US006952181B2

(12) United States Patent
Karr et al.

(10) Patent No.: US 6,952,181 B2
(45) Date of Patent: Oct. 4, 2005

(54) LOCATING A MOBILE STATION USING A PLURALITY OF WIRELESS NETWORKS AND APPLICATIONS THEREFOR

(75) Inventors: Charles L Karr, Tuscaloosa, AL (US); Frederick W. LeBlanc, Arvada, CO (US); Dennis J. Dupray, Golden, CA (US)

(73) Assignee: TracBeam, LLC, Golden, CO (US)

( * ) Notice: Subject to any disclaimer, the term of this patent is extended or adjusted under 35 U.S.C. 154(b) by 53 days.

(21) Appl. No.: 09/820,584

(22) Filed: Mar. 28, 2001

(65) Prior Publication Data

US 2003/0222819 A1 Dec. 4, 2003

Related U.S. Application Data

(63) Continuation of application No. 09/230,109, filed as application No. PCT/US97/15933 on Sep. 8, 1997, now Pat. No. 6,236,365.
(60) Provisional application No. 60/056,603, filed on Aug. 20, 1997, provisional application No. 60/044,821, filed on Apr. 25, 1997, and provisional application No. 60/025,855, filed on Sep. 9, 1996.

(51) Int. Cl.[7] .................................................. G01S 3/02
(52) U.S. Cl. ........................ 342/457; 342/450; 342/453
(58) Field of Search ................................. 342/450, 451, 342/456, 457, 463, 453; 455/456.1, 456.3, 456.6, 457, 65, 456

(56) References Cited

U.S. PATENT DOCUMENTS

| | | | |
|---|---|---|---|
| 3,886,553 A | 5/1975 | Bates ...................... | 343/112 R |
| 4,023,176 A | 5/1977 | Currie et al. ............ | 343/113 R |
| 4,232,313 A | 11/1980 | Fleishman ................. | 343/6 R |
| 4,347,618 A | 8/1982 | Kavouras et al. ............. | 375/37 |
| 4,438,439 A | 3/1984 | Shreve ....................... | 343/449 |
| 4,475,010 A | 10/1984 | Huensch et al. .......... | 179/2 EB |
| RE31,962 E | 7/1985 | Brodeur ...................... | 343/389 |
| 4,630,057 A | 12/1986 | Martin ....................... | 342/358 |
| 4,636,795 A | 1/1987 | Dano ........................ | 342/387 |
| 4,651,157 A | 3/1987 | Gray et al. ................. | 342/457 |
| 4,670,758 A | 6/1987 | Campbell ................... | 342/458 |
| 4,700,374 A | 10/1987 | Bini ........................... | 379/60 |
| 4,721,958 A | 1/1988 | Jenkin ......................... | 342/13 |

(Continued)

FOREIGN PATENT DOCUMENTS

| | | |
|---|---|---|
| EP | 0 177 203 A2 | 9/1985 |
| EP | 0 546 758 A2 | 6/1993 |

(Continued)

OTHER PUBLICATIONS

Miller, RT, et al., "Protein fold recognition by sequence threading: tools and assessment techniques," Journal Announcement, Department of Biochemistry and Molecular Biology, University College, London, United Kingdom, Jan. 1998.

(Continued)

*Primary Examiner*—Dao Phan

(57) ABSTRACT

A location is disclosed for wireless telecommunication infrastructures. The systems output requested locations of hand sets or mobile stations (MS) based on, e.g., AMPS, NAMPS, CDMA or TDMA communication standards. The system determines both local MS locations, and more global MS location requests via, e.g., Internet communication. The system uses a plurality of mobile station locating technologies, including those based on, e.g., (1) two-way TOA and TDOA; (2) home base stations and (3) distributed antenna provisioning. The system is useful for 911 emergency calls, tracking, routing, people and animal location including applications for confinement to and exclusion from certain areas. The system is particularly useful for estimating a location of an MS using information received from a commercial mobile radio service provider (CMRS) for which the MS is not registered for subscriber services.

232 Claims, 41 Drawing Sheets

WIRELESS LOCATION USING MULTIPLE CMRSs

U.S. PATENT DOCUMENTS

| | | |
|---|---|---|
| 4,740,792 A | 4/1988 | Sagey et al. ................ 342/457 |
| 4,742,357 A | 5/1988 | Rackley ....................... 342/457 |
| 4,799,062 A | 1/1989 | Sanderford, Jr. et al. ... 342/450 |
| 4,857,840 A | 8/1989 | Lanchais .................... 324/207 |
| 4,860,352 A | 8/1989 | Laurance et al. ............. 380/23 |
| 4,864,313 A | 9/1989 | Konneker ................... 342/457 |
| 4,876,550 A | 10/1989 | Kelly ......................... 342/451 |
| 4,879,713 A | 11/1989 | Ichiyoshi ..................... 370/75 |
| 4,888,593 A | 12/1989 | Friedman et al. ........... 342/387 |
| 4,914,689 A | 4/1990 | Quade et al. ................ 379/142 |
| 4,952,772 A | 8/1990 | Zana ..................... 219/124.34 |
| 4,990,922 A | 2/1991 | Young et al. ................. 342/52 |
| 4,992,796 A | 2/1991 | Apostolos .................. 342/156 |
| 5,003,317 A | 3/1991 | Gray et al. ................. 342/457 |
| 5,008,679 A | 4/1991 | Effland et al. .............. 342/353 |
| 5,017,926 A | 5/1991 | Ames et al. ................ 342/353 |
| 5,034,898 A | 7/1991 | Lu et al. ..................... 364/513 |
| 5,043,736 A | 8/1991 | Darnell et al. .............. 342/357 |
| 5,055,851 A | 10/1991 | Sheffer ...................... 342/457 |
| 5,092,343 A | 3/1992 | Spitzer et al. .............. 128/733 |
| 5,099,245 A | 3/1992 | Sagey ........................ 342/357 |
| 5,111,209 A | 5/1992 | Toriyama ................... 342/357 |
| 5,119,102 A | 6/1992 | Barnard ...................... 342/357 |
| 5,119,104 A | 6/1992 | Heller ........................ 342/450 |
| 5,136,686 A | 8/1992 | Koza ............................ 395/13 |
| 5,142,590 A | 8/1992 | Carpenter et al. ............ 382/14 |
| 5,155,490 A | 10/1992 | Spradley et al. ............ 342/357 |
| 5,163,004 A | 11/1992 | Rentz ......................... 364/460 |
| 5,166,694 A | 11/1992 | Russell et al. .............. 342/457 |
| 5,177,489 A | 1/1993 | Hatch ........................ 342/357 |
| 5,184,347 A | 2/1993 | Farwell et al. ............. 370/94.1 |
| 5,191,342 A | 3/1993 | Alsup et al. ................ 342/465 |
| 5,193,110 A | 3/1993 | Jones et al. ................... 379/94 |
| 5,208,756 A | 5/1993 | Song ......................... 364/706 |
| 5,212,765 A | 5/1993 | Skeirik ........................ 395/11 |
| 5,212,804 A | 5/1993 | Choate ..................... 455/33.1 |
| 5,214,789 A | 5/1993 | George ..................... 455/33.2 |
| 5,218,367 A | 6/1993 | Sheffer et al. .............. 342/457 |
| 5,218,618 A | 6/1993 | Sagey ........................... 375/1 |
| 5,218,716 A | 6/1993 | Comroe et al. ................ 455/33 |
| 5,223,844 A | 6/1993 | Mansell et al. ............. 342/357 |
| 5,225,842 A | 7/1993 | Brown et al. ............... 342/357 |
| 5,235,633 A | 8/1993 | Dennison et al. ............. 379/60 |
| 5,243,530 A | 9/1993 | Stanifer et al. .............. 364/452 |
| 5,251,273 A | 10/1993 | Betts et al. .................... 382/57 |
| 5,260,711 A | 11/1993 | Sterzer ....................... 342/375 |
| 5,278,892 A | 1/1994 | Bolliger et al. ............... 379/60 |
| 5,280,295 A | 1/1994 | Kelley et al. ............... 342/463 |
| 5,280,472 A | 1/1994 | Gilhousen et al. ............ 370/18 |
| 5,282,261 A | 1/1994 | Skeirik ........................ 395/22 |
| 5,293,642 A | 3/1994 | Lo ............................. 455/33.1 |
| 5,293,645 A | 3/1994 | Sood ........................ 455/54.1 |
| 5,295,180 A | 3/1994 | Vendetti et al. .............. 379/59 |
| 5,311,195 A | 5/1994 | Mathis et al. ............... 342/357 |
| 5,317,323 A * | 5/1994 | Kennedy et al. ............ 342/457 |
| 5,319,374 A | 6/1994 | Desai et al. ................ 342/387 |
| 5,325,419 A | 6/1994 | Connolly et al. ............. 379/60 |
| 5,327,144 A * | 7/1994 | Stilp et al. .................. 342/387 |
| 5,331,550 A | 7/1994 | Stafford et al. ........ 364/413.02 |
| 5,349,631 A | 9/1994 | Lee ............................. 379/59 |
| 5,359,521 A | 10/1994 | Kyrtsos et al. .............. 364/449 |
| 5,363,110 A | 11/1994 | Inamiya ..................... 342/357 |
| 5,365,447 A | 11/1994 | Dennis ....................... 364/449 |
| 5,365,450 A | 11/1994 | Schuchman et al. ........ 364/450 |
| 5,365,516 A * | 11/1994 | Jandrell ....................... 370/18 |
| 5,365,544 A | 11/1994 | Schilling ....................... 375/1 |
| 5,379,224 A | 1/1995 | Brown et al. ............... 364/449 |
| 5,388,147 A | 2/1995 | Grimes ....................... 379/59 |
| 5,388,259 A | 2/1995 | Fleischman et al. ........ 395/600 |
| 5,389,934 A | 2/1995 | Kass .......................... 342/357 |
| 5,390,339 A | 2/1995 | Bruckert et al. ........... 455/33.2 |
| 5,392,052 A | 2/1995 | Eberwine ................... 342/357 |
| 5,394,158 A | 2/1995 | Chia .......................... 342/457 |
| 5,394,435 A | 2/1995 | Weerackody ............... 375/206 |
| 5,395,366 A | 3/1995 | D'Andrea et al. ........ 604/890.1 |
| 5,398,302 A | 3/1995 | Thrift .......................... 395/23 |
| 5,402,520 A | 3/1995 | Schnitta ....................... 395/22 |
| 5,408,586 A | 4/1995 | Skeirik ........................ 395/23 |
| 5,408,588 A | 4/1995 | Ulug ........................... 395/23 |
| 5,410,737 A | 4/1995 | Jones ........................ 455/56.1 |
| 5,420,914 A | 5/1995 | Blumhardt .................. 379/114 |
| 5,422,813 A | 6/1995 | Schuchman et al. ........ 364/449 |
| 5,426,745 A | 6/1995 | Baji et al. ................... 395/375 |
| 5,434,927 A | 7/1995 | Brady et al. ................. 382/104 |
| 5,438,644 A | 8/1995 | Fu ............................... 395/22 |
| 5,444,451 A | 8/1995 | Johnson et al. ............. 342/453 |
| 5,448,754 A | 9/1995 | Ho et al. .................... 455/34.1 |
| 5,457,736 A | 10/1995 | Cain et al. .................... 379/60 |
| 5,473,602 A | 12/1995 | McKenna et al. ............ 370/60 |
| 5,479,397 A | 12/1995 | Lee ............................. 370/18 |
| 5,479,482 A | 12/1995 | Grimes ........................ 379/59 |
| 5,485,163 A | 1/1996 | Singer et al. ............... 342/457 |
| 5,506,864 A | 4/1996 | Schilling .................... 375/205 |
| 5,508,707 A | 4/1996 | LeBlanc et al. ............. 342/457 |
| 5,508,708 A | 4/1996 | Ghosh et al. ............... 342/457 |
| 5,512,908 A | 4/1996 | Herrick ....................... 342/387 |
| 5,513,243 A | 4/1996 | Kage ........................... 379/58 |
| 5,513,246 A | 4/1996 | Jonsson et al. ............... 379/60 |
| 5,515,378 A | 5/1996 | Roy, III et al. ............. 370/95.1 |
| 5,515,419 A | 5/1996 | Sheffer ........................ 379/58 |
| 5,517,667 A | 5/1996 | Wang .......................... 395/24 |
| 5,519,760 A | 5/1996 | Borkowski et al. ........... 379/59 |
| 5,526,001 A | 6/1996 | Rose et al. .................. 342/442 |
| 5,526,357 A | 6/1996 | Jandrell ..................... 370/95.2 |
| 5,526,466 A | 6/1996 | Takizawa ................... 395/2.62 |
| 5,537,460 A | 7/1996 | Holliday, Jr. et al. ......... 379/59 |
| 5,546,445 A | 8/1996 | Dennison et al. ............. 379/60 |
| 5,555,257 A | 9/1996 | Dent ........................ 370/95.1 |
| 5,561,704 A | 10/1996 | Salimando ................... 379/58 |
| 5,563,611 A | 10/1996 | McGann et al. ............. 342/389 |
| 5,563,931 A | 10/1996 | Bishop et al. ................ 379/59 |
| 5,564,079 A | 10/1996 | Olsson ...................... 455/54.1 |
| 5,570,412 A | 10/1996 | LeBlanc ...................... 379/58 |
| 5,572,218 A | 11/1996 | Cohen et al. ............... 342/357 |
| 5,574,648 A | 11/1996 | Pilley ......................... 364/439 |
| 5,577,169 A | 11/1996 | Prezioso ....................... 395/61 |
| 5,581,596 A | 12/1996 | Hogan ......................... 379/59 |
| 5,583,513 A | 12/1996 | Cohen ........................ 342/357 |
| 5,583,517 A | 12/1996 | Yokev et al. ................ 342/457 |
| 5,588,038 A | 12/1996 | Snyder ........................ 379/57 |
| 5,592,180 A * | 1/1997 | Yokev et al. ................ 342/450 |
| 5,594,425 A | 1/1997 | Ladner et al. .......... 340/825.06 |
| 5,594,740 A | 1/1997 | LaDue ......................... 379/59 |
| 5,594,782 A | 1/1997 | Zicker et al. ................. 379/63 |
| 5,596,625 A | 1/1997 | LeBlanc ....................... 379/60 |
| 5,600,705 A | 2/1997 | Maenpaa ..................... 379/58 |
| 5,600,706 A | 2/1997 | Dunn et al. .................. 379/59 |
| 5,602,903 A | 2/1997 | LeBlanc et al. .............. 379/60 |
| 5,604,765 A | 2/1997 | Bruno et al. ................ 375/200 |
| 5,608,410 A | 3/1997 | Stilp et al. .................. 342/387 |
| 5,610,815 A | 3/1997 | Gudat et al. .......... 364/424.027 |
| 5,610,972 A | 3/1997 | Emery et al. ................. 379/58 |
| 5,611,704 A | 3/1997 | Kamizono et al. .......... 439/164 |
| 5,612,703 A | 3/1997 | Mallinckrodt ............... 342/457 |
| 5,613,041 A | 3/1997 | Keeler et al. ................. 395/23 |
| 5,613,205 A | 3/1997 | Dufour ...................... 455/33.2 |
| 5,614,914 A | 3/1997 | Bolgiano et al. ............ 342/364 |
| 5,619,552 A | 4/1997 | Karppanen et al. ........... 379/60 |
| 5,621,848 A | 4/1997 | Wang .......................... 395/2.2 |
| 5,625,668 A | 4/1997 | Loomis et al. ................ 379/58 |
| 5,629,707 A | 5/1997 | Heuvel et al. .............. 342/357 |

| | | | |
|---|---|---|---|
| 5,631,469 A | 5/1997 | Carrieri et al. | 250/341.5 |
| 5,638,486 A | 6/1997 | Wang et al. | 395/2.45 |
| 5,640,103 A | 6/1997 | Petsche et al. | 324/772 |
| 5,646,630 A | 7/1997 | Sheynblat et al. | 342/357 |
| 5,649,065 A | 7/1997 | Lo et al. | 395/23 |
| 5,652,570 A | 7/1997 | Lepkofker | 340/573 |
| 5,657,487 A | 8/1997 | Doner | 455/456 |
| 5,663,734 A | 9/1997 | Krasner | 342/357 |
| 5,673,322 A | 9/1997 | Pepe et al. | 380/49 |
| 5,675,344 A | 10/1997 | Tong et al. | 342/457 |
| 5,675,788 A | 10/1997 | Husick et al. | 395/615 |
| 5,686,924 A | 11/1997 | Trimble et al. | 342/357 |
| 5,701,328 A | 12/1997 | Schuchman et al. | 375/204 |
| 5,710,758 A | 1/1998 | Soliman et al. | 370/241 |
| 5,710,918 A | 1/1998 | Lagarde et al. | 395/610 |
| 5,717,406 A | 2/1998 | Sanderford et al. | 342/457 |
| 5,719,584 A | 2/1998 | Otto | 342/465 |
| 5,724,047 A | 3/1998 | Lioio et al. | 342/442 |
| 5,724,648 A | 3/1998 | Shaughnessy et al. | 455/56.1 |
| 5,724,660 A | 3/1998 | Kauser et al. | 455/456 |
| 5,727,057 A | 3/1998 | Emery et al. | 379/211 |
| 5,729,549 A | 3/1998 | Kostreski et al. | 370/522 |
| 5,732,074 A | 3/1998 | Spaur et al. | 370/313 |
| 5,732,354 A | 3/1998 | MacDonald | 455/456 |
| 5,736,964 A | 4/1998 | Ghosh et al. | 342/457 |
| 5,737,431 A | 4/1998 | Brandstein et al. | 381/92 |
| 5,742,509 A | 4/1998 | Goldberg et al. | 364/449.5 |
| 5,742,905 A | 4/1998 | Pepe et al. | 455/461 |
| 5,754,955 A | 5/1998 | Ekbatani | 455/422 |
| 5,764,756 A | 6/1998 | Onweller | 379/242 |
| 5,774,802 A | 6/1998 | Tell et al. | 455/408 |
| 5,774,805 A | 6/1998 | Zicker | 455/426 |
| 5,774,829 A | 6/1998 | Cisneros et al. | 701/213 |
| 5,774,869 A | 6/1998 | Toader | 705/10 |
| 5,786,773 A | 7/1998 | Murphy | 340/947 |
| 5,787,354 A | 7/1998 | Gray et al. | 455/456 |
| 5,790,953 A | 8/1998 | Wang et al. | 455/435 |
| 5,790,974 A | 8/1998 | Tognazzini | 701/204 |
| 5,799,016 A | 8/1998 | Onweller | 370/401 |
| 5,802,454 A | 9/1998 | Goshay et al. | 455/31.2 |
| 5,802,518 A | 9/1998 | Karaev et al. | 707/9 |
| 5,805,670 A | 9/1998 | Pons et al. | 379/45 |
| 5,809,415 A | 9/1998 | Rossmann | 455/422 |
| 5,815,538 A | 9/1998 | Grell et al. | 375/356 |
| 5,815,814 A | 9/1998 | Dennison et al. | 455/456 |
| RE35,916 E | 10/1998 | Dennison et al. | 455/456 |
| 5,819,273 A | 10/1998 | Vora et al. | 707/10 |
| 5,819,301 A | 10/1998 | Rowe et al. | 707/513 |
| 5,822,539 A | 10/1998 | van Hoff | 395/200.66 |
| 5,832,367 A | 11/1998 | Bamburak et al. | 455/62 |
| 5,835,857 A | 11/1998 | Otten | 455/410 |
| 5,835,907 A | 11/1998 | Newman | 707/10 |
| 5,838,562 A | 11/1998 | Gudat et al. | 364/424.02 |
| 5,842,130 A | 11/1998 | Oprescu-Surcobe et al. | 455/456 |
| 5,844,522 A | 12/1998 | Sheffer et al. | 342/457 |
| 5,845,198 A | 12/1998 | Bamburak et al. | 455/31.1 |
| 5,845,267 A | 12/1998 | Ronen | 705/40 |
| 5,857,181 A | 1/1999 | Augenbraun | 707/2 |
| 5,864,755 A | 1/1999 | King et al. | 455/404 |
| 5,867,495 A | 2/1999 | Elliott et al. | 370/352 |
| 5,867,799 A | 2/1999 | Lang et al. | 707/1 |
| 5,870,029 A | 2/1999 | Otto et al. | 340/825.36 |
| 5,872,539 A | 2/1999 | Mullen | 342/357 |
| 5,873,040 A | 2/1999 | Dunn et al. | 455/456 |
| 5,873,076 A | 2/1999 | Barr et al. | 707/3 |
| 5,875,394 A | 2/1999 | Daly et al. | 455/411 |
| 5,875,401 A | 2/1999 | Rochkind | 455/466 |
| 5,883,598 A | 3/1999 | Parl et al. | 342/457 |
| 5,890,068 A * | 3/1999 | Fattouche et al. | 455/456 |
| 5,892,441 A | 4/1999 | Woolley et al. | 340/539 |
| 5,893,091 A | 4/1999 | Hunt et al. | 707/3 |
| 5,901,358 A | 5/1999 | Petty et al. | 455/456 |
| 5,903,844 A | 5/1999 | Bruckert et al. | 455/456 |
| 5,905,455 A | 5/1999 | Heger et al. | 342/22 |
| 5,906,655 A | 5/1999 | Fan | 701/216 |
| 5,913,170 A | 6/1999 | Wortham | 455/457 |
| 5,914,675 A | 6/1999 | Tognazzini | 340/989 |
| 5,917,405 A | 6/1999 | Joao | 340/426 |
| 5,917,449 A | 6/1999 | Sanderford et al. | 342/457 |
| 5,917,866 A | 6/1999 | Pon | 375/346 |
| 5,920,873 A | 7/1999 | Van Huben et al. | 707/202 |
| 5,924,090 A | 7/1999 | Krellenstein | 707/5 |
| 5,926,133 A | 7/1999 | Green, Jr. | 342/363 |
| 5,933,421 A | 8/1999 | Alamouti et al. | 370/330 |
| 5,933,822 A | 8/1999 | Braden-Harder et al. | 707/5 |
| 5,936,572 A | 8/1999 | Loomis et al. | 342/357 |
| 5,943,014 A | 8/1999 | Gilhousen | 342/465 |
| 5,945,948 A * | 8/1999 | Buford et al. | 342/457 |
| 5,949,815 A | 9/1999 | Pon | 375/208 |
| 5,952,969 A | 9/1999 | Hagerman et al. | 342/457 |
| 5,959,568 A | 9/1999 | Woolley | 342/42 |
| 5,963,866 A | 10/1999 | Palamara et al. | 455/456 |
| 5,966,658 A | 10/1999 | Kennedy, III et al. | 455/426 |
| 5,973,643 A | 10/1999 | Hawkes et al. | 342/457 |
| 5,977,913 A | 11/1999 | Christ | 342/465 |
| 5,978,840 A | 11/1999 | Nguyen et al. | 709/217 |
| 5,982,324 A | 11/1999 | Watters et al. | 342/357.06 |
| 5,982,891 A | 11/1999 | Ginter et al. | 380/4 |
| 5,983,214 A | 11/1999 | Lang et al. | 707/1 |
| 5,987,329 A | 11/1999 | Yost et al. | 455/456 |
| 5,999,124 A | 12/1999 | Sheynblat | 342/357.09 |
| 5,999,126 A | 12/1999 | Ito | 342/357.1 |
| 6,009,334 A | 12/1999 | Grubeck et al. | 455/456 |
| 6,014,102 A | 1/2000 | Mitzlaff et al. | 342/457 |
| 6,026,304 A | 2/2000 | Hilsenrath et al. | 455/456 |
| 6,028,551 A | 2/2000 | Schoen et al. | 342/357 |
| 6,029,161 A | 2/2000 | Lang et al. | 707/1 |
| 6,031,490 A | 2/2000 | Forssén et al. | 342/457 |
| 6,034,635 A | 3/2000 | Gilhousen | 342/457 |
| 6,038,668 A | 3/2000 | Chipman et al. | 713/201 |
| 6,046,683 A | 4/2000 | Pidwerbetsky et al. | 340/825.54 |
| 6,047,192 A | 4/2000 | Maloney et al. | 455/456 |
| 6,061,064 A | 5/2000 | Reichlen | 345/418 |
| 6,064,339 A | 5/2000 | Wax et al. | 342/417 |
| 6,064,942 A | 5/2000 | Johnson et al. | 701/213 |
| 6,097,958 A | 8/2000 | Bergen | 455/456 |
| 6,101,178 A | 8/2000 | Beal | 370/336 |
| 6,101,390 A | 8/2000 | Jayaraman et al. | 455/456 |
| 6,101,391 A | 8/2000 | Ishizuka et al. | 455/457 |
| 6,108,555 A | 8/2000 | Maloney et al. | 455/456 |
| 6,157,621 A | 12/2000 | Brown et al. | 370/310 |
| 6,167,274 A | 12/2000 | Smith | 455/456 |
| 6,185,427 B1 | 2/2001 | Krasner et al. | 455/456 |
| 6,236,365 B1 * | 5/2001 | LeBlanc et al. | 342/457 |
| 6,240,285 B1 | 5/2001 | Blum et al. | 455/404 |
| 6,243,587 B1 | 6/2001 | Dent et al. | 455/456 |
| 6,249,245 B1 | 6/2001 | Watters et al. | 342/357.03 |
| 6,249,252 B1 | 6/2001 | Dupray | 342/450 |
| 6,308,072 B1 | 10/2001 | Labedz et al. | 455/448 |
| 6,321,092 B1 | 11/2001 | Fitch et al. | 455/456 |
| 6,324,404 B1 | 11/2001 | Dennison et al. | 455/456 |
| 6,330,452 B1 | 12/2001 | Fattouche et al. | 455/456 |
| 6,381,464 B1 | 4/2002 | Vannucci | 455/456 |
| 6,549,130 B1 | 4/2003 | Joao | 340/539 |

FOREIGN PATENT DOCUMENTS

| | | | |
|---|---|---|---|
| EP | 0 689 369 A1 | 12/1995 | |
| EP | 0 870 203 B12 | 12/1996 | G01S/5/04 |
| EP | 0 811 296 B1 | 9/2002 | H04Q/7/38 |
| GB | 1 605 207 | 6/1975 | |
| GB | 2 155 720 A | 3/1984 | |

| WO | WO 93/04453 | 3/1993 | |
| --- | --- | --- | --- |
| WO | WO 94/10978 | 1/1994 | ............ H04Q/7/04 |
| WO | WO 94/27161 | 4/1994 | |
| WO | WO 94/11853 | 5/1994 | ......... G08G/1/0968 |
| WO | WO 94/15412 | 7/1994 | ........... H04B/7/185 |
| WO | WO 96/14588 | 5/1996 | ............ G01S/5/02 |
| WO | WO 97/01228 | 1/1997 | ............ H04B/7/28 |
| WO | WO 97/22888 | 6/1997 | ............ G01S/5/04 |
| WO | WO 97/24010 | 7/1997 | ............ H04Q/7/38 |
| WO | WO 97/26750 | 7/1997 | .......... H04M/11/00 |
| WO | WO 97/38540 | 10/1997 | ............ H04Q/7/22 |
| WO | WO 97/41654 | 11/1997 | ............ H04H/1/00 |
| WO | WO 97/5002 | 12/1997 | ............ G01S/3/02 |
| WO | WO 98/00982 | 1/1998 | |
| WO | WO 98/10307 | 3/1998 | ............ G01S/3/02 |
| WO | PCT/US01/17957 | 6/2001 | |
| WO | WO 01/44998 A2 | 6/2001 | ........... G06F/17/60 |
| WO | WO 01/95642 | 12/2001 | ............ H04Q/7/20 |
| WO | WO 02/065250 A2 | 8/2002 | |

OTHER PUBLICATIONS

Dailey, D.J., "Demonstration of an Advanced Public Transportation System in the Context of an IVHS Regional Architecture," paper presented at the First World Congress on Applications on Transport Telematics and Intelligent Vehicle–Highway Systems, Nov. 30–Dec. 3, 1994.

Dalley, D.J., et al., "ITS Data Fusion," Final Research Report, Research Project T9903, Task 9, ATIS/ATMS Regional IVHS Demonstration, University of Washington, Apr., 1996.

Dartmouth College, "Soldiers, Agents and Wireless Networks: A Report on a Military Application," PAAM 2000.

Bass, Tim, "Intrusion Detection Systems & Multisensor Data Fusion: Creating Cyberspace Situational Awareness," Communications of the ACM, data unknown.

Callan, James P., et al., "Searching Distributed Collections with Inference Networks," 18th Annual International ACM SIGIR Conference on Research and Development in Information Retrieval, 1995.

Orphanoudakis, C.E., et al., "I$^2$Cnet: Content–Based Similarity Search in Geographically Distributed Repositories of Medical Images," *vol., 20(4), pp. 193–207, Computerized Medical Imaging and Graphics,* 1986.

Schopp, Michael, "User Modelling and Performance Evaluation of Distributed Location Management for Personal Communications Services," Proceedings of the 15$^{th}$ International Teletraffic Congress (ITC) 15, Washington, D.C., 1997, S. 23–34.

Kennemann, Olrik, "Continuous Location of Moving GMS Mobile Stations by Pattern Recognition Techniques," Fifth IEEE International Symposium on Personal, Indoor and Mobile Radio Communications, (PIMRC) '94), pp. 830–834, IEEE, Sep. 1994.

Smith, et al., "Passive Location of Mobile Cellular Telephone Terminals," pp. 221–225, IEEE, 1991.

U.S. Appl. No. 09/176,587 filed Oct. 21, 1998 entitled "A Wireless Location System For Calibrating Multiple Location Estimators."(1005).

CC Docket No. 94–102, Before the Federal Communications Commission, in the Matter of Revision of the Commission's Rules to Ensure Compatibility with Enhanced 911 Emergency Calling Systems; ex parte communication from Cambridge Positioning Systems Ltd. received Apr. 14, 1997 by the Commission.

Lepkofker; U.S. Appl. No. 08/245,149 Entitled "Individual Location System"; May 19, 1994.

Maloney et al.; U.S. Appl. No. 60/017,899 Entitled "Enhanced Time–Difference Localization System"; May 17, 1996.

Kosko, "Fuzzy Systems as Universal Approximators", 1994, *IEEE,* pp. 1329–1333.

Mardiraju et al., "Neural Networks for Robust Image Feature Classification: A Comparative Study", 1994, *IEEE,* pp. 423–430.

Rizzo et al., "Integration of Location Services in the Open Distributed Office", 1994, pp. 1–14.

Caffery et al.; "Vehicle Location and Tracking for IVHS in CDMA Microcells"; 5 pgs.

Caffery et al.; "Radio Location in Urban CDMA Microcells"; 5 pgs.

Beck et al.; "Simulation Results on the Downlink of a Qualcomm–like DS–CDMA–System Over Multipath fading channels"; pp. 1–7.

Pop et al., "Site Engineering for Indoor Wireless Spread Spectrum Communications"; 3 pgs.

Caffery et al.; "Overview of Radiolocation in CDMA Cellular Systems"; *IEEE Communications Magazine;* Apr. 1998; pp. 38–45.

Salcic, "AGPCS—An Automatic GSM–based Positioning and Communication System" *Proceedings of GeoComputation 1997 & SIRC 1997;* pp. 15–22.

Ramanathan et al.; "A Survey of Routing Techniques for Mobile Communications Networks"; 1996; pp. 1–31.

Pending Claims only: U.S. Appl. No. 09/194,367 filed Nov. 24, 1998 entitled "Wireless Location Using Multiple Mobile Station Location Techniques," which is the U.S. National Phase Application of International Application Serial No. PCT/US97/15892 with International Filing Date of Sep 8, 1997, which was published under International Publication No. WO 98/10307 with an International Filing Date of Mar. 12, 1998 (Copy of specification submitted in previously IDS.) (1003–PUS).

Pending Claims only: U.S. Appl. No. 09/770,838 filed Jan. 26, 2001 entitled "A Gateway and Hybrid Solutions for Wireless Location," which is a continuation of the above listed U.S. Appl. No. 09/194,367 filed Nov. 24, 1998 entitled "Wireless Location Using Multiple Mobile Station Location Techniques," which is the U.S. National Phase Application of International Application Serial No. PCT/US97/15892 with International Filing Date of Sep 8, 1997, which was published under International Publication No. WO 98/10307 with an International Filing Date of Mar. 12, 1998 (Copy of specification submitted in previously IDS.) (1003–1).

Pending Claims only: U.S. Appl. No. 10/262,413 filed Sep. 30, 2002 entitled "Wireless Location Using Hybrid Techniques," which is a continuation of the above listed 09/194, 367 filed Nov. 24, 1998 entitled "Wireless Location Using Multiple Mobile Station Location Techniques," which is the U.S. National Phase Application of International Application Serial No. PCT/US97/15892 with International Filing Date of Sep 8, 1997, which was published under International Publication No. WO 98/10307 with an International Filing Date of Mar. 12, 1998 (Copy of specification submitted in previously IDS.) (1003–2).

Pending Claims only: U.S. Appl. No. 10/262,338 filed Sep. 30, 2002 entitled "Wireless Location Using Signal Direction and Time Difference of Arrival," which is a continuation of the above listed U.S. Appl. No. 09/194,367 filed Nov. 24, 1998 entitled "Wireless Location Using Multiple Mobile Station Location Techniques," which is the U.S. National Phase Application of International Application Serial No. PCT/US97/15892 with International Filing Date of Sep 8, 1997, which was published under International Publication No. WO 98/10307 with an International Filing Date of Mar. 12, 1998 (Copy of specification submitted in previously IDS.) (1003–3).

* CC Docket No. 94–102, Before the Federal Communications Commission, in the Matter of Revision of the Commission's Rules to Ensure Compatibility with Enhanced 911 Emergency Calling Systems; "Comments of Harris Government Communication Systems Division *A Division of Harris Corporation*", filed Sep. 25, 1996.
* CC Docket No. 94–102, Before the Federal Communications Commission, in the Matter of Revision of the Commission's Rules to Ensure Compatibility with Enhanced 911 Emergency Calling Systems; "Reply Comments of KSI Inc. and MULIC Inc." filed Oct. 25, 1996.
* CC Docket No. 94–102, Before the Federal Communications Commission, in the Matter of Revision of the Commission's Rules to Ensure Compatibility with Enhanced 911 Emergency Calling Systems; *ex parte* communication from GeoTek Communications, Inc. received Apr. 14, 1997 by the Commission.
* CC Docket No. 94–102, Before the Federal Communications Commission, in the Matter of Revision of the Commission's Rules to Ensure Compatibility with Enhanced 911 Emergency Calling Systems; *ex parte* communication from XYPOINT Corporation, Inc. received Jul. 28, 1997 by the Commission.
* CC Docket No. 94–102, Before the Federal Communications Commission, in the Matter of Revision of the Commission's Rules to Ensure Compatibility with Enhanced 911 Emergency Calling Systems; *ex parte* communication from National Strategies, Inc., regarding enhanced 911 system trial by TruePosition, Inc. and New Jersey Office of Emergency Telecommunications Services, received Aug. 8, 1997 by the Commission.
* CC Docket No. 94–102, Before the Federal Communications Commission, in the Matter of Revision of the Commission's Rules to Ensure Compatibility with Enhanced 911 Emergency Calling Systems; *ex parte* communication from SnapTrack, Inc., received Jun. 27, 1997 by the Commission.
* from http:/www.uswcorp.com/laby.htm., Release concerning RadioCamera™, printed Sep. 14, 1998.
* Wylie et al., "The Non–Line of Sight Problem in Mobile Location Estimation".
* Evans, 1998, "New Satellites for Personal Communications," *Scientific American*, 278(4):70–77.
* Hills, 1998, Terrestrial Wireless Networks, *Scientific American*, 278(4):86–91.
* Pelton, 1998, "Telecommunications for the 21$^{st}$ Century," *Scientific American*, 278(4):80–85.
* Stutzmann et al., 1998, "Moving Beyond Wireless Voice Systems," *Scientific American*, 278(4):92–93.
* Driscoll, "Wireless Caller Location Systems", 1998, *GSP World Advanstar Communications, Inc.,* www.gpsworld.com/1198/1198driscol.html, pp. 1–8.

* Junius et al., "New Methods for Processing GSM Radio Measurement Data; Applications for Locating, Handover, and Network Management", 1994, *Communication Network, Aachen University of Technology, pp. 338–342.*
* Low, "Comparison of Urban Propagation Models with CW–Measurements", 1992, *IEEE Deutsche Bundespost Telekom*, pp. 936–942.
* "Location Systems and Technologies", 1994, *Wireless Emergency Services JEM Report,* Annex A pp. 42–46 and Appendix A pp. 1–2.
* Fechner et al., A Hybrid Neural Network Architecture for Automatic Object Recognition, 1994, *IEEE,* pp. 187–194.
* Sousa et al., "Delay Spread Measurements for the Digital Cellular Channel in Toronto", 1994, *IEEE,* pp. 837–847.
* Goldbsmith et al., "A Measurement–Based Model for Predicting Coverage Areas of Urban Microcells", 1993, *IEEE,* pp. 1013–1023.
* Ichitsubo et al., "A Statistical Model for Microcellular Multipath Propagation Environment", Prior to Dec. 22, 1997, *Wireless Systems Laboratories,* pp. 1–6.
* Wittenben et al., "Low Cost Noncoherent Receiver with Adaptive Antenna Combining for High Speed Wireless Lans", Prior to Dec. 22, 1997, *ASCOM Systec AG,* pp. 1–4.
* Gaspard et al., "Position Assignment in Digital Cellular Mobile Radio Networks (e.g. GSM) derived from Measurements at the Protocol Interface", Prior to Dec. 22, 1997, pp. 1–5.
* Dutta et al., "Modified Adaptive Multiuser Detector for DS–CDMA in Multipath Fading", Prior to Dec. 22, 1997, pp. 1–7.
* Gallant, "Neural Network Learning and Expert Systems", 1994, *the MIT Press,* pp. 132–137.
* Striglis et al., "A Multistage RAKE Receiver for Improved Capacity of CDMA Systems", 1994, *IEEE Vehicular Technology Conference,* pp. 1–5.
* Chan et al., "Multipath Propagation Effects on a CDMA Cellular System", 1994, *IEEE,* pp. 848–855.
* Wolfe et al., "Field Strength Prediction in Indoor Environments with Neural Networks", Prior to Dec. 22, 1997, pp. 1–5.
* "The Measearch Engine Years: Fit the First", 1992, http://www.conman.org/people/spc/refs/search.hpl.html, pp. 1–3.
* Lawrence et al., "Northern Light Search Engine Leads the Pack– Others Fall Behind", May 1, 1998, *Online Newsletter,* 19(5):pp. 1–2.
* Johnson, "Smart Technology Busting Out All Over Web", Jun. 15, 1998, *Electronic Engineering Times,* 1012 pp. 1–6.
* Notess, "Internet Search Engine Update", Jul. 1, 1998, *Online,* vol. v22:nr, pp. 1–3.
* Meadow, "Text Information Retrieval Systems", 1992, *Academic Press,* pp. 204–209.
* Iwayama et al., "Cluster–Based Text Catagorization: A Comparison of Category Search Strategies", 1995, *ACMSI-GIR,* pp. 273–279.
* Botafogo, "Cluster Analysis for Hypertext Systems", Jun. 1993, *ACM–SIRG,* pp. 116–124.
* Wang Baldonado et al., "SensMaker: An Information–Exploration Interface Supporting the Contextual Evolution of a User's Interests", 1997, *ACM–CHI,* pp. 11–18.
* Baldazo, "Navigating with a Web Compass: Quarterdeck Harnessess Leading–edge "Metasearch" Technology to Create a Smart Agent that Searches the Web and organizes the Results", Mar. 1996, *BYTE,* pp. 97–98.

* Weiss et al., "HyPursuit: A Hierarcical Network Search Engine that Exploits Content–Link Hypertext Clustering", 1996, *Hypertext,* pp. 180–193.

Christ, U.S. Appl. No. 60/038,037 Entitled "Method and Apparatus for Tracking and Locating Personnel" filed Feb. 7, 1997.

Maloney; U.S. Appl. No. 60/035,691, Entitled "Robust, Efficient, Localization System" filed Jan. 16, 1997.

Maloney; U.S. Appl. No. 60/017,269 Entitled "Efficient, Distributed, Time Difference Localization System" filed May 13, 1998.

U.S. Appl. No. 08/355,901 Entitled "MICR–Minature Emergency Geo–Location Beacon System For Personal Security", filed Dec. 13, 1994.

Communication from U.S. Patent and Trademark Office Re: U.S. Appl. No. 08/355,901 Paper from Examiner M. Blum of Group Art Unit 2202.

Communication from U.S. Patent and Trademark Office Re: U.S. Appl. No. 08/355,901 Response from Examiner regarding communication filed on Dec. 26, 1995 Dated Jul. 23, 1996.

Communication from U.S. Patent and Trademark Office Re: U.S. Appl. No. 08/355,901 Examiner Interview Summary Record Dated: Aug. 13, 1996.

Communication from U.S. Patent and Trademark Office Re: U.S. Appl. No. 08/355,901 Office Action Summary Dated: Mar. 14, 1997.

Communication from U.S. Patent and Trademark Office Re: U.S. Appl. No. 08/355,901 Office Action Summary Dated: Mar. 17, 1998.

Communication from U.S. Patent and Trademark Office Re: U.S. Appl. No. 08/355,901 Office Action Summary Dated: Jun. 24, 1998.

Communication from U.S. Patent and Trademark Office Re: U.S. Appl. No. 08/355,901 Advisory Action Dated: Aug. 11, 1998.

Communication from U.S. Patent and Trademark Office Re: U.S. Appl. No. 08/355,901 Advisory Action Dated: Sep. 9, 1998.

Communication from U.S. Patent and Trademark Office Re: U.S. Appl. No. 08/355,901 Advisory Action Dated: Oct. 9, 1998.

Communication from U.S. Patent and Trademark Office Re: U.S. Appl. No. 08/355,901 Advisory Action Dated: Nov. 4, 1998.

Ergon Proprietary; "Performance Analyses Brief: Micro-miniature Emergency Locator Systems, (MELS)"; May 1996.

Loran; 1992; "Users Handbook 1992 Edition"; *U.S. Coast Guard, Radionavigation Division;* 28 pgs.

Newton; 1981; "The Near–Term Potential of Doppler Location"; *John Hopkins APL Technical Digest;* pp. 16–31.

"ARGOS: Basic Description of the Argos System"; *ARGOS;* 7 pgs.

* cited by examiner

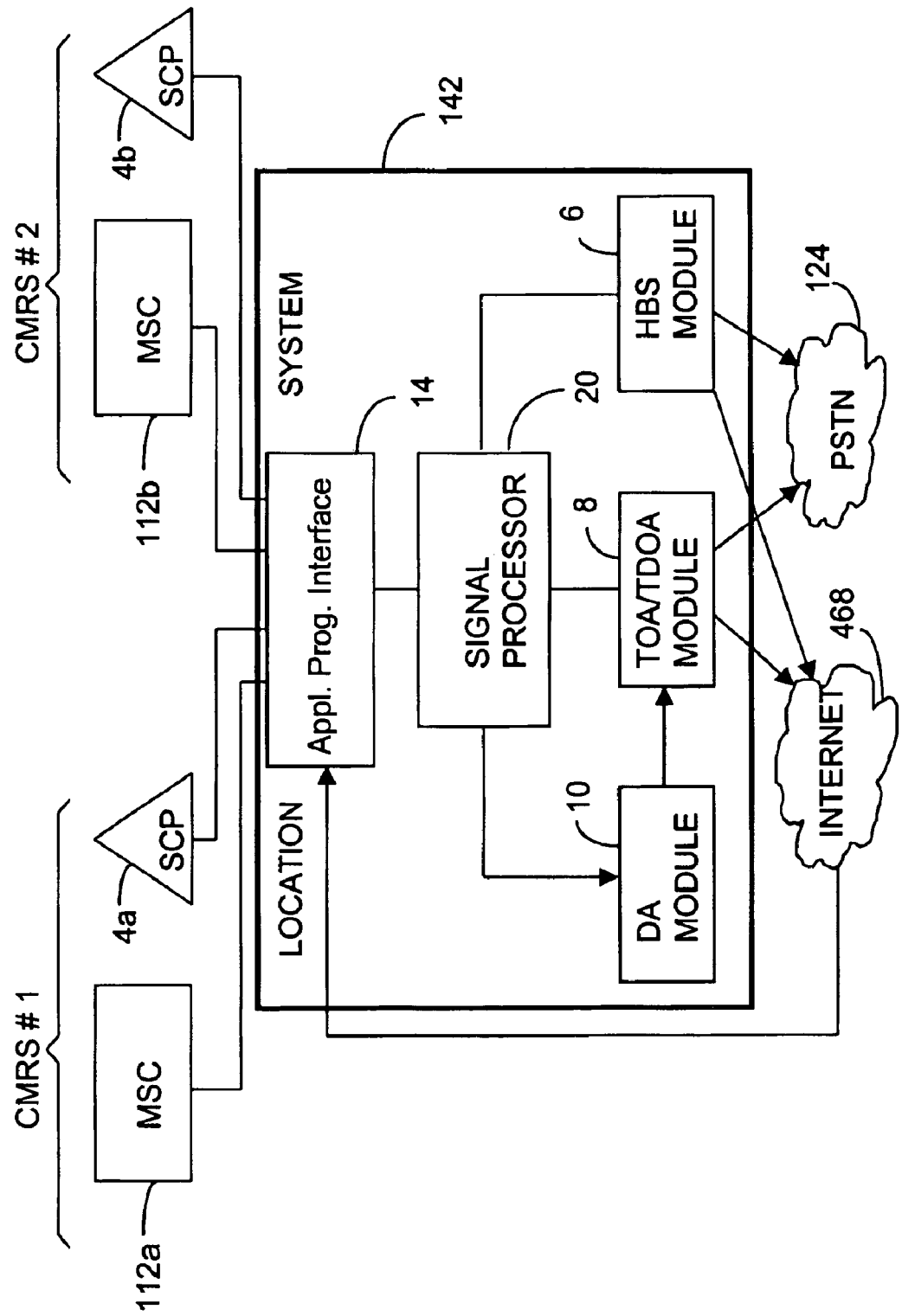
FIG. 1: WIRELESS LOCATION USING MULTIPLE CMRSs

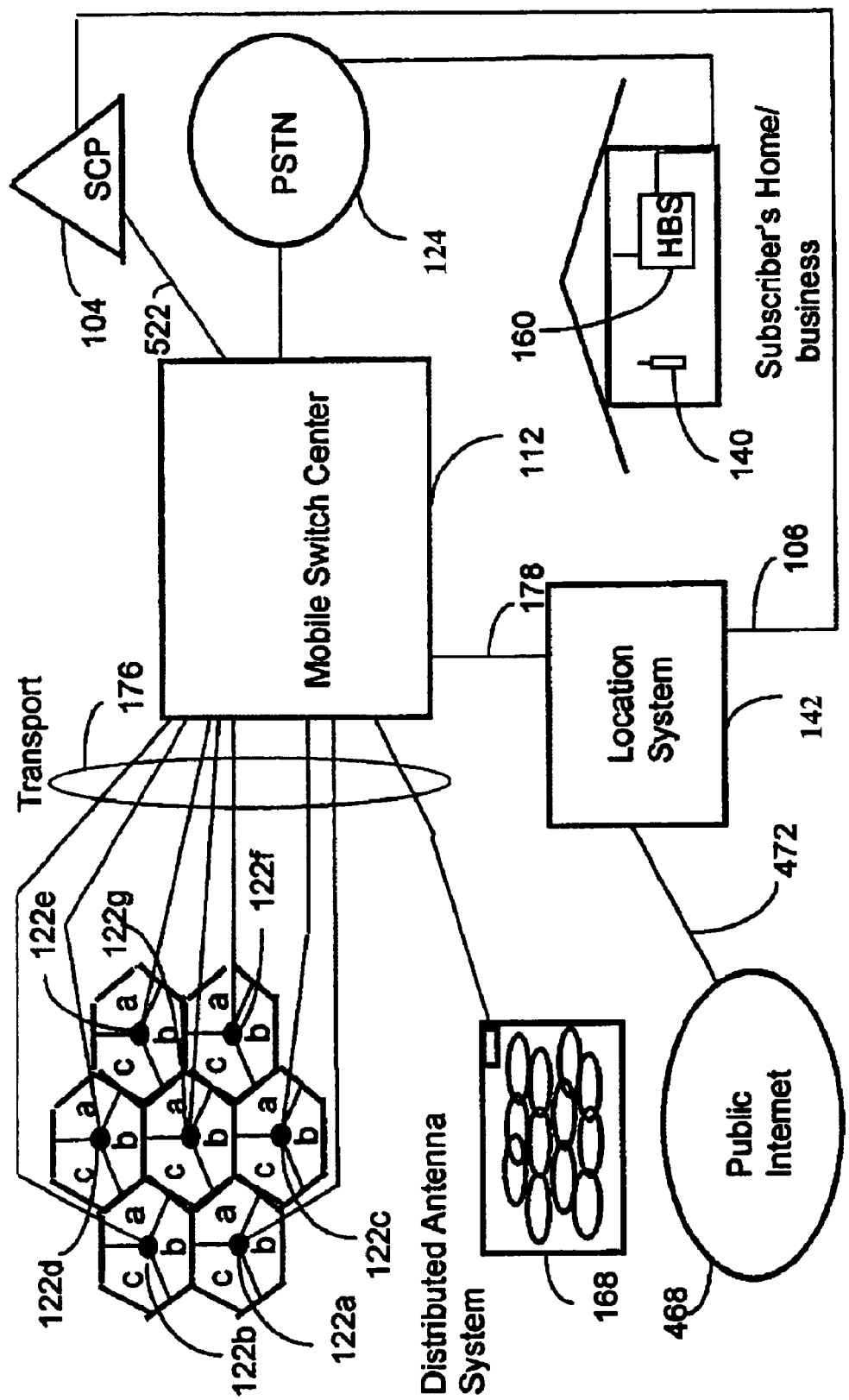
Fig. 2: WIRELESS LOCATION INTELLIGENT NETWORK ARCHITECTURE

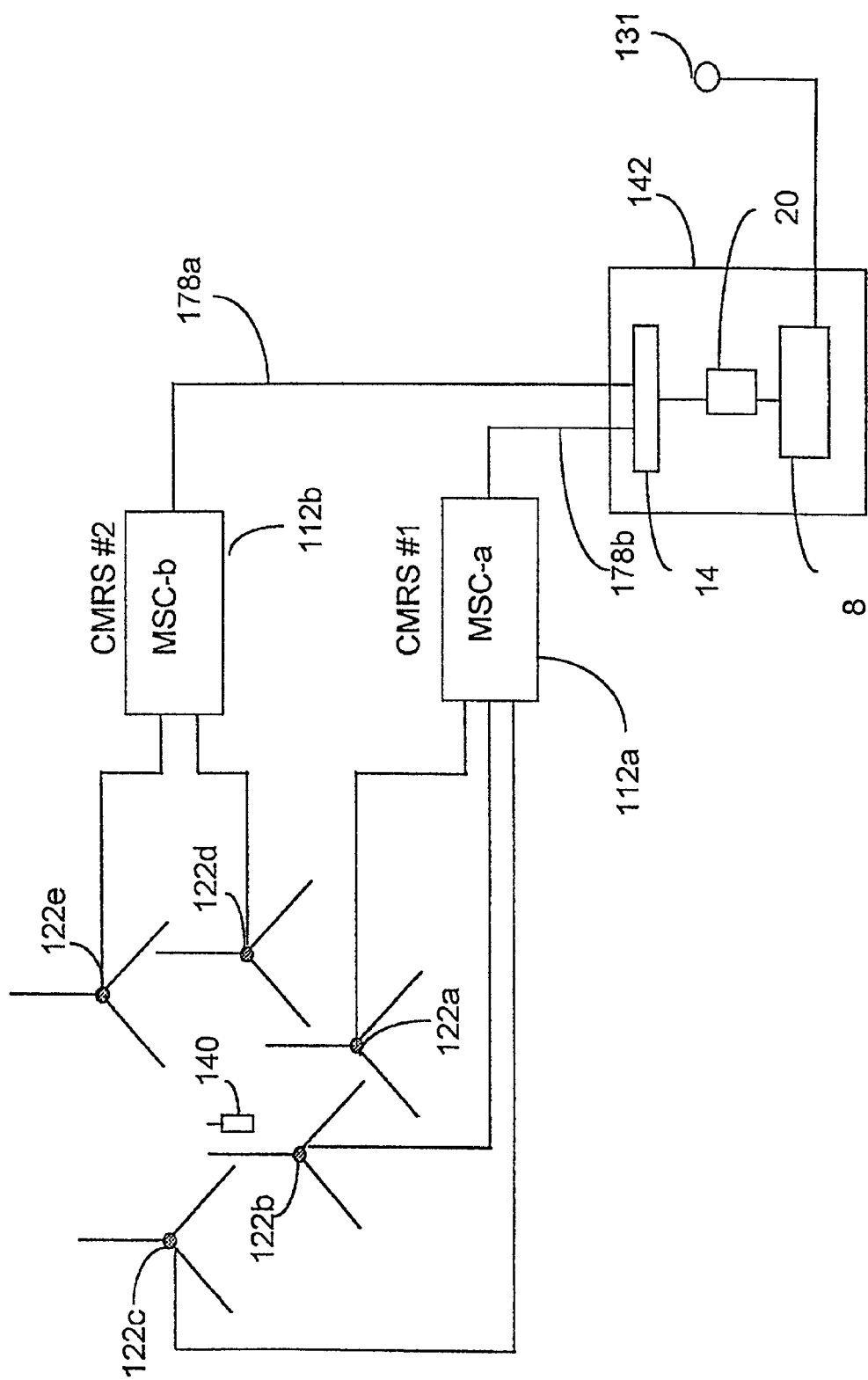
FIG. 3: SHARING CMRS BASE STATION INFRASTRUCTURE

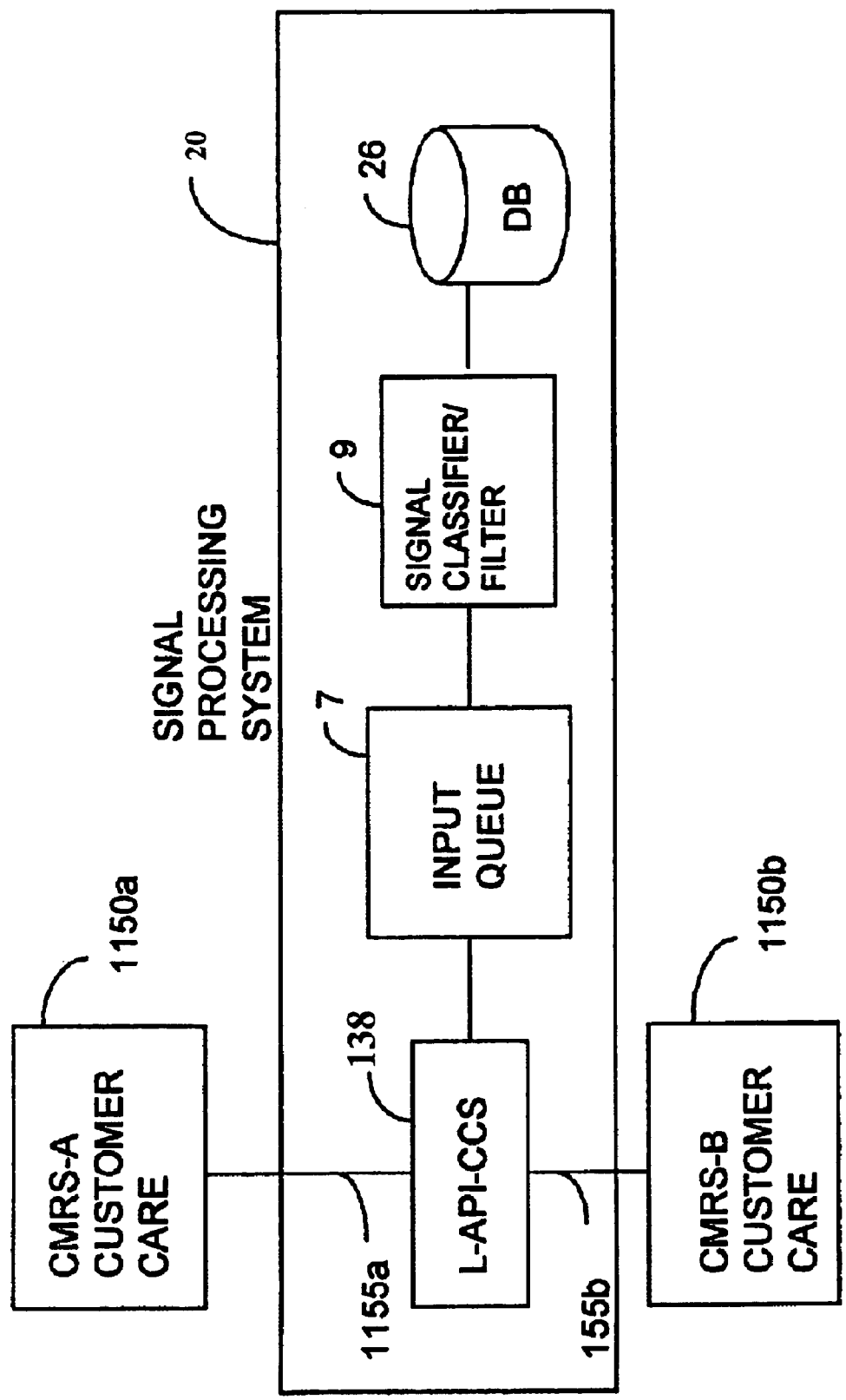
FIG. 4: LOCATION PROVISIONING VIA MULTIPLE CMRS

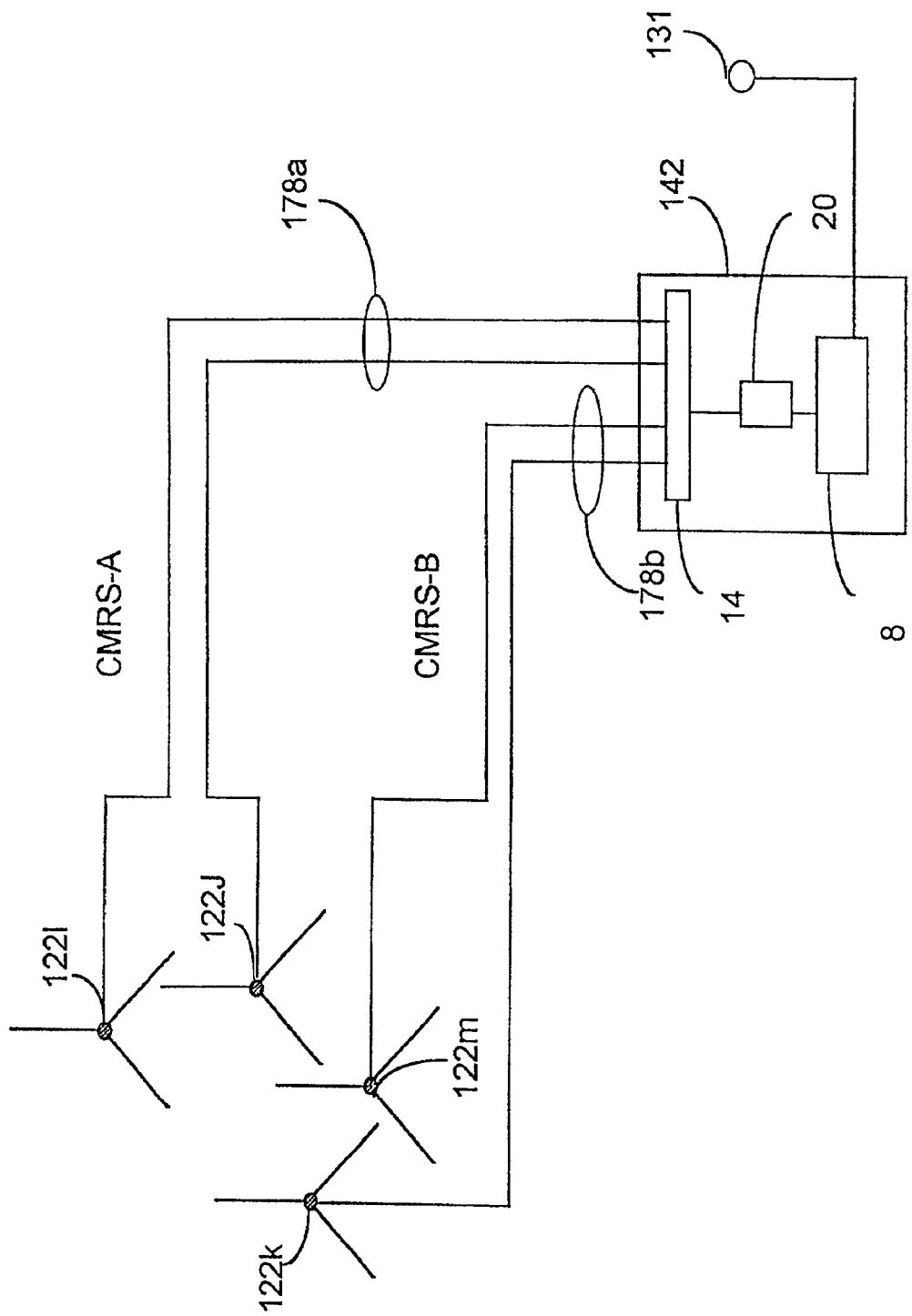
FIG. 5: LOCATION CENTER BASE STATION ACCESS, MULTIPLE CMRS

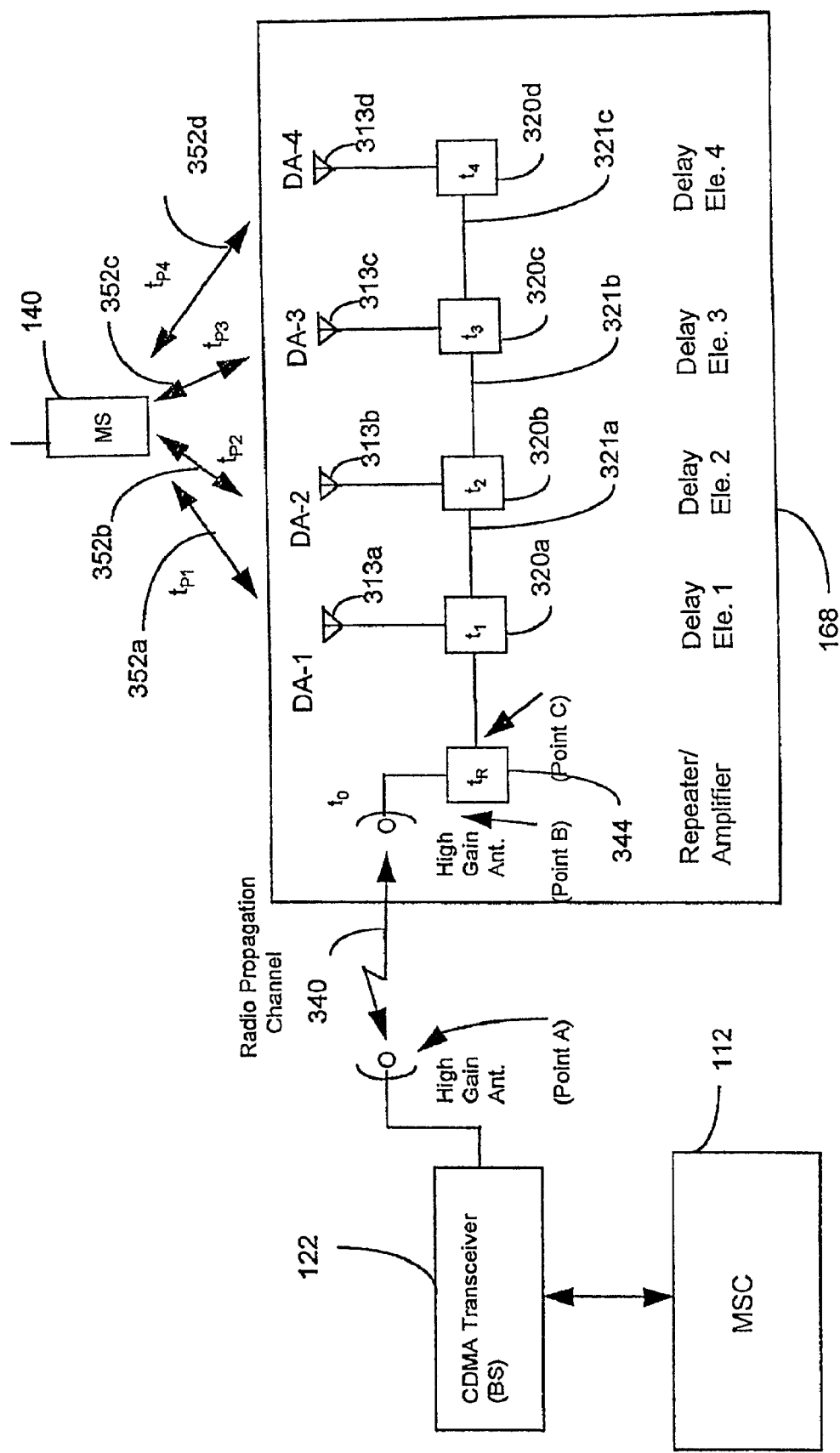
FIG. 6: DISTRIBUTED ANTENNA DELAY CHARACTERIZATION

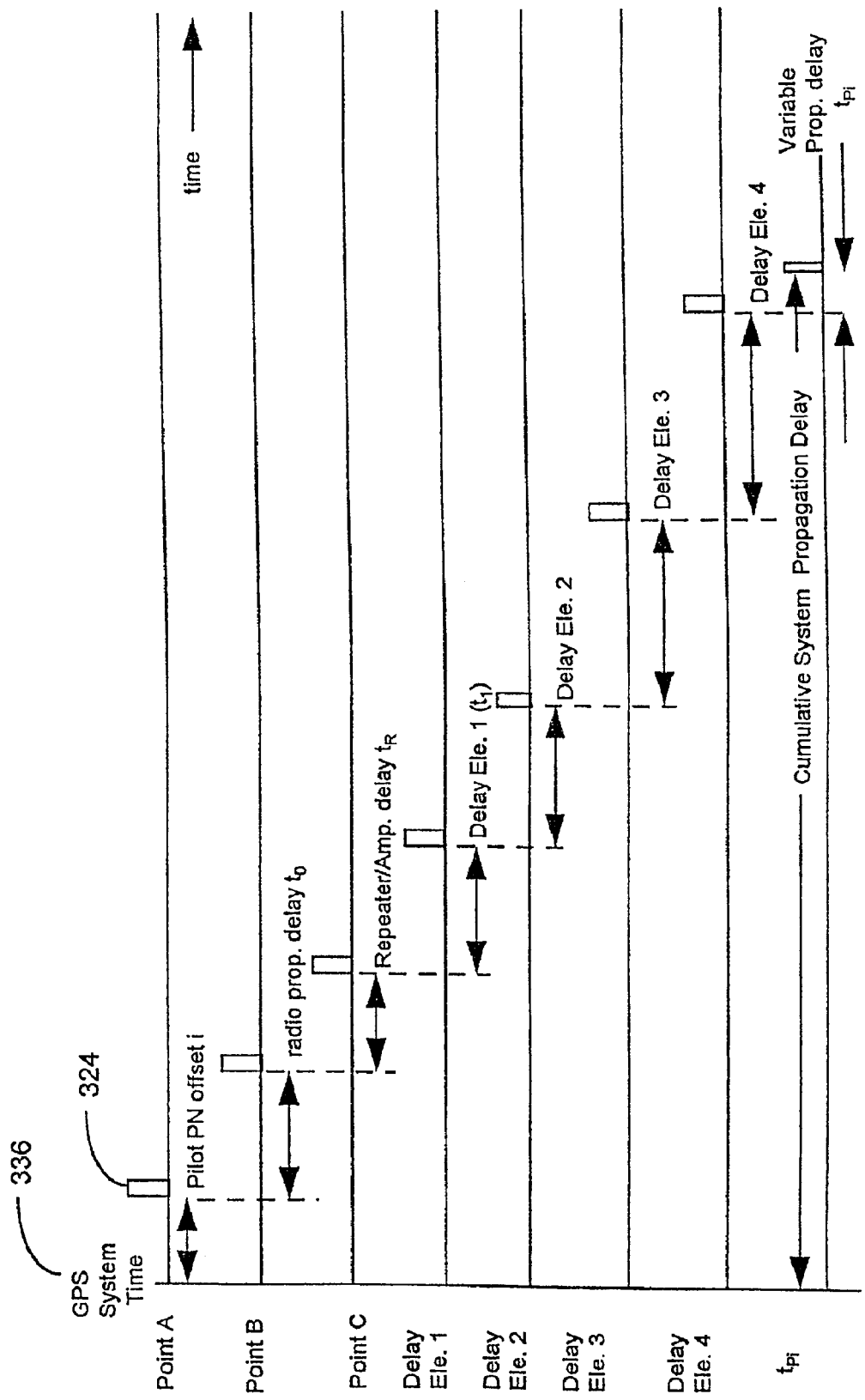
Fig. 7: DA System Timing Diagram

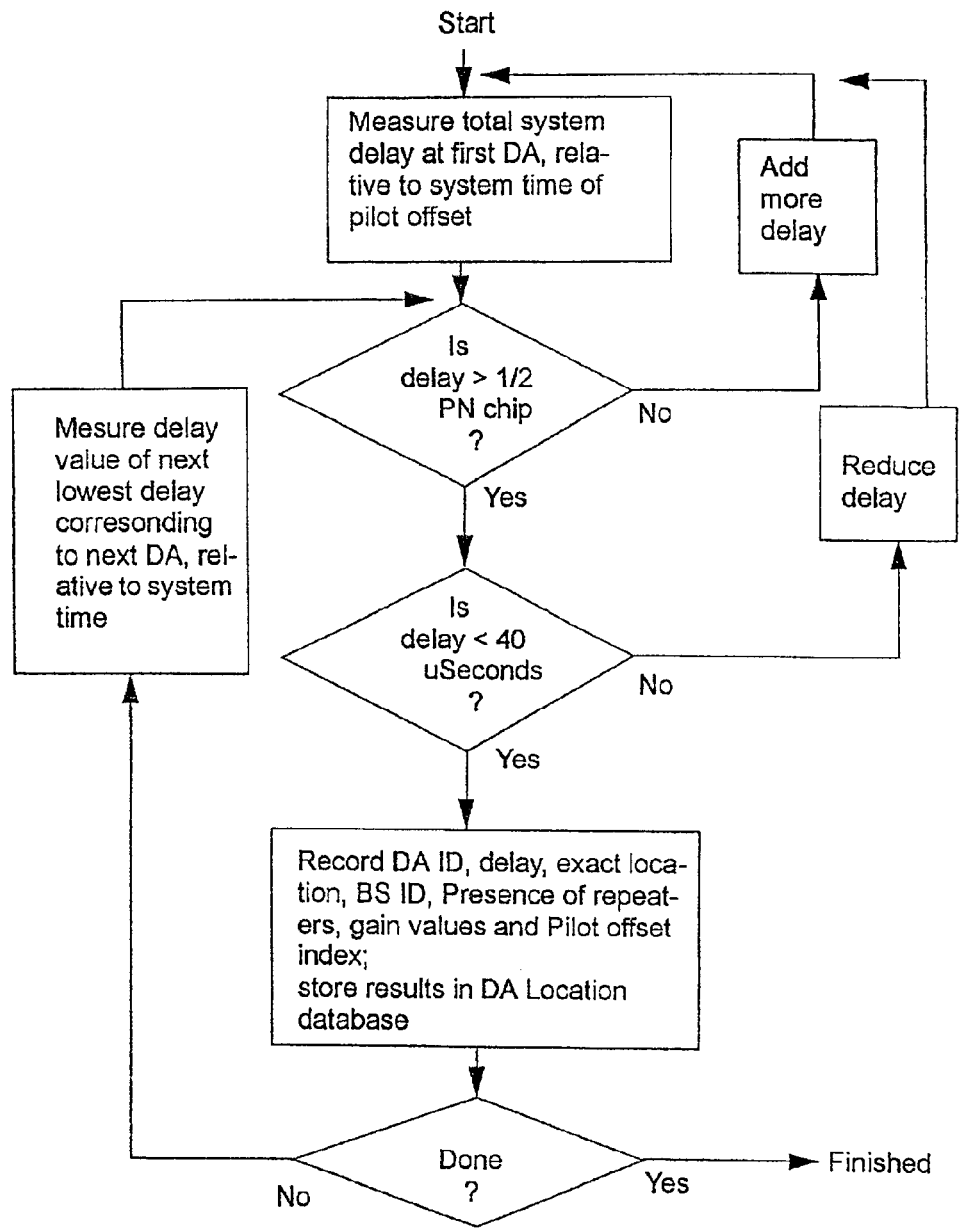
FIG. 8: DA Installation Procedure for Wireless Location

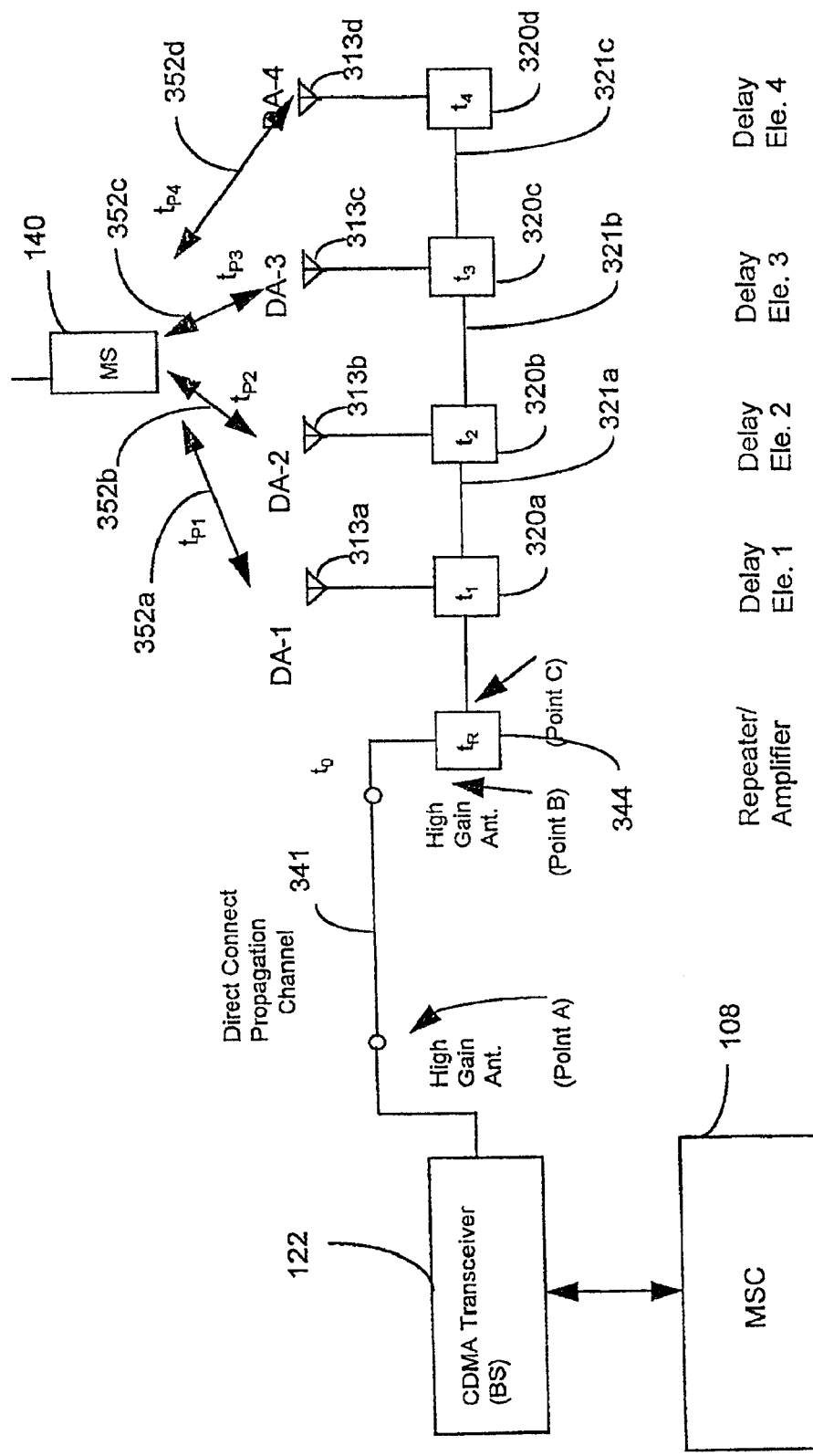
Figure 9: A Direct-Connect Distributed Antenna System

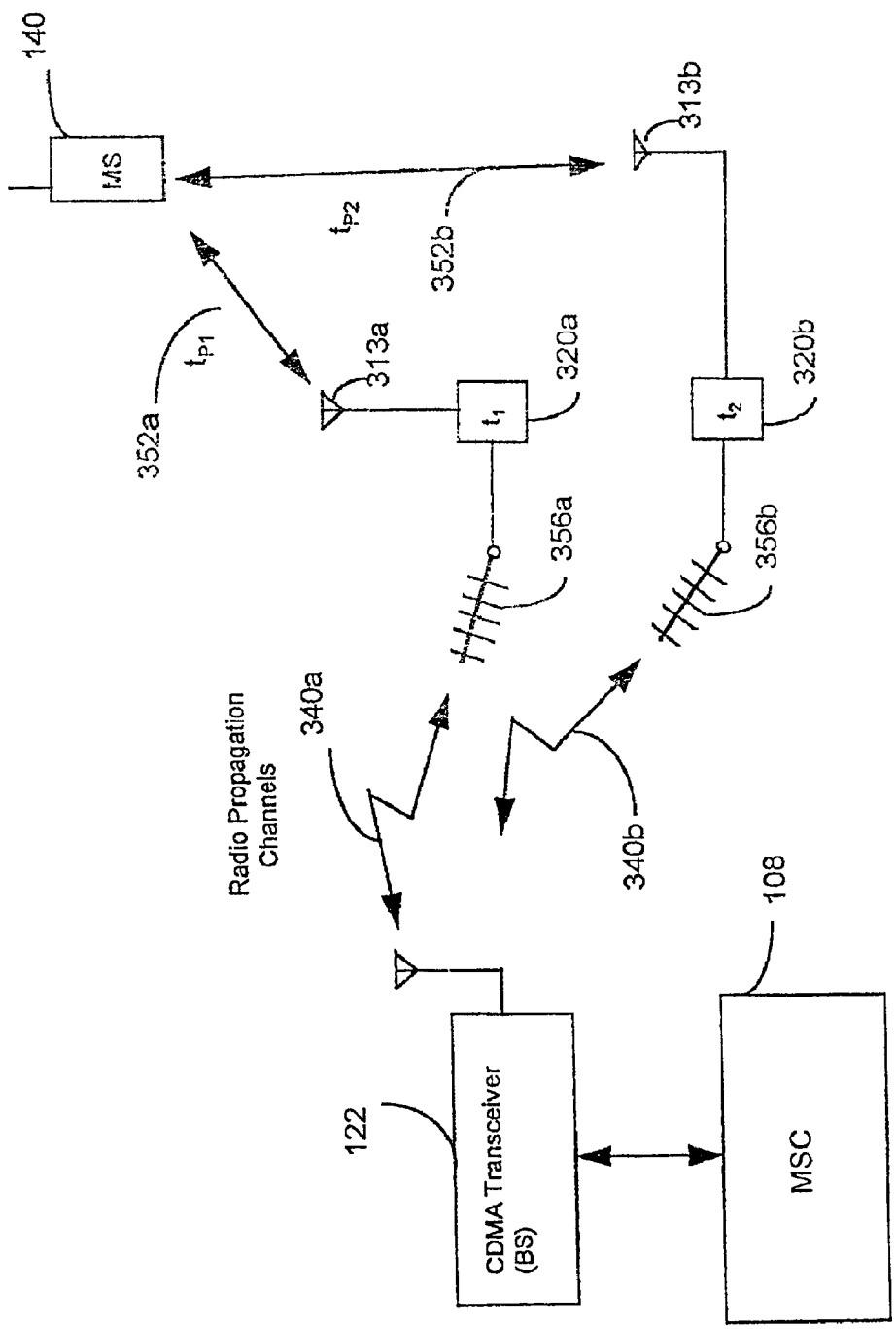
Figure 10: Multipoint Distributed Antenna System

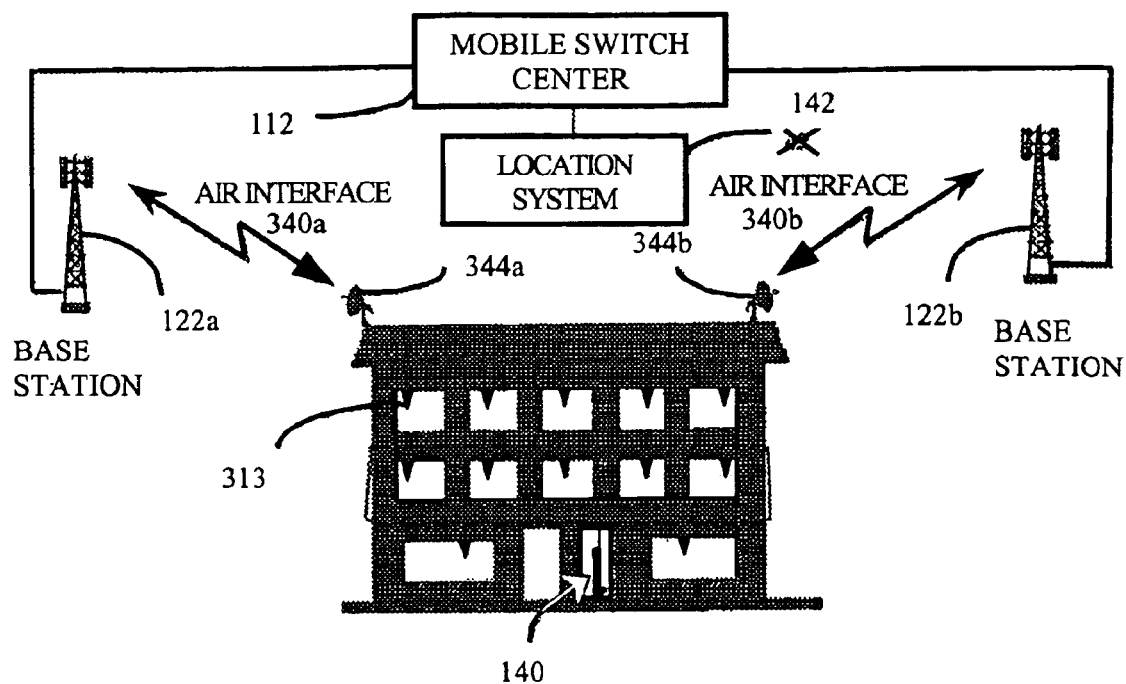
FIG. 11: Dual-Microwave Access Distributed Antenna Example

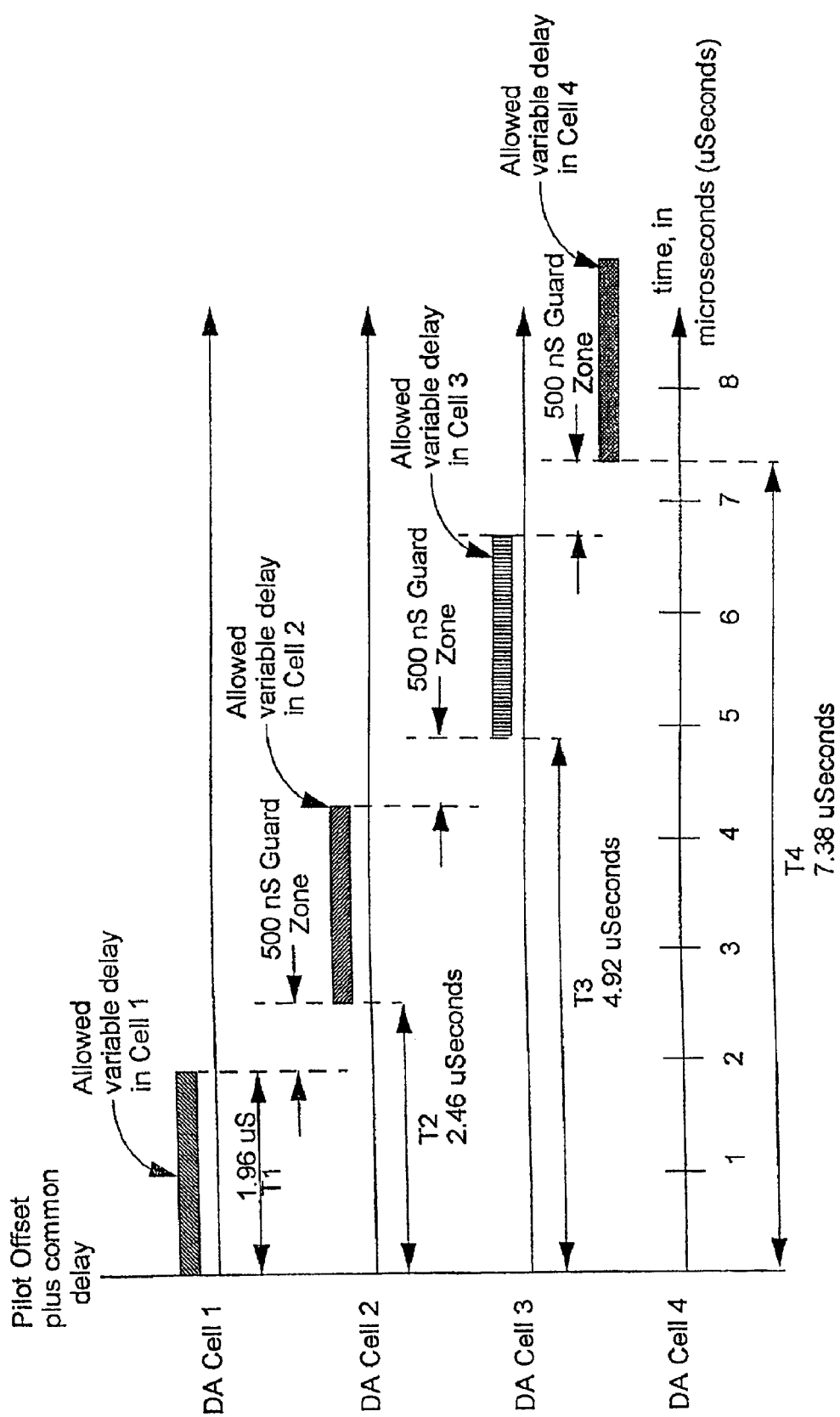
FIG. 12: ALLOWABLE DELAY SPREADS AMONG DA CELLS

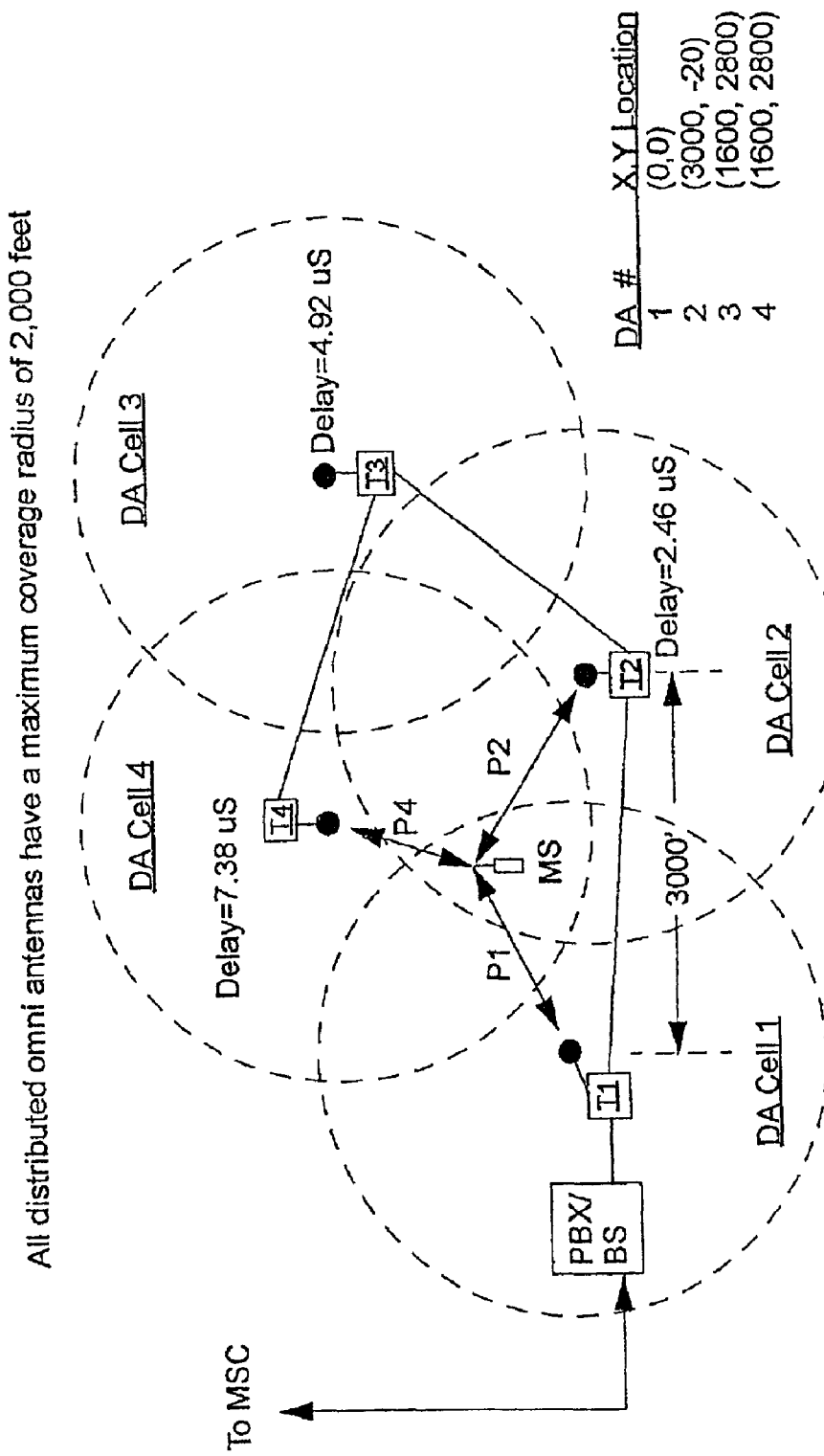
FIG. 13: DA Cell Geometry Illustration

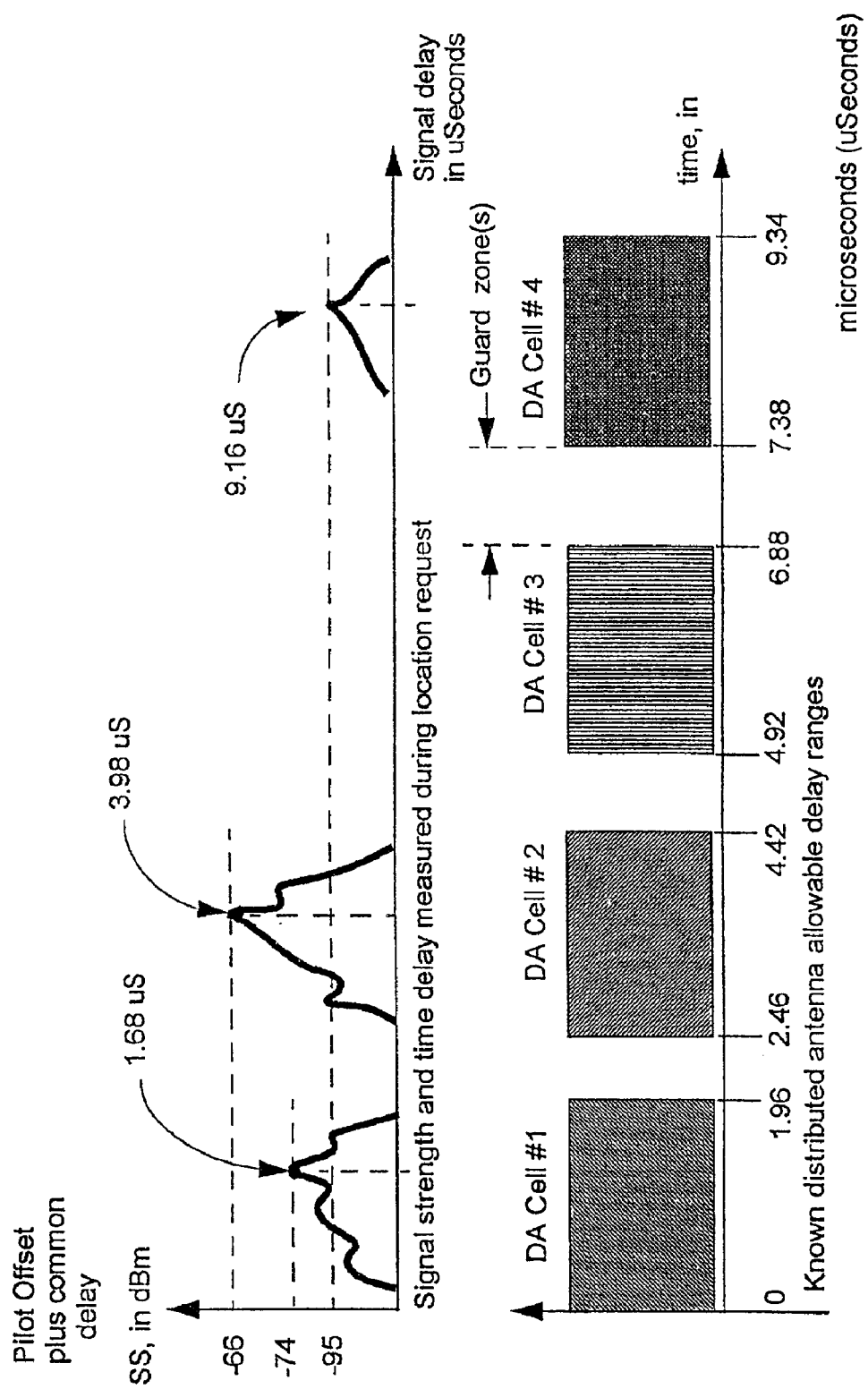
FIG. 14: LOCATION MEASUREMENTS ILLUSTRATION

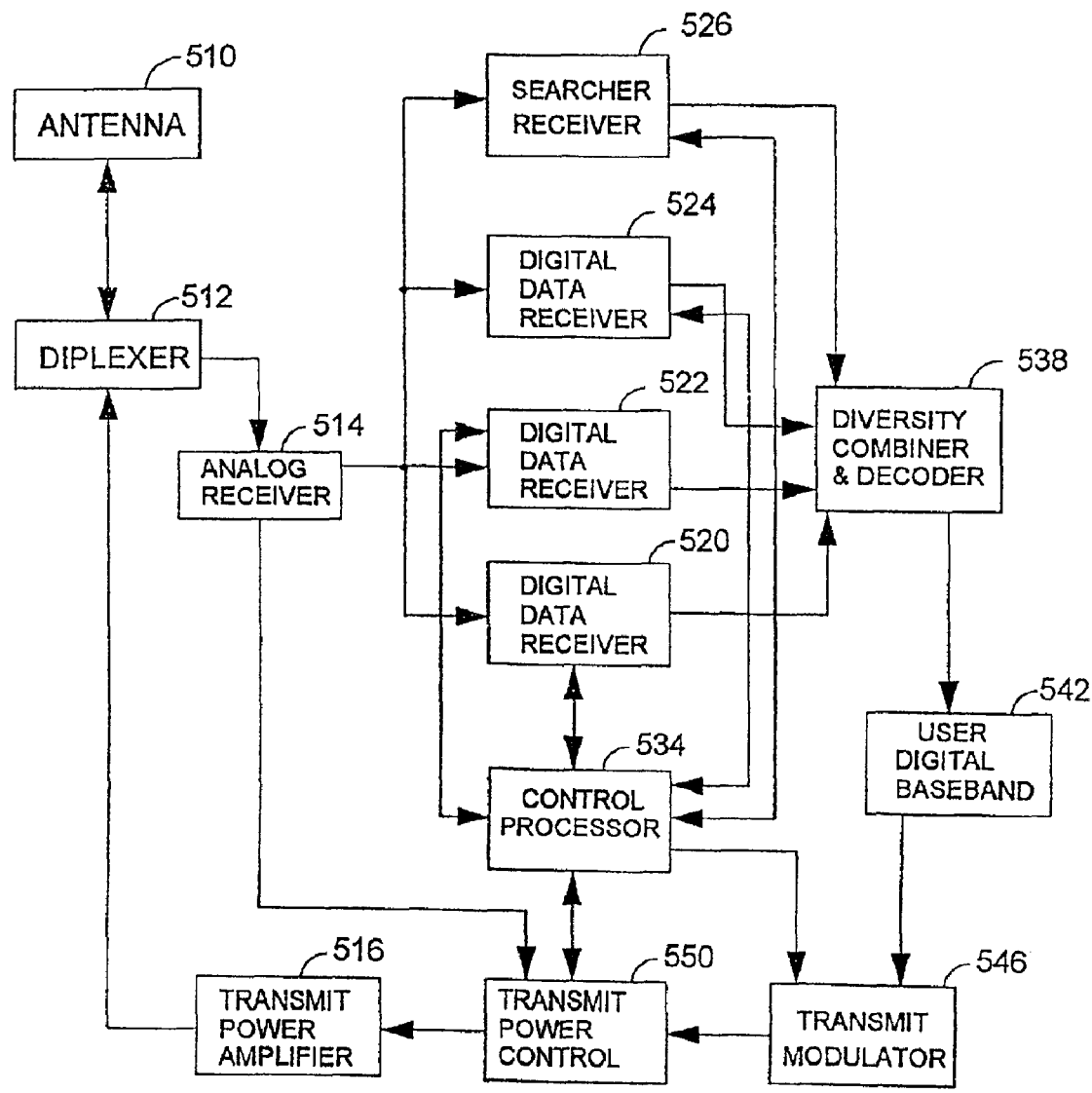
FIG. 15: CDMA Mobile Station Prior Art

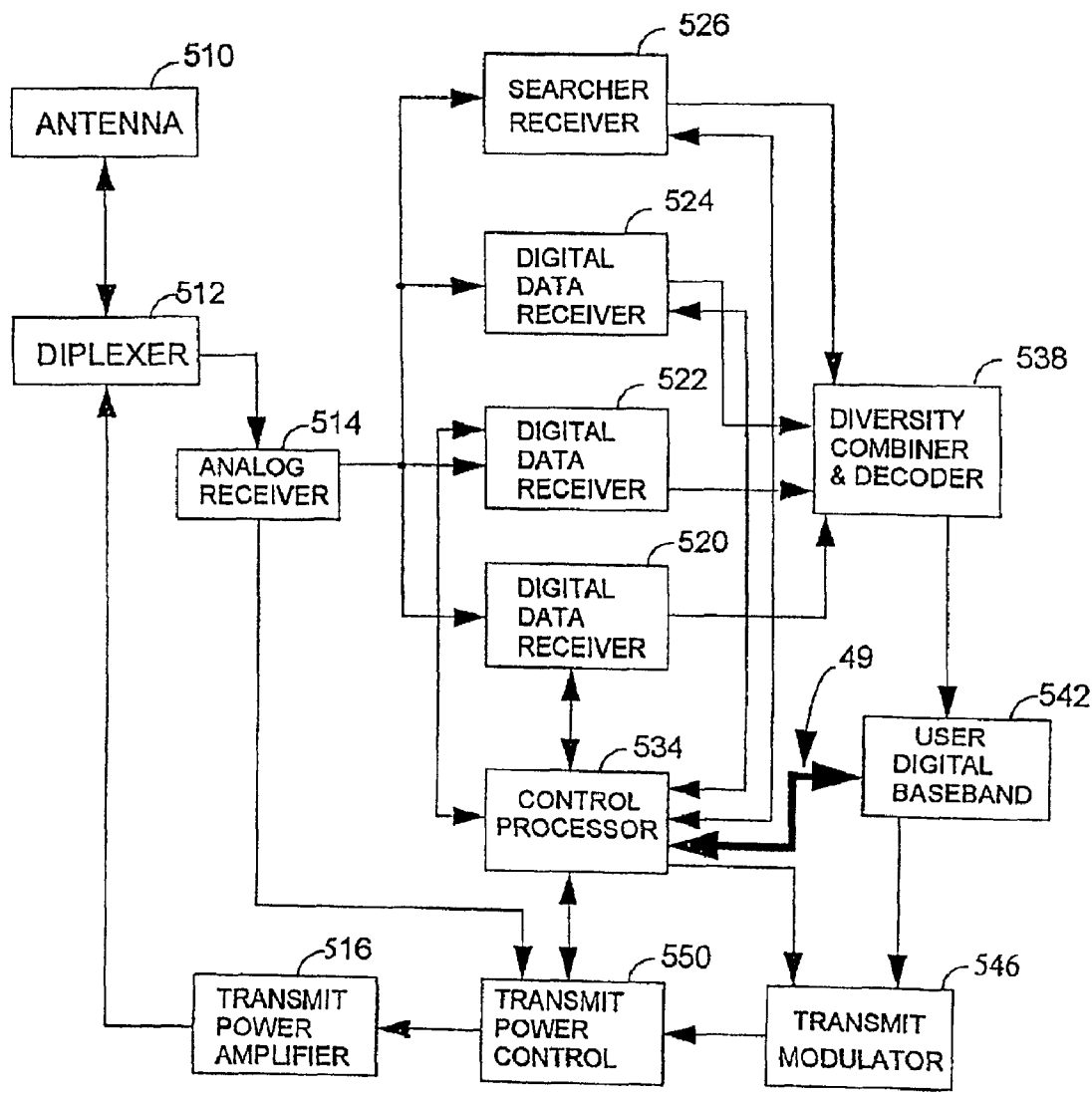
FIG. 16: MS Modification for RF Signal Telemetry

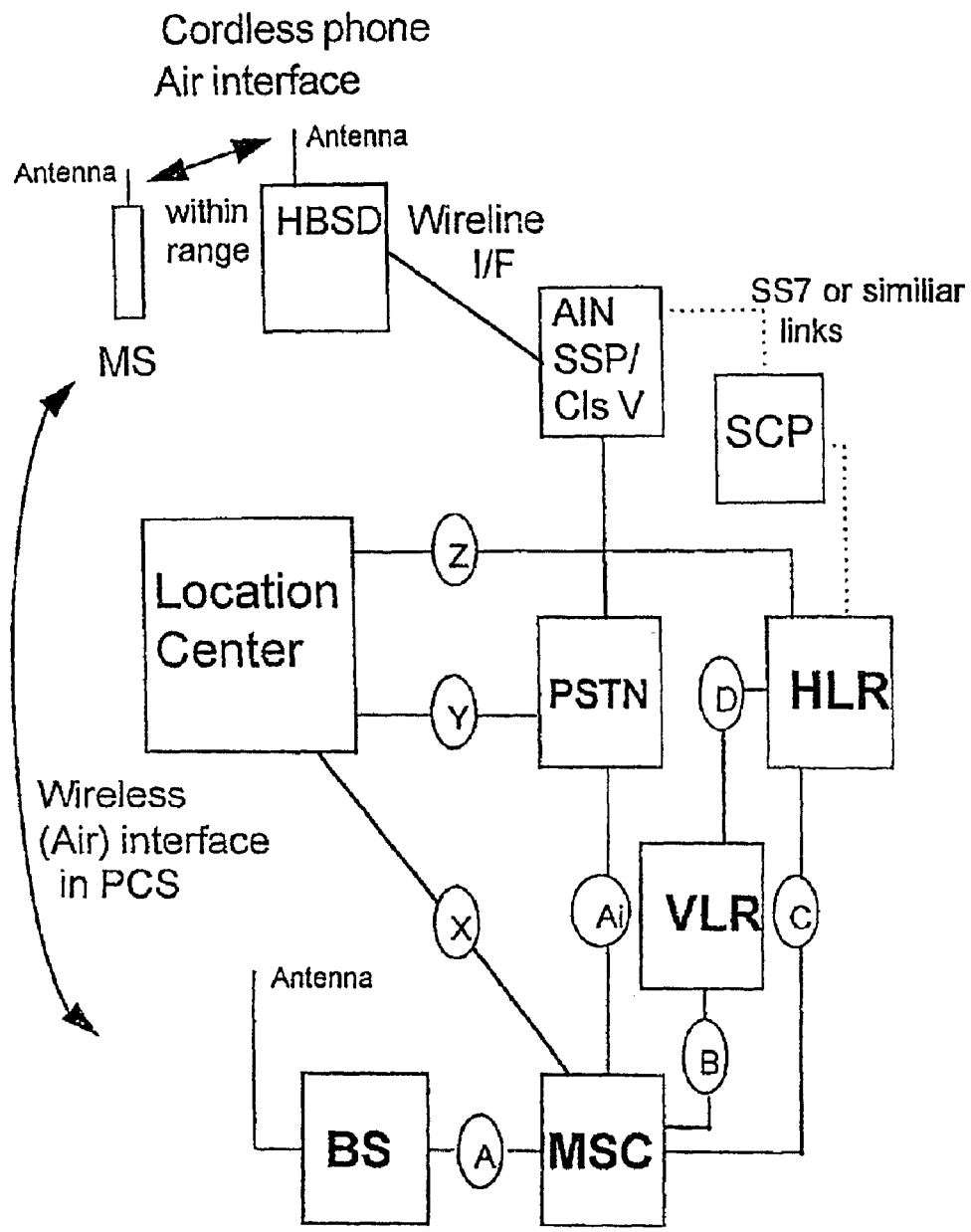
Figure 17: Location and a Home Base Station

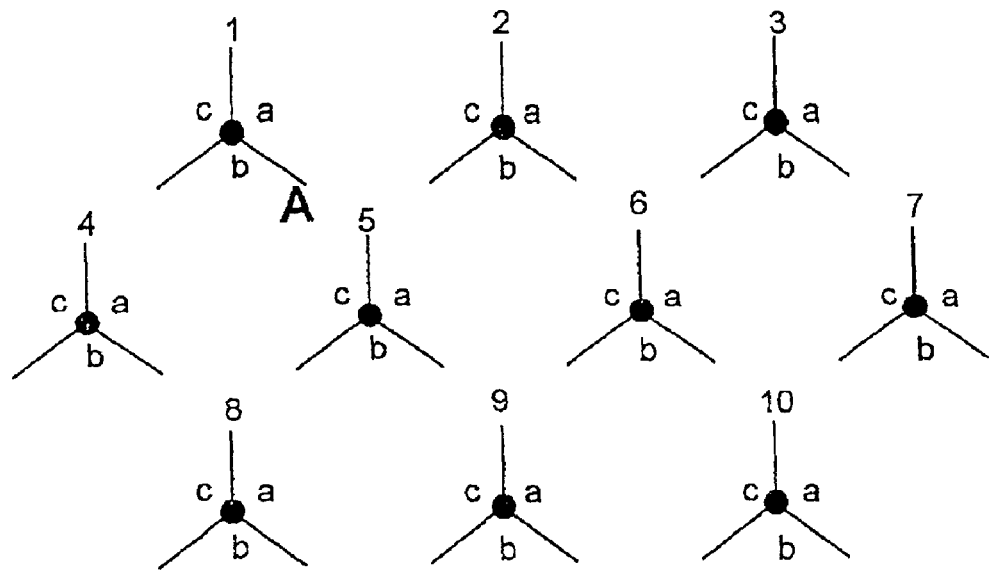
Fig. 18: MS at location A, detects BSs 1b, 5c and 4a
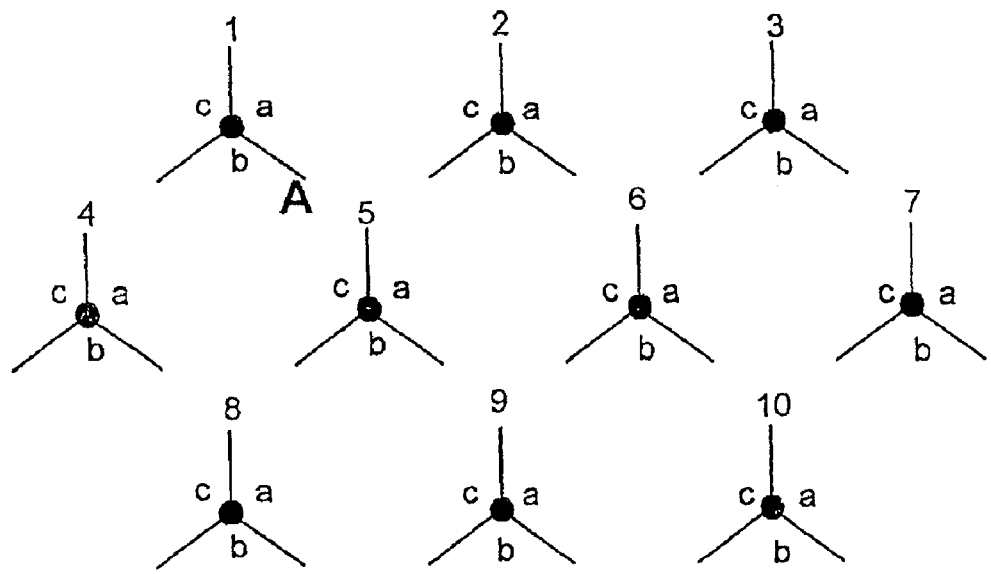
Fig. 19: MS at location A, detects BSs 1b, 5c, 2c and 4a

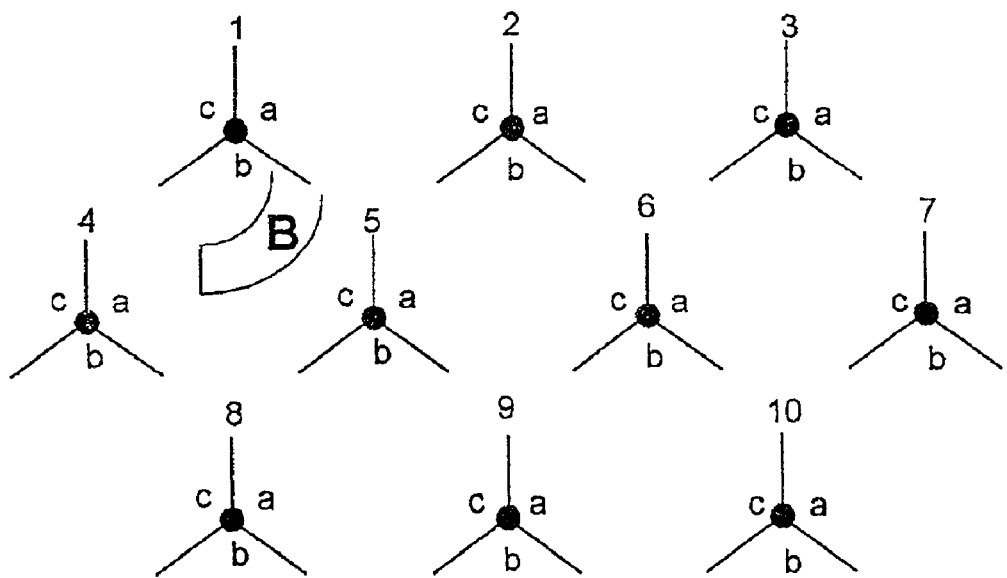
Fig. 20: MS at location B, detects BSs 1b and 2a
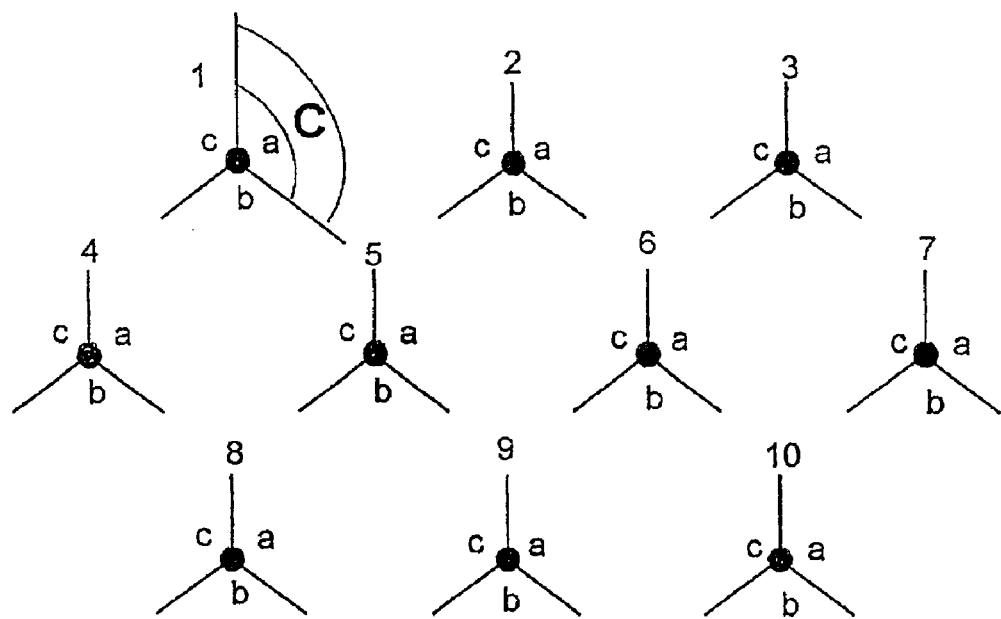
Fig. 21: MS at location C, detects only BS 1a

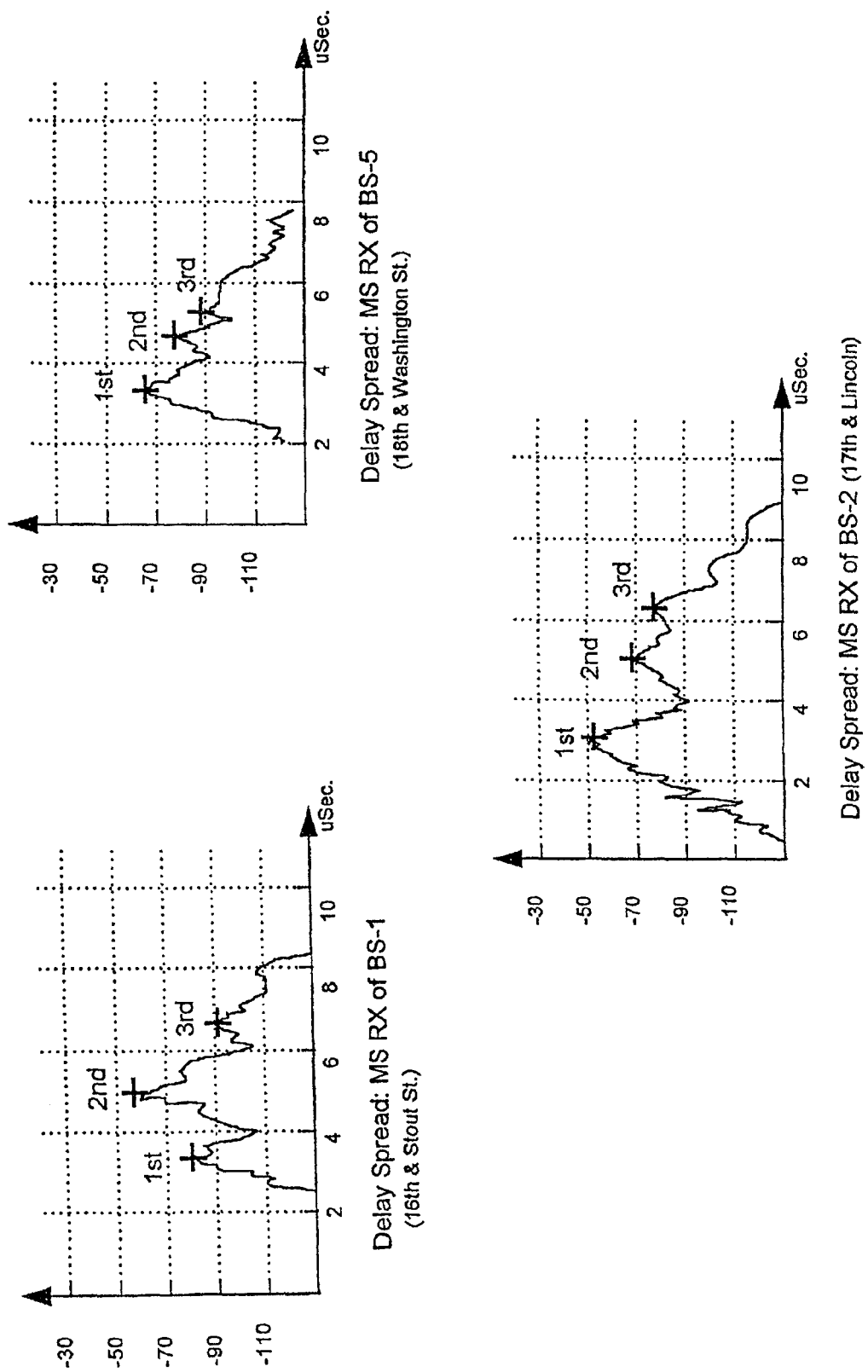
Figure 22: MS Received Delay Spreads of 3 Base Stations (Dense Urban Canyon)

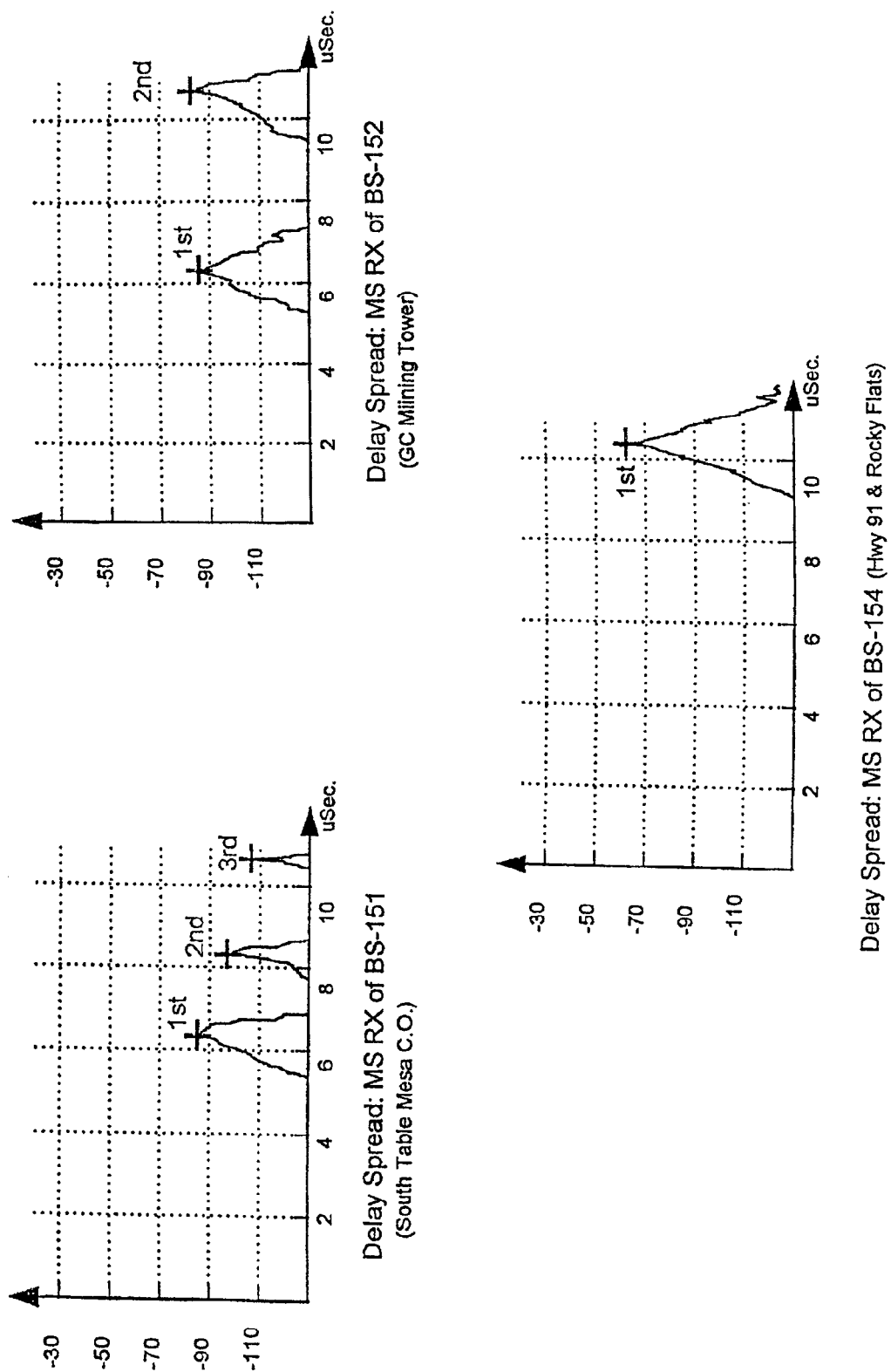
Figure 23: MS Received Delay Spreads of 3 Base Stations (Rural Setting)

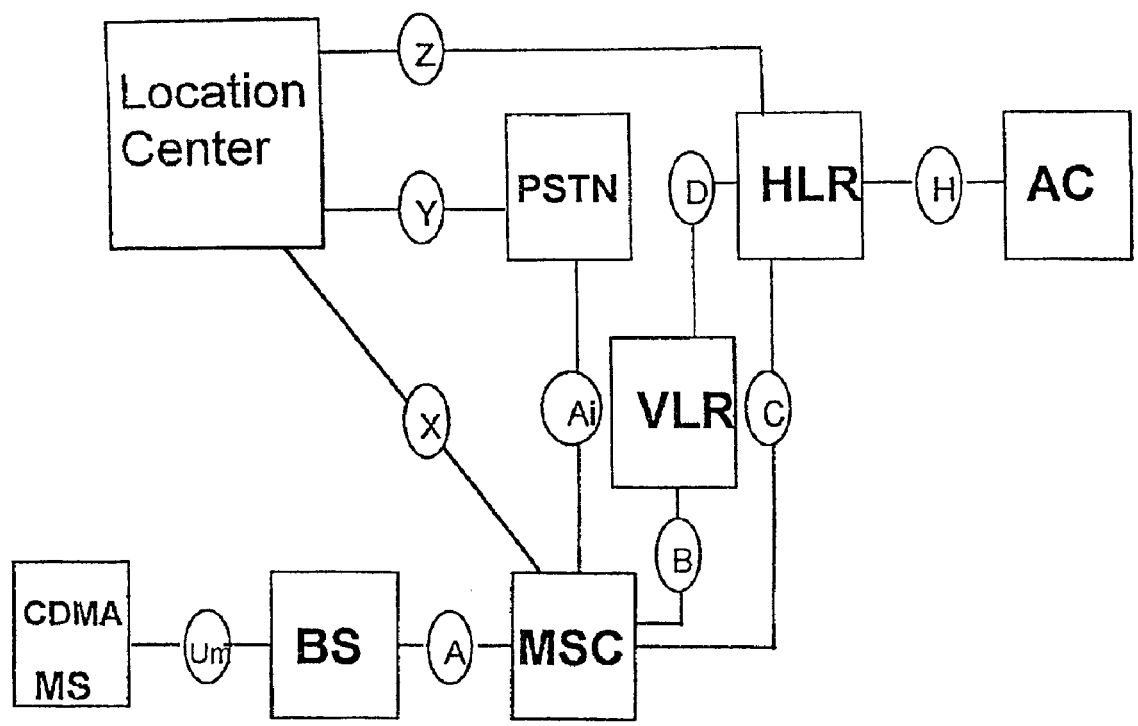
Figure 24: Location and CTIA/TR45
Network Reference Model

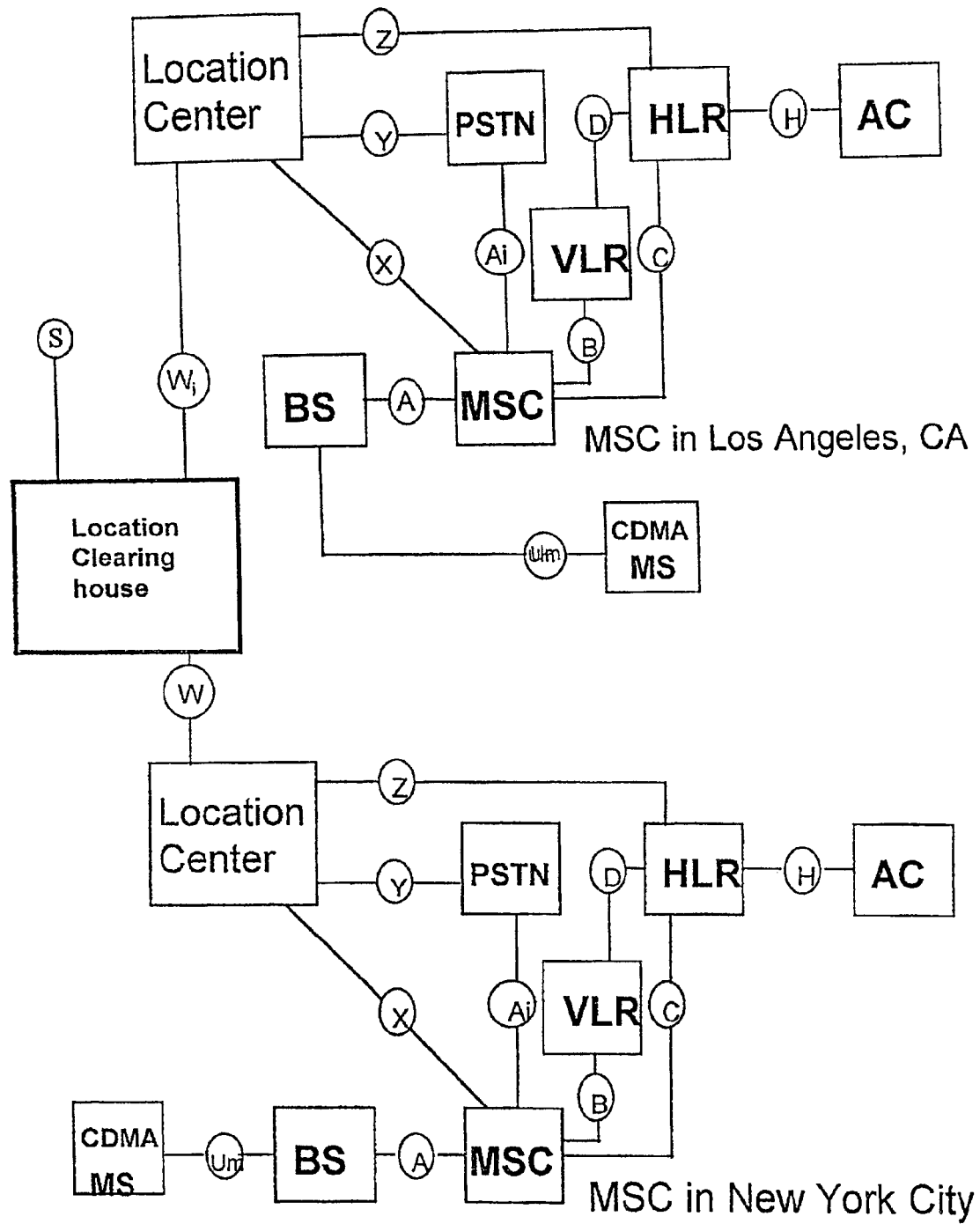
Figure 25: National Location Clearinghouse Structure

Fig. 29: Signal Processing Subsystem

| Turn # | Directions | And Go | Total Miles |
|---|---|---|---|
| Start | Head SOUTH on BROADWAY, FromStart Marker (1999 Broadway, Denver) | 1.4 mi | 1.4 |
| 1 | BEAR LEFT onto E. SPEER BLVD | 0.9 mi | 2.4 |
| 2 | BEAR RIGHT onto S. DOWNING ST | 0.4 mi | 2.8 |
| 3 | TURN RIGHT onto E. CEDAR AV | 0.1 mi | 2.8 |
| 4 | TURN LEFT onto S. MARION PKY | And then | 2.9 |
| END | End Marker (255 marion Parkway, Denver, CO) | | 2.9 |

WARNING: use these directions at your own risk. Lucent Technologiesis not responsible for their accuracy or for any losses resulting from their use. Obey all traffic regulations.

User Manual Sections: [Routes In General] [Turn-By-Turn Directions] [Caveats]

Fig. 41

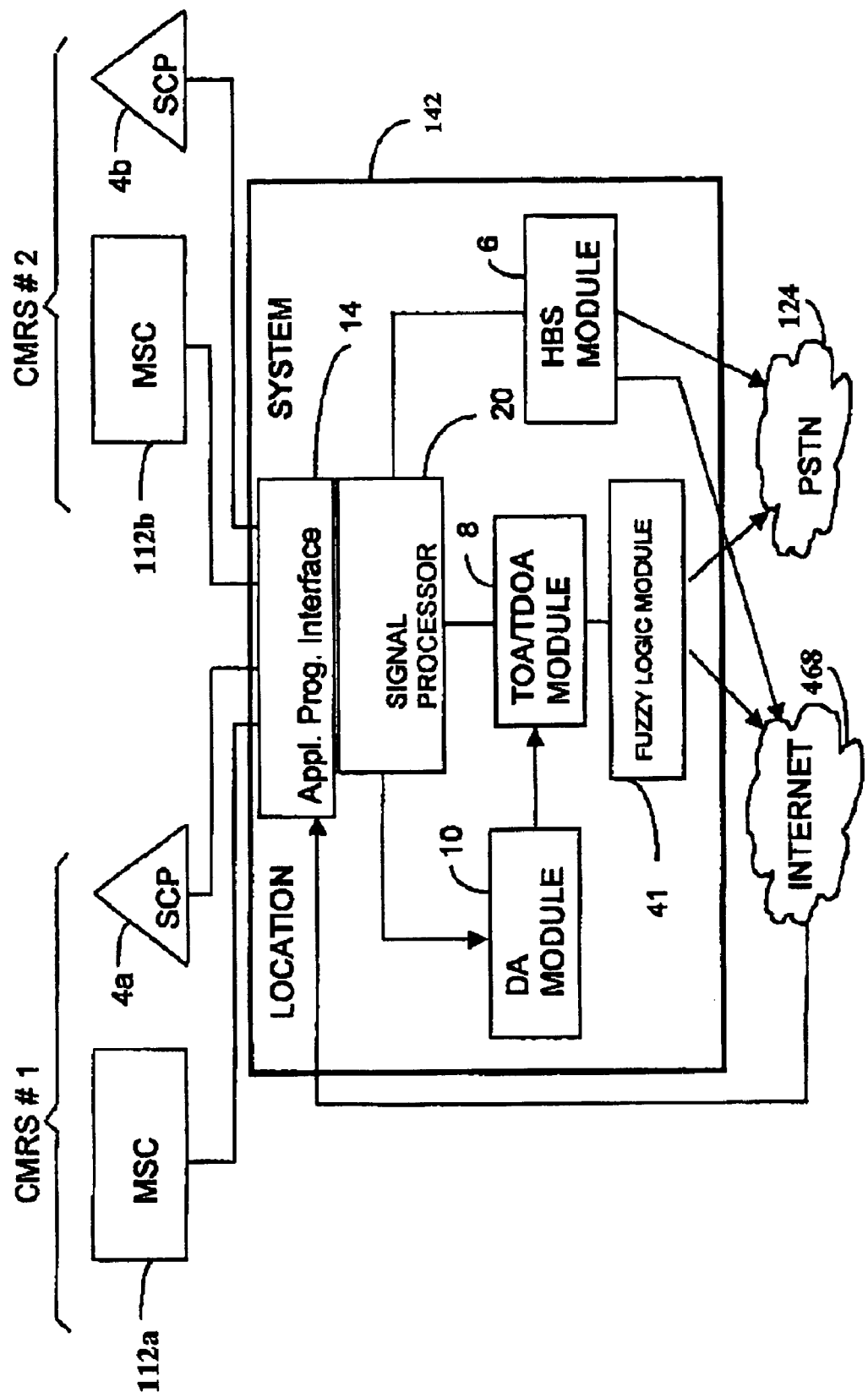
FIG. 43: WIRELESS LOCATION USING FUZZY LOGIC

LOCATING A MOBILE STATION USING A PLURALITY OF WIRELESS NETWORKS AND APPLICATIONS THEREFOR

RELATED APPLICATIONS

The present application is a continuation of U.S. application Ser. No. 09/230,109 filed Jul. 8, 1999 (now U.S. Pat. No. 6,236,365) which is the National Stage of International Application No. PCT/US97/15933 filed Sep. 8, 1997 (and claims the benefit thereof) which, in turn, claims the benefit of the following three applications: U.S. Provisional Application No. 60/056,603 filed Aug. 20, 1997, U.S. Provisional Application No. 60/044,821 filed Apr. 25, 1997; and U.S. Provisional Application No. 60/025,855 filed Sep. 9, 1996. All the above cited references are fully incorporated by reference herein.

RELATED FIELD OF THE INVENTION

The present invention is directed gene rally to a system and method for locating people or objects, and in particular to a system and met hod for locating a Wireless mobile radio station in a macro base station, distributed antenna, or home base station environment.

BACKGROUND OF THE INVENTION

Wireless communications systems are becoming increasingly important worldwide. Wireless cellular telecommunications systems are rapidly replacing conventional wire-based telecommunications systems in many applications. Commercial mobile radio service provider networks, and specialized mobile radio and mobile data radio networks are examples. The general principles of wireless cellular telephony have been described variously, for example in U.S. Pat. No. 5,295,180 to Vendetti, et al filed Apr. 8, 1992, which is incorporated herein by reference. There is great interest in using existing infrastructures for wireless communication systems for locating people and/or objects in a cost-effective manner. Such a capability would be invaluable in a variety of situations, especially in emergency or crime situations. Due to the substantial benefits of such a location system, several attempts have been made to design and implement such a system. Systems have been proposed that rely upon signal strength and trilateralization techniques to permit location include,those disclosed in U.S. Pat. No. 4,818,998 filed Mar. 31, 1986 and U.S. Pat. No. 4,908,629 filed Dec. 5, 1988 both to Apsell et al. ("the Apsell patents"), which are incorporated fully herein by reference, and U.S. Pat. No. 4,891,650 to Sheffer ("the Sheffer patent") filed May 16, 1988 and also incorporated fully by reference. The Apsell patents disclose a system employing a "homing-in" scheme using radio signal strength, wherein the scheme detects radio signal strength transmitted from an unknown location. This signal strength is detected by nearby tracking vehicles, such as police cruisers using receivers with directional antennas. Alternatively, the Sheffer patent discloses a system using the FM analog cellular network. This system includes a mobile transmitter located on a vehicle to be located. The transmitter transmits an alarm signal upon activation to detectors located at base stations of the cellular network. These detectors receive the transmitted signal and transmit, to a central station, data indicating the signal strength of the received signal and the identity of the base stations receiving the signal. This data is processed to determine the distance between the vehicle and each of the base stations and, through trilateralization, the vehicle's position. However, these systems have drawbacks that include high expense in that special purpose electronics are required. Furthermore, the systems are generally only effective in line-of-sight conditions, such as rural settings. Radio wave surface reflections, refractions and ground clutter cause significant distortion, in determining the location of a signal source in most geographical areas that are more than sparsely populated. Moreover, these drawbacks are particularly exacerbated in dense urban canyon (city) areas, where errors and/or conflicts in location measurements can result in substantial inaccuracies.

Another example of a location system using time of arrival and triangulation for location are satellite-based systems, such as the military and commercial versions of the Global Positioning Satellite system (GPS). GPS can provide accurate position determination (i.e., about 100 meters error for the commercial version of GPS) from a time-based signal received simultaneously from at least three satellites. A ground-based GPS receiver at or near the object to be located determines the difference between the time at which each satellite transmits a time signal and the time at which the signal is received and, based on the time differentials, determines the object's location. However, the GPS is impractical in many applications. The signal power levels from the satellites are low and the GPS receiver requires a clear, line-of-sight path to at least three satellites above a horizon of about 60 degrees for effective operation. Accordingly, inclement weather conditions, such as clouds, terrain features, such as hills and trees, and buildings restrict the ability of the GPS receiver to determine its position. Furthermore, the initial GPS signal detection process for a GPS receiver is relatively long (i.e., several minutes) for determining the receiver's position. Such delays are unacceptable in many applications such as, for example, emergency response and vehicle tracking.

Differential GPS, or DGPS systems offer correction schemes to account for time synchronization drift. Such correction schemes include the transmission of correction signals over a two-way radio link or broadcast via FM radio station subcarriers. These systems have been found to be awkward and have met with limited success.

Additionally, GPS-based location systems have been attempted in which the received GPS signals are transmitted to a central data center for performing location calculations. Such systems have also met with limited success due, for example, to the limited reception of the satellite signals and the added expense and complexity of the electronics required for an inexpensive location mobile station or handset for detecting and receiving the GPS signals from the satellites.

The behavior of a mobile radio signal in the general environment is unique and complicated. Efforts to perform correlation between radio signals and distance between a base station and a mobile station are similarly complex. Repeated attempts to solve this problem in the past have been met with only marginal success. Factors include terrain undulations, fixed and variable clutter, atmospheric conditions, internal radio characteristics of cellular and PCS systems, such as frequencies, antenna configurations, modulation schemes, diversity methods, and the physical geometry of direct, refracted and reflected waves between the base stations and the mobile. Noise, such as man-made externally sources (e.g., auto ignitions) and radio system co-channel and adjacent channel interference also affect radio reception and related performance measurements, such as the analog carrier-to-interference ratio (C/I), or digital energy-per-bit/ Noise density ratio ($E_{b/No}$) and are particular to various points in time and space domains.

Before discussing real world correlation between signals and distance, it is useful to review the theoretical premise, that of radio energy path loss across a pure isotropic vacuum propagation channel, and its dependencies within and among various communications channel types.

Over the last forty years various mathematical expressions have been developed to assist the radio mobile cell designer in establishing the proper balance between base station capital investment and the quality of the radio link, typically using radio energy field-strength, usually measured in microvolts/meter, or decibels.

One consequence from a location perspective is that the effective range of values for higher exponents is an increased at higher frequencies, thus providing improved granularity of ranging correlation.

Actual data collected in real-world environments uncovered huge variations with respect to the free space path loss equation, giving rise to the creation of many empirical formulas for radio signal coverage prediction. Clutter, either fixed or stationary in geometric relation to the propagation of the radio signals, causes a shadow effect of blocking that perturbs the free space loss effect. Perhaps the best known model set that characterizes the average path loss is Hata's, "Empirical Formula for Propagation Loss in Land Mobile Radio", M. Hata, *IEEE Transactions* VT-29, pp. 317–325, August 1980, three pathloss models, based on Okumura's measurements in and around Tokyo, "Field Strength and its Variability in VHF and UHF Land Mobile Service", Y. Okumura, et al, *Review of the Electrical Communications laboratory*, Vol 16, pp 825–873, September–October 1968 these references being incorporated fully herein by reference.

Although the Hata model was found to be useful for generalized RF wave prediction in frequencies under 1 GHz in certain suburban and rural settings, as either the frequency and/or clutter increased, predictability decreased. In current practice, however, field technicians often have to make a guess for dense urban an suburban areas (applying whatever model seems best), then installing a base stations and begin taking manual measurements.

In 1991, U.S. Pat. No. 5,055,851 to Sheffer filed Nov. 29, 1989 (and incorporated herein by reference) taught that if three or more relationships have been established in a triangular space of three or more base stations (BSs) with a location database constructed having data related to possible mobile station (MS) locations, then arculation calculations may be performed, which use three distinct $P_{or}$ measurements to determine an X,Y, two dimensional location, which can then be projected onto an area map. The triangulation calculation is based on the fact that the approximate distance of the mobile station (MS) from any base station (BS) cell can be calculated based on the received signal strength. Sheffer acknowledges that terrain variations affect accuracy, although as noted above, Sheffer's disclosure does not account for a sufficient number of variables, such as fixed and variable location shadow fading, which are typical in dense urban areas with moving traffic.

Most field research before about 1988 has focused on characterizing (with the objective of RF coverage prediction) the RF propagation channel (i.e., electromagnetic radio waves) using a single-ray model, although standard fit errors in regressions proved dismal (e.g., 40–80 dB). Later, multi-ray models were proposed, and much later, certain behaviors were studied with radio and digital channels. In 1981, Vogler proposed that radio waves at higher frequencies could be modeled using optics principles. In 1988 Walfisch and Bertoni applied optical methods to develop a two-ray model, which when compared to certain highly specific, controlled field data, provided extremely good regression fit standard errors of within 1.2 dB.

In the Bertoni two ray model it was assumed that most cities would consist of a core of high-rise buildings surrounded by a much larger area having buildings of uniform height spread over regions comprising many square blocks, with street grids organizing buildings into rows that are nearly parallel. Rays penetrating buildings then emanating outside a building were neglected.

After a lengthy analysis it was concluded that path loss was a function of three factors: 1.) the path loss between antennas in free space; 2.) the reduction of rooftop wave fields due to settling; and 3.) the effect of diffraction of the rooftop fields down to ground level.

However, a substantial difficulty with the two-ray model in practice is that it requires a substantial amount of data regarding building dimensions, geometry, street widths, antenna gain characteristics for every possible ray path, etc. Additionally, it requires an inordinate amount of computational resources and such a model is not easily updated or maintained.

Unfortunately, in practice clutter geometry and building heights are random. Moreover, data of sufficient detail is extremely difficult to acquire, and regression standard fit errors are poor; i.e., in the general case, these errors were found to be 40–60 dB. Thus the two-ray model approach, although sometimes providing an improvement over single ray techniques, still did not predict RF signal characteristics in the general case to level of accuracy desired (<10 dB).

Work by Greenstein has since developed from the perspective of measurement-based regression models, as opposed to the previous approach of predicting-first, then performing measurement comparisons. Apparently yielding to the fact that low-power, low antenna (e.g., 12–25 feet above ground) height PCS microcell coverage was insufficient in urban buildings, Greenstein, et al, authored "Performance Evaluations for Urban Line-of-sight Microcells Using a Multi-ray Propagation Model", in IEEE Globecom Proceedings, 12/91, incorporated fully by reference. This paper proposed the idea of formulating regressions based on field measurements using small PCS microcells in a lineal microcell geometry (i.e., geometries in which there is always a line-of-sight path between a subscriber's mobile and its current microsite). Additionally, Greenstein studied the communication channels variable Bit-Error-Rate (BER) in a spatial domain, which was a departure from previous research that limited field measurements to the RF propagation channel signal strength alone. However, Greenstein based his finding on two suspicious assumptions: 1) he assumed that distance correlation estimates were identical for uplink and downlink transmission paths; and 2) modulation techniques would be transparent in terms of improved distance correlation conclusions. Although some data held very correlation, other data and environments produced poor results. Accordingly, his results appear unreliable for use in general location context.

In 1993 Greenstein, et al, authored "A Measurement-Based Model for Predicting Coverage Areas of Urban Microcells", in the IEEE Journal On Selected Areas in Communications, Vol. 11, No. 7, 9/93. Greenstein reported a generic measurement-based model of RF attenuation in terms of constant-value contours surrounding a given low-power, low antenna microcell environment in a dense, rectilinear neighborhood, such as New York City. However, these contours were for the cellular frequency band. In this case, LOS and non-LOS clutter were considered for a given microcell site. A result of this analysis was that RF propagation losses (or attenuation), when cell antenna heights were relatively low, provided attenuation contours resembling a spline plane curve depicted as an asteroid, aligned with major street grid patterns. Further, Greenstein found that convex diamond-shaped RF propagation loss contours were a common occurrence in field measurements in a rectilinear urban area. The special plane curve asteroid is represented by the formula:

$$x^{2/3}+y^{2/3}=r^{2/3}.$$

However, these results alone have not been sufficiently robust and general to accurately locate an mobile station, due to the variable nature of urban clutter spatial arrangements.

At Telesis Technology in 1994 Howard Xia, et al, authored "Microcellular Propagation Characteristics for Personal Communications in Urban and Suburban Environments", in IEEE Transactions of Vehicular Technology, Vol. 43, No. 3, 8/94, incorporated fully herein by reference, which performed measurements specifically in the PCS 1.8 to 1.9 GHz frequency band. Xia found corresponding but more variable outcome results in San Francisco, Oakland (urban) and the Sunset and Mission Districts (suburban).

The physical radio propagation channel perturbs signal strength, frequency (causing rate changes, phase delay, signal to noise ratios (e.g., C/I for the analog case, or $E_{b/No}$, RF energy per bit, over average noise density ratio for the digital case) and Doppler-shift. Signal strength is usually characterized by:

Free Space Path Loss ($L_p$)

Slow fading loss or margin ($L_{sloe}$)

Fast fading loss or margin ($L_{fast}$)

The cell designer increases the transmitted power $P_{TX}$ by the shadow fading margin $L_{slow}$ which is usually chosen to be within the 1–2 percentile of the slow fading probability density function (PDF) to minimize the probability of unsatisfactorily low received power level $P_{RX}$ at the receiver. The $P_{RX}$ level must have enough signal to noise energy level (e.g., 10 dB) to overcome the receiver's internal noise level (e.g., −118 dBm in the case of cellular 0.9 GHz), for a minimum voice quality standard. Thus in this example $P_{RX}$ must never be below −108 dBm, in order to maintain the quality standard.

Additionally the short term fast signal fading due to multipath propagation is taken into account by deploying fast fading margin $L_{fast}$, which is typically also chosen to be a few percentiles of the fast fading distribution. The 1 to 2 percentiles compliment other network blockage guidelines. For example the cell base station traffic loading capacity and network transport facilities are usually designed for a 1–2 percentile blockage factor as well. However, in the worst-case scenario both fading margins are simultaneously exceeded, thus causing a fading margin overload.

In Roy Steele's, text, *Mobile Radio Communications*, EEEE Press, 1992, estimates for a GSM system operating in the 1.8 GHz band with a transmitter antenna height of 6.4 m and a mobile station receiver antenna height of 2 m, and assumptions regarding total path loss, transmitter power would be calculated as follows:

Table 1: GSM Power Budget Example

| Parameter | dBm value | Will require |
|---|---|---|
| $L_{slow}$ | 14 | |
| $L_{fast}$ | 7 | |
| $Ll_{path}$ | 110 | |
| Min. RX pwr required | −104 | |
| | | TXpwr = 27 dBm |

Steele's sample size in a specific urban London area of 80,000 LOS measurements and data reduction found a slow fading variance of $$\sigma=7 \text{ dB}$$

assuming log-normal slow fading PDF and allowing for a 1.4% slow fading margin overload, thus $$L_{slow}=2\sigma=14 \text{ dB}$$

The fast fading margin was determined to be:

$$L_{fast}=7 \text{ dB}$$

In contrast, Xia's measurements in urban and suburban California at 1.8 GHz uncovered flat-land shadow fades on the order of 25–30 dB when the mobile station (MS) receiver was traveling from LOS to non-LOS geometries. In hilly terrain fades of +5 to −50 dB were experienced. Thus it is evident that attempts to correlate signal strength with mobile station ranging distance suggest that error ranges could not be expected to improve below 14 dB, with a high side of 25 to 50 dB. Based on 20 to 40 dB per decade, Corresponding error ranges for the distance variable would then be on the order of 900 feet to several thousand feet, depending upon the particular environmental topology and the transmitter and receiver geometries.

Although the acceptance of fry logic has been generally more rapid in non-American countries, the principles of fuzzy logic can be applied in wireless location. Lotfi A Zadeh's article, "Fuzzy Sets" published in 1965 in *Information and Control*, vol. 8, Pg 338–353, herein incorporated by reference, established the basic principles of fuzzy logic, among which a key theorem, the FAT theorem, suggests that a fuzzy system with a finite set of rules can uniformly approximate any continuous (or Borel-measureable) system. The system has a graph or curve in the space of all combinations of system inputs and outputs. Each fuzzy rule defines a patch in this space. The more uncertain the rule, the wider the patch. A finite number of small patches can always cover the curve. The fuzzy system averages patches that overlap. The Fat theorem was proven by Bart Kosko, in a paper entitled, "Fuzzy Systems as Universal Approximators", in *Proceedings of the First IEEE Conference on Fuzzy Systems*, Pages 1153–1162, in San Diego, on March, 1992, herein incorporated by reference.

Fuzzy relations map elements of one universe, say "X", to those of another universe, say "Y", through the Cartesian product of the two universes. However, the "strength" of the relation between ordered pairs of the two universes is not measured with the characteristic function (in which an element is either definitely related to another element as indicated by a strength value of "1", or is definitely not related to another element as indicated by a strength value of "0", but rather with a membership function expressing various "degrees" of strength of the relation on the unit interval [0,1]. Hence, a fuzzy relation R is a mapping from the Cartesian space X×Y to the interval [0,1], where the strength of the mapping is expressed by the membership function of the relation for ordered pairs from the two universes or $\mu_R(x,y)$.

Just as for crisp relations, the properties of commutativity, associativity, distributivity, involution and idempotency all hold for fuzzy relations. Moreover, DeMorgan's laws hold for fuzzy relations just as they do for crisp (classical) relations, and the null relations O, and the complete relation, E, are analogous to the null set and the whole set in set-theoretic from, respectively. The properties that do not hold for fuzzy relations, as is the case for fuzzy sets in general, are the excluded middle laws. Since a fuzzy relation R is also a fit set, there is overlap between a relation and its complement, hence.

$$R \cup R' \neq E$$

$$R \cap R' \neq O$$

As seen in the foregoing expression, the excluded middle laws for relation do not result in the null relation, O, or the complete relation, E. Because fuzzy relations in general are fuzzy sets, the Cartesian product can be defined as a relations between two or more fuzzy sets. Let A be a fuzzy set on universe X and B be a fuzzy set on universe Y; then the Cartesian product between fuzzy sets A and B will result in a fuzzy relation R, which is contained within the full Cartesian product space, or $$A \times B = R \subset X \times Y$$

where the fuzzy relation R has membership function:

$$\mu_R(x,y) = \mu_{A \times B}(x,y) = \min(\mu_A(x), \mu_B(y))$$

Fuzzy composition can be defined just as it is for crisp (binary) relations. If R is a fuzzy relation on the Cartesian space X×Y, and S is a fuzzy relation on the Cartesian space Y×Z, and T is a fuzzy relation on the Cartesian space X×Z; then fuzzy max-min composition is defined in terms of the set-theoretic notation and membership function-theoretic notation in the following manner:

$$\mu_T(x,y) = (\mu_R(x,y) \cdot \mu_S(x,y)) = \max\{\min[\mu_R(x,y), \mu_S(y,z)]\}$$

The fuzzy extension principle allows for transforms or mappings of fuzzy concepts in the form y=f(x). This principle, combined with a compositional rule of inference, allows for a crisp input to be mapped through a fuzzy transform using membership functions into a crisp output. Additionally, in mapping a variable x into a variable y, both x and y can be vector quantities.

SUMMARY OF THE INVENTION

Objects of the Invention

It is an objective of the present invention to provide a system and method for determining wireless location using one or more commercial mobile radio telecommunication systems for accurately locating people and/or objects in a cost effective manner. Related objectives for the present invention include providing a system and method that:

(1) can be readily incorporated into existing commercial wireless telephony systems with few, if any, modifications of a typical telephony wireless infrastructure;

(2) can use the native electronics of typical commercially available telephony wireless mobile stations (e.g., handsets) as location devices;

(3) can be used for locating people and/or objects residing indoors.

Yet another objective is to provide a low cost location system and method, adaptable to wireless telephony systems, for using simultaneously a plurality of base stations owned and/or operated by competing commercial mobile radio service providers within a common radio coverage area, in order to achieve FCC phase 2 or other accuracy requirements, and for synergistically increasing mobile station location accuracy and consistency.

Yet another objective is to provide a low cost location system and method, adaptable to wireless telephony systems, for using a plurality of location techniques In particular, at least some of the following mobile station location techniques can be utilized by various embodiments of the present invention:

(4.1) time-of-arrival wireless signal processing techniques;

(4.2) time-difference-of-arrival wireless signal processing techniques;

(4.3) adaptive wireless signal processing techniques having, for example, learning capabilities and including, for instance, neural net and genetic algorithm processing;

(4.4) signal processing techniques for matching MS location signals with wireless signal characteristics of known areas;

(4.5) conflict resolution techniques for resolving conflicts in hypotheses for MS location estimates;

(4.6) enhancement of MS location estimates through the use of both heuristics and historical data associating MS wireless signal characteristics with known locations and/or environmental conditions.

Yet another objective is to provide a system and method for flexible delivery of location information to Public Safety Answering Points, end users, centralized dispatchers, as well as to agents (either human or mechanized) associated with trigger-based inventory and tracking systems. Flexible delivery used here indicates providing location via various two dimensional closed-form shapes, such as polygons, ellipses, etc., which bound the location probabilities. In cases where height location information is known, the bounding shape may be three-dimensional.

Yet another objective is to provide a system and method for a variety of new location-based services for public and private group safety, including family support functions.

Yet another objective is to provide a system and method for National Scale Wireless Location capability. Although the primary focus of this patent is to provide wireless location with accuracy to meet the FCC phase two requirements, a system and method is provided that also utilizes roaming signaling to determine in which city is a particular wireless mobile station located.

Yet another objective is to provide and system and method for Parametric-driven, intelligent agent-based location services. Parameters may include time, location, and user-specific and/or group specific criteria.

Yet another objective is to provide a system and method for determining and/or enhancing wireless location using one or more of the following: (a.) CDMA-based Distributed Antenna technology; (b.) Home Base Stations and AIN technology.

Yet another objective is to provide notification messages and/or voice-synthesized call or text paging function to a plurality of other mobile station users when a mobile station user travels into, or away from, one or more zones or are within short distances of shopping malls, stores, merchandising dealers etc.

Yet another objective is to provide notification messages and/or voice-synthesized call or text paging functions to a plurality of other mobile station users when a mobile station dials a redefined telephone number, such as 911, or a type of "mild emergency cry for help" number.

Yet another objective is to provide notification messages and/or voice-synthesized call or text paging function to a plurality of other mobile station users when a mobile station user dials a predefined telephone number, such as 311, or a type of mild emergency cry for help number, wherein the plurality of other mobile station users are within a particular distance, or a minimum distance to the mobile station user who dialed the predefined number.

Yet another objective is to provide notification messages and/or voice-synthesized call or text paging function to a plurality of other mobile station users when a mobile station user dials a predefined telephone number, such as 311, or a type of mild emergency cry for help number, wherein the plurality of other mobile station users are within a particular distance, or a minimum distance to the mobile station user who dialed the predefined number, and wherein the other mobile station users are provided individualized directional or navigation information from their current locations, to reach to the mobile station user who dialed the predefined number.

Yet another objective is to provide automatic home office, vehicle and boat security functions, which are activated and deactivated based on a mobile station user's location to or away from a location associated with the security functions.

Yet another objective is to provide notifications (e.g., via fax, page, e-mail, text paging or voice synthesized call message), or to setup a group conference call capability to a plurality of predefined individuals, based on a mobile station user's call to 911, or based on a mobile station user's traveling into or away from a location zone or area, or based upon a sensor input signal to the user's mobile station, such as a sudden change in G forces, such as falling down, having the car hit another object suddenly, air bag deployment, etc.

Yet another objective is to provide location information to a 'searcher' mobile station user who then further refines or narrows the scope of the location/search for a 'target' mobile station, or the mobile station to be located, using a small microwave dish, in communication with, or to supplement/replace the searcher mobile station antenna, whose physical orientation is used to further determine the target mobile station location, relative to the searcher's mobile station position/orientation.

Yet another objective is to provide a means to allow more flexible storage, inventory and enhanced user accessibility of rental vehicles, by combining location technology of rental car driver carrying his/her own mobile station, along with a mobile station which remains always active and fixed to a rental car. By maintaining accurate location records of rental car locations and automatic, remote-control of rental cars (or smart cars) which use the mobile station to telemeter control data to and from the car, whose doors, door locks, and general accessibility are controlled by a centralized computer system, rental cars can be dropped off at convenient shopping center malls, airport parking lots, hotels and at other convenient locations.

Yet another objective is to provide location estimates to users carrying mobile stations, via voice synthesis, data circuit messaging or text paging.

Yet another objective is to provide a mechanism whereby mobile station users may access and control their subscriber profile for location purposes. The location subscriber profile is a persistent data store which contains logic regarding under what criteria will that mobile station user allow his/her location to be made known, and to whom. The mobile station user may access the location profile via several methods, including Internet means, and mobile station handset keypad entry and voice recognition circuits.

Yet another objective is to utilize signaling detection characteristics of other CDMA base stations and systems in a given area, owned and operated by an another commercial mobile radio service provider (CMRS provider). By including other CMRS providers' infrastructure in the location estimation analysis process, improvements in location accuracy can be realized.

DEFINITIONS

The following definitions are provided for convenience. In general, the definitions here are also defined elsewhere in this document as well.

(1) The term wireless herein is, in general, an abbreviation for digital wireless, and in particular, wireless refers to digital radio signaling using one of standard digital protocols such as CDMA, TDMA and GSM, as one skilled in the art will understand.

(2) As used herein, the term mobile station (equivalently, MS) refers to a wireless device that is at least a transmitting device, and in most cases is also a wireless receiving device, such as a portable radio telephony handset. Note that in some contexts herein instead or in addition to mobile station, the following terms are also used: personal station (PS), and location unit (LU). In general, these terms may be considered synonymous. However, the later two terms may be used when referring to reduced functionality communication devices in comparison to a typical digital wireless mobile telephone.

(3) The term, infrastructure, denotes the network of telephony communication services, and more particularly, that portion of such a network that receives and processes wireless communications with wireless mobile stations. In particular, this infrastructure includes telephony wireless base stations (BS) such as those for radio mobile communication systems based on CDMA, TDMA, and GSM wherein the base stations provide a network of cooperative communication channels with an air interface with the mobile station, and a conventional telecommunications interface with a Mobile Switch Center (MSC). Thus, an MS user within an area serviced by the base stations may be provided with wireless communication throughout the area by user transparent communication transfers (i.e., hand-offs) between the user's mobile station and these base stations in order to maintain effective telephony service. The mobile switch center provides communications and control connectivity among base stations and the public telephone network.

(4) An example of a Parametric-driven intelligent agent-based location service follows: An intelligent agent software process monitors sets of Parametric conditions and location scenarios. When appropriate conditions and location criteria are satisfied, then a set of notifications or other actions are triggered to occur. A specific example follows: given that a certain child carrying a mobile station should be in a certain school between 8:00 A.M. and 3:00 P.M. on regular school days, then a wireless location request is invoked periodically, within the school day time frame. If a location request determines that the child's mobile station is located substantially outside of the general school area, then a parent/guardian is notified of that fact, and of the child's location via any of several methods, such as: (a.) a voice-synthesized telephone message, (b.) various extranet/internet means, such as electronic mail, netcasting, such as the product Castanet, by Marimba Software, Inc., (c.) fax to a pre-determined telephone number, or (d.) alpha-numeric text paging.

(5) Commercial mobile radio service (CMRS) service provider is the reference name of the company that owns and/or operates a publicly accessible wireless system in the cellular or PCS spectrum radio bands.

(6) The term "geolocation" as used herein refers to "a representation of at least one of: a geographical location or a geographical extent". Thus, the term "GeoLocation Message" refers to a message that contains a content representative of at least one of a geographical location or a geographical extent. Moreover, the term "geolocation result" refers to a result that represents at least one of: a geographical location or a geographical extent, and the term "geolocation related processing" is intended to mean "processing that is related to a result that represents at least one of: a geographical location or a geographical extent".

SUMMARY DISCUSSION

The location system of the present invention accomplishes the above and other objectives by the following steps:

(1.) receiving signal data measurements corresponding to wireless communications between a mobile station to be located (herein also denoted the target mobile station) and a wireless telephony infrastructure, wherein the mobile station, MS and/or mobile switch center may be enhanced in certain novel and cost effective ways so as to provide an extended number of values characterizing the wireless signal communications between the target mobile station and the base station infrastructure, such infrastructure including multiple, distinct CMRS where base stations share a common coverage area;

(2.) organizing and processing the signal data measurements received from a given target mobile station and surrounding base stations so that composite wireless signal characteristic values may be obtained from which target mobile station location estimates may be derived. In particular, the signal data measurements are ensembles of samples from the wireless signals received from the target mobile station by the base station infrastructure, and from associated base stations wherein these samples are subsequently filtered using analog and digital spectral filtering.

(3.) providing the resultant location estimation characteristic values to a mobile station location estimate model, wherein each such model (also denoted a "first order model" or FOM) subsequently determines the estimate of the location of the target mobile station based on, for example, the signal processing techniques (1.) through (2.) above.

Accordingly, steps (1.) and (2.) above are performed by a subsystem of the invention denoted the Signal Processing and Filtering Subsystem (or simply the Signal Processing Subsystem). In particular, this subsystem receives samples of wireless signal characteristic measurements such as a plurality of relative signal strengths and corresponding signal time delay value pairs, wherein such samples are used by this subsystem to produce the component with the least amount of multipath, as evidenced in the sample by the short time delay value, wherein each such value pair is associated with wireless signal transmissions between the target mobile station and a particular base station of a predetermined wireless base station infrastructure. Extremely transient signal anomalies such as signal reflection from tree leaves or the passing of a truck are likely to be filtered out by the Signal Processing Subsystem. For example, such an ensemble of data value pairs can be subjected to input cropping and various median filters employing filtering techniques such as convolution, median digital Fast Fourier transform, Radon transform, Gabar transform nearest neighbor, histogram equalization, input and output cropping, Sobel, Wiener, and the like.

It is a further aspect of the present invention that the wireless personal communication system (PCS) infrastructures currently being developed by telecommunication providers offer an appropriate localize infrastructure base upon which to build various personal location systems employing the present invention and/or utilizing the techniques disclosed herein. In particular, the present invention is especially suitable for the location of people and/or objects using code division multiple access (CDMA) wireless infrastructures, although other wireless infrastructures, such as, time division multiple access (TDMA) infrastructures and GSM are also contemplated. Note that CDMA personal communications systems are described in the Telephone Industries Association standard IS-95, for frequencies below 1 GHz, and in the Wideband Spread—Spectrum Digital Cellular System Dual-Mode Mobile Station-Base Station Compatibility Standard, for frequencies in the 1.8–1.9 GHz frequency bands, both of which are incorporated herein by reference. Furthermore, CDMA general principles have also been described, for example, in U.S. Pat. No. 5,109,390, to Giuhousen, et al filed Nov. 7, 1989, and CDMA Network Engineering Handbook by Qualcomm, Inc., each of which is also incorporated herein by reference.

For example, in one embodiment, the present invention includes low cost, low power base stations, denoted location base stations (LBS) above, providing, for example, CDMA pilot channels to a very limited area about each such LBS. The location base stations may provide limited voice traffic capabilities, but each is capable of gathering sufficient wireless signal characteristics from an MS within the location base station's range to facilitate locating the MS. Thus, by positioning the location base stations at known locations in a geographic region such as, for instance, on street lamp poles and road signs, additional MS location accuracy can be obtained. That is, due to the low power signal output by such location base stations, for there to be communication between a location base station and a target MS, the MS must be relatively near the location base station. Additionally, for each location base station not in communication with the target MS, it is likely that the MS is not near to this location base station. Thus, by utilizing information received from both location base stations in communication with the target MS and those that are not in communication with the target MS, the present invention can substantially narrow the possible geographic areas within which the target MS is likely to be. Further, by providing each location base station (LBS) with a co-located stationary wireless transceiver (denoted a built-in MS above) having similar functionality to an MS, the following advantages are provided:

(4.1) assuming that the co-located base station capabilities and the stationary transceiver of an LBS are such that the base station capabilities and the stationary transceiver communicate with one another, the stationary transceiver can be signaled by another component(s) of the present invention to activate or deactivate its associated base station capability, thereby conserving power for the LBS that operate on a restricted power such as solar electrical power;

(4.2) the stationary transceiver of an LBS can be used for transferring target MS location information obtained by the LBS to a conventional telephony base station;

(4.3) since the location of each LBS is known and can be used in location processing, the present invention is able to (re)train and/or (re)calibrate itself in geographical areas having such LBSs. That is, by activating each LBS stationary transceiver so that there is signal communication between the stationary transceiver and surrounding base stations within range, wireless signal characteristic values for the location of the stationary transceiver are obtained for each such base station.

In another aspect of the present invention, in environments where a home base station capability exists, then wireless location can be provided under certain circumstances, wherein when a mobile station user is within a predetermined range of for example, 1000 feet of his/her premises, the user's mobile station is detected through mobile station receiving electronics provided in, for example, cordless telephone units as being at home. Thus, the local public telephone switching network may be provided with such information for registering that user is at home, and therefore the mobile station may be allowed to function as a cordless home telephone utilizing the local public telephone switching network instead of the base station infrastructure. According to this aspect of the present invention, the location center of the present invention receives notification from the local public switched telephone network that the mobile station is at or near home and utilizes this notification in outputting a location estimate for the mobile station.

In yet another aspect, the present invention includes a capability for locating a target mobile station within areas of poor reception for infrastructure base stations by utilizing distributed antennas. A distributed antenna system as used herein is a collection of antennas attached in series to a reduced function base station wherein the antennas are distributed throughout an area for improving telephony coverage. Such distributed antenna systems are typically used in indoor environments (e.g., high rise buildings) or other areas wherein the signal to noise ratio is too high for adequate communication with standard infrastructure base stations. Also a distributed antenna system may be located such that its coverage pattern overlaps the area of coverage of another distributed antenna system. In such cases each of the overlapping distributed antenna systems includes purposeful delay elements to provide different signal delays for each of the overlapping antenna systems and thereby provide multipath signals with sufficient delay spread for signal discrimination, as one skilled in the art will understand. Accordingly, the present invention receives and utilizes location information communicated from distributed antenna systems for locating a target mobile station. That is, the present invention may receive information from the base station infrastructure indicating that a target mobile station is communicating with such a distributed antenna system and provide distributed antenna signal characteristic values related to the distributed antenna system. Accordingly, to process such target mobile station location signal data, the present invention includes a distributed antenna system for generating target mobile station location estimate derived from the location signal data obtained from the distributed antenna system.

The location system of the present invention offers many advantages over existing location systems. The system of the present invention, for example, is readily adaptable to existing wireless communication systems and can accurately locate people and/or objects in a cost-effective manner. In particular, the present invention requires few, if any, modifications to commercial wireless communication systems for implementation. Thus, existing personal communication system infrastructure base stations and other components of, for example, commercial CDMA infrastructures are readily adapted to the present invention. The present invention can be used to locate people and/or objects that are not in the line-of-sight of a wireless receiver or transmitter, can reduce the detrimental effects of multipath on the accuracy of the location estimate, can locate people and/or objects located indoors as well as outdoors, and uses a number of wireless stationary transceivers for location. The present invention employs a number of distinctly different location computational models (FOMs) for location which provides a greater degree of accuracy, robustness and versatility than is possible with existing systems. For instance, the location models provided include not only the radius-radius/TOA and TDOA techniques but also adaptive neural net techniques. Further, the present invention is able to adapt to the topography of an area in which location service is desired. The present invention is also able to adapt to environmental changes substantially as frequently as desired. Thus, the present invention is able to take into account changes in the location topography over time without extensive manual data manipulation.

Moreover, there are numerous additional advantages of the system of the present invention when applied in CDMA communication systems. The location system of the present invention readily benefits from the distinct advantages of the CDMA spread spectrum scheme, namely the exploitation of radio frequency spectral efficiency and isolation by (a) monitoring voice activity, (b) management of two-way power control, (c) provision of advanced variable-rate modems and error correcting signal encoding, (d) inherent resistance to fading, (e) enhanced privacy, and (f) multiple "rake" digital data receivers and searcher receivers for correlation of signal multipaths.

Additionally, note that this architecture need not have all modules co-located. In particular, it is an additional aspect of the present invention that various modules can be remotely located from one another and communicate with one another via telecommunication transmissions such as telephony technologies and/or the Internet. Accordingly, the present invention is particularly adaptable to such distributed computing environments. For example, some number of the location center modules may reside in remote locations and communicate their generated hypotheses of mobile station location estimates (each such hypothesis also denoted a "location hypothesis" herein) via the Internet.

In an alternative embodiment of the present invention, the processing following the generation of location estimates by the modules may be such that this processing can be provided on Internet user nodes and the modules may reside at Internet server sites. In this configuration, an Internet user may request hypotheses from such remote modules and perform the remaining processing at his/her node.

Additionally, note that it is within the scope of the present invention to provide one or more central location development sites that may be networked to, for example, dispersed location centers or systems providing location services according to the present invention, wherein the modules may be accessed, substituted, enhanced or removed dynamically via network connections with a central location development site. Thus, a small but rapidly growing municipality in substantially flat low density area might initially be provided with access to, for example, two or three modules for generating location hypotheses in the municipality's relatively uncluttered radio signaling environment. However, as the population density increases and the radio signaling environment becomes cluttered by, for example, thermal noise and multipath, additional or alternative modules may be transferred via the network to the location center for the municipality.

Of course, other software architectures may also to used in implementing the processing of the location center without departing from scope of the present invention. In particular, object-oriented architectures are also within the scope of the present invention. For example, the modules may be object methods on an mobile station location estimator object, wherein the estimator object receives substantially all target mobile station location signal data output by the signal filtering subsystem 20. Alternatively, software bus architectures are contemplated by the present invention, as one skilled in the art will understand, wherein the software architecture may be modular and facilitate parallel processing.

One embodiment of the present invention includes providing the location of a mobile station (MS) using the digital air interface voice channel and an automatic call distributor device. This embodiment provides location information to either the initiating caller who wishes to learn of his location, using the voice channel, and/or location information could be provided to another individual who has either a wireline or wireless telephone station.

Another embodiment of the present invention includes providing the location of a mobile station using the digital air interface voice channel and a hunt group provided from a central office or similar device. This embodiment provides location information to either the initiating caller who wishes to learn of his location, using the voice channel and/or location information could be provided to another individual who has either a wireline or wireless telephone station.

Another embodiment of the present invention includes providing the location of a mobile station using the digital air interface text paging, or short message service channel and a hunt group provided from a central office or similar device. This embodiment provides location information to either the initiating caller who wishes to learn of his location, using the voice channel, and/or location information could be provided to another individual who has either a wireline or wireless telephone station.

Another embodiment of the present invention includes providing the location of a plurality of mobile stations using the public Internet or an intranet, with either having the ability to further use "push", or "netcasting" technology. This embodiment provides location information to either the initiating Internet or Intranet user who wishes to learn of one or more mobile station locations, using either the Internet or an intranet. Either the mobile station user to be located can initiate a request for the user to be located, or an Internet/ intranet user may initiate the location request. Optionally the location information could be provided autonomously, or periodically, or in accordance with other logic criteria, to the recipient of the location information via the Internet or a intranet As a further option, location information can be superimposed onto various maps (e.g., bit/raster, vector, digital photograph, etc.) for convenient display to the user.

Yet another embodiment of the present invention includes providing a multicast notification to a group of mobile station users, based on distress call from a particular mobile station, wherein the group of mobile station users are relatively nearby the distress caller. The multicast notification provides individual directions for each group mobile station user, to direct each user to the fastest route to reach the distressed caller.

Other aspects of the present invention can be described as follows:

Aspect 1. An apparatus for locating a first mobile station for at least transmitting and receiving radio signals, wherein said radio signals are received on a forward radio bandwidth and said radio signals are transmitted on a different reverse radio bandwidth, comprising:
  a first wireless network infrastructure for communicating with said first mobile station, said first wireless network infrastructure having:
    (A1) a plurality of spaced apart base stations for communicating via said radio signals with said first mobile station, and
    (A2) a mobile switching center for communicating with said first mobile station, via said radio signals with the base stations, wherein said mobile switching center also communicates with said plurality of base stations for receiving measurements of said radio signals, said measurements including: (i) first measurements of said radio signals received by said first mobile station in said forward radio bandwidth, and (ii) second measurements of said radio signals transmitted by said first mobile station in said reverse radio bandwidth;
  a location determining means for locating said first mobile station, wherein said location determining means receives said first and second measurements from the mobile switching center for estimating a location of said first mobile station, wherein said estimate is a function of both said first measurements and said second measurements.

Aspect 2. An apparatus for locating a mobile station as in Aspect 1, further including an interface means between said location determining means and said mobile switching center, wherein said interface means generates a location request for a primary one of said base stations to which said first mobile signaling means is in communication.

Aspect 3. An apparatus for locating a mobile station as in Aspect 1, further including a means for requesting data related to additional radio signals between said first mobile station and at least a second wireless network infrastructure different from said first wireless network infrastructure.

Aspect 4. An apparatus for locating a mobile station as in Aspect 1, wherein said first wireless network infrastructure is capable of communicating at least one of voice and visual information with said first mobile station.

Aspect 5. An apparatus for locating a mobile station, comprising:
  a wireless network infrastructure for communicating with a plurality of mobile stations, each said mobile station for transmitting and receiving wireless signals, wherein said wireless signals are received in a forward bandwidth and said wireless signals are transmitted in a different reverse bandwidth, and, said wireless network infrastructure having a plurality of spaced apart base stations for communicating via said wireless signals with said plurality of mobile stations;
  a location determining means for communicating with said plurality of mobile stations, via said radio signals with the base stations, wherein said location determining means communicates with said plurality of base stations for receiving measurements related to said radio signals for estimating a location of at least a first of said plurality of mobile stations, said measurements including: (i) first measurements of said wireless signals received by said first mobile station in said forward radio bandwidth, and (ii) second measurements of said wireless signals transmitted by said first mobile station in said reverse radio bandwidth;

wherein said location determining means estimates a location of said first mobile station using both said first measurements and said second measurements.

Aspect 6. An apparatus for locating a mobile station as in Aspect 5, wherein said second measurements are determined from said wireless signals being received by said base stations.

Aspect 7. An apparatus for locating a mobile station as in Aspect 5, wherein said measurements include at least one of: a delay spread, a signal strength, a ratio of energy per bit versus signal to noise, a word error rate, a frame error rate, a mobile signaling means, a power control value, a pilot index, a finger identification, an arrival time, an identification of said first mobile station for communicating with the wireless network infrastructure, a make of said first mobile station, a revision of said first mobile station, a sector identification of one of the base stations receiving said radio signals transmitted from said first mobile station.

Aspect 8. An apparatus for locating a mobile station as in Aspect 5, wherein said radio signals are communicated using one of: CDMA, W-CDMA, TDMA and advanced mobile phone service.

Aspect 9. An apparatus for locating a mobile station as in Aspect 5 wherein said location determining means includes a location estimator using time difference of arrival data from said measurements.

Aspect 10. An apparatus for locating a mobile station as in Aspect 9, wherein said location estimator receives said measurements from a distributed antenna system.

Aspect 11. An apparatus for locating a mobile station as in Aspect 9, wherein said location estimator receives active, candidate and remaining set information from said first mobile signaling means.

Aspect 12. An apparatus for locating a mobile station as in Aspect 1, wherein said location determining means includes:

a receiving means for receiving first data related to at least one of said first measurements and said second measurements between said first mobile station and said wireless network infrastructure;

activating a first location estimator for outputting a first estimate of a location of said first mobile station when supplied with location information from said receiving means, said location information related to the first data;

outputting said first estimate of the location of said first mobile station when said first estimate has an extent less than or equal to a predetermined size;

activating a second location estimator for outputting a second estimate of a location of said first mobile station when said first location estimator does not provide said first estimate having an extent less than or equal to a predetermined size;

outputting an estimate of the location of said first mobile station when said second location estimator provides said second estimate.

Aspect 13. A method for locating a wireless mobile station, comprising: transmitting, by a first short range transceiver station, a status change related to whether the mobile station and said first short range transceiver station are able to wirelessly communicate through a telephony network to a predetermined storage; storing, in said predetermined storage, said status of a mobile station, wherein said status has a first value when the mobile station communicates with said short range transceiver station as a cordless telephone, and said status has a second value when the mobile station communicates with a network of base stations, wherein said base stations are cooperatively linked for providing wireless communication; detecting, by said first short range transceiver station, a change accessing said predetermined storage for determining a location of the mobile station.

Aspect 14. A method for locating a wireless mobile station, as in Aspect 13, wherein said short range transceiver is a home base station.

Aspect 15. A method for locating a wireless mobile station, as in Aspect 13, wherein said predetermined storage is accessible via one of: an autonomous notification message and a request-response message.

Aspect 16. A method for locating a wireless mobile station, as in Aspect 13, wherein said predetermined storage is a home location register.

Aspect 17. A method for locating a wireless mobile station, as in Aspect 13, wherein said predetermined storage includes one or more of the following data items related to said mobile station: mobile station identification number, short range transceiver identification and mobile switch center identification.

Aspect 18. A method for locating a wireless mobile station, as in Aspect 13, wherein said step of accessing includes responding to a query of said predetermined storage location using an identification of the mobile station.

Aspect 19. A method for locating a wireless mobile station, as in Aspect 13, further including providing said status from said predetermined storage together with an identification of the mobile station to a mobile station location estimator for estimating a location of the mobile station.

Aspect 20. A method for location a wireless mobile station, as in Aspect 17, wherein said step of transmitting further includes associating said change with a predetermined fixed location and said short range transceiver identification.

Aspect 21. A method for location a wireless mobile station, as in Aspect 13, wherein said step of accessing includes translating the mobile identification number and said short range transceiver identification into a predetermined location when the status has said first predetermined value.

Aspect 22. A method for location a wireless mobile station, as in Aspect 13, further including a prior step of provisioning a translating database from a customer care system containing the location of the short range transceiver.

Aspect 23. A method for locating a wireless mobile station, comprising: receiving data of wireless signals communicated between a mobile station and a wireless network; detecting, using said first data, that the mobile station is in wireless communication with a distributed antenna system having a plurality of antennas connected in series and distributed along a signal conducting line so that there is a predetermined signal time delay between said antennas and at predetermined locations; determining a plurality of signal time delay measurements for signals transmitted between the mobile station and a collection of some of said antennas, wherein said signals are also communicated through said line, estimating a location of the mobile station using said plurality of signal time delay measurements.

Aspect 24. A method for locating a wireless mobile station as in Aspect 23, wherein said step of estimating includes correlating each measurement of said plurality of signal time delay measurements with a unique corresponding one of said antennas.

Aspect 25. A method for locating a wireless mobile station as in Aspect 24, wherein said step of estimating includes: identifying a plurality of antennas in said collection using correlation obtained in said step of correlating; determining a corresponding signal time delay between the mobile station and each antenna in said collection; determining a location of each antenna in said collection; estimating a location of the mobile station using said corresponding signal time delays and said locations of each antenna in said collection.

Aspect 26. A method for locating a wireless mobile station as in Aspect 23, wherein said step of estimating includes determining, for said signal time delay measurements, a common signal time delay corresponding to transmitting signals from said distributed antenna system to a receiver of the first wireless network.

Aspect 27. A method for locating a wireless mobile station as in Aspect 23, wherein said step of estimating includes using an absolute delay time with respect to a pilot channel for a base station on the wireless network.

Aspect 28. A method for locating a wireless mobile station as in Aspect 23, wherein said step of estimating includes performing a triangulation using values related to one of: a signal time of arrival, and a signal time difference of arrival for time difference of arrival corresponding to each antenna in said collection.

Aspect 29. A method for locating a wireless mobile station, as in Aspect 23 wherein said step of estimating includes a step of computing a most likely location of said mobile station using a fuzzy logic computation.

Aspect 30. A method for locating a wireless mobile station as in Aspect 23, wherein said step of activating includes activating one of:
(a) a location estimator for determining whether the mobile station is detected by a base station of the network, wherein said base station communicates with the mobile station as a cordless telephone;
(b) a location estimator for estimating a location of the mobile station using location information obtained from said distributed antenna system;
(c) a location estimator for estimating a location of the mobile station by one of: triangulation and trilateration.

Aspect 31. A method for locating a wireless mobile station, comprising: first receiving first signal characteristic measurements of wireless signals communicated between a mobile station and a first network of base stations, wherein said base stations in the first network are cooperatively linked by a first wireless service provider for providing wireless communication; instructing the mobile station to search for a wireless signal from a second network of base stations that are cooperatively linked by a second wireless service provider for providing wireless communication, wherein said first and second wireless service providers are different; second receiving second signal characteristic measurements of wireless signals communicated between the mobile station and said second network of base stations; estimating a location of the mobile station using said first and second signal characteristic measurements.

Aspect 32. A method for locating a wireless mobile station as in Aspect 31, wherein the mobile station is registered for a wireless communication service with the first wireless service provider, and the mobile station is not registered for the wireless communication service with the second wireless service provider.

Aspect 33. A method for locating a wireless mobile station as in Aspect 31, wherein said step of instructing includes transmitting a command to the mobile station for instructing the mobile station to search for a signal from a base station of said second wireless service provider in a frequency bandwidth different from a frequency bandwidth for communicating with the base stations of said first wireless service provider.

Aspect 34. A method for locating a wireless mobile station as in Aspect 31, wherein said step of instructing includes transmitting a command to the mobile station for instructing the mobile station to hand-off from said first service provider to a base station associated with said second service provider, for purposes of performing additional signal measurements.

Aspect 35. A method for locating a wireless mobile station as in Aspect 31, wherein said first signal characteristic measurements include measurements for time delay, signal strength pairs of signal communicated from at least one of:
(a) the base stations of said first network to the mobile station, and
(b) the mobile station to the base stations of said first network, and
wherein said second signal characteristic measurements include measurements for time delay, signal strength pairs of signals communicated from the base stations of said second network to the mobile station.

Aspect 36. A method for locating a wireless mobile station, comprising: receiving first data related to wireless signals communicated between a mobile station and at least a first network of a plurality of commercial mobile service provider networks of base stations, wherein for each said network, there is a plurality of base stations for at least one of transmitting and receiving wireless signals with a plurality of mobile stations; instructing the mobile station to communicate with a second network of the plurality of networks for supplying second data; activating a mobile station location estimator, when said first and second data are obtained for providing an estimate of a location of the mobile station.

Aspect 37. A method for locating a wireless mobile station, as in Aspect 36, wherein said second network includes a second plurality of base stations, wherein a majority of base stations in said second plurality of base stations has a location different from the locations of base stations in said first network.

Aspect 38. A method for locating a wireless mobile station, as in Aspect 36, wherein at least one of said first and second data includes signal characteristic measurements of communication with the mobile station for a time interval of less than 10 seconds.

Aspect 39. A method for locating a wireless mobile station, comprising: first receiving first signal characteristic measurements of wireless signals communicated between a mobile station and a first network of base stations, wherein said base stations in the first network are cooperatively linked by a first wireless service provider for providing wireless communication; instructing a second network of base stations that are cooperatively linked by a second wireless service provider for providing wireless communication so that the second network searches for wireless signals from the mobile station, wherein said first and second wireless service providers are different, second receiving second signal characteristic measurements of wireless signals communicated between the mobile station and said second network of base stations; estimating a location of the mobile station using said first and second signal characteristic measurements.

Aspect 40. A method for locating a wireless mobile station, as in Aspect 39, further including a step of requesting the mobile station to raise it's transmitter power level to a predetermined level, prior to said step of instructing.

Aspect 41. A method for locating a wireless mobile station, comprising: receiving, by a receiving means, first data related to wireless signals communicated between a mobile station and at least a first network of a plurality of commercial mobile service provider networks, wherein for each said network, there are a plurality of communication stations for at least one of transmitting and receiving wireless signals with a plurality of mobile stations; first activating a location estimator for providing a first estimate of a location of the mobile station when supplied with first location information from said receiving means, said first location information related to the first data, when one of (a) said first estimate does not exist, and (b) said first estimate has an extent greater than or equal to a predetermined size, the steps (A1) and (A2) are performed:
  (A1) instructing the mobile station to communicate with a second network of the plurality of networks for supplying second data to said receiving means, wherein said second data is related to wireless signals communicated between the mobile station and the second network;
  (A2) second activating said location estimator a second time for providing a second estimate of a location of the mobile station when supplied with additional location information from said receiving means, said additional location information related to the second data;
outputting at least one of the estimates of the location of the mobile station provided by said location estimator when said location estimator provides at least one estimate of the location of the mobile station.

Aspect 42. A method for locating a wireless mobile station as in Aspect 41, wherein said additional location information and said first location information are utilized together by said location estimator.

Aspect 43. A method of locating a wireless mobile station as in Aspect 4 1, wherein said communication stations include wireless base stations for one of CDMA, TDMA, and GSM.

Aspect 44. A method of locating a wireless mobile station as in Aspect 43, wherein said communication stations include home base stations.

Aspect 45. A method of locating a wireless mobile station as in Aspect 41, wherein the mobile station includes one of: a CDMA transmitter, a TDMA transmitter, and a GSM transmitter, and a AMPS transmitter.

Aspect 46. A method for locating a wireless mobile station as in Aspect 41, wherein one or more of said activating steps includes:
  (a) said location estimator for determining whether the mobile station is detected by a communication station which communicates with the mobile station as a cordless telephone;
  (b) said location estimator for estimating a location of the mobile station using location information related to data from a distributed antenna system;
  (c) said location estimator for estimating a location of the mobile station by one of: triangulation and trilateration.

Aspect 47. A method for locating a wireless mobile station as in Aspect 41, wherein said predetermined extent is less than one thousand feet.

Aspect 48. A method for locating a wireless mobile station, comprising: receiving, by a receiving means, first data related to wireless signals communicated between a mobile station and at least a first network of one or more commercial mobile service provider networks, wherein for each said network, there is a different plurality of base stations for at least one of transmitting and receiving wireless signals with a plurality of mobile stations; activating a first location estimator for outputting a first estimate of a location of the mobile station when supplied with location information from said receiving means, said location information related to the first data; outputting said first estimate of the location of the mobile station when said first estimate has an extent less than or equal to a predetermined size; activating a second location estimator for outputting a second estimate of a location of the mobile station when said first location estimator does not provide said first estimate having an extent less than or equal to a predetermined size; outputting an estimate of the location of the mobile station when said second location estimator provides said second estimate.

Aspect 49. A method for locating a wireless mobile station as in Aspect 48 further including a step of instructing the mobile station to communicate with a second network of the plurality of networks for supplying second data to said receiving means, wherein said second data is related to wireless signals communicated between the mobile station and the second network.

Aspect 50. A method for locating a wireless mobile station as in Aspect 49, wherein said step of instructing includes a step of instructing the mobile station to hand-off to said second network for synchronizing timing signals and performing measurements between the mobile station an said second network.

Aspect 51. A method for locating a wireless mobile station as in Aspect 48, wherein one or more of said activating steps includes activating one of:
  (a) a location estimator for determining whether the mobile station is detected by one of the base stations which communicates with the mobile station as a cordless telephone;
  (b) a location estimator for estimating a location of the mobile station using location information related to data from a distributed antenna system;
  (c) a location estimator for estimating a location of the mobile station by one of: triangulation and trilateration.

Aspect 52. A method for locating a mobile station, comprising: receiving, by said mobile station, a request control message from one of a plurality of base stations, wherein said message is received by a receiving antenna of said mobile station; the control message providing information related to said message to at least one of a control processor and a searcher receiver in said mobile station; determining, using at least one of said control processor and said searcher receiver, a plurality of pairs of radio signal strength related values and corresponding signal time delays for a wireless communication between said mobile station and at least a first of the base stations, wherein for at least some of said pairs, said signal time delays are different, and for each pair, said signal strength related value for said pair is obtained using a signal strength of said communication at said corresponding signal time delay of said pair, transmitting signals for said pairs to one or more of the base stations via a transmitting antenna of said mobile station; routing data for at least one of said pairs from said one or more base stations to a mobile station location estimator for estimating a location of said mobile station.

Aspect 53. A method for locating a mobile station, as in Aspect 52, wherein said step of receiving uses one of a CDMA, an AMPS, a NAMPS and a TDMA wireless standard.

Aspect 54. A method for locating a mobile station, as in Aspect 52, wherein said step of determining is performed for a wireless communication between said mobile station and each of a plurality of the base stations.

Aspect 55. A method for locating a mobile station, as in Aspect 52, wherein each of said signal time delays is included within a predetermined corresponding time delay spread.

Aspect 56. A method for locating a mobile station, as in Aspect 52, wherein said step of determining includes a step of instructing, by said control processor, said searcher receiver to output a plurality of said radio signal strength related values for a plurality of fingers resulting from said communication from said first base station to said mobile station.

Aspect 57. A method for locating a mobile station, as in Aspect 52, wherein said step of determining includes inputting data for said pairs to a modulator for modulating said data prior to said step of transmitting.

Aspect 58. A method for locating a mobile station, as in Aspect 57, further including a step of establishing a software controllable data connection between said control processor and a mobile station component including at least one of: a user digital baseband component and said modulator, wherein said connection inputs said data to said component.

Aspect 59. A method for locating a mobile station, as in Aspect 52 further including a step of providing said data for said pairs to a mobile station location estimating system having a first mobile station location estimating component using time difference of arrival measurements for locating said mobile station via one of trilateration and triangulation.

Aspect 60. A method for locating a mobile station, as in Aspect 59, wherein said step of providing includes selecting one of: said first mobile station estimating component, a second mobile station estimating component using data obtained from a distributed antenna system, and a third mobile station estimating component for using data obtained from activation of a home base station.

Aspect 61. A method for locating a mobile station, as in Aspect 60, further including a step of computing a most likely location of said mobile station using a fuzzy logic computation.

Aspect 62. A method for locating a mobile station, as in Aspect 61, wherein said step of computing is performed by said second mobile station estimating component for determining a most likely floor that said mobile station resides in a multi-story building having a distributed antenna system.

Aspect 63. A method for locating a mobile station, as in Aspect 59, further including a step of requesting data for additional pairs of radio signal strength related values and corresponding signal time delays for a wireless communication between said mobile station and at least a second base station of a commercial mobile radio service provider different from a commercial mobile service provider for said first base station.

Aspect 64. A method for obtaining data related to wireless signal characteristics, comprising: providing a user with a mobile station for use when the user traverses a route having one or more predetermined route locations, wherein one or more of the route locations have a corresponding telephone number and a corresponding description stored in the mobile station; performing the following substeps when the user visits each of the route locations: activating a call to said corresponding telephone number; transmitting a code identifying the route location when the user is substantially at the route location; storing an association of:
(a) signal characteristic measurements for wireless communication between the mobile station and one or more base stations, and
(b) a unique identifier for the route location obtained using said code transmitted by said call;
Wherein said stored signal characteristic measurements are accessible using said unique identifier.

Aspect 65. A method as in Aspect 64, wherein said unique identifier corresponds to one of: (a) an address for the route location, and (b) a latitude and longitude of the route location.

Aspect 66. A method as in Aspect 64, wherein said route is periodically traversed by a user having a mobile station for accomplishing said step of performing.

Aspect 67. A method as in Aspect 64, wherein said step of storing includes retaining said signal characteristic measurements in a data storage for analyzing signal characteristic measurements of wireless communications between mobile stations and a wireless infrastructure of base stations.

Aspect 68. A method as in Aspect 64, further including, prior to said step of activating, a step of determining, by the user, that a display on the mobile station uniquely identifies that said corresponding description of the route location is available for calling said corresponding telephone number and transmitting said identifying code.

Aspect 69. A method as in Aspect 64, wherein said step of storing includes: obtaining a phone number identifying the mobile station; providing said phone number identifying the mobile station to a commercial mobile radio service provider in a request for said signal characteristic measurements.

Aspect 70. A method as in Aspect 64, wherein said step of storing includes using a phone number identifying the mobile station in combination with said transmitted identifying code for determining said unique identifier.

Aspect 71. A method as in Aspect 64, wherein said corresponding description includes at least one of; a textual description of its corresponding route location, and an address of its corresponding route location.

Aspect 72. A method as in Aspect 64, further including steps of: associating said identifying code for the route location and said unique identifier in a data storage prior to performing said step of performing; accessing said data storage using said identifying code for obtaining said unique identifier in said step of storing.

Aspect 73. A method as in Aspect 64, further including a step of accessing said stored signal characteristic measurements for enhancing a performance of a process for locating mobile stations.

Aspect 74. A method as in Aspect 64, wherein at least two of said one or more base stations are in networks of different commercial mobile radio service providers.

Aspect 75. A method as in Aspect 64, further including a step of filtering said signal characteristic measurements so that when said signal characteristic measurements are suspected of being transmitted from a location substantially different from the route location, said step of storing is one of: (a) not performed, and (b) performed so as to indicate that said signal characteristic measurements are suspect.

Aspect 76. A method as in Aspect 75, wherein said step of filtering includes at least one of: (a) determining an amount by which an estimated location of the mobile station using said signal characteristic measurements differs from a location of the mobile station obtained from said unique identifier; (b) determining whether a predetermined amount of time has elapsed between successive performances of said step of activating.

Aspect 77. A method for locating a wireless mobile station, comprising:

first receiving first signal characteristic measurements of wireless signals communicated between a mobile station and a first network of base stations, wherein said first signal characteristic measurements includes:
(a) one or more pairs of wireless signal strength related values and corresponding signal time delays for a wireless communication between the mobile station and at least a first of the base stations;
(b) data identifying operational characteristics of the mobile station including information related to a signal transmission power for the mobile station and information for determining a maximum transmission power level of the mobile station;

adjusting, for at least one of said pairs, its corresponding wireless signal strength, using said data, thereby obtaining corresponding adjusted pairs, wherein each adjusted pair has the corresponding adjusted signal strength, and wherein said adjusted signal strength is an expected signal strength of a predetermined standardized mobile station transmitter power level having a predetermined maximum transmission power and operating at a predetermined transmission power level;

outputting second signal characteristic information, obtained using said adjusted signal strength, to a mobile station location estimator for determining a location estimate of said first mobile station.

Aspect 78. A method for locating a mobile station as in Aspect 77, further including applying sequence of one or more signal processing filters to one of said pairs and said adjusted pairs.

Aspect 79. A method for locating a mobile station as in Aspect 78, wherein said sequence of filters is dependent upon a corresponding mobile station location estimator.

Aspect 80. A method for locating a mobile station as in Aspect 79, wherein said sequence of filters is pipelined so that for first and second filters of said sequence, an output of said first filter is an input to said second filter.

Aspect 81. A method for locating a mobile station as in Aspect 79, wherein said filters include Sobel, Weiner, median and neighbor.

Aspect 82. A method for locating a wireless mobile station, comprising:

first receiving first signal characteristic measurements of wireless signals communicated between a mobile station and a first network of base stations, wherein said first signal characteristic measurements includes one or more pairs of wireless signal strength related values and corresponding signal time delays for a wireless communication between the mobile station and at least a first of the base stations;

categorizing said pairs into categories according to ranges of signal strength related values and ranges of corresponding signal time delays for obtaining a representation of a frequency of occurrence of said one or more pairs in said categories;

applying one or more filters to said representation for one of: (a) reducing characteristics of said representation that are expected to be insufficiently repeatable for use in identifying a location of the mobile station, and (b) enhancing a signal to noise ratio;

supplying an output obtained from said step of applying to a mobile station location estimator;

estimating a location of the mobile station using said mobile station location estimator.

Aspect 83. A method for locating a wireless mobile station as in Aspect 82, further including a step of requesting data for additional pairs of wireless signal strength related values and corresponding signal time delays for a wireless transmission between the mobile station and at least a second base station of a second network of base stations different from the base stations of the first network, wherein said first and second networks communicate with the mobile station in different signal bandwidths.

Aspect 84. A method for locating a wireless mobile station as in Aspect 83, wherein the first network is operated by a first commercial mobile radio service provider and the second network is operated by a second commercial mobile radio service provider.

Aspect 85. A method for locating a wireless mobile station as in Aspect 82, wherein said representation corresponds to a histogram.

Aspect 86. A method for locating a wireless mobile station as in Aspect 82, further including a step of normalizing one of: (a) said pairs, and (b) values corresponding to said output.

Aspect 87. A method for locating a wireless mobile station as in Aspect 23, wherein said step of activating further includes the step of applying a fuzzy logic module which further discretizes the location estimate provided from one of:
(a) a location estimator for estimating a location of the mobile station using location information obtained from said distributed antenna system;
(b) a location estimator for estimating a location of the mobile station by one of: triangulation and trilateration.

Aspect 88. A method for contacting a telephony station, comprising: associating, by a user, a particular telephony number with a collection of one or more telephony station numbers of telephony stations with which the user desires to communicate when said particular telephony number is called from a predetermined telephony station; receiving said particular telephony number from the predetermined telephony station; determining a location of said predetermined telephony station and at least some of said telephony stations having telephony station numbers in said collection; selecting a first of said telephony stations having telephony station numbers in said collection, wherein said first telephony station is selected according to a location of said predetermined telephony station and a location of first telephony station; transmitting a user desired message to said first telephony station.

Aspect 89. A method for locating a mobile station, comprising: establishing, by a user of a particular mobile station, a collection of identities of one or more persons having permission to receive a location of said particular mobile station; receiving a request by a first of said persons for locating said particular mobile station; determining a location of said particular mobile station in response to said request, said location determined using measurements of wireless transmissions between said particular mobile station and a first wireless network of base stations, wherein said base stations are cooperatively linked for wireless communication; outputting said location to the first person.

Aspect 90. A method as in Aspect 89, wherein said step of determining includes using measurements of wireless transmissions between said particular mobile station and a second wireless network of base stations provided by a different commercial wireless service provider from a commercial wireless service provider for the first wireless network.

Aspect 91. An apparatus for locating a mobile station as in Aspect 3, further including a means for providing a location estimate using the Internet.

Aspect 92. An apparatus for locating a mobile station as in Aspect 3, further including a means for providing a location estimate using the Internet.

Aspect 92. An apparatus for locating a mobile station as in Aspect 3, further including a means for providing a location estimate using digital certificate keys and the Internet.

Aspect 93. An apparatus for locating a mobile station as in Aspect 91, further including a means for providing a location estimate using push technology on the Internet.

Further description of the advantages, benefits and patentable aspects of the present invention will become evident from the accompanying drawings and description hereinbelow. All novel aspects of the invention, whether mentioned explicitly in this Summary section or not, are considered subject matter for patent protection either singly or in combination with other aspects of the invention. Accordingly, such novel aspects of the present invention disclosed hereinbelow and/or in the drawings that may be omitted from, or less than fully described in, this Summary section are fully incorporated herein by reference into this Summary. In particular, all claims of the Claims section hereinbelow are fully incorporated herein by reference into this Summary section.

BRIEF DESCRIPTION OF THE DRAWINGS

FIG. 1 illustrates an overall view of a wireless location system and method for using multiple commercial mobile radio service providers;

FIG. 2 shows is a high level wireless location architecture using the intelligent network, which illustrates aspects of the home base station and Internet connectivity for receiving location requests and for providing location estimates;

FIG. 3 illustrates how the signals from the base stations associated with various multiple commercial radio service providers can be shared with the wireless location system to provide an improved geometry and thus improved wireless location accuracy.

FIG. 4 shows how the mobile station database in the location system is updated via interfaces in communication with multiple commercial mobile radio service providers using customer care systems.

FIG. 5 shows a method of direct access to multiple CMRS base stations, from the location system perspective, thus avoiding the need to significantly modify network infrastructure systems.

FIG. 6 illustrates physical components and the effects of predetermined signal delay, and total system delay in a distributed antenna environment for purposes of wireless location;

FIG. 7 shows the timing relationships among the signals within a distributed antenna system.

FIG. 8 shows a flowchart of the methods and procedures required to implement a DA database;

FIG. 9 illustrates an exemplary DA configuration with a direct antenna connection to the base stations;

FIG. 10 illustrates an alternative DA configuration using multipoint microwave;

FIG. 11 illustrates how multiple base stations could be used via a microwave circuit to provide PCS and location service to a multilevel building via virtual pilot channels;

FIG. 12 shows the DA delay spread ranges possible for a 500 microsecond guard zone, FIG. 13 shows DA-cell layout a geometry and how location geometries can be constructed;

FIG. 14 illustrates the realization of actual measurements and classification utilized within DA cell ranges to determine a percent range within each cell.

FIG. 15 shows the standard components of a CDMA MS.

FIG. 16 shows one embodiment for MS modification that facilities enhanced RF measurement telemetry.

FIG. 17 shows how the LC is used in a Home Base Station architecture.

FIG. 18 illustrates a typical case where signals from three base stations can be detected.

FIG. 19 illustrates a typical case where signals from four base stations (including remaining set information) can be detected.

FIG. 20 shows a MS detection scheme with a two base station geometry.

FIG. 21 illustrates a typical amorphous location area with only the signal detection of a single base station sector, by a MS.

FIG. 22 shows a series of typical reverse path CDMA RF measurements in a dense urban area.

FIG. 23 shows a series of typical reverse path CDMA RF measurements in a rural setting.

FIG. 24 shows a typical Location Center connection to a CTIA Model.

FIG. 25 shows a typical national Location Center and relevant network connections.

FIG. 41 illustrates how traveling instructions from two different points can be provided to an initiator.

FIG. 43 indicates the addition of a fuzzy logic module which discretizes the wireless location estimate output from the TOA/TDOA location estimator module.

DETAILED DESCRIPTION

Figure 26:
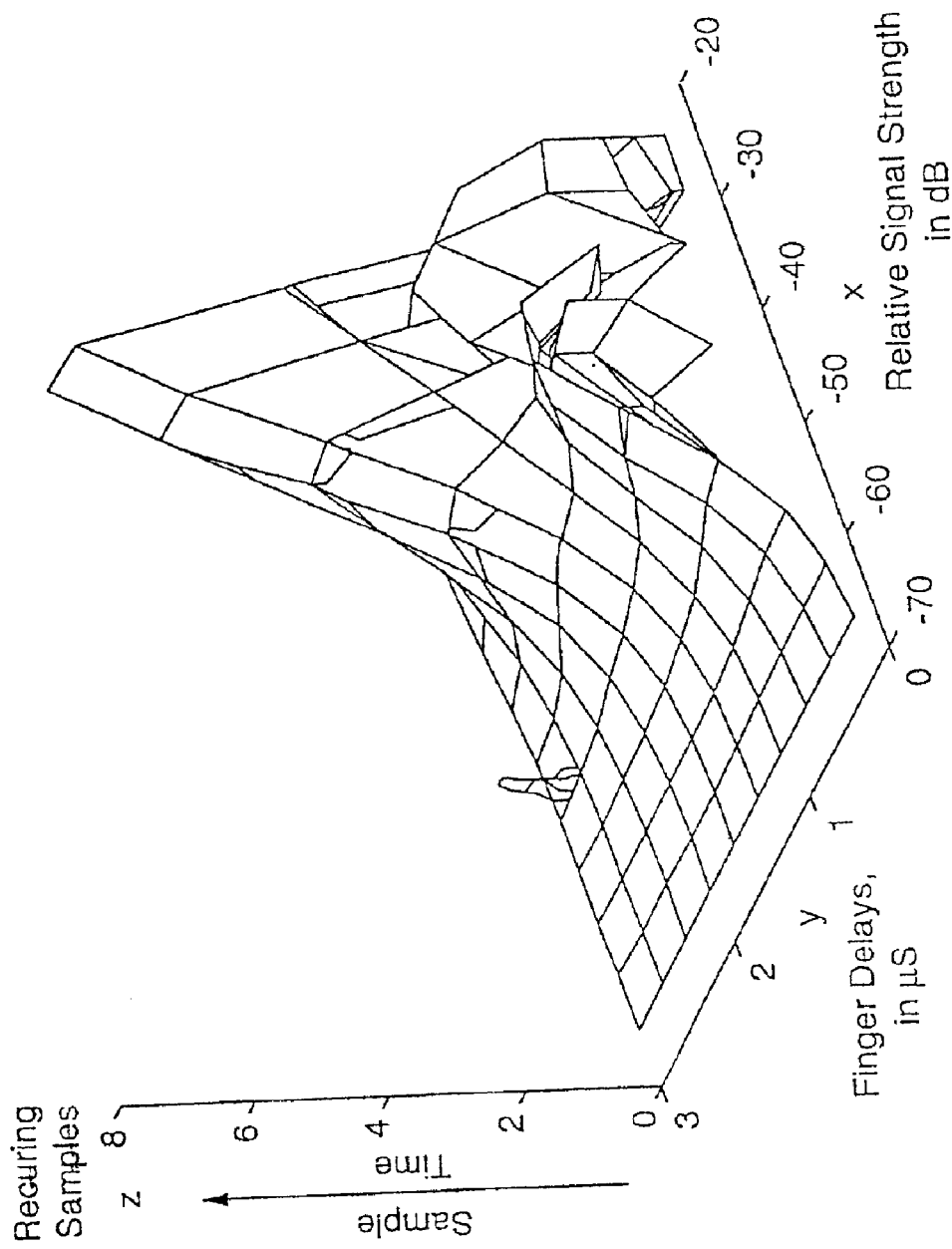
FIG. 26 illustrates a typical three dimensional delay spread profile.

Various digital wireless communication standards have been introduced such as code division multiple access (CDMA) and Time Division Multiple Access (TDMA) (e.g., Global Systems Mobile (GSM). These standards provide numerous enhancements for advancing the quality and communication capacity for wireless applications. Referring to CDMA, this standard is described in the Telephone Industries Association standard IS-95, for frequencies below 1 GHz, and in J-STD-008, the Wideband Spread-Spectrum Digital Cellular System Dual-Mode Mobile Station-Base station Compatibility Standard, for frequencies in the 1.8–1.9 GHz frequency bands.

Additionally, CDMA general principles have been described, for example, in U.S. Pat. No. 5,109,390, Diversity Receiver in a CDMA Cellular Telephone System, by Gilhousen, et al, filed Nov. 7, 1989. There are numerous advantages of such digital wireless technologies such as CDMA radio technology. For example, the CDMA spread spectrum scheme exploits radio frequency spectral efficiency and isolation by monitoring voice activity, managing two-way power control, provision of advanced variable-rate modems and error correcting signal design, and includes inherent resistance to fading, enhanced privacy, and provides for multiple "rake" digital data receivers and searcher receivers for correlation of multiple physical propagation paths, resembling maximum likelihood detection, as well as support for multiple base station communication with a mobile station, i.e., soft or softer hand-off capability. When coupled with a location center as described herein, substantial improvements in radio location can be achieved. For example, the CDMA spread spectrum scheme exploits radio frequency spectral efficiency and isolation by monitoring voice activity, managing two-way power control, provision of advanced variable-rate modems and error correcting signal design, and includes inherent resistance to fading, enhanced privacy, and provides for multiple "rake" digital data receivers and searcher receivers for correlation of multiple physical propagation paths, resembling maximum likelihood detection, as well as support for multiple base station communication with a mobile station, i.e., soft hand-off capability. Moreover, this same advanced radio communication infrastructure can also be used for enhanced radio location. As a further example, the capabilities of IS-41 and AIN already provide a broad-granularity of wireless location, as is necessary to, for example, properly direct a terminating call to a mobile station. Such information, originally intended for call processing usage, can be re-used in conjunction with the location center described herein to provide wireless location in the large (i.e., to determine which country, state and city a particular mobile station is located) and wireless location in the small (i.e., which location, plus or minus a few hundred feet within one or more base stations a given mobile station is located).

FIG. 1 illustrates a wireless location network using two commercial mobile radio service provider networks for the present invention. Accordingly, this figure illustrates the interconnections between the components of a typical wireless network configuration and various components that are specific to the present invention. In particular, as one skilled in the art will understand, a typical wireless network includes: (a) a mobile switching center (MSC) 112a, (b) generally a service control point 4a, and base stations (not shown) which are in communication with a mobile switch center 112a. Within a typical metropolitan area it is also common for a second commercial mobile radio service (CMRS) provider to offer wireless service within essentially similar coverage areas, such systems typically including an mobile switch center 112b, service control point 4b, and associated base stations (not shown). Added to this wireless network, the present invention provides the following additional components:

(1) a location system or center 142 which is required for determining a location of a target mobile station using signal characteristic values as measured by the target mobile station (not shown) and nearby base stations (not shown), further including of the following modules or subsystem components:

(1.1) an application programming interface 14 (having a controller also denoted by the label "14"), for physically interfacing with and controlling the messaging to and from each CMRS mobile switch center 112a, 112b, service control points 4a and 4b, receiving location requests from either the mobile switch center 112a, or 112b, or the Internet 468, and providing connection to the signal processing subsystem 20;

(1.2) a signal processing subsystem 20, which is in communication with the application programming interface (L-API) 14. The signal processor 20 receives, queues, filters and processes signal measurement messages into various formats suitable for the location estimate modules DA 10 and TOA/TDOA 8;

(1.3) a TOA/TDOA location estimate module 8, in communication with the signal processing subsystem 20. The TOA/TDOA module 8 provides a location estimate result, using a time of arrival or a time difference of arrival technique based on conditioned signals from the signal processing subsystem 20; in addition the TOA/TDOA module may also process signals from the distributed antenna module 10, in order to provide a location estimate within environments containing distributed antenna systems;

(1.4) a distributed antenna (DA) module 10, which receives signals related to distributed antennas, from the signal processor 20 in communication a location estimating capability for utilizing one or more distributed antenna systems 168 as shown in FIG. 2, wherein each such system 168 provides wireless location information for an MS 140 within the area in communication with one or more distributed antenna system 168.

(1.5) a home base station module (HBS) 6 in FIG. 1, which receives signals from the (application programming interface) controller 14 and determines wireless location (i.e., providing a location estimate result) based on registration principles of the wireless user's mobile station when in communication with the user's home base station (not shown) in communications with a given service control point 4a or 4b, containing a home base station application (not shown).

Since home base stations and distributed antenna systems can be located on potentially each floor of a multi-story building, in such cases where infrastructure is installed, the wireless location technology described herein can be used to perform location in terms of height as well as by Latitude and Longitude.

Referring to FIG. 2, additional detail is provided of typical base station coverage areas, sectorization, and high level components used in the present invention's scope, including the mobile switch center 112, a mobile station 140 in communication with a home base station 160, and communication between the location system 142 and the public Internet 468, via an Internet service provider interface 472. A novel aspect of this invention includes providing wireless location estimate information to various designated users via the public Internet. Although base stations may be placed in any configuration, a typical deployment configuration is approximately in a cellular honeycomb pattern, although many practical tradeoffs exist, such as site availability, versus the requirement for maximal terrain coverage area. To illustrate, such exemplary base stations (BSs) 122a through 122g are shown, each of which radiate referencing signals within their area of coverage to facilitate mobile station (MS) 140 radio frequency connectivity, and various timing and synchronization functions. A given base station may contain no sectors (not shown), thus radiating and receiving signals in a 360 degree omnidirectional coverage area pattern, or the base station may contain "smart antennas" (not shown) which have specialized coverage area patterns.

Alternatively and generally most frequent are base stations having three sector coverage area patterns. Shown in FIG. 2, each sector for base station 122a through 122g contains three sectors, labeled a, b, and c, which represent antennas that radiate and receive signals in an approximate 120 degree arc, from an overhead view. As one skilled in the art will understand, actual base station coverage areas generally are designed to overlap to some extent, thus ensuring seamless coverage in a geographical area. Control electronics within each base station are used to communicate with a given mobile station 140. Further, during communication with the mobile station the exact base station identification and sector identification information are known and are provided to the location center 142.

The base stations located at their cell sites may be coupled by various transport facilities 176 such as leased lines, frame relay, T-Carrier links, optical fiber links or by microwave communication links.

When the mobile station is powered on and in the idle state, it constantly monitors the pilot signal transmissions from each of the base stations located at nearby cell sites. As illustrated in FIG. 3, base station/sector coverage areas may often overlap both in the context of a single CMRS base station network, and also in the context of multiple CMRS base station networks, thus enabling mobile stations to detect, and, in the case of certain technologies, communicate simultaneously along both the forward and reverse paths, with multiple base stations/sectors, either with a single CMRS network or, in the case of hand-offs and roaming, multiple CMRS network equipment. In FIG. 3 the constantly radiating pilot signals from base station sectors 122a, 122b and 122c are detectable by mobile station 140 at its location. The mobile station 140 scans each pilot channel, which corresponds to a given base station/sector ID, and determines which cell it is in by comparing signals strengths of pilot signals transmitted from these particular cell-sites.

The mobile station 140 then initiates a registration request with the mobile switch center 112a, via the base station controller (not shown). The mobile switch center 112a determines whether or not the mobile station 140 is allowed to proceed with the registration process (except in the case of a 911 call, wherein no registration process is required). At this point, calls may be originated from the mobile station 140 or calls or short message service messages can be received from the mobile switch center 112a.

As shown in FIG. 2, the mobile switch center 112 communicates as appropriate, with a class 4/5 wireline telephony circuit switch or other central offices, with telephone trunks in communication with the public switch telephone network (PSTN) 124. Such central offices connect to wireline stations, such as telephones, or any communication device compatible with the line, such as a personal or home base station. The PSTN may also provide connections to long distance networks and other networks.

The mobile switch center 112 may also utilize IS/41 data circuits or trunks 522, which in turn connects to a service control point 104, using, for example, signaling system #7 (SS7) signaling link protocols for intelligent call processing, as one skilled in the art will understand. In the case of wireless advanced intelligent network (AIN) services such trunks and protocols are used for call routing instructions of calls interacting with the mobile switch center 112 or any switch capable of providing service switching point functions, and the public switched telephone network (PSTN) 124, with possible termination back to the wireless network. In the case of an mobile station 140 in communication with a corresponding home or office base station (HBS) 160, the HBS 160 controls, processes and interfaces the mobile station 140 to the PSTN 124, in a manner similar to a cordless telephone system, except that added AIN logic within, for example, the service control point (SCP) 104 is used to determine if the mobile station 140 is being controlled by the HBS 160 or a wireless base station 122. Regarding non-HBS calls, the mobile switch center 112 may direct calls between mobile stations 140 via the appropriate cell site base stations 122a through 122h since such mobile stations 140 do not typically communicate directly with one another in such wireless standards as CDMA, TDMA NAMPS, AMPS and GSM.

Referring again to FIG. 2, the Location system 142 interfaces with the mobile switch center 112 either via dedicated transport facilities 178, using for example, any number of LAN/WAN technologies, such as Ethernet, fast Ethernet, frame relay, virtual private networks, etc., or via the PSTN 124 (not shown). The location system 142 receives autonomous (e.g., unsolicited) or command/response messages regarding, for example: (a) the wireless network states, including for example, the fact that a base station has been taken in or out of service, (b) mobile station 140 and BS 122 radio frequency (RF) signal measurements, (c) notifications from a SCP 104 indicating that an HBS 160 has detected and registered with the SCP 104 the mobile station 140 corresponding to the HBS 160, and (d) any distributed antenna systems 168. Conversely, the location system 142 provides data and control information to each of the above components in (a)–(e). Additionally, the Location system 142 may provide location information to a mobile station 140, via a BS 122, using, for example the short message service protocol, or any data communication protocol supported by the air interface between the base station and the mobile station. Interface 106 connecting the location system 142 with the service control point 104 may also be required in the event the home location register and/or the home base station AIN function is located in the SCP 104.

Assuming the wireless technology CDMA is used, each BS 122a, 122b, 122c, through 122g uses a time offset of the pilot PN sequence to identify a forward CDMA pilot channel. Furthermore, time offsets, in CDMA chip sizes, may be re-used within a PCS system, thus providing efficient use of pilot time offset chips, thus achieving spectrum efficiency.

The use of distributed antennas is another technique for improving or extending the RF coverage of a radio coverage area 120 of a wireless system. Such distributed antennas are typically used in buildings or other areas of dense clutter, such as numerous walls, partitions and/or similar structures causing substantial signal attenuation. As shown in FIGS. 6, 9, 10, 11, and 13, distributed antennas 168 are typically connected together in a serial fashion for communicating with one or more infrastructure base stations 122. Distributed antennas may be connected to the mobile switch center 112 via various air interfaces, as shown in FIGS. 10 and 11, or alternatively distributed antennas may be connected to the MSC via a directed connection to a base station 122 as shown in FIG. 9, or via a private branch exchange (PBX) as shown in FIG. 13.

Referring to FIG. 11, distributed antennas 168 are useful particularly in wireless system configurations involving microcells, and potentially indoor environments, such as wireless systems in communication with private branch exchange systems (reference FIG. 13) in business offices, and in wireless local loop applications (not shown) as one skilled in the art will understand. Additionally, a distributed antenna embodiment can provide significant improvements in decreasing location error, as compared with an indoor mobile station 140 (reference FIG. 11) user with a wireless connection to an outdoor, infrastructure base station 122, as illustrated in FIGS. 11, 12, 13 and 14.

Mobile Station Description

As an example of a mobile station 140, such a mobile station will be described using CDMA technology. FIG. 15 illustrates a typical block diagram of the functional components of a CDMA mobile station (MS) 140, based on the patent, "Diversity Receiver in a CDMA Cellular Telephone System", U.S. Pat. No. 5,109,390. The MS 140 contains an antenna 510 coupled through diplexer 512 to analog receiver 514 and transmit power amplifier 516. Antenna 510 and diplexer 512 permit simultaneous transmission and reception of signals through an antenna 510. Antenna 510 collects transmitted signals and provides them through diplexer 512 to analog receiver 514. Receiver 514 receives the RF frequency signals, typically either in the 800–900 MHZ or 1.8–1.9 GHz band, from diplexer 512, for amplification and frequency down conversion to an intermediate frequency (IF). Translation is accomplished through the use of a frequency synthesizer of standard design which permits the receiver 514 to be tuned to any of the frequencies within the designated receive frequency band. The IF signal is passed through a surface acoustic wave bandpass filter, typically of 1.25 MHZ bandwidth, to match the waveform of the signal transmitted by a base station 122. Receiver 514 also provides an analog to digital converter (not shown) for converting the IF signal to a digital signal. The digital signal is provided to each of four or more data receivers (520, 522, 524, and 526), one of which is a searcher receiver (526) with the remainder being data receivers, as one skilled in the art will understand.

Analog receiver 514 also performs a open-loop type of power control function for adjusting the transmit power of the mobile station 140 on the reverse link channel. Receiver 514 measures the forward link signal strength of the signals from base stations 122, then generates an analog power control signal to circuitry in the transmit power amplifier 516, which can effect a range up to about 80 dB. The power control for the transmit power amplifier 516 is also supplemented by a closed-loop power control or mobile attenuation code (MAC) control parameter sent to the mobile station 140 via the air (i.e., wireless) interface from a BS 122, with either the CMAC or VMAC command (as one knowledgeable in CDMA standards will understand). The MAC can take on one of eight values 0 through 7, which effect a closed loop to raise or lower the power correction. The transmit amplifier 516 may utilize one of three transmit power classes when transmitting within a transmitted power control group in the 800–900 MHZ cellular band: class I (1 to 8 dBW), class II (−3 to 4 dBW), or class III (−7 to 0 dBW), for a closed-loop range of about "32 dB. In the PCS 1.8–1.9 GHz band five classes are defined: class I (−2 to 3 dBW), class II (−7 to 0 dBW), class III (−12 to −3 dBW), class IV (−17 to −6 dBW), class V (−22 to −9 dBW), for a closed-loop range of about "40 dB. The mobile station 140 power class and transmit power level for a communicating mobile station 140 is known to the wireless infrastructure network, and may be utilized for location estimation, as is described hereinbelow.

The digitized IF signal may contain the signals from several telephone calls together with the pilot channels and multipath delayed signals from each of several pilot channels. Searcher receiver 526, under control of control processor 534, continuously scans the time domain around the nominal time delay offsets of pilot channels contained within the active, candidate, neighboring and remaining sets of pilot channels. The initial sets of pilot channels and a defined search window size for each set are provided by a control message from a BS 122 via the air interface to the mobile station 140. The searcher receiver 526 measures the strength of any reception of a desired waveform at times other than the nominal time and measures each pilot channel's arrival time relative to each pilot's PN sequence offset value. Receiver 526 also compares signal strength in the received signals. Receiver 526 provides a signal strength signal to control processor 534 indicative of the strongest signals and relative time relationships.

Control processor 534 provides signals to control digital data receivers 520, 522 and 524 such that each of these receivers processes a different one of the strongest signals. Note, as one skilled in the art will understand, the strongest signal, or finger, may not be the signal of shortest arrival time, but rather may be a reflected, and therefore delayed, signal (such reflected denoted collectively as "multipath"). Data receivers 520, 522 and 524 may track and process multipath signals from the same forward channel pilot channel offset or from a different forward channel pilot offset. In the case where a different pilot channel offset signal is of greater strength than the current cell site (or more specifically the current base station 122) pilot channel offset, then control processor 534 generates a control message for transmission on a reverse channel from the mobile station 140 to the current BS 122, requesting a transfer of the call, or a soft hand-off, to the now strongest cell site Base station 122. Note that each of the four receivers 520, 522, 524 and 526 can be directed independently from each other. The three data receivers 520, 522, and 524 are capable of tracking and demodulating multipath signals from of the forward CDMA pilot channel. Thus data receivers 520, 522 and 524 may provide reception of information via separate multipath signals from one BS 122 (e.g., in particular, an antenna face of a sectored antenna at the BS 122, or reception of signals from a number of sectors at the same BS 122, or reception of signals from multiple BSs 122 or their antenna faces of sectored antennas. Upon receiving a CDMA pilot measurement request order command, or whenever: (a) the mobile station 140 detects a pilot signal of sufficient strength, not associated with any of the assigned forward traffic channels currently assigned, or (b) the mobile station 140 is in preparation for a soft or hard hand-off, then the searcher receiver 526 responds by measuring and reporting the strengths of received pilots and the receiver's definition of the pilot arrival time of the earliest useable multipath component of the pilot, in units of PN chips (one chip= 0.813802 microseconds). The receiver 526 computes the strength of a pilot by adding the ratios of received pilot energy per chip $E_c$, to total received spectral density, $I_o$, of at most k useable multipath components, where k is the number of data receivers supported in the mobile station 140.

The outputs of data receivers 520, 522, and 526 are provided to diversity combiner and decoder circuitry 538 (i.e., simply diversity combiner). The diversity combiner 538 performs the function of adjusting the timing of a plurality of streams of received signals into alignment and adds them together. In performing this function, the diversity combiner 538 may utilize a maximal ratio diversity combiner technique. The resulting combined signal stream is then decoded using a forward stream error detection contained within the diversity combiner. The decoded result is then passed on to the user digital baseband circuitry 542.

The user digital baseband circuitry 542 typically includes a digital vocoder which decodes the signals from diversity combiner 538, and then outputs the results to a digital to analog (D/A) converter (not shown). The output of the D/A serves as an interface with telephony circuitry for providing mobile station 140 user analog output information signals to the user corresponding to the information provided from diversity combiner 538.

User analog voice signals typically provided through an mobile station 140 are provided as an input to baseband circuitry 542. Baseband 542 serves as an interface with a handset or any other type of peripheral device, to the user for audio communication. Baseband circuitry 542 includes an analog to digital (A/D) converter which converts user information signals from analog form into a digital form. This digital form is then input to a vocoder (not shown) for encoding, which includes a forward error correction function. The resulting encoded signals are then output to transmit modulator 546.

Transmit modulator 546 modulates the encoded signal on a PN carrier signal whose PN sequence is based on the assigned address function for a wireless call. The PN sequence is determined by the control processor 534 from call setup information that was previously transmitted by a cell site BS 122 and decoded by the receivers 520, 522, 524 as one skilled in the art will understand. The output of transmit modulator 546 is provided to transmit power control circuitry 550. Note that signal transmission power is controlled partially by an open-loop analog power control signal provided from receiver 514. In addition, control bits are also transmitted by the controlling BS 122 in the form of a supplemental closed-loop power adjustment command and are processed by data receivers 520, 522,. In response to this command, control processor 534 generates a digital power control signal that is provided to the transmit power amplifier 516. Transmit power control 550 also provides the digitized and encoded user information signals in an IF format to output to the transmit power amplifier 516. The transmit power amplifier 516 converts the IF format signals into an RF frequency by mixing this signal with a frequency synthesizer (not shown) output signal for providing a corresponding signal at the proper output transmission frequency signal. Subsequently, transmit power amplifier 516 amplifies the signal to the final power output level. The transmission signal is then output from the transmit power amplifier 516 to the diplexer 512. The diplexer 512 then couples the transmission signal to antenna 510 for air interface transmission to the infrastructure base stations 122.

Additionally, note that control processor 534 is also responsive to various control and information request messages from the controlling BS 122, including for example, sync channel messages, the system parameters messages, in-traffic system parameters messages, paging/alert messages, registration messages, status requests, power control parameters messages and hand-off direction messages, as one skilled in the art will understand.

Referring still to a CDMA mobile station 140, in one embodiment of the present invention, the above-described standard CDMA mobile station architecture in an mobile station 140 is sufficient. However, in a second embodiment, this architecture may be modified in minor, cost effective ways so that additional information may be transmitted from an mobile station 140 to the BS 122. The modifications for this second embodiment will now be described. The following modifications, either together or in any combination, provide improvements in location accuracy from the perspective of capturing RF measurement data: (1) increasing measurement quantity, (2) improving measurement transmission, (3) extending the pilot set and search, (4) extending the pilot signal reporting capabilities, (5) decreasing the Quantization size of the units used to report the pilot PN phase arrival time, (6) improving the accuracy of the mobile and base station time reference, and (7) increasing the number of data receivers and related circuitry, for correlation tracking of a larger plurality of pilot channels and each of their multipath signals.

Using the standard system parameters overhead message in the paging channel as one method of reporting to the base station the signal strengths and delays of detectable pilot channels, a mobile station has various timers indicating the upper bounds of time needed to respond to a request, and to bid for access to the forward channel (if not already using it's assigned traffic channel). These timers restrict the frequency of measurement reporting and thus limit the aggregate amount of measurement data which can be sent in a given time period.

For example, CDMA standard timer $T_{33m}$ establishes the maximum time of a mobile station to enter the update overhead information substate of the system access state to respond to messages received while in the mobile station idle state, typically 0.3 seconds. Timer $T_{58m}$, the maximum time for the mobile station to respond to one service option request, is typically 0.2 seconds. Thus during a period of about five seconds, this measurement reporting method would provide for a maximum of about fifteen measurements.

However the same CDMA receiver design infrastructure, with slight circuitry modification can be used to support improved measurement transmission.

In order to collect a data ensemble of RF measurements that represents a statistically significant representation of data values in a geographical area of interest, it is the intention that the second (CDMA) mobile station 140 embodiment be capable of sending to the network base station infrastructure approximately 128 samples of each multipath peak signal strength and its relative delay, for each detectable pilot channel, in less than a preferred period of about five seconds. In order to transmit this amount of data, other means are needed to efficiently send the needed data to the network (i.e., from the mobile station to the base station, and then to forward data to the wireless switch, and then to forward data to the Location Center).

The CDMA air interface standard provides several means for transmitting data at higher rates. The Data Burst message can be used, or various blank-and-burst, dim-and-burst multiplex options can be used, and well as selecting various service options 2 through 9, through the setup of a normal voice or data telephone call. In one embodiment, , the user dials a speed number representing a data-type call to the Location Center 142, which initiates a command to the mobile station 140, responsive by the mobile station 140, which then provides the location center 142, via the base station 122, mobile switch center 112 with the needed measurement data.

Referring to FIG. 16, in one embodiment a software controllable data connection or path 49 is established between the control processor 46, and the user digital baseband 30 functional components in the mobile station, a much larger quantity of RF measurements, on the order of 128 data samples, can be transmitted as a data burst, multiplexed, or sent by other means such as a data circuit call, back to the network, and to the Location Center. Note that the existing connection between the control processor 534 and the transmit modulator 546 may also be used, as well via any other virtual path, such as software register-to-register move instructions, as long as sufficient signal measurement content and data samples can be sent to the wireless network and the location center 142 via the associated interfaces. Those skilled in the art will understand the wireless network consists of the base station, mobile switch center, and related infrastructure equipment, interfaces and facilities circuits to telemeter the measurement content and data samples to the location center 142. Additional design issues include, for example, the fact that existing memory in the mobile station must be allocated to the temporary storage of RF sample measurements, and new control means, such as selecting a future use control bit pattern in the CDMA air standard, are required to telemeter, preferably upon command, RF measurement sample data to the Location Center 142 in FIG. 1. In the case where a location request is received by the location engine 139 in the location center 142, the location engine 139 initiates a message to the mobile station 140 via a signal processing subsystem and the location center mobile switch center physical interface, the location applications programming interface 136 (e.g., FIG. 36 L-API-MSC) for the mobile switch center 112 and the wireless network infrastructure.

The addition of a controllable data connection or path 49 can be easily performed by CDMA application-specific integrated circuit (ASIC) manufacturers. In the case of one ASIC manufacturer known to the authors, the Qualcomm ASIC chip mobile station modem, model number MSM 2300, provides both the control processor function 534 and the user digital baseband 542 functions or the same chip, thus the external pinout physical configuration would not have to change to accommodate the wireless location software controllable data connection or path 49 modification.

If the mobile station 140 searcher receiver detects 4 pilots with 4 multipaths each, with each measurement consisting of a pilot index, finger identification, multipath signal strength, and multipath arrival time, then about 480 bytes are needed per measurement. Assuming the searcher receiver performs one measurement every 10 microseconds, about 1 second is needed to compile and buffer each sample of 128 measurements per sample, or about 48 kilobytes. Using a typical 9600 kbps CDMA data channel between the mobile station 140 and a BS 122, and assuming a 50 percent overhead, the mobile station can complete the collection and transmission of a location measurement sample in less than ten seconds, which is within a reasonable period for satisfying a location request.

Network Data Services

The implementation of the data services required to telemeter the necessary signal measurements may be performed in any of several embodiments. In one embodiment the location signal measurements request-response application message set utilizes the air interface services provided by the spare bits and digital control words not currently in the air interface standards IS-95 and ANSI-J-STD-008. Such bits and control words can be reserved for the purpose of requesting and providing the required location signal measurements discussed herein. Using this embodiment the base station and mobile switch center must be modified to support the interworking function required between the location center and the mobile station. In a second embodiment the location signal measurements request-response application message set is implemented using service options 4 and 12, which provides asynchronous data transmission capability, as defined in TR45 Data Standard, Async and Fax Section, document number TIA/EIA/IS-DATA4. Using this second embodiment, the mobile station control processor provides, or would interface with a function emulating mobile termination 0 or 2 services at the $R_m$ network reference point. The L-API 14 then provides, or would interface with a function emulating the physical interface connecting a data circuit-terminating equipment (DCE) to the PSTN at the W network reference point, in communication with the PSTN, which is also in communication with reference point Ai, which is in communication with reference point $U_m$, which is in turn in communication with reference point $R_m$. An advantage of this embodiment is that no ASIC or circuit board modifications are needed in the mobile station.

The ANSI standards J-008 and IS-95 provide several means for the base station 122 to establish and to extend the search window size that the mobile station 140 should use in its scanning process, and to identify further pilots. For location purposes, either existing standard parameters can be extended, or a location message request from the Base station can inform the searcher receiver of the mobile station to extend its search range, as necessary, to capture all relevant base station pilots and their multipath fingers, in order to complete the location measurement sample.

The search performance criteria defined in ANSI IS-98, Recommended Minimum Performance Standards for Dual Mode, can be increased as appropriate to accommodate a larger set of potentially detectable base stations, including Location Base stations and Mobile Base stations. Additionally the search window table size for various search window values must be increased to accommodate new pilot channel pn-offsets associated with Location Base Stations and Mobile Base stations.

Existing standard parameters include, for example using the In-traffic System Parameters Message, the values SRCH_WIN_A (for active and candidate set), SRCH_WIN_N (for neighboring set), and SRCH_SIN_R (for remaining set) can be used to cause the searcher receiver to increase its search area to detect and thus measure as many pilots as can be detected in the area. Extending the range of T_ADD and T_DROP parameters can also be used to facilitate the mobile to retain data on additional pilots in the area. The extended neighbor list message is used to inform the mobile station of the necessary characteristics of neighboring pilot signals. For example if location base stations are used on a different frequency assignment, and/or utilize unique, non-public pilot PN sequence offset indices, for example, in using increments other than 64 PN chips, then the extended neighbor list message can be used to instruct the mobile station to scan for those types of base stations, accordingly.

There can be several combinations of delay spread signal strength measurements made available to the location center, from the mobile station 140. In some cases the mobile station 140 may detect up to three to four pilot channels (representing 3–4 base stations), or as few as one signal from one pilot channel.

For each pilot channel detection case, multiple, up to three to four fingers, or multipath signals may be detected per pilot channel.

Note that multiple multipath signals, or multiple "fingers" could exist from a less-strong BS pilot signal, or in any of several combinations, which can depend widely upon the mobile station's location within the base station environment.

By modifying the CDMA Base station, mobile station and controller capabilities to provide the location center 142 with data that exceeds the 1:1 fingers to data receiver correspondence, additional information can be collected and processed in order to further improve the accuracy of the location estimate. A control message from the location center 142 and carried through the network, is sent to the control processor in the mobile station, requiring the searcher receiver in the mobile station to transmit to the location center 142 via the network, all detectable delay spread fingers related to each detectable pilot channel.

In one embodiment the control message is implemented in the CDMA receiver via a multiplexing technique, including appropriate manipulation of the hand-off parameters T_ADDs, T_DROPs, search window and the active, neighbor and remaining pilot sets held within the mobile station' memory.

Although the CDMA ANSI J-STD 008 requires reporting of the pilot channel arrival time in a time period of units of one chip size, or 813.802 nanoseconds, typical CDMA receivers contain an internal Quantization interval of one eighth chip size.

Within the mobile station, by modifying the time of arrival message response message to output the delay value in unit increments of one-eighth chip size, the precision of location accuracy can be increased from about 800 feet in radius to about 110 feet. At the base station the arrival time measurement is forwarded in one-eighth units to the Location Center. A multiplier function applied to the received measurement at the base station rescales the measurement for routine CDMA control and monitoring purposes, in order to be consistent with the CDMA standard. In order to distinguish among several mobile station models which report arrival time in either one-eighth chip units or one chip unit sizes, an encoding can be used in the mobile station's hardware or software identifications, telemetered to the base station and Location Center, in order to determine the arrival time measurement units. In one embodiment the analog receiver in the mobile station utilizes a clock signal which runs eight times faster than the clock originally disclosed in the Gilhousen U.S. Pat. No. 5,109,390. In this manner the digital signal provided to the data receivers and the searcher receiver will include an improved resolution in ability to detect delay spread signals, which are directly used to improve wireless location.

Although the CDMA air interface standard only requires a 1,000 nanosecond tolerance accuracy within respect to the base station, location accuracy can be improved if manufacturing calibration precision's are held to within tighter tolerances, such as less than 250 nanoseconds. However in any given location request, as long as the base station to base station tolerances are tuned properly to an amount less than 500 nanoseconds, then very good location estimates can be performed due to the self canceling time effect geometries typically present in multi pilot channel detection found in urban and suburban areas.

Increasing the typical number of data receivers in either the mobile station or base station provide added capabilities to lock and track more delay spread fingers and respective base station pilot channels. The resulting additional information, if available in a given radio coverage area 120 in FIG. 1, can be used for enhanced location estimate accuracy due to confluence or voting methods which can be deployed at the Location system 142.

Fuzzy Logic for Vertical Location

In certain cases wireless location signals are received representing distributed antennas (or other base stations) across building floor boundaries being received from a specific floor on a multi-storied building. As a specific example, consider signals are being received from both the 40th and the $41^{st}$ floor; the objective is to resolve the ambiguity of the situation. Fuzzy logic is used to resolve this ambiguity. The determination as to which floor the user of the mobile station is on is based on the strength of the signal, S, and the past reliability of the information associated with the two antennae, R. The spaces of S and R are discretized using fuzzy sets. The strength is defined as being: (1) VERY STRONG (VS), (2) STRONG (S), (3) WEAK (W), and (4) VERY WEAK (VW) as defined by membership functions. The reliability of information is defined as being: (1) VERY RELIABLE (VR), (2) RELIABLE (R), and (3) NOT RELIABLE (NR), again as defined by membership functions. A fuzzy relation or mapping is described which descretizes how confident it is that the signal is coming for a given floor, e.g., the 40th floor, using the following notation:

|     | VS   | S    | W    | VW  |
| --- | ---- | ---- | ---- | --- |
| VR  | 1.0  | 0.85 | 0.45 | 0.2 |
| R   | 0.85 | 0.6  | 0.4  | 0.1 |
| NR  | 0.6  | 0.4  | 0.3  | 0.0 |

The above relation matrix is read, for example, that when the signal information is RELIABLE and the strength is WEAK, then the confidence that the signal is coming from the 40th floor is 0.4. A similar fuzzy relation matrix is established for the distributed antenna on the 41st floor, and thus the result would be a confidence factor associated with the mobile station being located on either floor. A single solution, that is, whether the mobile station is on the 40th or 41st floor is determined using a compositional rule of inference. The compositional rule of inference is a function that prescribes a mechanism for consolidating membership function values into a single crisp function. This function can take a variety of forms including max-min composition, max-product composition, etc. The compositional rule of inference can be implemented, for example, by a summing junction which collects the results of each firing rule. The summing junction's output is then provided to a centroidal defuzzier which provides the discretized output.

FIG. 43 indicates the addition of a fuzzy logic module 41 which optionally discretizes the wireless location estimate output from the TOA/TDOA location estimator module 8. In the above case fuzzy logic rules related to the distributed antenna relation matrix would be fired or activated as a result of examining the message header data structure that indicates that the location estimate was the result of a distributed antenna case around the 40th and 41st floor of a particular building within which such fuzzy relations exist or in any other localized case wherein such fuzzy relations have been predetermined. Otherwise, in cases where no such fuzz rules apply, the location estimate is passed to the recipient without further discretization.

Note that the confidence associated with the location of the mobile station can be considered a function of several variables, not just the two (S and R) described above. For instance, it would not be unreasonable to segregate the reliability information by time signal delay as determined within this invention. The fuzzy relation is capable of handling a variety of such situations. Thus which floor the mobile station is on can be considered to be a function of numerous variables; the ultimate decision can be made based on a great deal of information.

Location Center—Network Elements API Description

A location application programming interface 14 (FIG. 1), or L-API, is required between the location system's 142 signal processor 20 and the mobile switch center 12 network element type, in order to send and receive various control, signals and data messages for wireless location purposes. The L-API 14 is implemented using a preferably high-capacity physical layer communications interface, such as IEEE standard 802.3 (10 baseT Ethernet), although other physical layer interfaces could be used, such as fiber optic ATM, frame relay, etc. Two forms of API implementation are possible. In the first case the control signals and data messages are realized using the mobile switch center 112 vendor's native operations messages inherent in the product offering, without any special modifications. In the second case the L-API 14 includes a full suite of commands and messaging content specifically optimized for wireless location purposes, which may require some, although minor development on the part of the mobile switch center vendor. A minimum set of L-API message types includes:

A first message type, an autonomous notification message from the mobile switch center 112 to the location system 142, is required in the event a wireless enhanced 9-1-1 call has been sent to the mobile switch center from a mobile station 140, including the mobile identification number (MIN), along with various CMRS identification and mobile station detected active, candidate, neighbor and remaining pilot set information, pilot strength measurements message.

A second message type, forward path request-response message, from location system 142 to mobile switch center 112, is required to request a mobile station (MS) for signal measurements and hand-off information, with a response message back from the mobile switch center 112 to the location system 142, along with various CMRS identification.

A third message type, Reverse path request-response message, from location system 142 to mobile switch center 112, to a BS for signal measurements received at the BS and hand-off information, for a given mobile station MIN, along with various CMRS identification. It is preferable for the received signal strength measurements performed at the mobile station along the forward path, and at the base station along the reverse path, to be reported in a variable-length data structure as follows: for each pilot channel offset, include the phase of the earliest arriving usable multipath component pilot PN sequence relative to the zero offset pilot PN sequence of this pilot, termed pilot PN phase or pilot arrival, in units of one-eighth PN chip, instead of units of one PN chip as stated in the standards. Furthermore, in accordance with the standards, the pilot strength shall be included, measured based on at most k usable components, where k is the number of demodulating elements supported by the receiver system. In addition the total number of each detectable multipath components shall be reported. In addition each multipath component, for a given pilot, shall be identified by both its delay component and signal strength, for inclusion in the signal measurements to the location system 142. Regarding each individual multipath component, signal strength is expressed as is commonly known, by adding the ratios of received pilot-multipath component energy per chip, $E_c$, to total received spectral density (noise and signals), $i_o$ of at most that one multipath component (i.e., k is equal to one).

A fourth message type, an autonomous notification message from the mobile switch center 112 to the location system 142 is required, in the event of a mobile station hand-off state change, along with various CMRS identification.

In order to implement additional location functions such as wide area location, wherein location is determined across roaming boundaries, out-of-coverage area conditions or mobile station 140 turned off, and home base station applications, the L-API 14 must include access to and receive data from a data store contained in the home location register (HLR) network element type associated with the mobile switch center 112.

A fifth message type is required which provides the location system 142 with the mobile station MIN, hand-off, along with various CMRS identification information (e.g., old and new state changes, old and new BS identifications, and hand-offs to another CMRS), roaming location and status changes. A typical communications protocol such as Signaling System number 7, running on a V.35 communications channel could be used for implementation, but numerous other protocols (e.g., TCIP/IP, ROSE, CMISE, etc.) could be used to implement this capability. If the home location register is local to the mobile switch center 112 then the LC—mobile switch center communications link could be used, otherwise a separate communications link is used between the location system 142 and the home location register.

A sixth message type, an autonomous notification message type issued from the location system 142 to the home location register, is required for those location applications that rely on an alert from the home location register when ever a particular mobile station state change occurs, along with various CMRS identification. Consider the case wherein an mobile station 140 whose location is to be tracked constantly. In such cases a history of locations is maintained in the location system 142. Should the mobile station 140 user turn off the power, or exit from the coverage area, then by using previous location values a vector and approximate velocity can be determined. This sixth message type provides a notification message from the home location register to the location system 142 whenever a previously identified mobile station MIN has a state change. Examples of state changes include cases where the base station 122 discovers the mobile station 140 has traveled to another base station, or that the current primary base station 122 can no longer communicate with the mobile station 140 (i.e., no power), or that a new registration has occurred. In general this message type should support the notification from the home location register to the location system 142 of all messaging and data associated with the nine types of registration, in the case of CDMA. Specifically these include power-up, power-down, timer-based, distance-based, zone-based, parameter-change, ordered, implicit and traffic channel registration. The location system 142 should also be informed of the registration enablement status of each type of registration, which can be provided to the location system 142 via a redirection of the systems parameters message. It should also be possible (in a seventh message type) for the location system 142 to initiate an ordered registration through an order message, from the location system 142 to the mobile switch center 112. The mobile switch center 112 then shall route the message to the appropriate base station, and then to the mobile station. The location system 142 should also be able to receive the results of the message.

In order to implement additional location functions such as providing users with location information and routing instructions to certain locations via the wireless short message text paging service, an L-API 14 is required between the location system 142 and the network element type used to implement the short message service. Such network elements may be termed an intelligent peripheral or a service node. A number of existing paging interfaces have been proposed in standards bodies, and one or more modifications can be made to accommodate L-API 14 content. In any case, the following L-API addition is required: an eighth message type which allows the location system 142 to send a text message containing location information or instructions to a particular mobile station MIN, and a related message to verify response. Optionally in another, ninth message type, an autonomous message may be provided to alert the location system 142 under conditions wherein a state change occurs on a previously pending text message. This last message type provides improved quality feedback to the initiating party regarding the acceptance situation of the attempted-to-send page.

Utilizing Multiple CMRS Infrastructure in a Shared Coverage Area

As a consequence in practical deployment situations that base stations are not placed in a uniform manner in a geographical area, and the fact that variable and fixed clutter introduce a variety of signal measurements which can result in the provision of an ambiguous location estimation, a novel aspect of this patent includes the utilization of the inherent ability of the wireless protocol and receiver design to request and receive signal measurements along the forward and reverse air interface communications path with a given mobile station and other commercial mobile radio service providers, in cases where multiple service providers share a common coverage area. Thus in a coverage area shared by two service providers A and B, utilization of received signal measurements from both service provider A and service provider B can be used by the location center as unique, orthogonal information to both resolve ambiguous location estimates and to further improve the location estimate accuracy.

The CDMA air interface, for example, provides a soft hand-off capability for the mobile station to hand-off a voice communication channel to another base station, and even to another CMRS provider, termed a hard hand-off.

Referring to FIG. 3, assume three sectored base stations 122*a*, 122*b*, and 122*c*, in communication with mobile switch center-A 112*a*, are owned and operated by CMRS provider A. Further, assume three sectored base stations 122*d* and 122*e*, in communication with mobile switch center-B 112*b*, are owned and operated by CMRS provider B, and that the coverage area with CMRS-A and CMRS-B substantially overlap. In order to locate a mobile station 140 whose subscriber normally does business with CMRS provider A, assume that the receiver of mobile station 140 can detect signals from base stations 122*a*, 122*b*, and 122*c*, as well as from base stations 122*d* and 122*e*, although normal mode use would preclude such measurements from being initiated. Assume further that the resulting location estimate 131 (FIG. 5), generated from the location center 142 contains either an ambiguous location estimate value pair, or otherwise cannot render a location estimate with the desired range of accuracy.

From an inspection of the overall base station geometry of base stations owned by CMRS A and CMRS B it is evident that a strong possibility exists that either 1.) the receivers in mobile station 140 have the possibility to detect the pilot channels associated with base stations 122*d* and 122*e*; 2.) the receivers in base stations 122*d* and 122*e* have the possibility to detect the transmitter signal from mobile station 140. The location system 142 contains a data store of both CMRS provider's base station geometries and is in communication with each mobile switch center-A 112*a* and mobile switch center-B 112*b*. An application in the location system 142 sends a control message to the mobile station 140, instructing the mobile station to tune its searcher receiver to listen for and report back signal measurement data regarding the pilot channel information associated with base stations 122*d* and 122*e*, in addition to a request to report of pilot signals relative to base stations 122*a*, 122*b*, and 122*c*. Similarly the application in the location system 142 sends messages to each of base stations 122*d* and 122*e*, with instructions to take signal measurements and report back the resulting information regarding the mobile stations transmitter 140. Since the signaling information from base stations 122*d* and 122*e* are based on a substantially different location geometry, the resultant information is orthogonal and thus can be used by the location center to provide enhanced location estimates.

If appropriate, a variation of the above process includes a location center initiated forced hard hand-off of the mobile station from a primary base station, e.g., 122*b* associated with CMRS-A, to a new primary base station associated with CMRS-B, e.g., 122*d*. A forced hand-off will further provide improvements in reducing systemic timing errors which may be inherent among base stations owned by different CMRS. After the appropriate signal measurements have been reported the location system 142 can revert the hand-off back to the original CMRS. Other location system components shown in FIG. 3 includes L-API 14 which includes the location applications programming interface 136 (L-API-MSC) as a communications interface with multiple CMRS mobile switching centers, via physical interfaces 176*a* and 176*b*.

In order to provide the most economically efficient and accurate wireless location service capabilities among multiple CMRS providers in a shared coverage area, a common location applications programming interface (L-API 14) is highly desirable. A common interface also supports the natural competitive behaviors among wireless consumers and CMRS by providing flexible relationships among consumers who may want to switch service providers, yet retain consistent wireless location services for public safety. This approach minimizes the L-API design and deployment costs among infrastructure vendors and location service providers in a shared coverage area. Based on a L-API between a wireless location center and the mobile switch centers of multiple CMRS, a novel aspect of this invention further includes a method and process that provides account management clearing house and revenue settlement capability with appropriate security management controls. This capability is implemented as wireless location control, accounting and security mediation agent functions to compensate CMRS providers for providing various location-specific network services as described herein.

As wireless location requests are sent to the location center for a given CMRS, operated by a wireless location service provider (WLSP), the location center: 1.) accesses the appropriateness of soliciting additional signal and control measurements from another CMRS' base station in the same coverage area, in order to improve the quality of the location estimate, 2.) accesses, requests and receives signal and control information with another CMRS base station infrastructure, 3.) provides as appropriate a record of compensation entitlement between or among multiple CRMS and WLSPs, and 4.) provides security management controls that protect the privacy needs of wireless customers and the unauthorized sharing of information between or among CMRS. Security controls also include audit trails and controls regarding customer access of their location subscriber profile and the administration of network security processes and related base station parameters and inventory.

Referring to FIG. 5, Location Center-base station access, multiple CMRS, an alternative embodiment is provided to extract the wireless location signal measurement data from each base station associated with each of multiple CMRS. Given base station 122i and 122j are operated by CMRS-A and base station 122k and 122m are operated by CMRS-B, a communication circuit provides connectivity with the location application programming interface—base station (L-API-BS) (not shown). The L-API-BS is in communication with the L-API 14 in the location center 142. The communications circuit can be any of several conventional transport facilities, such as a private line circuit, a DS-1 or T-1 carrier circuit, frame relay circuit, microwave circuit, or other data communications circuit.

The advantage of this embodiment is that no modifications are required by the infrastructure vendor in terms of the embedded operations circuit, and related functions and systems which otherwise would be needed to telemeter wireless location signal measurement data from the base station to the location center 142. The termination equipment (not shown) in communication with the transport facilities, within each base station typically includes a small computer with an in-circuit connection, such as an ASIC clip-on device, with connections to the control processor circuitry with the base station in the receiver section. The small computer provides a conversion of the signals provided on the in-circuit connection to the ASIC chip, for serialization and transmission to the location center via the transport facilities.

Home Base Station Description

The Home Base station (HBS) concept in the PCS wireless network environment allows a user's mobile station to be also used as a low cost cordless phone, whenever the mobile station is physically near (generally within 700–1,000 feet) of a Home Base station Device (HBSD). This enables the user to avoid the typically higher cost air time charges associated with traditional wireless service.

The HBSD is similar to ordinary cordless phone transceiver devices in current use today, but is modified to function with a PCS wireless mobile station. Although the HBSD has been typically used at a residential consumer's home, the HBSD could also be used in business settings and other environments.

When a mobile station (MS) is near the HBSD as shown in FIG. 17, and the HBSD detects the presence of a mobile station over the cordless phone air interface, the HBSD signals the Home Location Register (HLR) software in the Service Control Point in the AIN network associated with the mobile station and mobile station's home mobile switch center. The home location register redirects mobile station terminating calls from the network away form the mobile station's mobile identification number in the mobile switch center, and to the AIN/SSP wireline class V switch which connects the wireline number associated with the HBSD. Similarly, the HBSD, upon detecting a mobile station call origination attempt, redirects the mobile station signal from a PCS network fixed base station, to the control of the HBSD. The HBSD redirects the mobile station originating call through the wireline network, similar to any other wireline network call.

A reverse scenario occurs whenever the mobile station and HBSD lose communication: the mobile station registers in a wireless PCS network fixed base station, causing redirection of calls to the wireless network. The cordless phone air interface may be of a vendor proprietary design, or it may be a similar design as the CDMA air interface.

In order to perform a location estimate in the HBS concept, a connection is used between the Location Center (LC) and the home location register/HBS application in the SCP. In addition, a new process, termed a Location Notification Process (LNP) within the home location register/SCP is used to send a message to the LC, autonomously whenever a state change occurs in the mobile station' (either via a specific list of mobile identification numbers or all mobile identification numbers) registration: registering either to a fixed Base station in the Wireless PCS network or to a HBSD.

Alternatively the process may respond to an on-demand message from the LC to the LNP within the home location register/HBS application. In either case a response message from the LNP to the LC provides the information regarding whether or not a mobile station is within range of its, or a designated HBSD. In either case the response message contains a message header information which provides the signal processing subsystem 20 (equivalently this may be known by signal filtering subsystem) with the ability to determine and distribute the information to the HBS First Order Location Estimate Model.

Location Using Distributed Antennas Description

CDMA distributed antennas are useful particularly in system configurations involving microcells, and potentially indoor environments, such as CDMA PBX (private branch exchange) systems in business offices, and in wireless local loop applications. From a mobile station location perspective, the distributed antenna configuration can provide significant improvements in location error, as compared with an indoor mobile station user with a wireless connection to an outdoor, macrocell Base station. Wireless location can be achieved provided certain methods and procedures (M&Ps) are followed during the installation process. Data related to these M&Ps is then used by various location processes discussed elsewhere in this invention.

First, a general description of CDMA distributed antennas is presented, followed by the M&Ps necessary to support wireless location.

In the CDMA distributed antenna concept, a set of simple antennas placed apart in a given area, similarly to any other cell placement arrangement for coverage objectives, are fed by a common radio signal. Antennas are usually placed such that their coverage patterns are substantially or completely overlapped in area of coverage. From a wireless location perspective, completely overlapping coverage is preferred (this approach also improves perceived signal quality by the end users).

The importance of understanding and characterizing the aggregate system delay elements is shown in FIG. 6: Distributed Antenna Delay Characterization. For any given Pilot Channel offset "I", additional delay is introduced by the microwave propagation channel (Point A) and any internal repeater/amplifier equipment (Point B). Each of four delay elements $t_1$ through $t_4$ introduce further delay. A mobile station detecting all four DA antennas' delayed signals would determine various sets of cumulative system propagation delays. Since each delay is essentially fixed in a location, such information can be used to determine the mobile station location within the building. FIG. 7 illustrates the effective system timing among the delay elements 324, relative to the GPA system time 336, along each point in the diagram shown in FIG. 6.

FIG. 9: One Exemplary DA Configuration, illustrates a typical configuration where the CDMA base station antenna is also directed connected to three delay elements and antenna radiators.

The CDMA Base station transmitter common output signal is fed through a distribution coaxial cable system, optical fibers or other means, to a string of two or more antennas. Each antenna is connected to the distribution cable via a transmission line tap or delay element, which may or may not provide further broadband gain. The transmission system normally consists of two media channels, one for transmit and one for receive signals. FIG. 10 illustrates an Alternative DA Configuration, using multi-point microwave antennas connected to individual delay elements and their respective radiating antennas.

FIG. 11: Serving Dense Multi-level buildings via Virtual Pilots, illustrates a typical application where a multi-level building is served by two base stations with pilot offsets "I" and "j". Pilot offset "I" serves floor X and pilot offset "j" serves floor Y. As shown, a microwave link, either active or passive, relays the base station signals between the distributed antennas within the building to the base stations.

The main concept is to introduce purposeful delay and multipath signals with sufficient delay spread for signal discrimination. Each antenna radiates a signal which is substantially delayed with respect to any other antenna in the area. If two or more paths are available for the mobile station receivers with greater than one eighth microsecond differential path delay (or whatever resolution is available in the CDMA mobile station receivers), then two or more PN receivers in the same mobile station can be employed to separately receive and combine these signals and thus achieve processing gains through path diversity. Antennas may be omnidirectional or directional.

Delay elements may be simple delay lines such as lengths of coaxial cabling, or other active or passive delay elements, such that the combination of components provides the needed delay. The transmission line between the CDMA Base station/PBX and the distributed antennas may be via a pair of dedicated, beam-focused high gain antennas, and/or a repeater system. Provided sufficient delay exists between the multipath signals from separate distributed antennas exists, each Data Receiver within the mobile station tracks the timing of the received signal it is receiving. This is accomplished by the technique of correlating the received signal by a slightly earlier reference PN and correlating the received signal with a slightly late local reference PN. Further distributed antenna details can be seen from Gilhousen, et al, U.S. Pat. No. 5,280,472, assigned to Qualcomm, Inc.

The total measured delay of both forward and reverse link signals between the BS and the mobile station are thus determined naturally by the CDMA radio receiver designs as a part of the multipath tracking process, and can be made available to a location entity for performing location estimates of the mobile station.

However, the measurements of delay between a particular distributed antenna and the mobile station will include the aggregate delay components of several mechanisms, beyond the BS pilot PN offset delay. In the case of distributed antenna configurations, the simple TOA or TDOA model which is based solely of the speed of light, must now be adjusted to account for the purposefully introduced delay.

The mobile station measures the arrival time $T_i$, for each pilot I reported to the BS. The pilot arrival time is the time of occurrence, as measured at the mobile station antenna connection, of the earliest arriving usable multipath of the pilot. The arrival time is measured relative to the mobile station' time reference in units of PN chips. The mobile station computes the reported pilot PN phase $f_i$ as:

$$f_i = (T_i + 64 \times \text{PILOT\_PN}) \bmod 2^{15},$$

where PILOT_PN is the PN sequence offset of the pilot.

Reference FIG. 6, which illustrates a typical distributed antenna configuration consisting of a repeater/amplifier and four distributed antennas. The total system delay, $T_i$ is:

$$T_i = T_{offset} + T_0 + T_R + T_1 + T_2 + T_3 + T_4$$

During the installation phase of the high gain antenna (if required), repeater (if required) and the distributed antennas, if the system delay is measured at each distributed antenna and the values stored in a location database, including each antenna identification, and exact physical location (in three dimensions), then during a location request, all fixed delays will be known, thus the TP value can be determined by subtracting the fixed, known delay values from Ti, the measured time of arrival. The TP value can now be used to determine a TOA and or a TDOA value in a manner similar to the non-distributed antenna case, thus location can be determined based on these TOA/TDOA ranging values.

The required installation methods and procedures required to support wireless location are illustrated in FIG. 8: Methods and Procedures for DA Installation. By following these methods, the Location Center (LC) will contain a database populated with the necessary data values to perform accurate location estimates within the building containing the distributed antennas. Table B illustrates typically data element types and values required in the DA location estimate model database. Table DA-11 below illustrates how a simple TOA location estimate model can be used to determine wireless location in a DA environment. Based on the known geometry and coverage areas of each DA cell, and the percentage of maximum radius, determined by the above classification, it is possible to construct radius-radius circles of the DA cells. The intersection of the three circles (in this case) provides the location estimate.

TABLE DA-11

DA Cell Classification and Radius Percentage

| DA Cell ID | Low Range | High Range | Actual | % Max Radius |
|---|---|---|---|---|
| 1 | 0 | 1.96 | 1.68 | 88 |
| 2 | 2.46 | 4.42 | 3.98 | 78 |
| 4 | 7.38 | 9.34 | 9.16 | 91 |
| ← Static (from db) → | | | ← Dynamic Classification → | |

In order for the TOA and TDOA location calculations to be determined, it is a necessary condition that during distributed antenna installation, the minimum values of the Delay Elements be set to each exceed the maximum practical (i.e., within the coverage area) TP values be at least ½ of a PN chip duration (about 500 nanoseconds), to easily allow for the CDMA Data Receivers to be able to correlate between the delay element values and the TP delay values. FIG. 12: DA Delay Spread Ranges, illustrates typical maximum ranging variable delay values (e.g., up to 1,960 feet) if 500 nanosecond guard zones (t) are used. If larger ranging values are required, then guard zone delays must be increased proportionally.

FIG. 13: DA Cell Layout and Geometry, illustrates, for DA omnicell sizes with a radius of about 2,000 feet and guard zones of 500 nanoseconds, that the minimum required cumulative delay values for the delay elements are: $t_2$=2.46 microseconds (uS), $t_3$=4.92 uS, and $t_4$=7.38 uS, respectively.

It should also be noted that a maximum upper bound exists for the maximum amount of cumulative system propagation delay which can be tolerated by the CDMA mobile station. The total delay cannot exceed an amount that would interfere with the next pilot PN offset, or substantially delay the scanning time of the search receiver in the mobile station. In any case, 30 to 40 microseconds of total delay is acceptable, and would allow for a relatively large number of distributed antenna components to be included, thus no unusual impacts are required of the system to accommodate location methods.

By purposefully introducing a relatively large amount of delay in the distributed antenna delay elements, relative to the maximum permissible TP delay values, it is possible to utilize the large Delay Element values to uniquely identify the distributed antenna ID, and thus via the distributed antenna database, to determine the antennas' exact location. Knowing the antenna's location and TP value (last stage of propagation delay), TOA and TDOA ranging can be achieved, and thus mobile station location within a distributed antenna configuration, can be determined.

FIG. 14: Actual Measurements and Classification, illustrates how CDMA delay spread measurements are used in a DA configuration to form a relationship with the mobile station location with respect to the DA locations. Although the CDMA air interface standard only requires the signal strength and time of arrival of the first useable delay spread signal to be reported from the mobile station to the BS, assume here that the mobile station has the capability to provide the BS, and consequently the LC, with a list of all peak values of CDMA fingers.

Assume that the mobile station detects and telemeters three CDMA finger RF measurements, as shown in the table A below, New Message Type Data Structure Content.

TABLE A

New Message Type Data Structure Content

| Signal Strength | Delay Time of Arrival |
|---|---|
| −77 dBm | 1.68 microseconds |
| −66 | 3.98 |
| −95 | 9.16 |

Note that the measurements may be averaged over a sample space of 128 individual measurements. Referring now back to FIG. 14, it can be seen that the first finger is associated with the DA cell-1, range 0 to 1.96 microseconds, and DA cell-2, range 2.46 microseconds to 4.42 microseconds (uS), and DA cell-4, range 7.38 to 9.34 microseconds. Since the DA cell antennas are fixed, with known locations, correlation's can be derived and established to relate actual measurements with locations. Any one of several location estimating models may be used, using the radius-radius method, or multiple invocations of different modules may alternatively be used to form a location estimate of the mobile station within the DA environment.

It is now possible to classify the above actual measurements as propagation delayed signals for the DA cells 1, 2, and 4, since each DA cell delay range is known, and sufficient guard zones exist between delay spread ranges to unambiguously classify the measurements, and thus to determine mobile station location. The following table illustrates a typical database containing the classification columns for each DA cell and their corresponding location in an x,y plane.

TABLE B

New Message Type Data Structure Content for Exemplary DA Location Database Records

| DA Cell ID | Location (X, Y) (in feet) | DA Cell Radius | Low Range (microseconds) | High Range (In microseconds) |
|---|---|---|---|---|
| 1 | (0, 0) | 1.96 | 0 | 1.96 |
| 2 | (−20, 3000) | 1.96 | 2.46 | 4.42 |
| 3 | (4000, 2800) | 1.96 | 4.92 | 6.88 |
| 4 | (1600, 2800) | 1.96 | 7.38 | 9.34 |

Translating the actual delay measurements into a percentage of the maximum radius of each cell (i.e., cell 1 radius actual is 88%, cell 2 radius actual is 78%, and cell radius 4 actual is 91%) provides wireless location using familiar radius-radius calculations.

Depending upon the combinations of embodiments, the Location Center and Gateway may contain from one to three interfaces into the digital PCS network, shown as interfaces X, Y, and Z, in FIG. 24, Location and CTIA/TR45 Network Reference Model. Network interface reference points Um, A, Ai, B, C, D and H are part of the Cellular Telecommunications Industry of America (CTIA)/Technical Reference 45 standards, and are not discussed further.

Network interface reference point X provides a direct connection to the mobile switch center, used for transferring RF measurement signals from the mobile station and BS to the LC and for transferring location control between the LS and mobile station, and between the LC and BS. This interface can be implemented via any number of data communications circuit configurations and protocols in current use, such as a T-carrier data circuit, with DSU/CSUs at each end, using an intranet/intranet protocol suite, such as TCP/IP, RPC messaging, or other middleware solutions, such as Pipes, IBM MQ series, world wide web protocols, such as JAVA/VRML scripts, hypertext markup language (HTML) links, and may also include various firewall schemes and data encryption mechanisms, etc., in order to communicate asynchronous messaging among the endpoints, and in particular, in reference to the final distribution of the location information to the desired end user.

Network interface reference point Y is used in the embodiment wherein a public switched telephone network interface is required or desired. This interface is a straight-forward method to support location applications wherein, for example, a mobile station user dials a telephone number in order to initiate a location request, and could also be used to telemeter RF measurement and location control messages between the LC and the mobile station/BS. Alternatively a timer-initiated process internal to the LC may be used to start a location request, or via any number of events external to the network. Point Y also has the advantage of not requiring a direct connection to a commercial radio mobile service providers' network elements, thus affording a convenient interface for use by third party location service providers unrelated to the commercial radio mobile service provider.

National Scale Wireless Location

By utilizing specific data items used in the Home Location Register in the Advanced Intelligent Network, it is possible to determine the mobile station location on a national scale, i.e., location within the context of a state, and in which city.

Referring now to FIGS. 24 and 25, network interface reference point Z is used in the embodiment wherein a gross location must be determined. A gross location is defined as an area associated with a particular mobile switch center coverage area. Mobile switch center coverage areas are typically bounded by a large metropolitan area, such as a city. The Home Location Register (HLR) contains gross location information. The Z interface allows the LC 142 to query the home location register to determine if the user is in their "home area, or whether the user is roaming to another mobile switch center coverage area, such as another city. IS-41 Cellular Radio Telecommunications intersystem operations communications protocols provide mechanisms that allow a user to roam into authorized areas outside of their "home" area.

If the user is roaming in another area, then the LC 142 can use that information to initiate location control messages toward the CDMA network currently hosting the mobile station user. FIG. 25 illustrates how a user based in Los Angeles, Calif., for example, may roam to a CDMA system in New York City, and be "located" within that metropolitan area, through a data communications network and a national Location Center Clearinghouse system.

Signal Processor Subsystem

The signal processing subsystem receives control messages and signal measurements and transmits appropriate control messages to the wireless network via the location applications programming interface referenced earlier, for wireless location purposes. The signal processing subsystem additionally provides various signal identification, conditioning and pre-processing functions, including buffering, signal type classification, signal filtering, message control and routing functions to the location estimate modules.

There can be several combinations of Delay Spread/Signal Strength sets of measurements made available to the signal processing subsystem 20 within the Location Center/ System 142, shown in FIG. 3. In some cases the mobile station 140 may be able to detect up to three or four Pilot Channels representing three to four Base Stations, or as few as one Pilot Channel, depending upon the environment. Similarly, possibly more than one BS 122 can detect a mobile station 140 transmitter signal, as evidenced by the provision of cell diversity or soft hand-off in the CDMA standards, and the fact that multiple CBS' base station equipment commonly will overlap coverage areas. For each mobile station 140 or BS 122 transmitted signal detected by a receiver group at a station, multiple delayed signals, or "fingers" may be detected and tracked resulting from multipath radio propagation conditions, from a given transmitter.

In typical spread spectrum diversity CDMA receiver design, the "first" finger represents the most direct, or least delayed multipath signal. Second or possibly third or fourth fingers may also be detected and tracked, assuming the mobile station contains a sufficient number of data receivers. Although traditional TOA and TDOA methods would discard subsequent fingers related to the same transmitted finger, collection and use of these additional values can prove useful to reduce location ambiguity, and are thus collected by the Signal Processing subsystem in the Location Center 142.

For each pilot channel detection case, multiple fingers (up to three or four) may be detected and thus reported to the Location system 142, as shown in FIGS. 22 and 23, for dense urban and rural settings, respectively. From the mobile receiver's perspective, a number of combinations of measurements could be made available to the Location Center. Table SP-1 illustrates the available combinations for three and four receiver cases, respectively.

TABLE SP-1

Nominal CDMA Location Measurement Combinations

| No. of Receivers | No. of BSs detected | No. of Fingers Detected | No. of Fingers, BS 1-S (first strongest) | No. of Fingers, BS 2-S (second strongest) | No. of Fingers, BS 3-S (third strongest) | No. of Fingers, BS 4-S (fourth Strongest) |
|---|---|---|---|---|---|---|
| 3 | 1 | 1 | 1 | 0 | 0 | 0 |
| 3 | 1 | 2 | 2 | 0 | 0 | 0 |
| 3 | 1 | 3 | 3 | 0 | 0 | 0 |
| 3 | 2 | 2 | 1 | 1 | 0 | 0 |
| 3 | 2 | 3 | 2 | 1 | 0 | 0 |
| 3 | 2 | 3 | 1 | 2 | 0 | 0 |
| 3 | 3 | 3 | 1 | 1 | 1 | 0 |
| 4 | 4 | 4 | 1 | 1 | 1 | 1 |
| 4 | 3 | 4 | 1 | 2 | 1 | 0 |
| 4 | 3 | 4 | 1 | 2 | 1 | 0 |
| 4 | 3 | 4 | 2 | 1 | 1 | 0 |
| 4 | 2 | 4 | 3 | 1 | 0 | 0 |
| 4 | 2 | 4 | 2 | 2 | 0 | 0 |
| 4 | 2 | 4 | 1 | 3 | 0 | 0 |
| 4 | 1 | 4 | 4 | 0 | 0 | 0 |

The above Table SP-1 scenario assumes that the mobile station design and data collection structure only permits a 1:1 correspondence to exist between the number of base stations detected and the number of data receivers reporting multipath CDMA fingers.

Table SP-1 illustrates the potential combinations of detected CDMA signals representing multipath fingers and total number of detectable base station pilot signals in a given location within the radio coverage area 120. Due to the disperse and near-random nature of CDMA radio signals and propagation characteristics, traditional TOA/TDOA location methods have failed in the past, because the number of signals received in different locations area different. In a particularly small urban area, say less than 500 square feet, the number of RF signals and there multipath components may vary by over 100 percent.

FIGS. 18 and 19 illustrate a certain case from a location measurement perspective, of signals received for a three-data receiver and a four-data receiver configuration, in a nominal three sector honeycomb base station configuration. In FIG. 18, a mobile station at location "A" detects base stations 1b, 5c, and 4a. However although a triad of signals are received, if varying multipath signals are received from one or more base stations, then ambiguity can still result. FIG. 19 illustrates a mobile station located at position "A", detecting base stations 1b, 5c, 4a, and 2c. Although additional information is made available in this second case, traditional hyperbolic combinations taken three at a time, yield multiple location estimates. In certain cases the limit of the back-side of a "far-away" sectored antenna can be used to determine the limit of RF coverage in another base station sector area. FIG. 20 shows that normally a delay spread in sector 1b would imply a range of a 120 degree solid angle. However by using the known fact that base station sector 2a contains a coverage limit, such negative logic can be used to further restrict the apparent coverage area in sector 1b, from 120 degrees to approximately 90 degrees as shown in the illustration, in order to locate the mobile station B. Such information regarding sector 2a can be determined by collecting the remaining set information from mobile station B.

Now consider more practical, less ideal cases. Due to the large capital outlay costs associated with providing three or more overlapping base station coverage signals in every possible location, most practical digital PCS deployments result in fewer than three base station pilot channels being reportable in the majority of location areas, thus resulting in a larger, more amorphous location estimate. FIGS. 20 and 21 illustrate a typical relative error space wherein a mobile station detects only two base station pilot channels, and only one pilot channel, respectively. This consequence requires a family of location estimate location modules or models, each firing whenever suitable data has been presented to a model, thus providing a location estimate to a backend subsystem which resolves ambiguities.

In one embodiment of this invention using backend hypothesis resolution, by utilizing existing knowledge concerning base station coverage area boundaries (such as via the compilacation a RF coverage database—either via RF coverage area simulations or field tests), the location error space is decreased. Negative logic Venn diagrams can be generated which deductively rule out certain location estimate hypotheses.

Base Station Cell site planning tools which utilize antenna gain radiation patterns, environmental clutter, such as buildings, dense forests, terrain heights, etc., can provide reasonable raining data to bootstrap the initial operation of the LC.

An example of the types of data typically collected during field tests/runs is shown in the following database table SP-2 below:

TABLE SP-2

Typical CDMA Field Test Measurements

| Column Position | Mobile Data Test Set: Data Type Logged |
|---|---|
| 1 | CDMA Time (absolute, from GPS) |
| 2 | Vehicle Speed (in mph) |
| 3 | Vehicle Latitude (in deg. North) |
| 4 | Vehicle Longitude (in deg. East) |
| 5 | GPS Source (binary, e.g., GPS or Dead Reckoning) |
| 6 | GPS Data available indicator (binary states) |
| 7 | First BS-Mobile Received Power (in dBm, 1 second averages) |
| 8 | Mobile transmit Gain Adjust (in dBm, 1 second average) |
| 9 | First BS Mobile Rx Pilot $E_o/I_o$ (dB, 1 second average) |
| 10 | First BS Mobile received Frame Counts (integers per measurement period) |
| 11 | Mobile Finger's Average Time Separation (in nano/microseconds) |
| 12 | Mobile Fingers' Maximum Time Separation (in nano/microseconds) |
| 13 | Mobile Fingers' Number of Pilots locked (per 1 second average) |
| 14 | Mobile finger Lock Counts |
| 15 | First BS Received Frame Counts |
| 16 | First BS Eb/No set Point (in dB, 1 second average) |
| 17 | First BS cell Rx Eb/No per antenna (in dB, 1 second average) |
| 18 | Hand-off State (relative to the First, or connected-to BS) |
| 19 | First BS Traffic Channel Gain |
| 20 | First BS Power Control Subchannel Gain |
| 21 | First BS Reverse Link full Frame Error Rate, over 500 frames |
| 22 | Forward Link full Frame Error Rate, over 500 frames |
| 23 | First BS Pilot Channel Delay Spread (in nanoseconds) |
| 24 | Second BS-Ranked Pilot Delay Spread (in nanoseconds) |
| 25 | Second BS-Ranked Pilot Relative Signal Strength (in dB) |
| 26 | Third BS-Ranked Pilot Delay Spread |
| 27 | Third BS-Ranked Pilot Relative Signal Strength (in dB) |
| 28 | Mobile Antenna Identification (in the case of a multi-sectored antenna) |
| 29 | Vehicle compass orientation (bearing or heading) |
| 30 | Mobile Station Power Class (an integer, 0–7, indicating max. power capabilities of the mobile station transmitter) |

Although the forward link mobile station's received relative signal strength ($RRSS_{BS}$) of detected nearby base station transmitter signals can be used directly by the location estimate modules, the base station's reverse link received relative signal strength ($RRSS_{MS}$) of the detected mobile station transmitter signal must be modified prior to location estimate model use, since the mobile station transmitter power level changes nearly continuously, and would thus render relative signal strength useless for location purposes.

One adjustment variable and one factor value are required by the signal processing subsystem: 1.) instantaneous relative power level in dBm (IRPL) of the mobile station transmitter, and 2.) the mobile station Power Class. By adding the IRPL to the $RRSS_{MS}$, a synthetic relative signal strength ($SRSS_{MS}$) of the mobile station 140 signal detected at the BS 122 is derived, which can be used by location estimate model analysis, as shown below:

$$SRSS_{MS} = RRSS_{MS} + IRPL \quad \text{(in dBm)}$$

$SRSS_{MS}$, a corrected indication of the effective path loss in the reverse direction (mobile station to BS), is now comparable with $RRSS_{BS}$ and can be used to provide a correlation with either distance or shadow fading because it now accounts for the change of the mobile station transmitter's power level. The two signals $RRSS_{BS}$ and $SRSS_{MS}$ can now be processed in a variety of ways to achieve a more robust correlation with distance or shadow fading.

Although Rayleigh fading appears as a generally random noise generator, essentially destroying the correlation value of either $RRSS_{BS}$ or $SRSS_{MS}$ measurements with distance individually, several mathematical operations or signal processing functions can be performed on each measurement to derive a more robust relative signal strength value, overcoming the adverse Rayleigh fading effects. Examples include averaging, taking the strongest value and weighting the strongest value with a greater coefficient than the weaker value, then averaging the results. This signal processing technique takes advantage of the fact that although a Rayleigh fade may often exist in either the forward or reverse path, it is much less probable that a Rayleigh fade also exists in the reverse or forward path, respectively. A shadow fade however, similarly affects the signal strength in both paths.

At this point a CDMA radio signal direction-independent "net relative signal strength measurement" is derived which is used to establish a correlation with either distance or shadow fading, or both. Although the ambiguity of either shadow fading or distance cannot be determined, other means can be used in conjunction, such as the fingers of the CDMA delay spread measurement, and any other TOA/TDOA calculations from other geographical points. In the case of a mobile station with a certain amount of shadow fading between its BS 122 (FIG. 2), the first finger of a CDMA delay spread signal is most likely to be a relatively shorter duration than the case where the mobile station 140 and BS 122 are separated by a greater distance, since shadow fading does not materially affect the arrival time delay of the radio signal.

By performing a small modification in the control electronics of the CDMA base station and mobile station receiver circuitry, it is possible to provide the signal processing subsystem 20 (reference FIG. 1) within the Location system 142 (FIG. 1) with data that exceed the one-to-one CDMA delay-spread fingers to data receiver correspondence. Such additional information, in the form of additional CDMA fingers (additional multipath) and all associated detectable pilot channels, provides new information which is used to enhance to accuracy of the Location Center's location estimate location estimate modules.

This enhanced capability is provided via a control message, sent from the Location system 142 to the mobile switch center 12, and then to the base station(s) 122 (FIG. 2) in communication with, or in close proximity with, mobile stations 140 to be located. Two types of location measurement request control messages are needed: one to instruct a target mobile station 140 (i.e., the mobile station to be located) to telemeter its BS pilot channel measurements back to the primary BS 122 and from there to the mobile switch center 112 and then to the location system 142. The second control message is sent from the location system 142 to the mobile switch center 112, then to first the primary BS 122, instructing the primary BS' searcher receiver to output (i.e., return to the initiating request message source) the detected target mobile station 140 transmitter CDMA pilot channel offset signal and their corresponding delay spread finger (peak) values and related relative signal strengths.

The control messages are implemented in standard mobile station 140 and BS 122 CDMA receivers such that all data results from the search receiver and multiplexed results from the associated data receivers are available for transmission back to the Location Center 142. Appropriate value ranges are required regarding mobile station 140 parameters T_ADD, T_DROP, and the ranges and values for the Active, Neighboring and Remaining Pilot sets registers, held within the mobile station 140 memory. Further mobile station 140 receiver details have been discussed above.

In the normal case without any specific multiplexing means to provide location measurements, exactly how many CDMA pilot channels and delay spread fingers can or should be measured vary according to the number of data receivers contained in each mobile station 140.

As a guide, it is preferred that whenever RF characteristics permit, at least three pilot channels and the strongest first three fingers, are collected and processed.

From the BS 122 perspective, it is preferred that the strongest first four CDMA delay spread fingers and the mobile station power level be collected and sent to the location system 142, for each of preferably three BSs 122 which can detect the mobile station 140.

Table SP-3 illustrates the resulting extended combinations of BS signals (pilot channels) and finger measurements potentially available, based on the above preferred conditions. The philosophy is to collect as much reasonable data as is practical, given the contains of CDMA receivers, search times, receiver memory storage and available CPU and data transmission bandwidth, in order that sufficient orthogonal information can be processed to minimize location estimate error.

TABLE SP-3

Extended CDMA Location Measurement Combinations

| No. of Receivers | No. of BSs detected | No. of Fingers Detected | No. of Fingers, BS 1-S (first strongest) | No. of Fingers, BS 2-S (second strongest) | No. of Fingers, BS 3-S (third strongest) | No. of Fingers, BS 4-S (fourth Strongest) |
|---|---|---|---|---|---|---|
| 3 | 1 | 1 | 1 | 0 | 0 | 0 |
| 3 | 1 | 2 | 2 | 0 | 0 | 0 |
| 3 | 1 | 3 | 3 | 0 | 0 | 0 |
| 3 | 2 | 2 | 1 | 1 | 0 | 0 |
| 3 | 2 | 3 | 2 | 1 | 0 | 0 |
| 3 | 2 | 3 | 1 | 2 | 0 | 0 |
| 3 | 2 | 4 | 2 | 2 | 0 | 0 |
| 3 | 2 | 5 | 2 | 3 | 0 | 0 |
| 3 | 2 | 5 | 3 | 2 | 0 | 0 |
| 3 | 2 | 4 | 3 | 1 | 0 | 0 |
| 3 | 2 | 4 | 1 | 3 | 0 | 0 |
| 4 | 2 | 5 | 4 | 1 | 0 | 0 |
| 4 | 2 | 5 | 1 | 4 | 0 | 0 |
| 3 | 3 | 3 | 1 | 1 | 1 | 0 |
| 3 | 2 | 6 | 3 | 3 | 0 | 0 |
| 3 | 3 | 3 | 1 | 1 | 1 | 0 |
| 3 | 3 | 4 | 2 | 1 | 1 | 0 |
| 3 | 3 | 4 | 1 | 2 | 1 | 0 |
| 3 | 3 | 4 | 1 | 1 | 2 | 0 |
| 3 | 3 | 5 | 2 | 2 | 1 | 0 |
| 3 | 3 | 5 | 2 | 1 | 2 | 0 |
| 3 | 3 | 5 | 1 | 2 | 2 | 0 |
| 3 | 3 | 6 | 2 | 2 | 2 | 0 |
| 3 | 3 | 6 | 3 | 2 | 1 | 0 |
| 3 | 3 | 6 | 2 | 3 | 1 | 0 |
| 3 | 3 | 6 | 1 | 2 | 3 | 0 |
| 3 | 3 | 6 | 1 | 3 | 2 | 0 |
| 4 | 4 | 4 | 1 | 1 | 1 | 1 |
| 4 | 4 | 5 | 2 | 1 | 1 | 1 |
| 4 | 4 | 5 | 1 | 2 | 1 | 1 |
| 4 | 4 | 5 | 1 | 1 | 2 | 1 |
| 4 | 4 | 5 | 1 | 1 | 1 | 2 |
| 4 | 4 | 6 | 2 | 2 | 1 | 1 |
| 4 | 4 | 6 | 2 | 1 | 2 | 1 |
| 4 | 4 | 6 | 1 | 1 | 2 | 2 |
| 4 | 4 | 6 | 1 | 2 | 2 | 1 |
| 4 | 4 | 6 | 1 | 2 | 1 | 2 |
| 4 | 4 | 6 | 2 | 1 | 1 | 2 |
| 4 | 4 | 7 | 3 | 2 | 1 | 1 |
| 4 | 4 | 7 | 3 | 1 | 2 | 1 |
| 4 | 4 | 7 | 2 | 3 | 1 | 1 |
| 4 | 4 | 7 | 2 | 1 | 3 | 1 |
| 4 | 4 | 7 | 2 | 1 | 1 | 3 |

TABLE SP-3-continued

Extended CDMA Location Measurement Combinations

| No. of Receivers | No. of BSs detected | No. of Fingers Detected | No. of Fingers, BS 1-S (first strongest) | No. of Fingers, BS 2-S (second strongest) | No. of Fingers, BS 3-S (third strongest) | No. of Fingers, 4-S (fourth Strongest) |
|---|---|---|---|---|---|---|
| 4 | 4 | 7 | 1 | 3 | 2 | 1 |
| 4 | 4 | 7 | 1 | 2 | 3 | 1 |
| 4 | 4 | 7 | 1 | 1 | 2 | 3 |
| 4 | 4 | 7 | 1 | 1 | 3 | 2 |
| 4 | 4 | 7 | 3 | 1 | 1 | 2 |
| 4 | 4 | <13 | ... | ... | ... | ... |

As can be seen from the table, a much larger combination of measurements is potentially feasible using the extended data collection capability of the CDMA receivers. In the case of the last row shown, additional combinations are also possible using a similar scheme of allocating the number of CDMA fingers detected at the first or strongest BS, followed by the second strongest base station, then the third strongest base station, etc.

Figure 29:
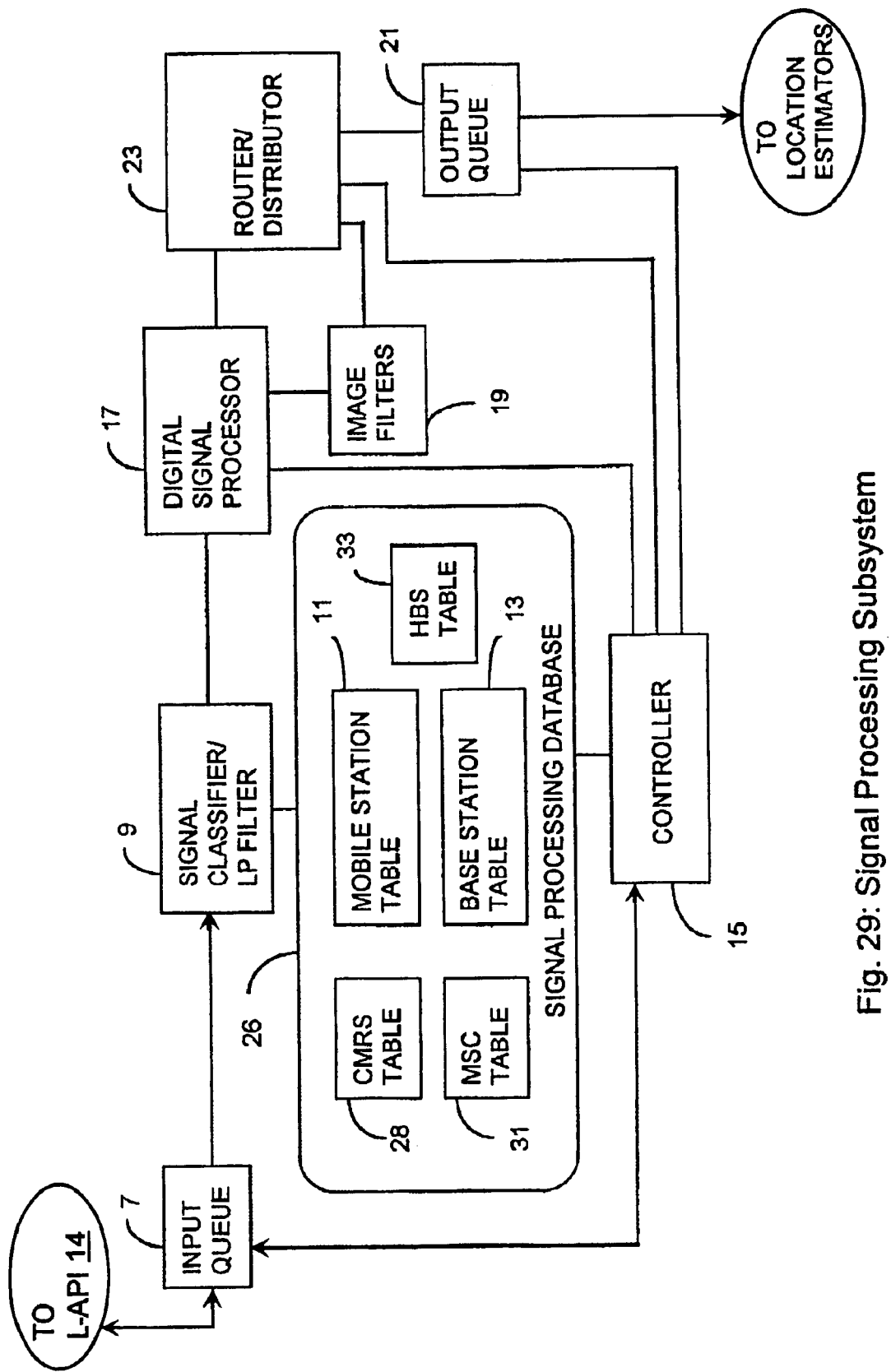
FIG. 29 illustrates the main components of the Signal Processing Subsystem 20.

FIG. 29 illustrates the components of the Signal Processing Subsystem 20. The main components consist of the input queue(s) 7, signal classifier/filter 9, digital signaling processor 17, imaging filters 19, output queue(s) 21, router/distributor 23, a signal processor database 26 and a signal processing controller 15.

Input queue(s) 7 are required in order to stage the rapid acceptance of a significant amount of RF signal measurement data, used for either location estimate purposes or to accept autonomous location data. Each location request using fixed base stations may, in one embodiment, contain from 1 to 128 radio frequency measurements from the mobile station, which translates to approximately 61.44 kilobytes of signal measurement data to be collected within 10 seconds and 128 measurements from each of possibly four base stations, or 245.76 kilobytes for all base stations, for a total of approximately 640 signal measurements from the five sources, or 307.2 kilobytes to arrive per mobile station location request in 10 seconds. An input queue storage space is assigned at the moment a location request begins, in order to establish a formatted data structure in persistent store. Depending upon the urgency of the time required to render a location estimate, fewer or more signal measurement samples can be taken and stored in the input queue(s) 7 accordingly.

The signal processing subsystem 20 supports a variety of wireless network signaling measurement capabilities by detecting the capabilities of the mobile and base station through messaging structures provided by the location application programming interface 14 in FIG. 1. Detection is accomplished in the signal classifier 9 (FIG. 29) by referencing a mobile station database table within the signal processor database 26, which provides, given a mobile station identification number, mobile station revision code, other mobile station characteristics. Similarly, a mobile switch center table 31 provides MSC characteristics and identifications to the signal classifier/filter 9. The signal classifier/filter 9 adds additional message header information that further classifies the measurement data which allows the digital signal processor and image filter components to select the proper internal processing subcomponents to perform operations on the signal measurement data, for use by the location estimate modules.

Regarding service control point messages autonomously received from the input queue 7, the signal classifier/filter 9 determines via a signal processing database 26 query that the message is to be associated with a home base station module. Thus appropriate header information is added to the message, thus enabling the message to pass through the digital signal processor 17 unaffected to the output queue 21, and then to the router/distributor 23. The router/distributor 23 then routes the message to the HBS module 6 shown in FIG. 1. Those skilled in the art will understand that associating location requests from Home Base Station configurations require substantially less data: the mobile identification number and the associated wireline telephone number transmission from the home location register are on the order of less than 32 bytes. Consequentially the home base station message type could be routed without any digital signal processing.

Output queue(s) 21 are required for similar reasons as input queues 7: relatively large amounts of data must be held in a specific format for further location processing by the location estimate modules.

The router and distributor component 23 is responsible to directing specific signal measurement data types and structures to their appropriate modules. For example, the HBS module has no use for digital filtering structures, whereas the TDOA module would not be able to process an HBS response message.

The controller 15 is responsible for staging the movement of data among the signal processing subsystem 20 components input queue 7, digital signal processor 17, router/distributor 23 and the output queue 21, and to initiate signal measurements within the wireless network, in response from an internet 468 location request message in FIG. 1, via the location application programming interface 14.

In addition the controller 15 receives autonomous messages from the MSC, via the location applications programming interface 14 (FIG. 1) or L-API and the input queue 7, whenever a 9-1-1 wireless call is originated. The mobile switch center provides this autonomous notification to the location system as follows: By specifying the appropriate mobile switch center operations and maintenance commands to surveil calls based on certain digits dialed such as 9-1-1, the location applications programming interface 14 (FIG. 1), in communication with the MSC 112a and/or 112b in FIG. 1, receives an autonomous notification whenever a mobile station user dials 9-1-1. Specifically, a bi-directional authorized communications port is configured, usually at the operations and maintenance subsystem of the MSC 112a and/or 112b in FIG. 1, or with their associated network element manager system(s), with a data circuit, such as a DS-1, with the location applications programming interface 14 in FIG. 1. Next, the "call trace" capability of the mobile switch center is activated for the respective communications port. The exact implementation of the vendor-specific man-machine or Open Systems Interface (OSI) commands(s) and their associated data structures generally vary among MSC vendors, however the trace function is generally available in various forms, and is required in order to comply with Federal Bureau of Investigation authorities for wire tap purposes. After the appropriate surveillance commands are established on the MSC, such 9-1-1 call notifications messages containing the mobile station identification number (MIN) and, in FCC phase 1 E9-1-1 implementations, a pseudo-automatic number identification (a.k.a. pANI) which provides an association with the primary base station in which the 9-1-1 caller is in communication are communicated. In cases where the pANI is known from the onset, the signal processing subsystem 20 avoids querying the MSC in question to determine the primary base station identification associated with the 9-1-1 mobile station caller.

After the signal processing controller 15 receives the first message type, the autonomous notification message from the mobile switch center 112 to the location system 142, containing the mobile identification number and optionally the primary base station identification, the controller 15 queries the base station table 13 in the signal processor database 26 to determine the status and availability of any neighboring base stations, including those base stations of other CMRS in the area. The definition of neighboring base stations include not only those within a provisionable "hop" based on the cell design reuse factor, but also includes, in the case of CDMA, results from remaining set information autonomously queried to mobile stations, with results stored in the base station table. Remaining set information indicates that mobile stations can detect other base station (sector) pilot channels which may exceed the "hop" distance, yet are nevertheless candidate base stations (or sectors) for wireless location purposes. Although cellular and digital cell design may vary, "hop" distance is usually one or two cell coverage areas away from the primary base station's cell coverage area.

Having determined a likely set of base stations which may both detect the mobile station's transmitter signal, as well as to determine the set of likely pilot channels (i.e., base stations and their associated physical antenna sectors) detectable by the mobile station in the area surrounding the primary base station (sector), the controller 15 initiates messages to both the mobile station and appropriate base stations (sectors) to perform signal measurements and to return the results of such measurements to the signal processing system regarding the mobile station to be located. This step may be accomplished via several interface means. In a first case the controller 15 utilizes, for a given MSC, predetermined storage information in the MSC table 31 to determine which type of commands, such as man-machine or OSI commands are needed to request such signal measurements for a given MSC 112a or 112b in FIG. 1. The controller generates the mobile and base station signal measurement commands appropriate for the MSC and passes the commands via the input queue 7 and the locations application programming interface 14 in FIG. 1, to the appropriate MSC 112a and 112b, using the authorized communications port mentioned earlier. In a second case the controller 15 communicates directly with the base stations as discussed above and shown in FIG. 5, Location Center-base station access, multiple CMRS. In this second case, an alternative embodiment is provided to directly extract the wireless location signal measurement data from each base station associated with each of the multiple CMRS networks having to interface directly with the MSC for signal measurement extraction.

Upon receipt of the signal measurements, the signal classifier 9 examines location application programming interface-provided message header information from the source of the location measurement (for example, from a fixed BS 122, a mobile station 140, a distributed antenna system 168 or message location data related to a home base station), provided by the location applications programming interface (L-API 14) via the input queue 7 and determines whether or not device filters 17 or image filters 19 are needed, and assesses a relative priority in processing, such as an emergency versus a background location task, in terms of grouping like data associated with a given location request. In the case where multiple signal measurement requests are outstanding for various base stations, some of which may be associated with a different CMRS network, an additional signal classifier function includes sorting and associating the appropriate incoming signal measurements together such that the digital signal processor 17 processes related measurements in order to build ensemble data sets. Such ensembles allow for a variety of functions such as averaging, outlier removal over a time period, and related filtering functions, and further prevent association errors from occurring in location estimate processing.

Another function of the signal classifier/low pass filter component 9 is to filter information that is not useable, or information that could introduce noise or the effect of noise in the location estimate modules. Consequently low pass matching filters are used to match the in-common signal processing components to the characteristics of the incoming signals. Low pass filters match: Mobile Station, base station, CMRS and MSC characteristics, as well as to classify Home Base Station messages.

The signal processing subsystem 20 in FIG. 1 contains a base station database table 13 (FIG. 29) which captures the maximum number of CDMA delay spread fingers for a given base station, containing information structures as shown in table SP-4 below:

TABLE SP-4

| Base Station Characteristics | | | | |
|---|---|---|---|---|
| Primary Base Station Identification | Latitude, Longitude, elevation | Pilot Channel Offset | BS Identifier code | Maximum No. of CDMA Fingers |
| DEN-001 | x, y, z | 5 | CODENABC 001 | 4 |
| DEN-002 | p, q, r | 25 | CODENABC 002 | 4 |
| DEN-003 | s, t, u | 20 | CODENABC 003 | 3 |
| DEN-004 | a, b, c | 15 | CODENABC 004 | 4 |
| BLD-005 | d, e, f | 45 | COBLDABC 005 | 4 |

The base station identification code, or CLLI or common language level identification code is useful in identifying or relating a human-labeled name descriptor to the Base Station. Latitude, Longitude and elevation values are used by other subsystems in the location system for calibration and estimation purposes. As base stations and/or receiver characteristics are added, deleted, or changed with respect to the network used for location purposes, this database table must be modified to reflect the current network configuration.

Just as an upgraded base station may detect additional CDMA delay spread signals, newer or modified mobile stations may detect additional pilot channels or CDMA delay spread fingers. Additionally different makes and models of mobile stations may acquire improved receiver sensitivities, suggesting a greater coverage capability. The table below establishes the relationship among various mobile station equipment suppliers and certain technical data relevant to this location invention.

Although not strictly necessary, the MIN can be populated in this table from the PCS Service Provider's Customer Care system during subscriber activation and fulfillment, and could be changed at deactivation, or anytime the end-user changes mobile stations. Alternatively, since the MIN, manufacturer, model number, and software revision level information is available during a telephone call, this information could extracted during the call, and the remaining fields populated dynamically, based on manufacturer's specifications information previously stored in the signal processing subsystem 20. Default values are used in cases where the MIN is not found, or where certain information must be estimated.

TABLE SP-5

Mobile Station Characteristics Table

| Mobile Station Identification (MIN) | Manufacturer | Model No. | Allowed S/W Revision Levels | Maximum No. of CDMA Fingers | Maximum No. of Pilots Detectable | Transmit Power Class (Max) | Rec. Thermal Noise Floor (dBm) |
|---|---|---|---|---|---|---|---|
| 3034561234567 | Sony | 5 | R1.0 | 3 | 3 | 2 | −114 |
| 3034561234568 | Qualcomm | 25 | R2.01 | 4 | 4 | 4 | −115 |
| 3034561234569 | Panasonic | 20 | R1.1 | 3 | 3 | 5 | −113 |
| 3034561234570 | Fujutshu | 15 | R2.5 | 4 | 4 | 0 | −116 |
| 3034561234571 | Sony | 45 | R1.1 | 3 | 3 | 7 | −115 |
| Default | Default | Default | R1.0 | 3 | 3 | 3 | −112 |

A low pass mobile station filter, contained within the signal classifier/low pass filter 9 of the signal processing subsystem 20, uses the above table data to perform the following functions: 1) act as a low pass filter to adjust the nominal assumptions related to the maximum number of CDMA fingers, pilots detectable; and 2) to determine the transmit power class and the receiver thermal noise floor. Given the detected reverse path signal strength, the required value of $SRSS_{MS}$, a corrected indication of the effective path loss in the reverse direction (mobile station to BS), can be calculated based on the SP-5 table data contained within the mobile station table 11, in the signal processing database 26.

The effects of the maximum Number of CDMA fingers allowed and the maximum number of pilot channels allowed essentially form a low pass filter effect, wherein the least common denominator of characteristics are used to filter the incoming RF signal measurements such that a one for one matching occurs. The effect of the Transmit Power Class and Receiver Thermal Noise floor values is to normalize the characteristics of the incoming RF signals with respect to those RF signals used.

FIG. 4, Location Provisioning from Multiple CMRSs, illustrates a system architecture to enable the customer care systems belonging to different CMRSs, either on an autonomous or periodic basis, to update a provisionable signal processing database 26, containing the mobile station characteristics, in communication with the signal classifier/filter 9, input queue 7, and the location applications programming interface for customer care systems (L-API-CCS) 138. The signal classifier/filter 9 is in communication with both the input queue 7 and the signal processing database 26. In the early stage of a location request the signal processing subsystem 20 in FIG. 4, will receive the initiating location request from either an autonomous 9-1-1 notification message from a given MSC, or from a location application 146 (for example, see FIG. 36), for which mobile station characteristics about the target mobile station 140 (FIG. 2) is required. Referring to FIG. 29, a query is made from the signal processing controller 15 to the signal processing database 26, specifically the mobile station table 11, to determine if the mobile station characteristics associated with the MIN to be located are available in table 11, if the data exists then there is no need for the controller 15 to query the wireless network in order to determine the mobile station characteristics, thus avoiding additional real-time processing which would otherwise be required across the air interface, in order to determine the mobile station MIN characteristics. The resulting mobile station information may be provided either via the signal processing database 26 or alternatively a query may be performed directly from the signal processing subsystem 20 to the MSC in order to determine the mobile station characteristics.

A location application programming interface, L-API-CCS 138 to the appropriate CMRS customer care system provides the mechanism to populate and update the mobile station table 11 within the database 26. The L-API-CCS 138 contains its own set of separate input and output queues or similar implementations and security controls to ensure that provisioning data is not sent to the incorrect CMRS. The interface 1155a to the customer care system for CMRS-A 1150a provides an autonomous or periodic notification and response application layer protocol type, consisting of add, delete, change and verify message functions in order to update the mobile station table 11 within the signal processing database 26, via the controller 15. A similar interface 1155b is used to enable provisioning updates to be received from CMRS-B customer care system 1150b.

Although the L-API-CCS application message set may be any protocol type which supports the autonomous notification message with positive acknowledgment type, the T1M1.5 group within the American National Standards Institute has defined a good starting point in which the L-API-CCS could be implemented, using the robust OSI TMN X-interface at the service management layer. The object model defined in Standards proposal number T1M.15/96-22R9, *Operations Administration, Maintenance, and Provisioning (OAM&P)—Model for Interface Across Jurisdictional Boundaries to Support Electronic Access Service Ordering: Inquiry Function*, can be extended to support the L-API-CCS information elements as required and further discussed below. Other choices in which the L-API-CCS application message set may be implemented include ASCII, binary, or any encrypted message'set encoding using the Internet protocols, such as TCP/IP, simple network management protocol, http, https, and email protocols.

Referring to the digital signal processor (DSP) 17, in communication with the signal classifier/LP filter 9, the DSP 17 provides a time series expansion method to convert non-HBS data from a format of an signal measure data ensemble of time-series based radio frequency data measurements, collected as discrete time-slice samples, to a three dimensional matrix location data value image representation. Other techniques further filter the resultant image in order to furnish a less noisy training and actual data sample to the location estimate modules.

Referring now to digital signal and image filter processing, by way of example, a forward-path CDMA mobile station delay spread RF measurement sample is illustrated in FIG. 22, for the mobile station reception of one sample of transmission signal related to BS-1, located at 16th and Stout Streets. In this sample three fingers or groups of RF energy (relative signal strength is indicated along the vertical axis) were detected. A first CDMA finger was found at a delay of about 3.4 microseconds, and relative signal strength of about −80 dBm. A second finger was found at a delay of about 5 microseconds, and peak strength of about −55 dBm, followed by a third finger at 6.5 microseconds and a strength of about −92 dBm. Two other base stations were detected, BS-5 and BS-2, along with their respective three CDMA delay spread fingers.

Figure 28:
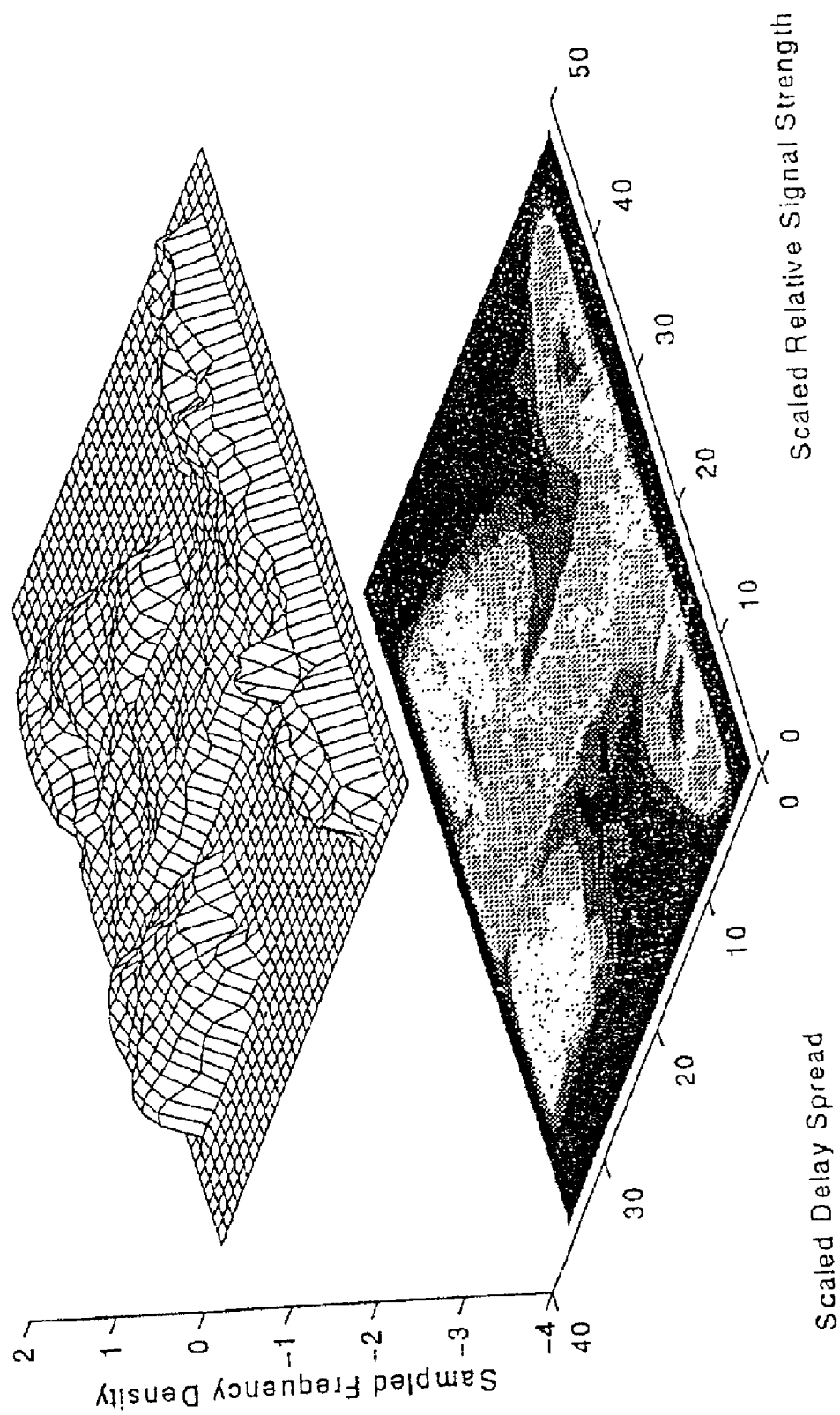
FIG. 28 illustrates an image and relief representation of a CDMA Delay Spread Profile.

Refer now to the left image shown in FIG. 26: Delay Spread Profile Image. After 128 samples of data are collected of the delay spread-relative signal strength RF data measurement sample: mobile station RX for BS-1 and grouped into a Quantization matrix, where rows constitute relative signal strength intervals and columns define delay intervals. As each measurement row, column pair (which could be represented as a complex number or Cartesian point pair) is added to their respective values to generate a Z direction of frequency of recurring measurement value pairs or a density recurrence function. By next applying a grid function to each x, y, and z value, a three-dimensional surface grid is generated, which represents a location data value or unique print of that 128-sample measurement. FIG. 28 illustrates the result of image generation when a number of data samples, or an ensemble of signal strength, delay pairs of values are added within a given bin area or matrix, to thus create a type of three-dimensional image, representing a particular RF signaling behavior at a given location.

Refer now to the right image shown in FIG. 26. In the general case where a mobile station is located in an environment with varied clutter patterns, such as terrain undulations, unique man-made structure geometries (thus creating varied multipath signal behaviors), such as a city or suburb, although the first CDMA delay spread finger may be the same value for a fixed distance between the mobile station and BS antennas, as the mobile station moves across such an arc, different finger-data are measured. In the right image for the defined BS antenna sector, location classes, or squares numbered one through seven, are shown across a particular range of line of position (LOP).

A traditional TOA/TDOA ranging method between a given BS and mobile station only provides a range along the arc, thus introducing ambiguity error. However a unique three dimensional image can be used in this method to specifically identify, with recurring probability, a particular unique location class along the same Line Of Position, as long as the multipath is unique by position but generally repeatable, thus establishing a method of not only ranging, but also of complete latitude, longitude location estimation in a Cartesian space. In other words, the unique shape of the "mountain image" enables a correspondence to a given unique location class along a line of position, thereby eliminating traditional ambiguity error.

Although man-made external sources of interference, Rayleigh fades, adjacent and co-channel interference, and variable clutter, such as moving traffic introduce unpredictability (thus no "mountain image" would ever be exactly alike), three basic types of filtering methods can be used to reduce matching/comparison error from a training case to a location request case: 1.) select only the strongest signals from the forward path (BS to mobile station) and reverse path (mobile station to BS), 2.) Convolute the forward path 128 sample image with the reverse path 128 sample image, and 3.) process all image samples through various digital image filters to discard noise components.

Figure 27:
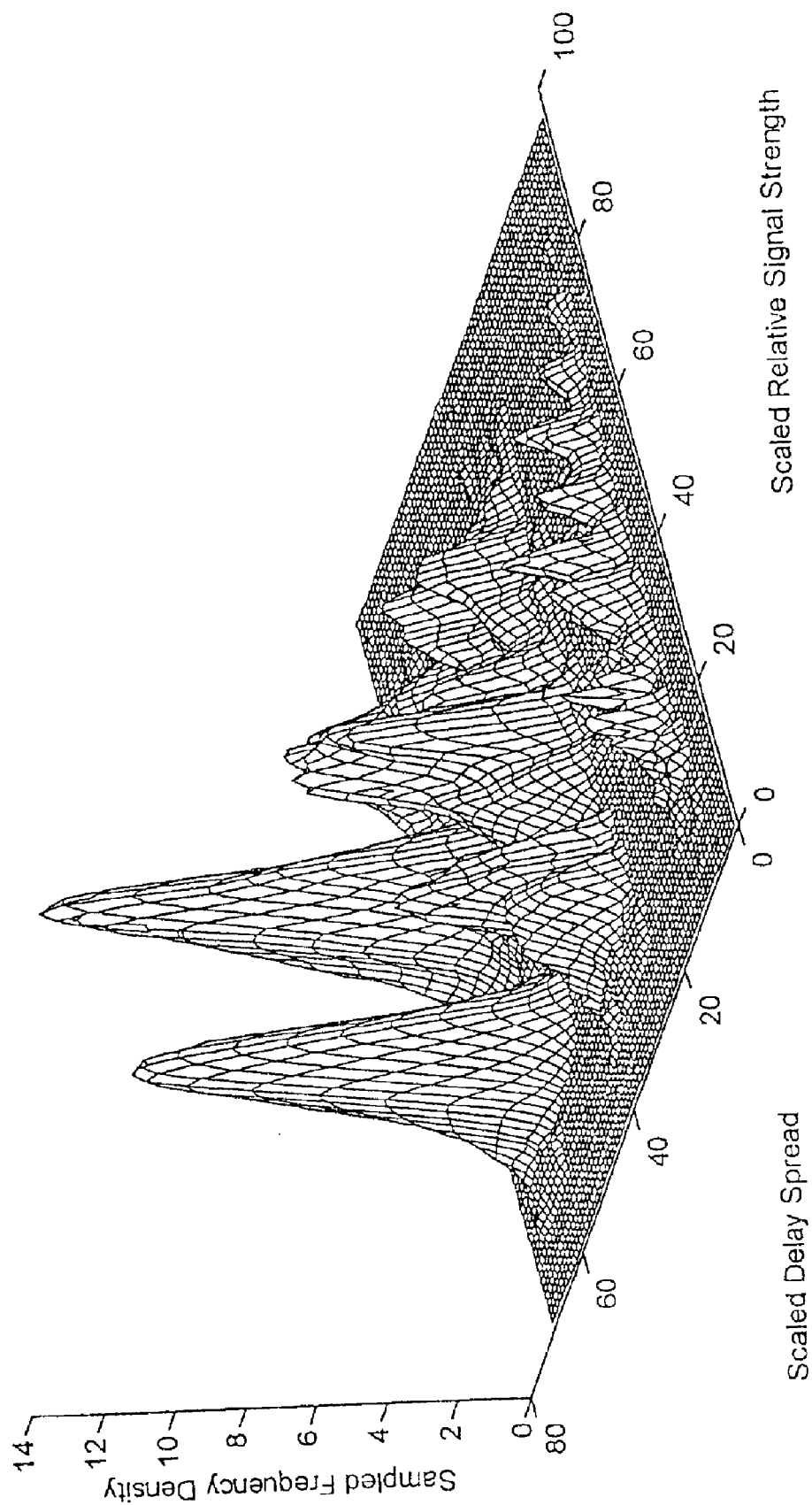
FIG. 27 shows the magnifying effects of convoluting similar-property forward and reverse path three-dimensional images.

The strongest signal technique has been discussed previously in the data filter section. FIG. 27: Convolution of Forward and Reverse Images, illustrates one method that essentially nulls noise completely, even if strong and recurring, as long as that same noise characteristic does not occur in the opposite path.

Figure 30:
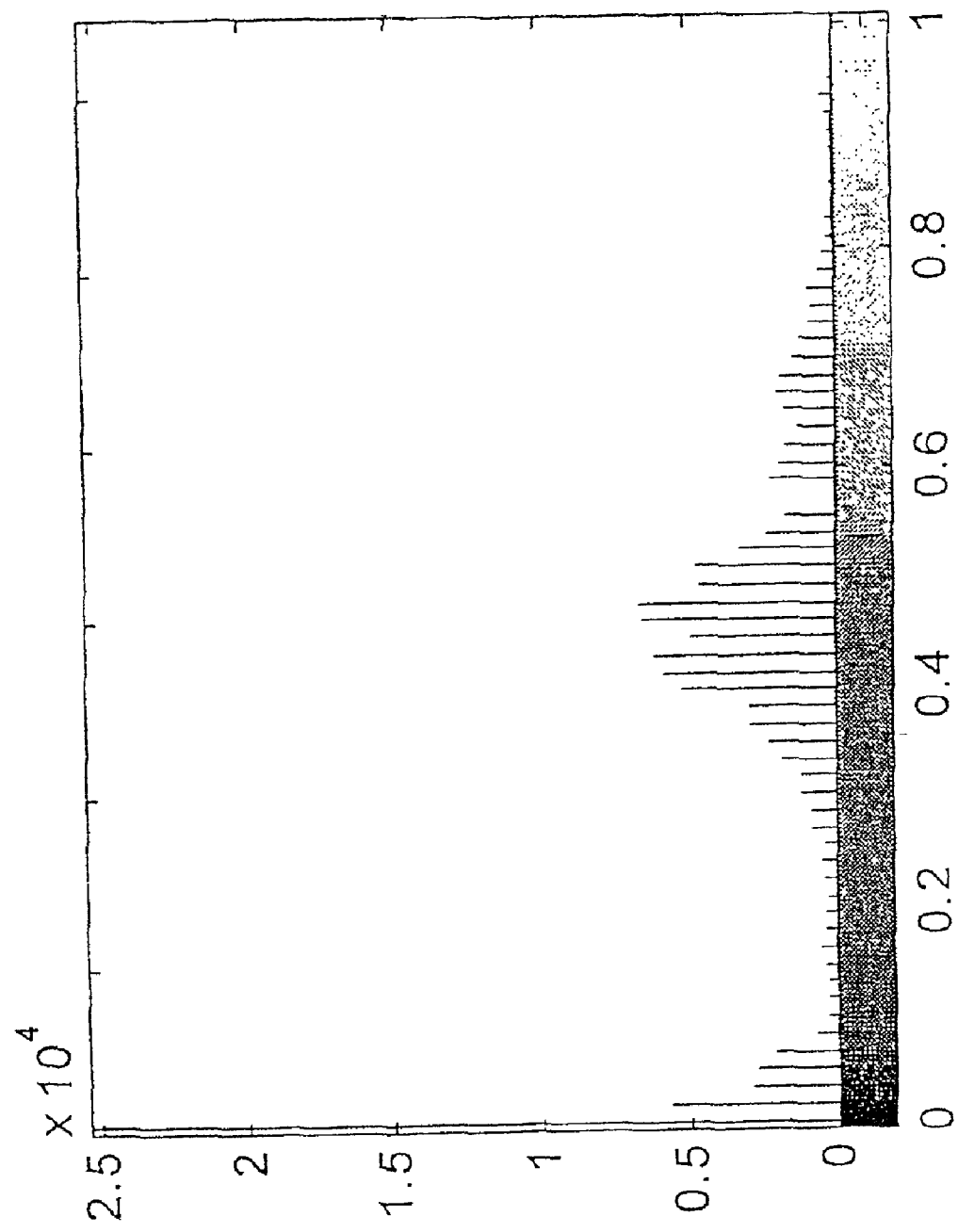
FIG. 30 illustrates an image based on an RF signal measurement sample set, before image histogram equalization filtering is applied.
Figure 31:
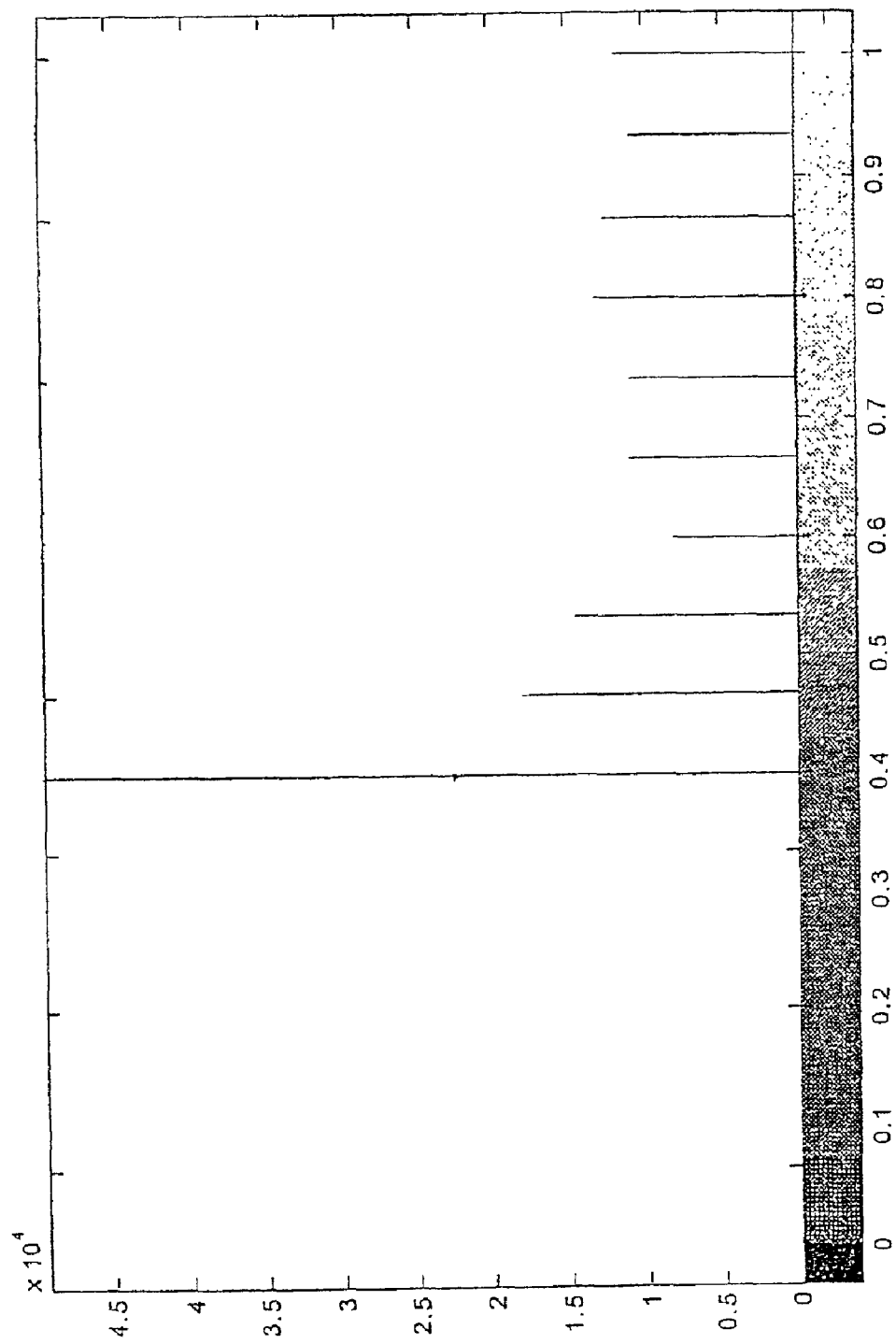
FIG. 31 illustrates an image based on an RF signal measurement sample set, after image histogram equalization input cropping filtering is applied.

The third technique of processing CDMA delay spread profile images through various digital image filters, provides a resultant "image enhancement" in the sense of providing a more stable pattern recognition paradigm to the neural net location estimate model. For example, image histogram equalization can be used, as illustrated in FIG. 30 (before equalization) and 31 (after equalization) to rearrange the images' intensity values, or density recurrence values, so that the image's cumulative histogram is approximately linear.

Figure 32:
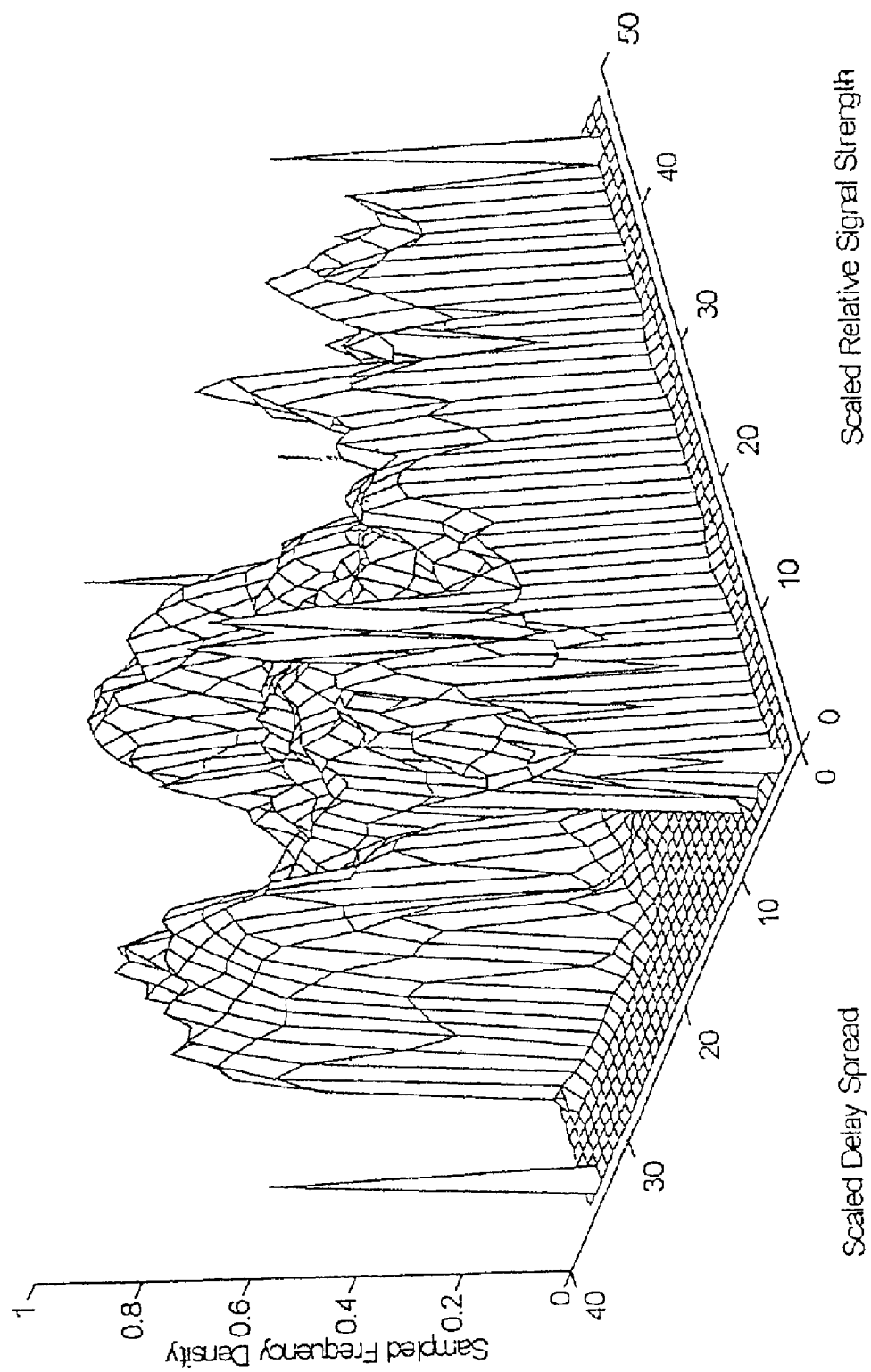
FIG. 32 illustrates an image sample grid before image filtering.
Figure 33:
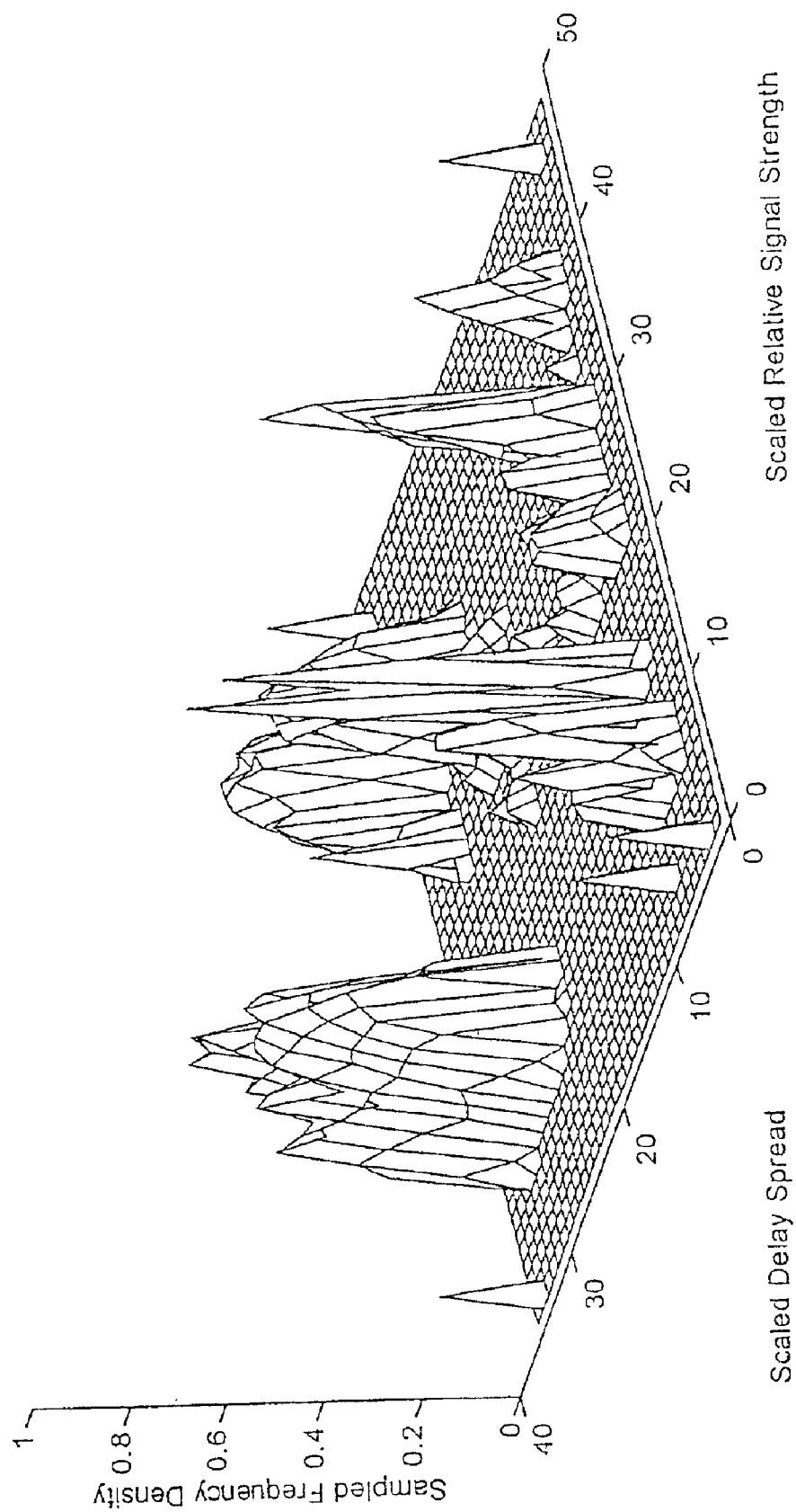
FIG. 33 shows a CDMA profile image after input cropping is used at a level of 50 percent.

Other methods which can be used to compensate for a concentrated histogram include: 1) Input Cropping, 2) Output Cropping and 3) Gamma Correction. Equalization and input cropping can provide particularly striking benefits to a CDMA delay spread profile image. FIGS. 32 and 33 illustrate the three dimensional grid images of the before and after input cropping filter example. As shown in FIG. 33, input cropping removes a large percentage of random signal characteristics that are non-recurring.

Other filters and/or filter combinations can be used to help distinguish between stationary and variable clutter affecting multipath signals. For example, it is desirable to reject multipath fingers associated with variable clutter, since over a period of a few minutes such fingers would not likely recur. Further filtering can be used to remove recurring (at least during the sample period), and possibly strong but narrow "pencils" of RF energy. A narrow pencil image component could be represented by a near perfect reflective surface, such as a nearby metal panel truck stopped at a traffic light.

Figure 34:
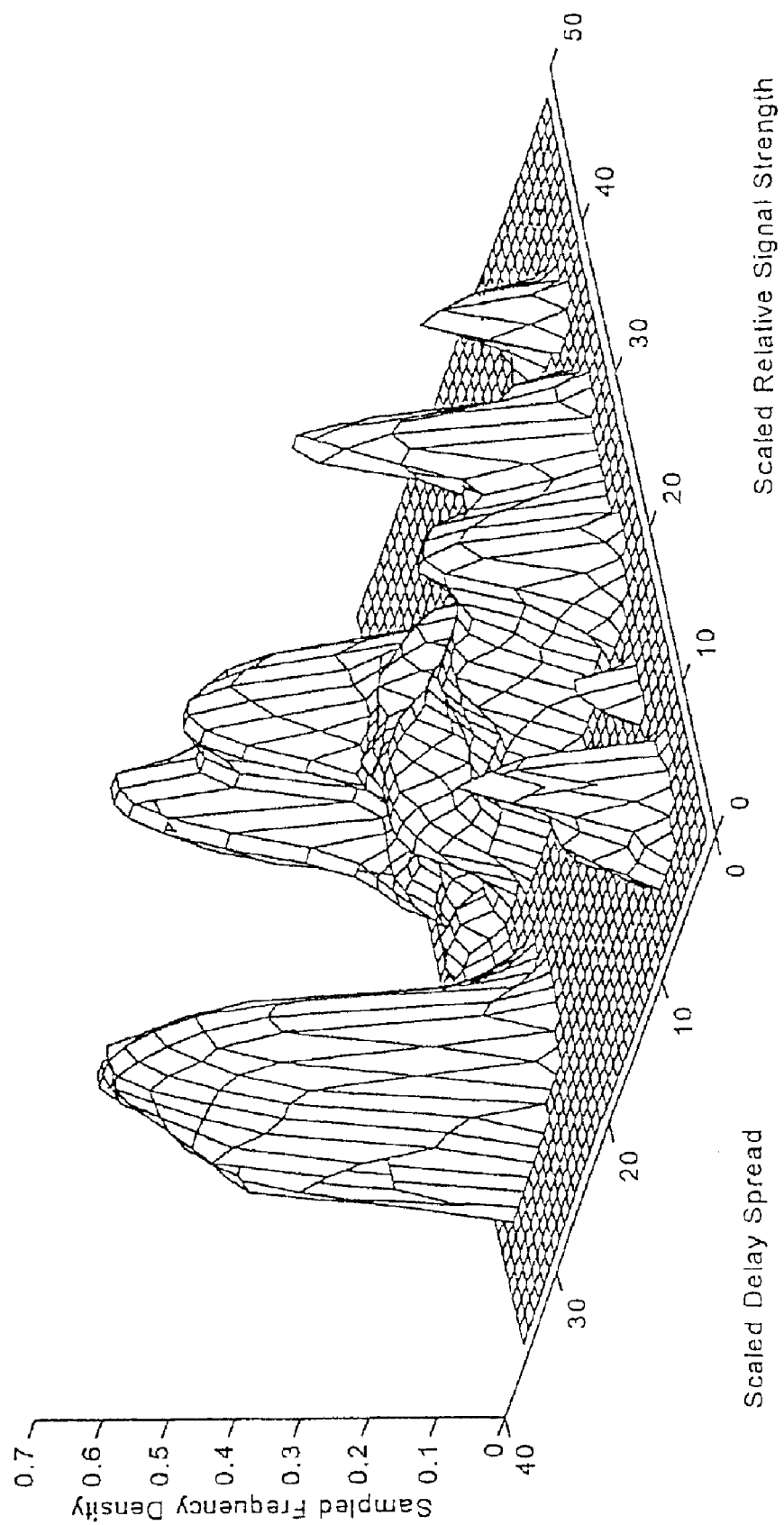
FIG. 34 illustrates the results of combining input cropping at 40 percent, then performing four by four median filtering on the resultant.
Figure 35:
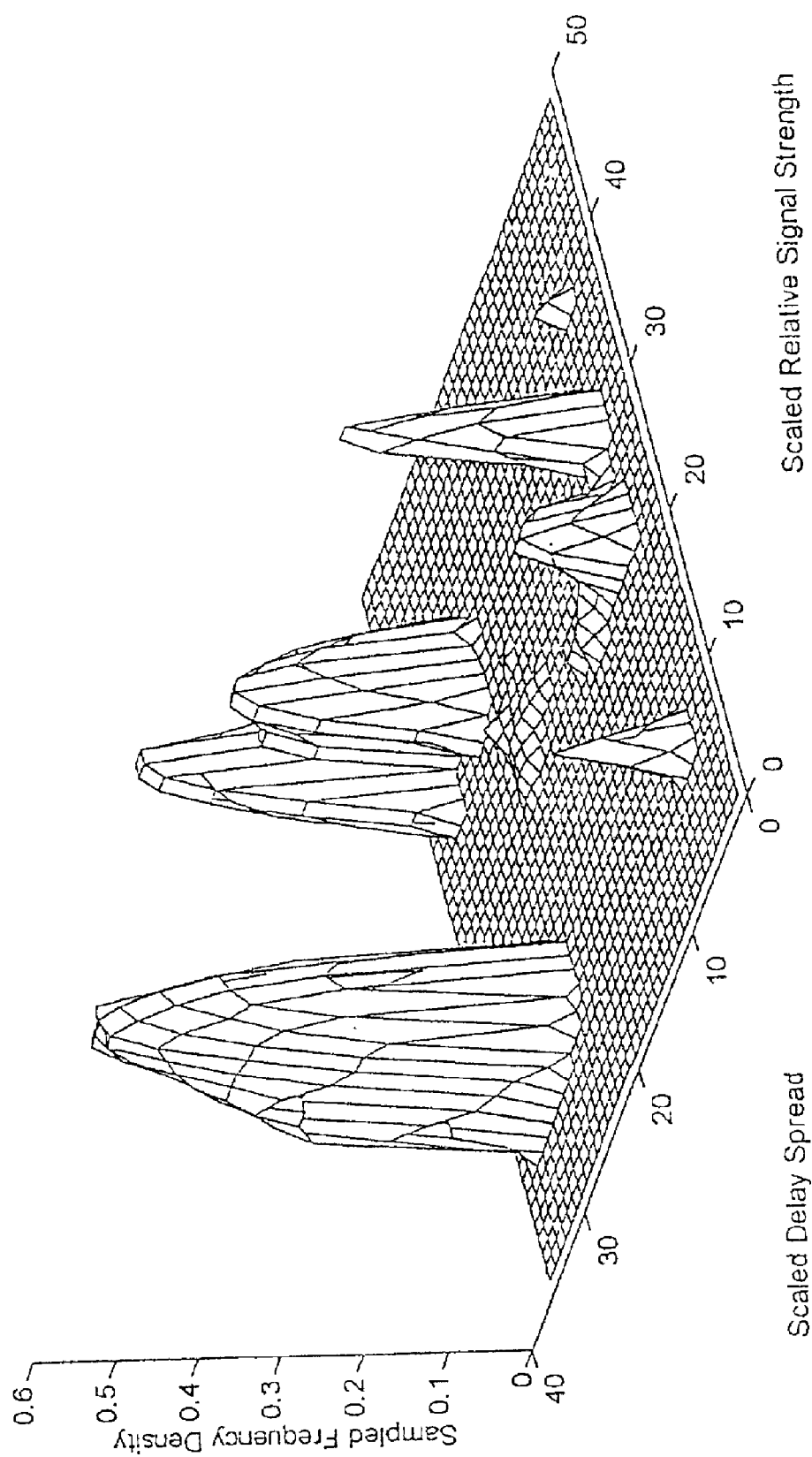
FIG. 35 shows the results of combining input cropping at 50 percent with four by four median filtering.

On the other hand, stationary clutter objects, such as concrete and glass building surfaces, adsorb some radiation before continuing with a reflected ray at some delay. Such stationary clutter-affected CDMA fingers are more likely to pass a 4×4 neighbor Median filter as well as a 40 to 50 percent Input Crop filter, and are thus more suited to neural net pattern recognition. FIG. 33 illustrate five "pencils" of CDMA finger energy that passed a simple 50 percent Input Crop filter. However, as shown in FIG. 34 when subjected to a 4×4 neighbor Median filter and 40 percent clipping, all five pencil-shaped fingers have been deleted. FIG. 35 illustrates the further simplified result of a 50 percent cropping and 4×4 neighbor median filtering. Other filtering methods include custom linear filtering, adaptive (Weiner) filtering, and custom nonlinear filtering.

The DSP 17 may provide data ensemble results, such as extracting the shortest time delay with a detectable relative signal strength, to the router/distributor 23, or alternatively results may be processed via one or more image filters 19, with subsequent transmission to the router/distributor 23. The router/distributor 23 examines the processed message data from the DSP 17 and stores routing and distribution information in the message header. The router/distributor 23 then forwards the data messages to the output queue 21, for subsequent queuing then transmission to the appropriate location estimators DA module 10, TOA/TDOA module 8 or the 'BS module 6, in FIG. 1.

Home Base Station Module

Upon receiving a message from the Data Capture Gateway or the signal processing subsystem 20, the HBS location estimate model examines a Home Base Station Table which defines relationships among a wireless MIN, and wireline telephone number, characteristics of the HBSD, and the possibility to use various signal types in order to further define the location within the address area of the fixed location HBSD. The following table, populated by the commercial mobile radio service provider at HBSD installation time, is used by the HBS model to determine location whenever the mobile station 140 is located within communication range of the HBSD:

TABLE HBS-1

HBSD Characteristics

| Wireline MIN | Wireless MIN | HBSD Model | HBSD location Latitude, Longitude | Fixed HBSD Location | CDMA Strength/Delay Measurements? |
|---|---|---|---|---|---|
| 3035561234 | 3035661299 | Sony Qx-9000, Rev. 1.1 | 52.619488 N, 112.4197601 W | 727 Magnolia Drive, Boulder, CO | No |
| 3035561236 | 3035661200 | Panasonic PF-130, Rev. 5.0 | 52.645488 N, 112.4197601 W | 1401 Digit Drive, Boulder, CO | Yes |
| 3035561236 | 3035661240 | Panasonic PF-130, Rev. 3.4 | 52.779488 N, 112.4197601 W | 1698 Folsom St., Boulder, CO | No |
| 3035561284 | 3035661205 | Panasonic PF-180, Rev. 5.0 | 51.619488 N, 111.9197601 W | 990 Nutcracker Dr., Niwot, CO | NO |
| 3035561224 | 3035661266 | Panasonic PF-5000, Rev. 1.0 | 52.619558 N, 112.4197601 W | 5606 Bismark Circle, Denver, CO | Yes |
| ... | ... | ... | | ... | ... |

In the event RF signals are available for telemetry from the HBSD to the location system, such information may be solicited from the location system to the HBSD, in the form of a request/response message scheme, using for example, a data-under-voice technique. In such cases the SSP provides a data connection with the location system 142 via the PSTN. The home base station may interact with the mobile station in the same manner as a cordless telephone transceiver interacts with a cordless telephone, when the mobile station is within an acceptable range.

The HBS module 6 in FIG. 1 outputs the Latitude and Longitude location estimates to either PSTN 124 or to the Internet 468, depending upon the source of the originating location request.

Distributed Antenna module

Upon receipt of one or more data ensemble messages from the signal processing subsystem 20 in FIG. 1, the distributed antenna (DA) module 10 queries a previously populated distributed antenna database to determine the locations of distributed antennas associated with the measured DA antenna "pilot delays" so that the detected signal measurement delay signal values received from the mobile station receivers and base station receivers can be input to the TOA/TDOA module. The TOA/TDOA module then utilizes the radius-radius method, or time difference method, in order to provide location estimates within the building or area containing the distributed antennas.

Daisey Chaining Base Stations

As a practical matter it may be necessary in some network conditions to add base stations in areas to permit improved estimates to be achieved in wireless location. An aspect in this invention includes daisy chaining communication circuits or transport facilities between or among base stations, in order to simplify the installation and operation of such base stations. Base stations normally communicate with the mobile switch center using T-carrier transport facilities, in order to carry voice and data bearer traffic, and to transport bi-directional control signals. However for various economic or other reasons it may not be justifiable to install such transport facilities. At the base station, by essentially originating a plurality of mobile telephone calls using the data communications option, and terminating such calls at the mobile switch center appropriately, the outputs of the base station transport multiplex circuits are re-directed into the data communication circuits normally intended for use by mobile stations in establishing a data circuit communication call to the network. Circuits at the mobile switch center used to terminate these data calls, redirect the communication to those circuits normally used to terminate the T-carrier facilities from the base stations. In this manner, existing wireless channels can be used to provide transport via this daisy-chaining method between certain base stations and the mobile switch center, thus simplifying connectivity in cases where the installation of transport facilities would either be impossible or impractical.

Distance First Order Module (TOA/TDOA)

Particular distinctions over the current state of the art include utilizing essentially the native electronics, antennas and standards, and opposed to overlay solutions, supervisor functions which control a hybrid set of techniques, including Time Of Arrival (TOA), Time Difference of Arrival (TDOA) in both the forward and reverse paths, pilot signal strengths, power control, mobile stations (mobile station) state conditions, stochastic features of environmental clutter, multipath detection and mitigation, and robustness, supporting a variety of conditions including degraded/faulty equipment, distributed and SMART antennas, various registration modes, and various call processing conditions such as soft, hard and idle hand-off conditions, location during the idle state, traffic-bearing states, and location during cases of severe multipath, such as that experienced in urban canyon environments, as well as location in suburban and rural cases.

Since each base station is required to emit a constant signal-strength pilot pseudo-noise (PN) sequence on the forward link channel identified uniquely in a network system by a pilot sequence offset and frequency assignment, it is possible to use the pilot channels of active, candidate, neighboring and remaining sets of pilots, associated with neighboring base stations, stored in the mobile station, for TOA and TDOA measurements performed by the mobile station.

Based on the arrival time measurement estimates and the speed of propagation, ranges or range differences between the base stations and the mobile station can be calculated. TOA and/or TDOA measurements can then be input to either the radius-radius multilateration or the time difference multilateration algorithms.

By utilizing the known base station positions, location of the mobile station can be determined. Since measurements and base station positions can be sent either to the network or the mobile station, location can be determined in either entity.

Since not all measurements can provide accurate location results at all times and conditions, a variety of supervisory logic processes can be invoked to resolve or litigate the problem area.

As those familiar with the EIA/TIA IS-95 and TIPI/JTC CDMA standards specifications know, mobile station call processing consists of four states:
1. Initialization State—where the mobile station selects and acquires a system, a network, and timing information. This state consists of four substates: System Determination, Pilot Channel Acquisition, Sync Channel Acquisition, and Timing Change Substate;
2. Idle State—where the mobile station monitors messages on the Paging Channel, and supports procedures such as Message Acknowledgment, nine modes of Registration, Idle Hand-off, Pilot Search, and response to Overhead Information, such as System and Access Parameters (which include BS Latitude and Longitude), mobile station Message Transmission Operation (i.e., Data Burst) and Neighboring List messages;
3. System Access State—where the mobile station sends messages to the base station on the Access Channel. This state consists of six substates: Update Overhead, Origination Attempt, Page Response, mobile station Order/ Message Response, Registration Access; Message Transmission Operation/Data Burst);
4. Mobile station Control on the Traffic Channel State— where the mobile station communicates with the primary base station using the forward and Reverse Traffic Channels. This state consists of five substates: TC initialization, Waiting for Order, Waiting for mobile station Answer, Conversation (which includes hand-off procedures and earliest arriving usable multipath components of pilots), and Release.

At power-up an IS-95 or TIPI PCS CDMA compliant mobile station enters Initialization State, as described in IS-95, section 6.6.1. During the System Determination substate, the mobile station refers to its internal memory to acquire preferences for system carrier (A or B), or the preferred carrier at 1.8–2.0 GHz, and for other types of service, including advanced mobile phone service, or AMPS, as well as narrow band advanced mobile phone service, or NAMPS.

A CDMA-preferred mobile station then transfers to the Pilot Acquisition Substate. The mobile station tunes to the CDMA Channel number equal to $CDMACH_S$ then sets its Walsh code (always W0) for the Pilot channel where it begins searching for pilot energy, in terms of energy per bit, per spectral density.

Once a sufficiently strong (as defined by the T_ADD threshold parameter) pilot channel has been identified within $T_{20m}$ seconds, the mobile station enters the Sync Channel Acquisition Substate, where the mobile station receives a Sync channel Message that includes, among other information, system time and the unique PN offset index for that particular BS. In the Timing Change substate, the mobile station adjusts its internal timing to match the BS's CDMA system time. At the completion of the Timing Change substate, the mobile station is completely synchronized to the CDMA system's BS time.

After satisfactory synchronization the mobile station then enters the stable Idle State, where the paging channel begins to be monitored.

At this point at least two alternatives are possible:
1. Perform Location determination without consumption of user-perceived air time via the introduction of a new call processing state, or
2. Perform Location determination via the traffic channel (requires air time)

In cases where Distributed Antennas (D)As), and/or Home Base Stations (HBS) are used, each location of these devices can be sent to the mobile station. There are at least three format-types possible in conveying this type of location information in the GeoLocation Message. First, a unique identifier can be assigned to each DA/HBS, such as a filly distinguished name. An example of location information could be: Within the USA, State of Colorado, city of Denver, with Service Provider xyz, BS ID 129, Distributed Antenna number 8. Or more compactly, the location string is structured as, "USA.CO.DEN.xyz.129.DA8". Secondly, an easy-to-understand human style data message can be sent, such as, "You are near the 30th floor of the Sears Tower building". Third, data values for Latitude, Longitude, and possibly altitude and accuracy could be sent from the BS or Location Center to the mobile station/LU. In order to be most easily useful to and end-user, in the first and third cases, a database would be needed within the mobile station or a Personal Digital Assistant device, which performs a translation of numerical data into a form useful for human understanding.

The mobile station thus maintains a list of location pilot offsets, where the list is ranked based on a weighted combination of received signal energy and BS location. The mobile station selects the best candidate BSs for location estimate purposes, which may be slightly different from the Active, candidate and remaining lists.

Additionally the mobile station may send a Data_Burst message back to the BS or Location Center, informing that no other Pilot Channels were detected. This "negative" Venn diagram information may be useful with various heuristics for location estimate deduction, for example, to note where the mobile station is not located.

It is the difference of system time values (as opposed to their absolute values) that is important. Note that for purposes of location, any communication back to a BS 122 would require re-synchronizing onto that BS's system time. Although not specified in either IS-95 or T1P1/JTC's PCS CDMA standards, most mobile station manufacturers build correlators with resolutions of approximately ⅛ PN chip, which is about 125 nanoseconds (nS). A location equipped mobile station will provide +/−125 nS. accuracy, which is about +/−125 feet.

The mobile station or location entity can process the arrival time estimates in at least two ways, first the mobile station may difference the measurements (preferred) to form time-difference-of-arrivals (TDOA); or second, the mobile station may determine absolute time-of-arrival (TOA) by solving for the clock bias between the mobile station and other CDMA system time reports. TOA requires very well calibrated BS system clocks among each other.

The following procedure illustrates significant capabilities hidden in the CDMA standards, which provide a substantial enabling base with which to provide the measurements and data for this inventions' location methods.

First the BS sends the Neighbor List Update Message, containing a complete list of the neighboring pilot PN sequence offset indices (i.e., via the NGHBR_PN field) associated with candidate BSs in the area, with which the mobile station could possibly scan for detecting usable earliest arriving neighboring useable BS multipath components. This list should typically be a complete list, as opposed to the presumed candidate subset. If the mobile station is not already in the Traffic/Conversation State, it could invoke this state by calling a dialable telephone number in the network, e.g., a designed "Quiet Line" This approach also allows a billing record to be generated according to routine wireless telephony practice. If the network is to determine location, then the network pages the mobile station 140, connecting the mobile station to a Quiet Line/ Voice message upon mobile station answer. Note that it may be desirable to suppress the mobile station ringer sounding for certain location applications. Other methods may also be possible.

During installation, each BS 122 in a particular area is provisioned with the locations of all possible neighboring BSs in its area. The BSs 122 use this information to populate a list of all Latitudes and Longitudes which can be sent to the LUs, using the Neighbor List Update message. Second, assuming that the mobile station does not currently have this data or if unknown, then the BS shall send a series of Mobile Station Registered messages, each message containing the latitude and Longitude values (i.e., the BASE_LAT and BASE_LONG fields) associated with a neighboring BS pilot PN offset sent with the first message. Note that the constants $N_{6m}$, Supported Traffic Channel Candidate Active Set size, normally set to 6, and $N_{7m}$, Supported Traffic Channel Candidate Set size, normally set to 5, and $N_{8m}$, the Minimum Supported Neighbor Set size, normally set to 20, should be sufficient for most location purposes, however these constants could be changed if the need arises.

Third, the BS saves the current T_ADD and T_DROP values in the BS memory, associated with the In-Traffic LU, and sends the In-Traffic System Parameters Message, which includes reduced T_ADD and T_DROP parameter values, useable for location purposes. The value for T_ADD would typically be set to a value near the lower end of the IS-98 specification, possibly below the 80 dB dynamic range requirement, close to (but not including) the thermal noise power level of the LU receiver. Note that if the LU is using restricted battery, e.g., a portable, then the time for keeping T_ADD and T_DROP at a low value for location estimates purposes, should be kept short to delay adverse consequences, such as increased current drain and noise.

Reduced T_ADD and T_DROP values sent to the mobile station will cause the LU to scan all conceivable neighboring BS pilots provided to it by the BS, and to measure the strengths of each received pilot, and to determine the pilot arrival time for each pilot offset. Note that the signal strengths now measured may not be sufficient for carrying traffic, but may be sufficient for location purposes.

Assuming the network is to determine location, then the mobile station reports the arrival time, PILOT_ARRIVAL, for each pilot reported to the base station. According to the standard the arrival time is measured relative to the mobile station's time reference (which was previously determined from the active BS), in units of PN chips (1/2288) microseconds, or about 814 nanoseconds, as follows:

$$PILOT\_PN\text{-}PHASE=(PILOT\_ARRIVAL+(64\times PILOT\_PN))\bmod 2^{15},$$

where PILOT_PN is the PN sequence offset index of the pilot associated with the BS pilot indices in the neighbor list.

In order to achieve location accuracy estimates on the order of a few hundred feet (or nanoseconds) a higher resolution than 1 PN chip is required. Although not specified directly in IS-95, most mobile manufacturers use correlators with resolutions of approximately ⅛ PN chip, or about 102 nS (suggesting that if no other systemic errors are present, about 102 feet of error is expected). Note that the search window size SRCH_WIN_A$_r$ for each pilot may need to be increased if there are substantial delays experienced from the environment. It is desirable for the mobile station to report the second and third arrival time (or the second and third fingers), and their relative signal strengths, corresponding to each detectable Pilot Channel.

If more than one PILOT_ARRIVAL is available then a basic TDOA multilateration algorithm may be invoked, at either the LU, or the network. In the network case, the active BS 122 must send a Pilot Request Order for Pilot Measurement Request Order (ORDER code 010001), which causes the mobile station 140 to forward its measurements to the BS (and consequently the network, as appropriate).

At this point a minimally sufficient number of measurements are available to perform a location estimate. Thus the BS should restore the original T_ADD and T_DROP values (previously saved in the BS memory) to the mobile station, via the In-Traffic System Parameters Message.

Additional information may be desirable, such as the active BS' TOA measurement, as well as associated BS measurements of the mobile station's TOA to their BS location. This added information may be sent to the mobile station if the mobile station is to perform location, via the Data Burst Message on the Forward Traffic Channel. Since 26 combinations of data burst types have been reserved for future use in the standard, dedication of several combinations could be used to telemeter location-related data. In cases where duplicate ranging or other information is available, various supervisor techniques mentioned elsewhere in this document, could be used to refine the location estimate.

Once the location estimate has been performed, any number of means could be used to provide the results to the end user.

The IS-95 and J-STD-008 CDMA specifications require that BSs should be synchronized to within +/−3 microseconds of CDMA system time and shall be synchronized to within +/−10 microseconds. This invention disclosure method assumes the cost of GPS receivers is relatively small, thus time calibration at a more precise calibration level at each location BS is recommended to be used by using the very accurate GPS time parameters. Preferably the absolute error deviation among surrounding or neighboring base stations should be less than 800 nanoseconds, however in most cases this should not be a fixed requirement, but rather a preference. In cases where absolute BS timing is prohibitively expensive, then the "Forced Hand-off" method discussed below can be used to overcome the preferred, or strict absolute BS timing requirements.

Three methods have been currently identified. Some of these techniques apply to other air interface types as well.
1. Use the first finger at BS (Absolute Ranging), and if detectable, invoke a "Forced Hand-off" between the mobile station and a neighboring BS, for a time sufficient to complete signal measurements between a mobile station transmitter and a BS receiver, and if possible, between a BS transmitter and a mobile station receiver, which gives access to as many BS's as can be detected either by the mobile station receiver or the surrounding BS receivers.

2. Use the first finger at mobile station (Differential Ranging) to obtain differential time readings of pilot channel from mobile station
3. Use the Pilot Power Level Measurements and Ground Clutter (Stochastic information) Now in the general case where three or more BSs can either determine TDOA and/or the mobile station can telemeter such data to the location entity within the network, repeat this method for $BS_2$ and $BS_3$, and $BS_3$ and $BS_1$, in order to determine the remaining curves, thus yielding location within a 2D space. In the case of 3D geometry (such as a multi-story building with multi-floor pico BS cells), the process must be repeated a fourth time in order to determine altitude.

MATLAB MathWorks code to implement the above algorithms follows:

```
clear;hold off;
j=sqrt(-1);
step_size=0.03;
# Set up BS variables
theta=pi/3*ones(3,1);
D=10*ones(3,1);
z(1)=0;
z(2)=D(1);
z(3)=D(3)*exp(-j*theta(1));
# Define the distance parameters
d=[0 6.4-6.8];
location1=[];
location2=[];
location3=[];
# Iterate and solve for the location with respect to the first
BS (at (0,0))
t2=-pi:0.05:0.05;
for t1=-pi/3:0.05:0.05,
t1=t1+0.001;
r1=1./(exp(j*t1)-exp(j*t2)).*(D(1)-d(1)*exp(j*t2));
r2=1./(exp(j*t1)-exp(j*t2)).*(D(1)-d(1)*exp(j*t1));
temp=arg(r1);
index find(abs(temp)=min(abs(temp)));
location1=[location1;r1(index)*exp(j*t1)];
end;
for t1=-pi/3:0.05:0.05
t1=t1+0.001;
r1=1./(exp(j*t1)-exp(j*t2)).*(D(1)-d(1)*exp(j*t2));
r2=1./(exp(j*t1)-exp(j*t2)).*(D(1)-d(1)*exp(j*t1));
temp=arg(r1);
index=find(abs(temp)=min(abs(temp)));
location2=[location2;r1(index)*exp(j*t1)];
end;
for t1=-pi/3:0.05:0.05
t1=t1+0.001;
r1=1./(exp(j*t1)-exp(j*t2)).*(D(1)-d(1)*exp(j*t2));
r2=1./(exp(j*t1)-exp(j*t2)).*(D(1)-d(1)*exp(j*t1));
temp=arg(r1);
index=find(abs(temp)=min(abs(temp)));
location2=[location2;r1(index)*exp(j*t1)];
end;
location2=location2*exp(j*arg(z(3)-z(2)))+z(2);
location3=location3*exp(j*arg(z(1)-z(3)))+z(3);
set yrange [-10:1];
set xrange [-1:11];
plot([z;z(1)])
hold on
plot(location1)
plot(location2)
plot(location3)
```

Wireless Location Data Collection

It is worthwhile to discuss techniques for both obtaining the initial collection of verified location data, as well as how additional location data can be obtained for updating the data in this data base in a straightforward cost-effective manner.

Regarding both the obtaining of the initial collection of verified location data as well as gathering data updates, it is believed that some of this data can be obtained from the initial and continued engineering of the base station infrastructure by the wireless telephony service provider(s) in the radio coverage area. Additional verified location data can be obtained by trained technicians driving and/or walking certain areas and periodically, at each of a plurality of locations: (a) determining a location estimate (using, for example, GPS if possible and/or offsets from GPS readings); and (b) using an mobile station 140 at the location to generate location data communication with the wireless base station infrastructure.

Alternatively, it is a novel aspect of the present invention that a straightforward method and system for gathering verified location data has been discovered, wherein a conventional mobile station 140 can be used without any additional electronics or circuit modifications. One embodiment of this method and system utilizes the personnel of businesses that travel predetermined routes through the radio coverage area (e.g., a delivery and/or pickup service) to generate such data using a conventional mobile station 140 while traversing their routes through the radio coverage area. One example of such personnel is the postal workers, and in particular, the mail carriers having predetermined (likely repetitive) routes for mail pickup and/or delivery at predetermined sites (denoted hereinafter as "mail pickup/delivery sites" or simply "mail sites"). By having such mail carriers each carry a conventional mobile station 140 and periodically generate location data communication with the wireless base station infrastructure at mail sites along their routes, additional verified location data can be added to a Location Data Base (not shown) cost effectively.

To describe how this can be performed, a brief description of further features available in a typical mobile station 140 is needed. At least some modules of mobile station 140 have the following capabilities:

(27.2.1) a unique mobile station 140 identification number; in fact, every mobile station 140 must have such a number (its telephone number);

(27.2.2) the mobile station 140 has a display and a display memory for presenting stored data records having telephone numbers and related data to a user. Further, some portion of each data record is annotation and some portion is able to be transmitted to the wireless base station network. In particular, the mobile station 140 is able to store and recall data records of sufficient size such that each data record may include the following information for a corresponding mail pickup/delivery site along a mail route: (a) an address or other textual description data (e.g., an English-like description) of the mail pickup/delivery site; (b) a predetermined telephone number; and (c) a numerical code (denoted the "site code" hereinafter) associated with the mail pickup/delivery site, wherein the site code is at least unique within a set of site codes corresponding to the mail sites on the mail route. In one embodiment, the memory may store 99 or more such data records, and the display is scrollable through the data records;

(27.2.3) the mobile station 140 can have its display memory updated from either an RS232 port residing on the mobile station, or from an over-the-air activation capability of the wireless network;

(27.2.4) the mobile station 140 has a pause feature, wherein a telephone number can be dialed, and after some predetermined number of seconds, additional predetermined data can be transmitted either through additional explicit user request (e.g., a "hard pause"), or automatically (e.g., a "soft pause"). Moreover, the additional predetermined data can reside in the display memory.

Assuming these features, the following steps can be performed for acquiring additional verified location data:

(27.3.1) For (at least some of the) postal carriers having predetermined routes of addresses or locations visited, the postal carriers are each provided with an mobile station 140 having the capabilities described in (27.2.1) through (27.2.4) above, wherein the memory in each provided mobile station has a corresponding list of data records for the addresses visited on the route of the postal carrier having the mobile station. Moreover, each such list has the data records in the same sequence as the postal carrier visits the corresponding mail sites, and each data record includes the information as in (27.2.2) for a corresponding mail site the postal carrier visits on his/her mail route. More precisely, each of the data records has: (a) a description of the address or location of its corresponding mail pickup/delivery site, (b) a telephone number for dialing a data collection system for the location center 142 (or, alternatively, a reference to a memory area in the mobile station having this telephone number since it is likely to be the same number for most data records), and (c) a site code for the mail pickup/delivery site that is to be transmitted after a predetermined soft pause time-out. Note that the corresponding list of data records for a particular postal route may be downloaded from, for example, a computer at a post office (via the RS232 port of the mobile station 140), or alternatively, the list may be provided to the mobile station 140 by an over-the-air activation. Further, there are various embodiments of over-the-air activation that may be utilized by the present invention. In one embodiment, the postal carrier dials a particular telephone number associated with data collection system and identifies both him/herself by his/her personal identification number (PIN), and the postal route (via a route identifying code). Subsequently, the mail pickup and delivery sites along the identified route are downloaded into the memory of the mobile station 140 via wireless signals to the mobile station 140. However, additional over-the-air techniques are also within the scope of the present invention such as:

(a) If the postal carrier's route is already associated with the carrier's PI for over-the-air activation, then the carrier may only need to enter his/her PIN.

(b) If the mobile station 140 is already associated with a particular route, then the carrier may only need to activate the mobile station 140, or alternatively, enter his/her PIN for obtaining an over-the-air download of the route.

(c) Regardless of how the initial download of mail sites is provided to the mobile station 140, it is also an aspect of the present invention that if there are more mail sites on a route than there is sufficient memory to store corresponding data records in the mobile station, then the data records may be downloaded in successive segments. For example, if there are 150 mail sites on a particular route and storage for only 99 data records in the mobile station, then in one embodiment, a first segment of 98 data records for the first 98 mail pickup/delivery sites on the route are downloaded together with a $99^{th}$ data record for transmitting an encoding requesting a download of the next 52 data records for the remaining mail sites. (Alternatively, the data collection system may monitor mobile station 140 requests and automatically detect the last location capture request of a downloaded segment, and subsequently automatically download the next segment of mail site data records). Accordingly, when the data records of the first segment have been utilized, a second segment may be downloaded into the mobile station 140. Moreover, at the end of the last segment, the data collection system may cause the first segment for the route to be automatically downloaded into the mobile station 140 in preparation for the next traversal of the route.

(27.3.2) Given that a download into the mobile station 140 of (at least a portion of) the data for a postal route has occurred, the postal carrier traversing the route then iteratively scrolls to the next data record on the list stored in the mobile station as he/she visits each corresponding mail pickup/delivery site, and activates the corresponding data record. That is, the following steps are performed at each mail pickup/delivery site:

(a) As the postal carrier arrives at each mail pickup/delivery site, he or she checks the scrollable mobile station 140 display to assure that the address or location of the mail pickup/delivery site is described by the data record in the portion of the mobile station display for activating associated data record instructions.

(b) The postal carrier then merely presses a button (typically a "send" button) on the mobile station 140 for concurrently dialing the telephone number of the data collection system, and initiating the timer for the soft pause (in the mobile station 140) associated with the site code for the mail pickup/delivery site currently being visited.

(c) Given that the soft pause is of sufficient length to allow for the data collection system call to be setup, the mobile station 140 then transmits the site code for the present mail pickup/delivery site.

(d) Upon receiving the telephone number of the mobile station 140 (via automatic number identification (AIN)), and the site code, the data collection system then performs the following steps:

(d1) A retrieval of an identifier identifying the route (route id). Note this may be accomplished by using the telephone number of the mobile station. That is, when the data collection system first detects that the mobile station 140 is to be used on a particular route, the telephone number of the mobile station and the route id may be associated in a data base so that the route id can be retrieved using the telephone number of the mobile station. .

(d2) A retrieval of a location representation (e.g., latitude, longitude, and possibly height) of the mail pickup/delivery site identified by the combination of the route id and the site code is performed by accessing a data base having, for each mail site, the following associated data items: the route id for the mail site, the site code, the mail site address (or location description), and the mail site location representation (e.g., latitude, longitude, possibly height).

(d3) A request to the location center 142 is issued indicating that the location data for the mobile station 140 (resulting from, e.g., the call being maintained between the mobile station and the data collection system) is to be retrieved from the wireless network, temporarily saved, and a location estimate for the mobile station is to be performed. Accordingly, the data collection system request to the location center 142 the following:

(i) the telephone number of the mobile station 140;
(ii) the retrieved location of the mobile station 140 according to the route id and site code,
(iii) a request for the location center 142 to perform a location estimate on the mobile station 140 and return the location estimate to the data collection system;
(iv) a request that the location center 142 retain the location for the mobile station 140 and associate with it the location of the mobile station 140 received from the data collection system.

Regarding step (iii), the location estimate may also include the steps temporarily increasing the mobile station transmitter power level (27.3.3) Subsequently, given that the location center 142 performs as requested, when the data collection system receives the mobile station 140 location estimate from the location center, the data collection system first associates the returned mobile station location estimate with the corresponding data collection system information regarding the mobile station, and secondly, performs "reasonability" tests on the information received from the mobile station 140 for detecting, filtering and/or alerting systems and personnel whenever the postal carrier appears to be transmitting (via the mobile station 140) from a location different from what the route id and site code indicate. The following are examples of such reasonability tests:

(a) If a threshold number of postal carrier transmittals disagree with the location center 142 estimate by a predetermined distance (likely dependent upon area type), then tag these particular transmittals as problematic and mark all transmittals from the mobile station 140 as suspect for "distance" inaccuracies.

(b) If there is less than a threshold amount of time between certain postal carrier transmittals, then tag these particular transmittals as problematic and mark all transmittals from the mobile station 140 as suspect for "time" inaccuracies.

(c) If an expected statistical deviation between a sampling of the postal carrier transmittals and the location estimates from the location center 142 vary by more than a threshold amount, then tag these particular transmittals as problematic and mark all transmittals from the mobile station 140 as suspect for "statistical" inaccuracies.

(d) If an expected statistical deviation between a sampling of the times of the postal carrier transmittals and an expected timing between these transmittals vary by more than a threshold amount, then tag these particular transmittals as problematic and mark all transmittals from the mobile station 140 as suspect for "statistical" inaccuracies.

(27.3.4) When suspect or problematic mobile station location information is detected (e.g., incorrect site code) in step (27.3.3), the data collection system may perform any of the following actions:

(a) Alert the postal carrier of problematic and/or suspected inaccuracies in real time, after a certain number of transmittals or at a later time. Note that such alerts as well as positive feedback at the end of the postal carrier's route (or segments thereof) may be advantageous in that it likely inhibits the postal carrier from experimenting with transmittals from locations that are purposefully inaccurate, but at the same time provides sufficiently timely feedback to encourage a conscientious postal carrier.

(b) Alert the Postal Service of perceived discrepancies in the mobile station 140 transmittals by the postal carrier.

(c) Dispatch location center technicians to the area to transmit duplicate signals.

(27.3.5) If the transmittal(s) from the mobile station 140 are not suspect, then the data collection system communicates with the location center 142 for requesting that each location received from the mobile station 140 be stored with its corresponding retrieved location (obtained in step (d2)) as a verified location value in the Location Data Base (not shown). Alternatively, if the transmittals from the mobile station 140 are suspect, then the data collection system may communicate with the location center 142 for requesting that at least some of the location data from the mobile station 140 be discarded.

Note that a similar or identical procedure to the steps immediately above may be applied with other services/workers such as courier services, delivery services, meter readers, street sweepers, and bus drivers having predetermined routes.

Additional Modules to Increase Location Hypothesis Accuracy

The following modules may be provided in various embodiments of the present invention, and in particular, as part of the location engine 139. Further modules and description directed to the location center 142 and its functionality, the location engine 139, various location enhancing techniques, and various additional embodiments are provided in U.S. Provisional Patent Application having Ser. No. 60/044,821, filed Apr. 25, 1997, by Dupray, Karr, and LeBlanc from which the present application claims priority, and which is fully incorporated herein by reference.

Path Comparison Module

The Path Comparison Module implements the following strategy: the confidence of a particular location hypothesis is be increased (decreased) if it is (not) predicting a path that lies along a known transportation pathway (and the speed of the target MS is sufficiently high). For instance, if a time series of target MS location hypotheses for a given FOM is predicting a path of the target MS that lies along an interstate highway, the confidence of the currently active location hypothesis for this FOM should, in general, be increased. Thus, at a high level the following steps may be performed:

(a) For each FOM having a currently active location hypothesis in a Run-time Location Hypothesis Storage Area, determine a recent "path" obtained from a time series of location hypotheses for the FOM. This computation for the "path" is performed by stringing together successive "center of area" (COA) or centroid values determined from the most pertinent target MS location estimate in each location hypothesis (recall that each location hypothesis may have a plurality of target MS area estimates with one being the most pertinent). The information is stored in, for example, a matrix of values wherein one dimension of the matrix identifies the FOM and the a second dimension of the matrix represents a series of COA path values. Of course, some entries in the matrix may be undefined.

(b) Compare each path obtained in (a) against known transportation pathways in an area containing the path.

A value, path_match(i), representing to what extent the path matches any known transportation pathway is computed. Such values are used later in a computation for adjusting the confidence of each corresponding currently active location hypothesis.

Velocity/Acceleration Calculation Module

The Velocity/Acceleration Calculation Module computes velocity and/or acceleration estimates for the target MS using currently active location hypotheses and previous location hypothesis estimates of the target MS. In one embodiment, for each FOM having a currently active location hypothesis (with positive confidences) and a sufficient number of previous (reasonably recent) target MS location hypotheses, a velocity and/or acceleration may be calculated. In an alternative embodiment, such a velocity and/or acceleration may be calculated using the currently active location hypotheses and one or more recent "most likely" locations of the target MS output by the Location Center. If the estimated velocity and/or acceleration corresponding to a currently active location hypothesis is reasonable for the region, then its confidence value is incremented; if not, then its confidence is decremented. The algorithm may be summarized as follows:

(a) Approximate speed and/or acceleration estimates for currently active target MS location hypotheses may be provided using path information related to the currently active location hypotheses and previous target MS location estimates in a manner similar to the description of the Path Comparison Module. Accordingly, a single confidence adjustment number may be determined for each currently active location hypothesis for indicating the extent to which its corresponding velocity and/or acceleration calculations are reasonable for its particular target MS location estimate. This calculation is performed by retrieving information from an Area Characteristics Data Base. Since each location hypothesis includes timestamp data indicating when the MS location signals were received from the target MS, the velocity and/or acceleration associated with a path for a currently active location hypothesis can be straightforwardly approximated. Accordingly, a confidence adjustment value, vel_ok(i), indicating a likelihood that the velocity calculated for the $i^{th}$ currently active location hypothesis (having adequate corresponding path information) may be appropriate for the environmental characteristics of the location hypothesis' target MS location estimate. Thus, if the target MS location estimate includes a portion of an interstate highway, then an appropriate velocity might correspond to a speed of up to 100 miles per hour, whereas if the target MS location estimate includes only rural dirt roads and tomato patches, then a likely speed might be no more than 30 miles per hour with an maximum speed of 60 miles per hour (assuming favorable environmental characteristics such as weather). Note that a list of such environmental characteristics may include such factors as: area type, time of day, season. Further note that more unpredictable environmental characteristics such as traffic flow patterns, weather (e.g., clear, raining, snowing, etc.) may also be included, values for these latter characteristics coming from an Environmental Data Base which receives and maintains information on such unpredictable characteristics. Also note that a similar confidence adjustment value, acc_ok(i), ray be provided for currently active location hypotheses, wherein the confidence adjustment is related to the appropriateness of the acceleration estimate of the target MS.

Attribute Comparison Module

The Attribute Comparison Module compares attribute values for location hypotheses generated from different FOMs, and determines if the confidence of certain of the currently active location hypotheses should be increased due to a similarity in related values for the attribute. That is, for an attribute A, an attribute value for A derived from a set $S_{FOM[1]}$ of one or more location hypotheses generated by one FOM, FOM[1], is compared with another attribute value for A derived from a set $S_{FOM2}$ of one or more location hypotheses generated by a different FOM, FOM[2] for determining if these attribute values cluster (i.e., are sufficiently close to one another) so that a currently active location hypothesis in $S_{FOM[1]}$ and a currently active location hypothesis in $S_{FOM2}$ should have their confidences increased. For example, the attribute may be a "target MS path data" attribute, wherein a value for the attribute is an estimated target MS path derived from location hypotheses generated by a fixed FOM over some (recent) time period. Alternatively, the attribute might be, for example, one of a velocity and/or acceleration, wherein a value for the attribute is a velocity and/or acceleration derived from location hypotheses generated by a fixed FOM over some (recent) time period.

In a general context, the Attribute Comparison Module operates according to the following premise:

(37.1) for each of two or more currently active location hypotheses (with positive confidences) if (a) each of these currently active location hypotheses, K was initially generated by a corresponding different $FOM_H$;

(b) for a given MS estimate attribute and each such currently active location hypothesis, H, there is a corresponding value for the attribute (e.g., the attribute value might be an MS path estimate, or alternatively an MS estimated velocity, or an MS estimated acceleration) wherein the attribute value is derived without using a FOM different from $FOM_H$, and;

(c) the derived attribute values cluster sufficiently well, then each of these currently active location hypotheses, H, will have their corresponding confidences increased. That is, these confidences will be increased by a confidence adjustment value or delta.

Note that the phrase "cluster sufficiently well" above may have a number of technical embodiments, including performing various cluster analysis techniques wherein any clusters (according to some statistic) must satisfy a system set threshold for the members of the cluster being close enough to one another. Further, upon determining the (any) location hypotheses satisfying (37.1), there are various techniques that may be used in determining a change or delta in confidences to be applied. For example, in one embodiment, an initial default confidence delta that may be utilized is: if "cf" denotes the confidence of such a currently active location hypothesis satisfying (37.1), then an increased confidence that still remains in the interval [0, 1.0] may be: $cf+[(1-cf)/(1+cf)]^2$, or, $cf*[1.0+cf_n]$, n.=>2, or, cf*[a constant having a system tuned parameter as a factor]. That is, the confidence deltas for these examples are: $[(1-cf)/(1+cf)]^2$ (an additive delta, and, $[1.0+cf^n]$ (a multiplicative delta), and a constant. Additionally, note that it is within the scope of the present invention to also provide such confidence deltas (additive deltas or multiplicative deltas) with factors related to the number of such location hypotheses in the cluster.

Moreover, note that it is an aspect of the present invention to provide an adaptive mechanism for automatically determining performance enhancing changes in confidence adjustment values such as the confidence deltas for the present module. That is, such changes are determined by applying an adaptive mechanism, such as a genetic algorithm, to a collection of "system parameters" (including parameters specifying confidence adjustment values as well as system parameters) in order to enhance performance of the present invention. More particularly, such an adaptive mechanism may repeatedly perform the following steps:

(a) modify such system parameters;

(b) consequently activate an insantiation of the Location Center (having the modified system parameters) to process, as input, a series of MS signal location data that has been archived together with data corresponding to a verified MS location from which signal location data was transmitted (e.g., such data as is stored in a Data Base); and (c) then determine if the modifications to the system parameters enhanced Location Center performance in comparison to previous performances.

Assuming this module adjusts confidences of currently active location hypotheses according to one or more of the attributes: target MS path data, target MS velocity, and target MS acceleration, the computation for this module may be summarized in the following steps:

(a) Determine if any of the currently active location hypotheses satisfy the premise (37.1) for is the attribute. Note that in making this determination, average distances and average standard deviations for the paths (velocities and/or accelerations) corresponding to currently active location hypotheses may be computed.

(b) For each currently active location hypothesis (wherein "i" uniquely identifies the location hypothesis) selected to have its confidence increased, a confidence adjustment value, path_similar(i) (alternatively, velocity_similar(i) and/or acceleration_similar(i)), is computed indicating the extent to which the attribute value matches another attribute value being predicted by another FOM.

Note that such confidence adjustment values are used later in the calculation of an aggregate confidence adjustment to particular currently active location hypotheses.

Extrapolation Module

The Extrapolation Module works on the following premise: if for a currently active location hypothesis there is sufficient previous related information regarding estimates of the target MS (e.g., from the same FOM or from using a "most likely" previous target MS estimate output by the Location Center), then an extrapolation may be performed for predicting future target MS locations that can be compared with new location hypotheses.

Note that interpolation routines (e.g., conventional algorithms such as Lagrange or Newton polynomials) may be used to determine an equation that approximates a target MS path corresponding to a currently active location hypothesis.

Subsequently, such an extrapolation equation may be used to compute a future target MS location. For further information regarding such interpolation schemes, the following reference is incorporated herein by reference: Mathews, 1992, Numerical methods for mathematics, science, and engineering. Englewood Cliffs, N.J.: Prentice Hall.

Accordingly, if a new currently active location hypothesis is received, then the target MS location estimate of the new location hypothesis may be compared with the predicted location. Consequently, a confidence adjustment value can be determined according to how well if the location hypothesis "i". That is, this confidence adjustment value will be larger as the new MS estimate and the predicted estimate become closer together.

Note that in one embodiment of the present invention, such predictions are based solely on previous target MS location estimates output by Location Center. Thus, in such an embodiment, substantially every currently active location hypothesis can be provided with a confidence adjustment value by this module once a sufficient number of previous target MS location estimates have been output. Accordingly, a value, extrapolation_chk(i), that represents how accurately the new currently active location hypothesis (identified here by "i") matches the predicted location is determined.

Analytical Reasoner Controller

Given one or more currently active location hypotheses for the same target MS input to a controller (denoted the Analytical Reasoner Controller herein), this controller activates, for each such input location hypothesis, the other submodules (denoted hereinafter as "adjustment submodules") with this location hypothesis. Subsequently, the Analytical Reasoner Controller receives an output confidence adjustment value computed by each adjustment submodule for adjusting the confidence of this location hypothesis. Note that each adjustment submodule determines:

(a) whether the adjustment submodule may appropriately compute a confidence adjustment value for the location hypothesis supplied by the controller. (or example, in some cases there may not be a sufficient number of location hypotheses in a time series from a fixed FOM.);

(b) if appropriate, then the adjustment submodule computes a non-zero confidence adjustment value that is returned to the Analytical Reasoner Controller.

Subsequently, the controller uses the output from the adjustment submodules to compute an aggregate confidence adjustment for the corresponding location hypothesis. In one particular embodiment of the present invention, values for the eight types of confidence adjustment values (described in sections above) are output to the present controller for computing an aggregate confidence adjustment value for adjusting the confidence of the currently active location hypothesis presently being analyzed. As an example of how such confidence adjustment values may be utilized, assuming a currently active location hypothesis is identified by "i", the outputs from the above described adjustment submodules may be more fully described as:

| | | |
|---|---|---|
| path_match(i) | 1 | if there are sufficient previous (and recent) location hypotheses for the same target MS as "i" that have been generated by the same FOM that generated "i", and, the target MS location estimates provided by the location hypothesis "i" and the previous location hypotheses follow a known transportation pathway. |
| | 0 | otherwise. |
| vel_ok(i) | 1 | if the velocity calculated for the $i^{th}$ currently active location hypothesis (assuming adequate corresponding path information) is typical for the area (and the current environmental characteristics) of this location hypothesis' target MS location estimate; |
| | 0.2 | if the velocity calculated for the $i^{th}$ currently |

-continued

| | | |
|---|---|---|
| | | active location hypothesis is near a maximum for the area (and the current environmental characteristics) of this location hypothesis' target MS location estimate; |
| | 0 | if the velocity calculated is above the maximum. |
| acc_ok(i) | 1 | if the acceleration calculated for the $i^{th}$ currently active location hypothesis (assuming adequate corresponding path information) is typical for the area (and the current environmental characteristics) of this location hypothesis' target MS location estimate; |
| | 0.2 | if the acceleration calculated for the $i^{th}$ currently active location hypothesis is near a maximum for the area (and the current environmental characteristics) of this location hypothesis' target MS location estimate; |
| | 0 | if the acceleration calculated is above the maximum. |
| similar_path(i) | 1 | if the location hypothesis "i" satisfies (37.1) for the target MS path data attribute; |
| | 0 | otherwise. |
| velocity_similar(i) | 1 | if the location hypothesis "i" satisfies (37.1) for the target MS velocity attribute; |
| | 0 | otherwise. |
| acceleration_similar(i) | 1 | if the location hypothesis "i" satisfies (37.1) for the target MS acceleration attribute; |
| | 0 | otherwise. |
| extrapolation_chk(i) | 1 | if the location hypothesis "i" is "near" a previously predicted MS location for the target MS; |
| | 0 | otherwise. |

Additionally, for each of the above confidence adjustments, there is a corresponding Location Center system settable parameter whose value may be determined by repeated activation of an Adaptation Engine. Accordingly, for each of the confidence adjustment types, T, above, there is a corresponding system settable parameter, "alpha_T", that is tunable by the Adaptation Engine. Accordingly, the following high level program segment illustrates the aggregate confidence adjustment value computed by the Analytical Reasoner Controller.

```
target_MS_loc_hyps ← get all currently active location hypotheses, H, identifying the
                present target;
    for each currently active location hypothesis, hyp(i), from target_MS_loc_hyps do
    {
        for each of the confidence adjustment submodules, CA, do
            activate CA with hyp(i) as input;
/* now compute the aggregate confidence adjustment using the output from the
    confidence adjustment submodules. */
        aggregate_adjustment(i) ← alpha_path_match * path_match(i)
                    + alpha_velocity * vel_ok(i)
                    + alpha_path_similar * path_similar(i)
                    + alpha_velocity_similar * velocity_similar(i)
                    + alpha_acceleration_similar * acceleration_similar(i)
                    + alpha_extrapolation * extrapolation_chk(i);
        hyp(i).confidence ← hyp(i).confidence + aggregate_adjustment(i);
    }
```

Wireless Location Applications

After having determined wireless location from a base technology perspective, several applications are detailed below, which provide the results of the location information to a variety of users in various channels and presentation schemes, for a number of useful reasons and under various conditions. The following applications are addressed: (1.) providing wireless location to the originator or another, using either the digital air interface voice channel or a wireline channel, and an automatic call distributor; (2.) providing wireless location to the originator, or another, using either the digital air interface voice channel or a wireline channel, and a hunt group associated with the central office or a PBS group; (3.) providing wireless location to the originator or another, using either the digital air interface text paging, or short message service communications channel; (4.) providing wireless location to the originator or another, using the Internet, and in one embodiment, using netcasting or "Push" technology; (5.) selective group, multicast individualized directions with optional Conferencing; (6.) rental car inventory control and dispatch; (7.) vocalized directions and tracking; (8.) wireless location and court ruling/criminal incarceration validation; (9.) flexible delivery of wireless location information to public safety answering points; (10.) trigger-based inventory and tracking; (11.) group, e.g., family, safety and conditional notification; (12.) wireless location-based retail/merchandising services; (13.) location-based home/office/vehicle security management; (13.) infrastructure-supported wireless location using hand-actuated directional finding; (14.) infrastructure-supported intelligent traffic and highway management; (15.) Parametric-driven intelligent agent-based location services. Each of these wireless location applications is discussed in detail below.

Providing Wireless Location Using an ACD Application

Figure 36:
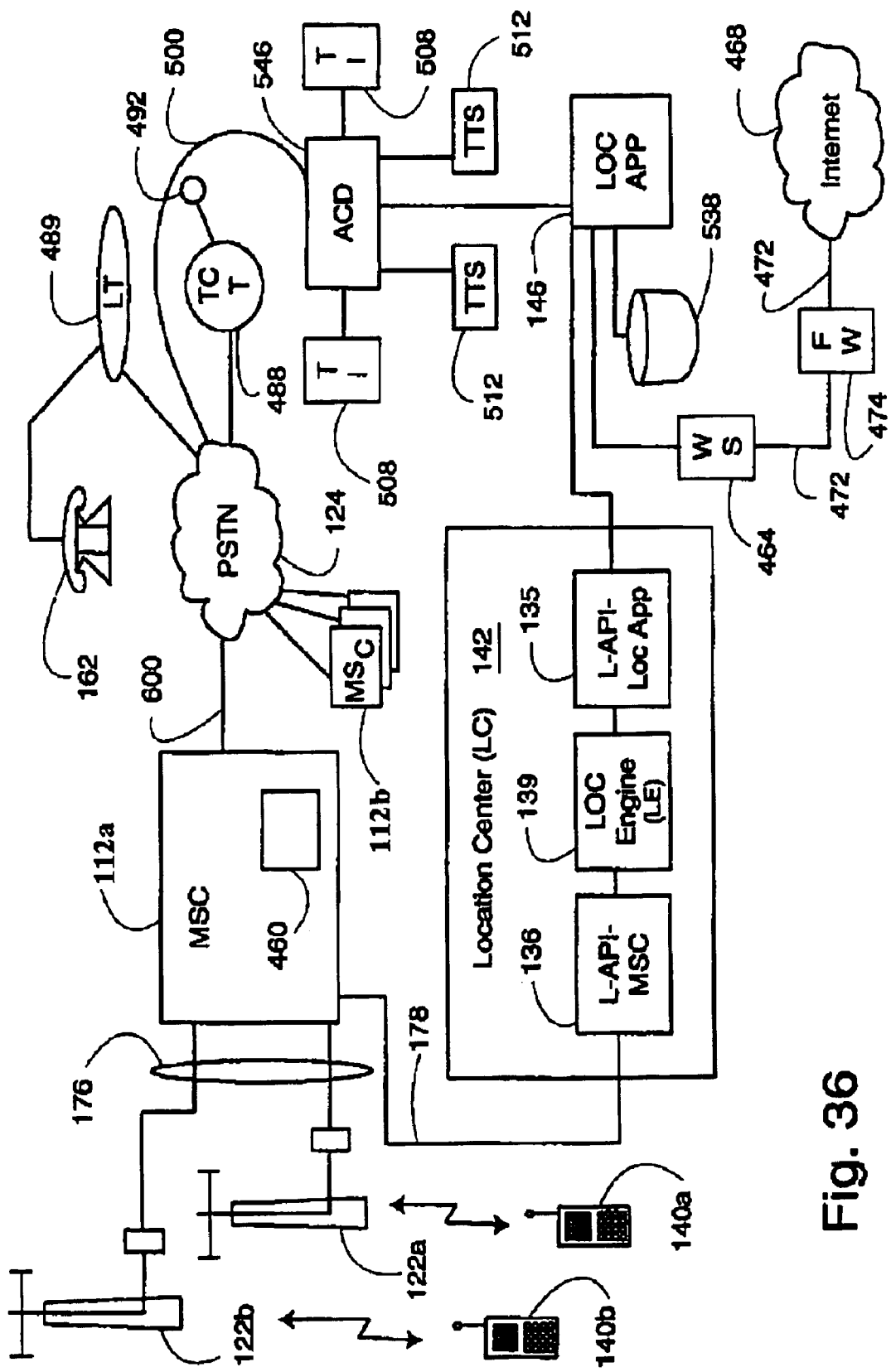
FIG. 36 illustrates how location estimates can be provided using voice channel connections via an ACD and Internet technology.

Referring to FIG. 36, a user (the initiating caller) desiring the location of a target mobile station 140a, such as a user at a telephone station 162 which is in communication with a tandem switch 489 or a user of an mobile station 140b, or any other telephone station user, such as a computer program, dials a publicly dialable telephone number which terminates on the automatic call distributor 546 (ACD), associated with the location center 142. If the caller originated the call from a mobile station 140b, then the call is processed via a base station 122b to a mobile switch center 112a. The mobile switch center 112a recognizes that the call is to be routed to the PSTN 124 via an interoffice trunk interface 600. The PSTN 124 completes the call to the ACD 546, via a trunk group interface 500. Note that the initiating caller could access the ACD 546 in any number of ways, including various Inter-LATA Carriers 492, via the public switched telephone network (PSTN) 124. The ACD 546 includes a plurality of telephone network interface cards 508 which provide telephony channel associated signaling functions, such as pulse dialing and detection, automatic number identification, winking, flash, off-hook voice synthesized answer, dual tone multi frequency (DTMF)

detection, system intercept tones (i.e., busy, no-answer, out-of-service), disconnected, call progress, answer machine detection, text-to-speech and automatic speech recognition. Note that some of these functions may be implemented with associated digital signal processing cards connected to the network cards via an internal bus system. An assigned telephone network interface card 508 detects the incoming call, provides an off-hook (answer signal) to the calling party, then provides a text to speech (TTS) message, via an assigned text-to-speech card 512 indicating the nature of the call to the user, collects the automatic number identification information if available (or optionally prompts the caller for this information), then proceeds to collect the mobile identification number (MIN) to be located. MIN collection, which is provided by the initiating caller through keypad signaling tones, can be achieved in several methods. In one case the network card 508 can request a TTS message via text-to-speech card 512, which prompts the initiator to key in the MIN number by keypad DTMF signals, or an automatic speech recognition system can be used to collect the MIN digits. After the MIN digits have been collected, a location request message is sent to a location application 146. The location application 146, in concert with location application interface 14 (more particularly, L-API-Loc 135, see FIG. 36 ), in the location system 142, is in communication with the location engine 139. Note that the location engine 139 includes the signal processing subsystem 20, and one or more location estimate modules, i.e., DA module 10, TOA/TDOA module 8 or HBS module 6. The location engine 139 initiates a series of messages, using the location application programming interface (L-API-MSC 136) to the mobile switch center 112*a*. The location application programming interface 136 then communicates with one or more mobile switch centers 112*b*, to determine whether or not the mobile station 140*a* to be located can be located. Conditions affecting the locateability of the mobile station 140*a* include, for example: the mobile station 140*a* being powered off, the mobile station 140*a* not being in communication range, the mobile station 140*a* roaming state not being known, the mobile station 140*a* not being provisioned for service, and related conditions. If the mobile station 140*a* cannot be located then an appropriate error response message is provided to the initiating caller, via e-mail, using the web server 464 in communications with the Internet 468 via an Internet access channel 472 or alternatively the error response message may be sent to a text to speech card 512, which is in communications with the initiating caller via the telephone interface card 508 and the ACD 546, which is in communication via telephony interface circuits 500 to the PSTN 124.

Note that in cases where rendering location estimate information is required on the Internet, the web server 464 can include the provision of a digital certificate key, thus enabling a secure, encrypted communication channel between the location web server 464 and the receiving client. One such digital encryption key capability is a web server provided by Netscape Communications, Inc. and a digital certificate key provided by Verisign, Inc. both located in the state of California, U.S.A.

The PSTN 124 completes routing of the response message to the initiating caller via routine telephony principles, as one skilled in the art will understand. Otherwise the mobile station 140*a* is located using methods described in greater detail elsewhere herein. At a high level, the mobile switch center 112*a* is in communication with the appropriate base stations 122, and provides the location system 142 with the necessary signal and data results to enable a location estimation to be performed by the location engine 139. Once the location has been determined by the location engine 139 in terms of Latitude, Longitude and optionally height if known (in the form of a text string), the result is provided by to the initiator by inputting the location text string to a text-to-speech card 512, which in turn is in communication with the assigned telephone interface card 508, via the automatic control distributor 546, for completing the communication path and providing the location response back to the initiating user via the telephone interface 500 to the PSTN 124, and from the PSTN 124 to the initiating user.

Alternatively the location results from the location application 146 (e.g., FIGS. 37 and 38) could be provided to the initiating caller or Internet user via a web server 464 in communication with the Internet 468, via an Internet access channel 472 and a firewall 474 (e.g., FIG. 36). In another embodiment, the location results determined by the location application 146 may be presented in terms of street addresses, neighborhood areas, building names, and related means familiar to human users. The alternative location result can be achieved by previously storing a relationship between location descriptors familiar to humans and Latitude and Longitude range values in a map database 538 (FIG. 36). During the location request, the location application 146 accesses the map database 538, providing it with the Latitude and Longitude information in the form of a primary key which is then used to retrieve the location descriptor familiar to humans. Note that to those skilled in the art, the map database 538 and associated messaging between the map database 538 and the location application 146 can be implemented in any number of techniques. A straightforward approach includes defining a logical and physical data model using a relational database and designer environment, such as "ORACLE 2000" for the design and development, using a relational database, such as the "ORACLE 7.3" database.

In an alternative embodiment, the location application 146 may be internal to the location system 142 (e.g. FIG. 37), as one skilled in the art will understand.

Providing Wireless Location via Hunt Groups Application

Figure 37:
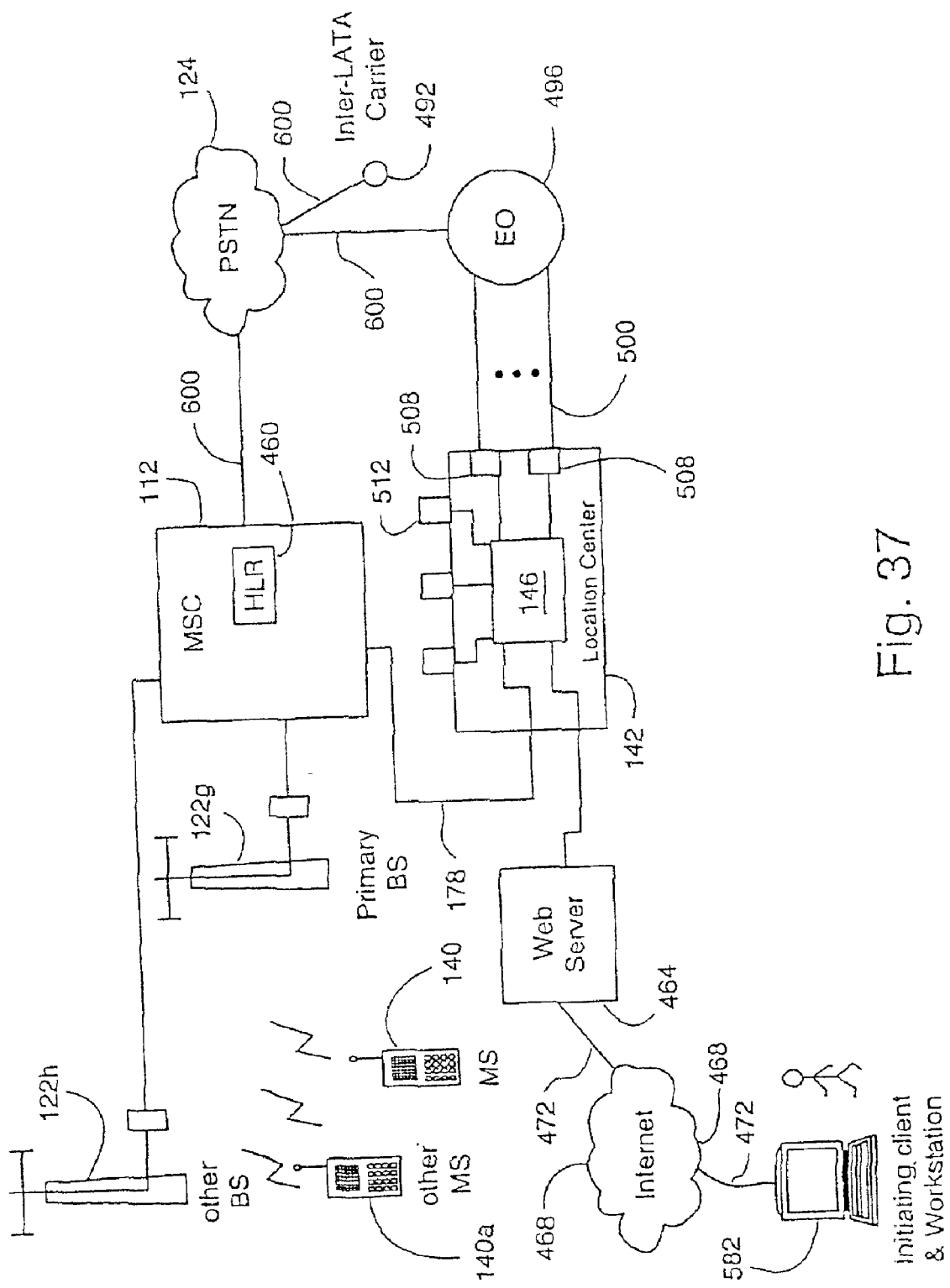
FIG. 37 shows wireless Location of a MS using the Voice Channel from a Hunt Group.
Figure 38:
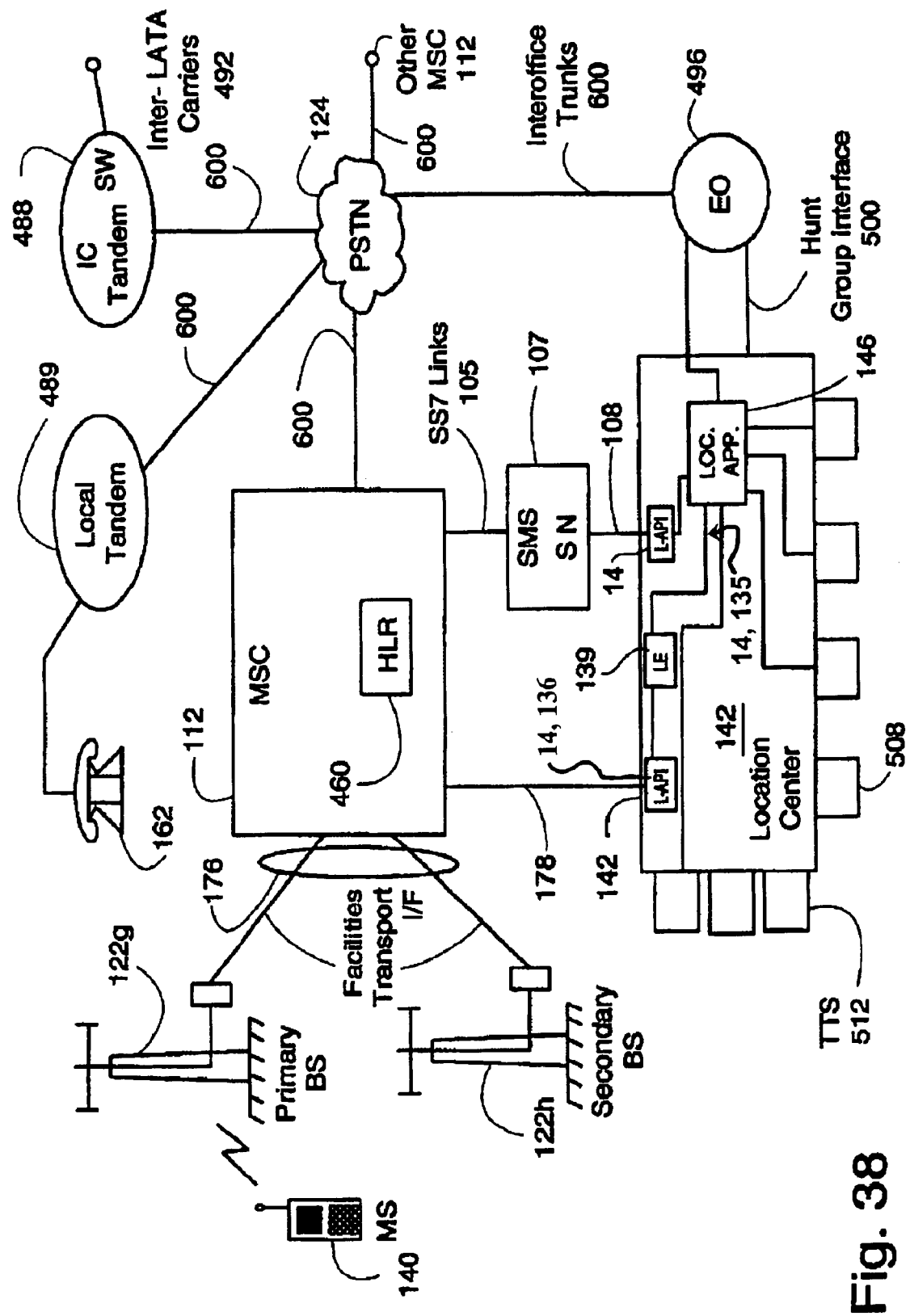
FIG. 38 illustrates how location information can be provided via Text paging or short message service messaging.

Referring to FIGS. 37 and 38, a user—the initiating caller, such as a mobile station 140*a* desiring the location of a mobile station 140, signals to the primary base station 122*g*, in connection with the mobile switch center 112 via transport facilities 176. The mobile switch center 112 is connected to the PSTN 124, via interoffice trunks 600. The initiating user dials a publicly dialable telephone number which is then routed through an end office 496, to a telephone interface card 508, via a telephone hunt group 500. The hunt group 500 provides a telephony connection to the interface card 247 associated with the location system 142. The hunt group trunk interface 500 is provided from an end office telephone switch 496. Note that the initiating caller could access the telephony interface card 508, via hunt group trunk interface 500 in any number of ways, including an InterLATA Carrier 492, via the public switched telephone network (PSTN) 124. The hunt group trunk interface 500 is in communication with a plurality of telephone interface cards 508. The interface cards 508 provide telephony channel associated signaling functions, such as pulse dialing and detection, automatic number identification, winking, flash, off-hook voice synthesized answer, dual tone multi frequency (DTMF) detection, system intercept tones (i.e., busy, no-answer, out-of-service), disconnected, call progress, answer machine detection, text-to-speech and automatic speech recognition. An assigned network interface card 508 detects the incoming call provides an off-hook (answer signal) to the calling party, then provides a text to speech (TTS) message indicating the nature of the call to the user, collects the automatic number identification information if available (or optionally prompts the caller for this information), then proceeds to collect the mobile identification number (MIN) to be located. MIN collection can be achieved in several methods. In one case the network card 508 can request a TTS message, generated by a voice synthesizer or text to speech card 512, which prompts the initiator to key in the MIN number by keypad tone signals, or an automatic speech recognition system can be used to collect the MIN digits. After the MIN digits have been collected, a location request message is sent to an application 146 in the location system 142. The application 146 in location system 142 initiates a series of messages to the mobile switch center 112, and optionally to the home location register 460, to determine whether or not the mobile station 140 to be located can be located. If the mobile station 140 cannot be located then an appropriate error response message is provided to the initiating caller, via e-mail, test to speech card 512, web server 464 in communications with the public Internet 468, or similar means. Alternatively the last known location can be provided, along with the time and date stamp of the last location, including an explanation that the current location is not attainable. Otherwise the mobile station 140 is located using methods described in greater detail elsewhere in this patent. At a high level, the mobile switch center 112 is in communication with the appropriate base stations 122g and 122h, and provides the location system 142 with the necessary signal and data results to enable a location estimation to be performed by the location system 142. Once the location has been determined by the location system 142 in terms of Latitude, Longitude and optionally height if known (in the form of a text string), the result is provided back to the initiator by inputting the location text string to a text-to-speech card 512, in communication with the assigned telephone interface card 508. The interface card 508 then provides the audible, synthesized message containing the location estimate to the initiating caller. Alternatively the location results could be provided to the initiating caller via a web server 464 in communication with the Public Internet 468, using standard client request-response Internet protocols and technology location system 142 access to a geographical information system or other mapping system could also be used to further enhance the user understanding of the location on a map or similar graphical display.

Providing Wireless Location Via Text Paging Application

Referring to FIG. 38, a user (the initiating caller) desiring the location of an mobile station 140, such as a wireless user using mobile station 140 who has text paging service provisioned, dials a publicly dialable telephone number, carried to the PSTN 124 which terminates on an end office 496 based hunt group interface 500, which in turn is in communication with the location system 142. The mobile switch center 112, local tandem 317 and interLATA Carrier tandem 362 are in communication with the PSTN 124, as those skilled in the art will understand. Note that the initiating caller could also be a wireline user with an ordinary telephone station 162 in communication with a local tandem 489, connected to the PSTN 124. The initiating location request user could access the telephony interface cards 512 via the hunt group 500. In other embodiments, including various Inter-LATA Carriers 492, via the public switched telephone network (PSTN) 124. The hunt group interface 500 is in communication with a plurality of telephone network interface cards 512, which are in communication with the location application 146. The telephone interface cards 512 provide telephony channel associated signaling functions, such as pulse dialing and detection, automatic number identification, winking, flash, off-hook voice synthesized answer, dual tone multi frequency (DTMF) detection, system intercept tones (i.e., busy, no-answer, out-of-service), disconnected, call progress, answer machine detection, text-to-speech and automatic speech recognition. Note that some of these functions may be implemented with associated digital signal processing cards connected to the network cards via an internal bus system. An assigned telephony interface card 508 detects the incoming call, provides an off-hook (answer signal) to the calling party, then provides, if appropriate, a text to speech (TTS) message indicating the nature of the call to the user, collects the automatic number identification information if available (or optionally prompts the caller for this information), then proceeds to collect the mobile identification number (MIN) to be located by sending a location request message to an application 146 in the location system 142. The mobile station MIN collection, provided through the communications channel established, is sent by the initiating caller through keypad signaling tones. This MIN collection process can be achieved in several methods. In one case the telephony interface card 512 can request a text-to-speech message, generated by a text-to-speech card 512, which prompts the initiator to key in the MIN number by keypad tone signals. In another case an automatic speech recognition system can be used to collect the MIN digits. In either case, after the MS digits have been collected, a location request message is sent to the location system 142. The location system 142 initiates a series of messages to the mobile switch center 112, via the location applications programming interface (L-API-MSC 136), and optionally to the home location register 460, to determine whether or not the mobile station 140 to be located can in fact be located. Alternatively the last known location can be provided, along with the time and date stamp of the last location, including an explanation that the current location is not attainable. Conditions regarding the locateability of a mobile station include, for example: mobile station 140 powered off, mobile station not in communication range, mobile station roaming state not known, mobile station 140 not provisioned for service, and related conditions. If the mobile station 140 cannot be located then an appropriate error response message is provided to the initiating caller, via the service node (SN) 107 for short messaging service (SMS). The service node is in communication with the location system 142 using a common text paging interface 108. The service node 107 accepts the location text paging message from the location system 142 and communicates a request to page the initiating caller via a typical signaling system 7 link for paging purposes, to the mobile switch center 112. The mobile switch center 112 forwards the location text page information to the initiating caller via the appropriate base stations, to the initiating mobile station caller. Otherwise the mobile station 140 is located using methods described in greater detail elsewhere in this patent. At a high level, the mobile switch center 112 is in communication with the appropriate base stations, and provides the location system 142 with the necessary signal and data results to enable a location estimation to be performed by the location system 142. Once the location has been determined by the location system 142 in terms of Latitude, Longitude and optionally height if known (in the form of a text string). The location result is provided to the initiator by inputting the location text string to the service node 107 for short messaging service (SMS). The service node 107 is in communication with the location system 142 using a common text paging interface 108. The service node 107 accepts the location text paging message from the location system 142 and communicates a request to page the initiating caller via a typical signaling system 7 link 105 for paging purposes, to the mobile switch center 112. The mobile switch center 112 forwards the location text page information to the initiating caller via the appropriate-base stations 122a or 122b (not shown in FIG. 38), to the initiating caller, via a text-to-speech card 512, in communication with the assigned telephone interface card 508.

Providing Wireless Location Using Internet Push Technology Application

Figure 39:
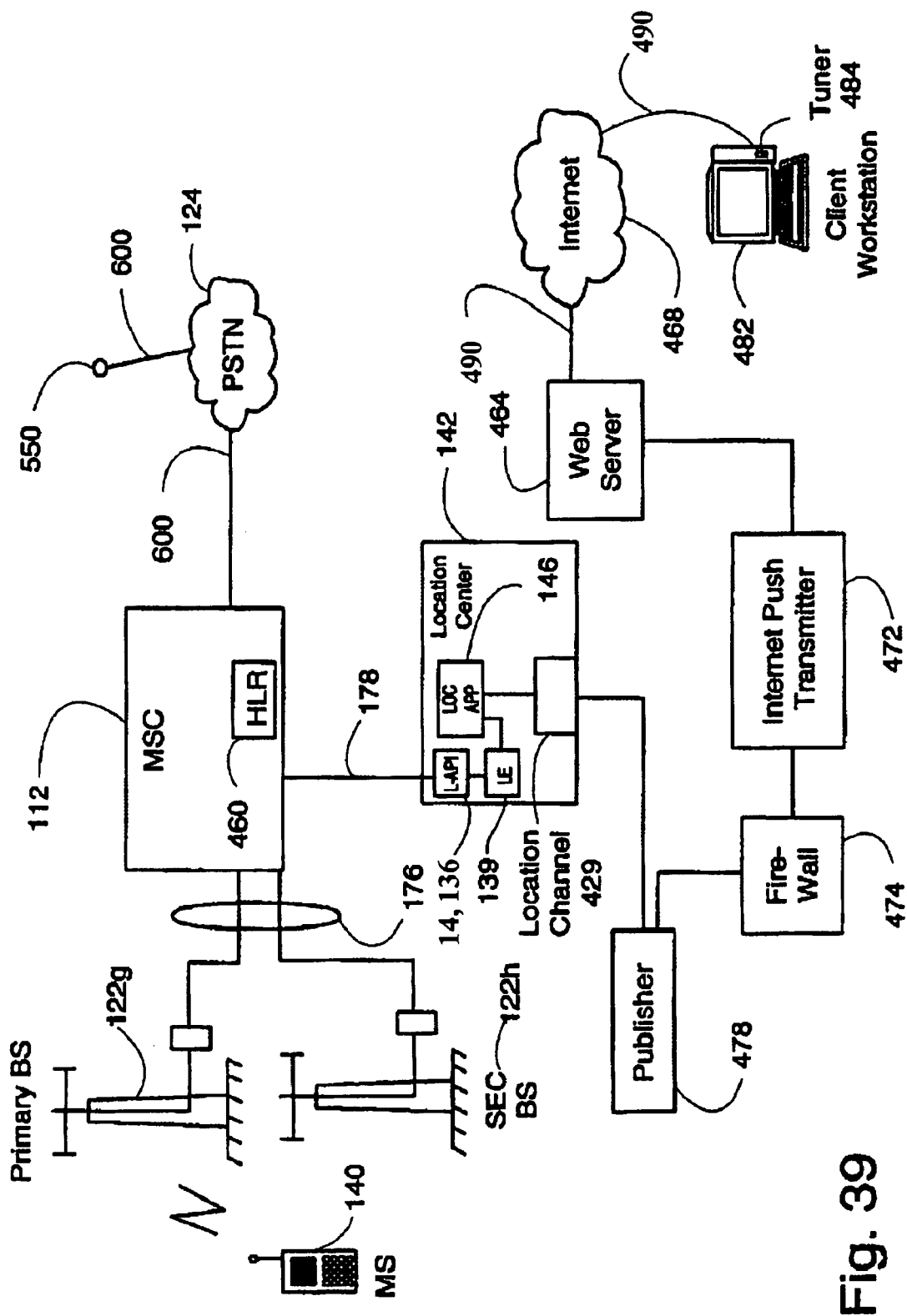
FIG. 39 shows how location information of an MS can be provided via Internet via "Push" technology.

Referring to FIG. 39, a user (the initiating user) desiring the location of an mobile station 140, who has a push technology tuner 484 associated with the user's client workstation 482, selects the location channel in the area, and further specifies the mobile station(s) 140 to be located, with what frequency should the location estimate be provided, and other related parameters, such as billing information. The user's client workstation 482 is in communication with the Internet, optionally via an encrypted communications channel (e.g. channel 490) ID using, for example, Netscape's SSL 3 encryption/decryption technology. A push transmitter 472, connected to the Internet 468 via a web server 464, detects the client workstation 482 user's request. The transmitter 472 requests location update information for specified mobile identification numbers through a firewall 474 and a publisher 478, in communication with a location channel application 429 in the location system 142. The location system 142 initiates location requests for all mobile station mobile identification numbers for which location information has been subscribed to, then provides the location results to the location channel application 429.

The location system 142 initiates a series of messages to the mobile switch center 112, via the location applications programming interface (L-API-MSC 136), and optionally to the home location register (HLR) 460, to determine whether or not the mobile station 140 or others, to be located can in fact be located. Alternatively the last known location can be provided, along with the time and date stamp of the last location, including an explanation that current location is not attainable. Conditions regarding the locateability of a mobile station 140 include, for example: mobile station 140 powered off, mobile station not in communication range, mobile station 140 roaming state not known, mobile station 140 not provisioned for service, and related conditions. If the mobile station 140 cannot be located then an appropriate error response message is provided to the initiating client workstation 482, via the push technology components location channel application 429, publisher 478, firewall 474, transmitter 472, web server 464, public Internet 468, to the client workstation 482. A similar communication mechanism is used to provide the client's workstation 482 with attained location information.

Note that the location channel 429 could in fact provide a collection of mobile station 140 mobile identification numbers for location purposes that are grouped by a particular market and/or customer organization segment, for example, location channel number 1 could provide enhanced wireless 9-1-1 service to specific public safety answering points, channel number 2 could provide periodic wireless location information of a fleet of taxi cabs belonging to a particular company, to their dispatch operator, channel 3 could provide wireless location to a control center of a military organization, channel 4 could provide wireless location information of vehicles carrying hazardous materials, to a control center, and so forth.

The location channel application 429 provides the location results to the publisher 478, which provides a method of adding the new location results to the transmitter 472, via firewall 474. The firewall 474, provides protection services between certain systems and the Internet 468, such as preventing malicious users from accessing critical computing systems.

Selective Group, Multicast, Individualized Directions Conferencing Application

The group multicast help, with individualized directions, is an application wherein for members of a group that are authorized and nearest a distressed caller, these members are given text paging message instructions on how to drive or navigate, to reach the initiating distressed caller. Alternatively optional voice synthesis technology could be used to aid one or more members to have spoken instruction giving directions and/or instructions for each member, to help them reach the distressed caller.

Figure 40:
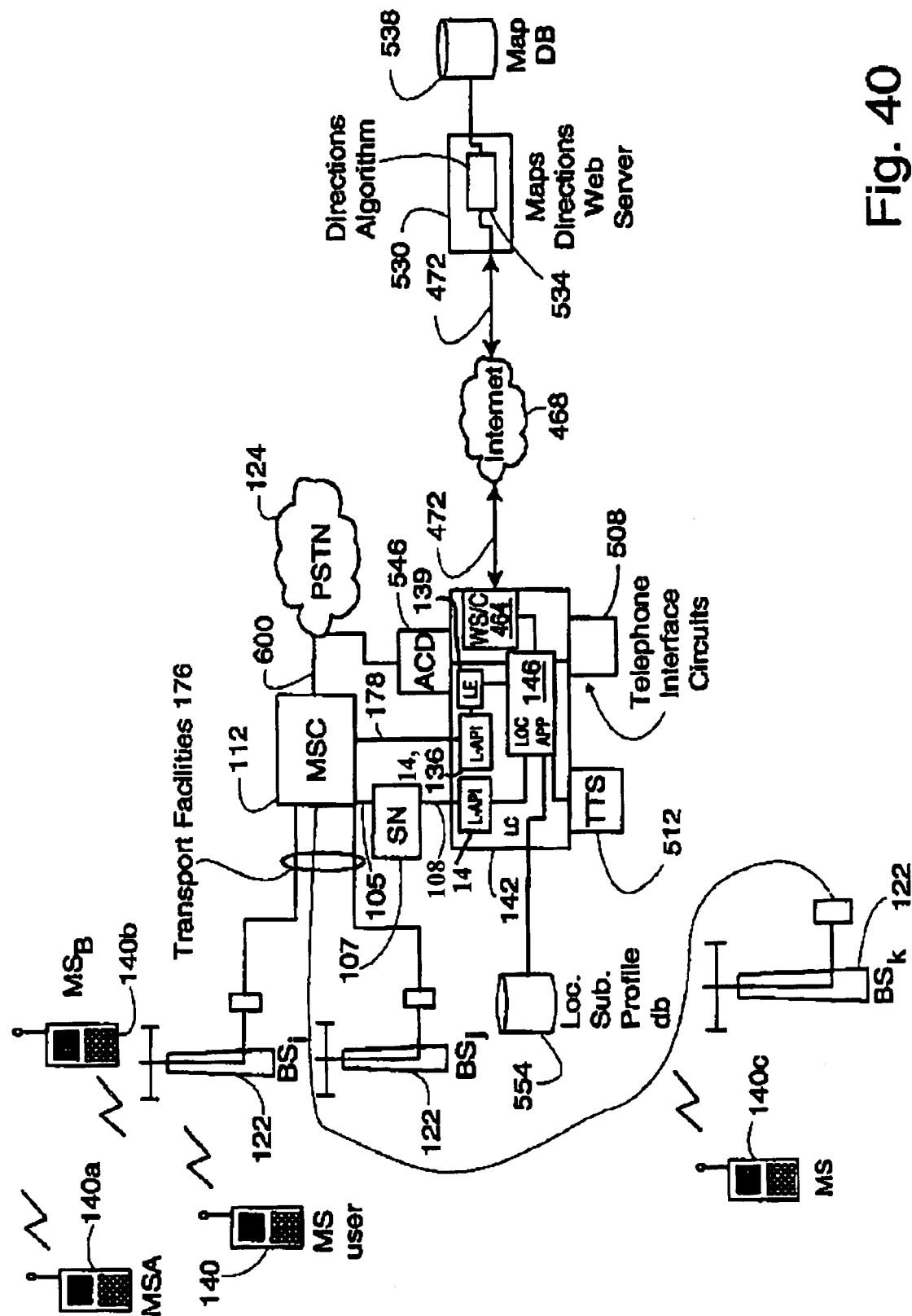
FIG. 40 illustrates how location directions can be provided to nearest members, regarding directions for each individual member to reach a distressed MS caller.

Referring to FIG. 40, an individual having a mobile station 140 desires to make a distress call for help, or for some other reason. The distressed caller with mobile station 140 dials a special telephone number, received by base station 122, which then sends the originating call setup request to the mobile switch center 112. The mobile switch center 112 routes the originating call through the PSTN 124 to an automatic call distributor (ACD) 546. The ACD 546 selects an available telephony interface circuit 508, which answers the call and provides introductory information to the caller, such as a greeting message, progress of service, etc., using a voice synthesizer circuit card 512. Note that circuits 508 and 512 may be combined as voice response units. The telephony interface circuit 508 collects the automatic number identification information if available in the call setup message or optionally prompts the caller for this information. This MIN collection process can be achieved in several methods. In one case the network telephony interface card 508 can request a TTS (text to speech) message, generated by a voice synthesizer card 512, which prompts the initiator to key in their MIN number by keypad tone signals. In another case an automatic speech recognition system can be used to collect the MIN digits. In either case after the MIN digits have been collected, a location request message is sent to the location system 142. The location system or location center (LC) 142 initiates a series of messages to the mobile switch center 112, via the location applications programming interface (L-API-MSC136), to determine whether or not the mobile station 140 to be located can in fact be located. If the mobile station 140 cannot be located then an appropriate error response message is provided to the initiating caller. Otherwise the LC 142 determines the caller's location via methods discussed elsewhere in this patent. While this event is proceeding an application in the LS 142 references the initiating caller's location subscriber profile database (not shown) to determine if the caller allows others to locate him or her, and specifically which individuals are allowed to be informed of the caller's location.

Assuming the caller allows location information to be sent out to a select group, then the list of member's mobile station identification numbers (MIN)s are extracted from the profile database, and an application in the LC 142 initiates a series of messages to the mobile switch center 112, via the location applications programming interface (L-API-MSC 136), to determine the locations of each of the users' mobile station mobile identification numbers associated with the member list. Regarding those mobile station mobile identification numbers nearest the distress caller, each member's mobile station is dialed via a control message sent from an application in the LC 142 to the telephony interface card 508. A voice synthesizer card 512 or text to speech circuit is also patched in the calling circuit path, to announce the purpose of the automated call to each member. The ACD 546 initiates the call request to each member via the PSTN 124, which connects to the mobile switch center 112, that ultimately rings the member mobile station 140 and 148 via base stations 122. An application in the LC 142 identifies a start and finish location destination location for a member, based on his/her current location as being the start location, and the finish location being the distress caller's location at mobile station MIN. The application in the LC 142 initiates a http or similar Internet compatible protocol universal resource locator (URL) request via the web server/client 530 to the public Internet 468, which terminates on a maps, directions web server 534. One such URL known to the authors is Lucent Technologies' http://www.mapsOnUs.com, which is provided for public use. The map/directions server 534 queries the map base 536 via a directions algorithm, and returns to the initiating http request, the location web server 530, with a list of instructions to enable a user to navigate between a start location and end location. Referring to FIG. 41, the information shown in the columns labeled "Turn #", "Directions", "And Go", and/or "Total Miles", can then be parsed from the http response information. Referring now to FIG. 40, this information can then be sent as a short text message, to the relevant mobile station 148 or 140 via the service node 107, using interface 105 to the mobile switch center 112, and relevant base stations 122, assuming each member mobile station has short message service provisioned. If this is not the case, the service node 107 will inform the application within the LS 142, which then initiates an alternative method of sending the start-finish location navigation instructions information via an appropriate voice synthesizer card 512 and associated telephony interface card 508. The interface card 508 initiates an automated call to each appropriate member's mobile station 148 and 140, via the telephony path including components ACD 546 in communication with the PSTN 124, which is in communication with the mobile switch center 112. The mobile switch center 112 completes the routing of the automated call to the appropriate mobile station 140 using base stations 122. The above process is repeated for each nearby member's mobile station, thus allowing all nearby members to be notified that the distressed caller needs help, with navigation instructions to each member, which enables the member to reach the distressed caller. Variations of this application include putting each relevant party in communication with each other via a conference call capability in the ACD 546, with or without providing location information and/or start-finish navigation instructions.

Rental Car Inventory, Tracking and Control Application

An application in the location system utilizes periodic wireless location of appropriate rental cars, control circuits and control communications within the rental car, and secured transactions across the Internet, or similar means, in order to provide various tracking and control functions. Such functions allow rental car agencies to remotely control and operate their rental cars in order to reduce operating costs such as storage and maintenance, as well as provide additional conveniences and services to rental car agency customers.

Figure 42:
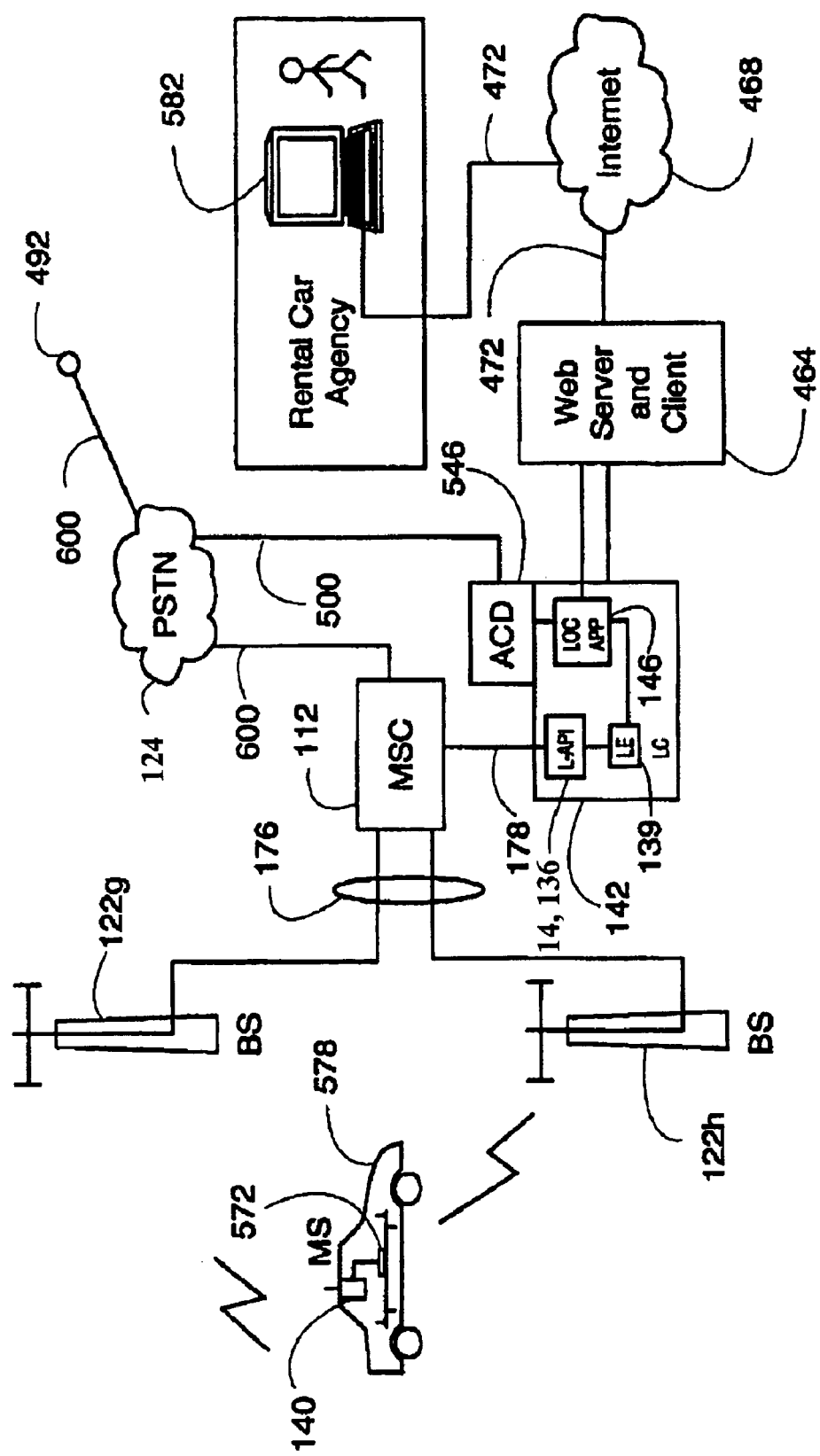
FIG. 42 illustrates how wireless location services can be used to facilitate automotive rental car tracking and control.

Referring to FIG. 42, a vehicle 578 containing various sensors and actuators (not shown) used to, for example, lock and unlock car doors, sense door position, keypad depressions, sense the condition of the engine and various subsystems, such as brakes, electrical subsystems, sense the amount of various fluid levels, etc., is in communication with a vehicle-based local area network 572, which is in turn connected to a mobile station 140 containing asynchronous data communications capability. The vehicle-based local area network may optionally contain a computer (not shown) for control and interfacing functions. The mobile station 140 is always in communication, using the radio air interface with at least one base station 122g, and possibly other base stations 122h. The base stations 122g and 122h are in communication with the mobile switch center 112 via transport facilities 176. The mobile switch center 112 is in communication with the location system 142 and the public switched telephone network 124 via interoffice trunks 600. In addition the mobile switch center 112 is also in communication with the location system 142 via the location system—mobile switch center physical interface 178. The physical interface provides two-way connections to the location applications programming interface (i.e., L-API-MSC 136), which is in communication with a location engine 139, which performs wireless location estimations for the mobile station, which is permanently mounted in the vehicle 578. The location engine 139 represents key components within the location system 142 which together comprise the capability to perform wireless location estimations. The rental car location application 146 is in communications with the location engine 139 for purposes of initiating wireless location requests regarding the mobile station 140, as well as for receiving wireless location responses from the location engine 139. The application 146 is in communications with the automatic call distributor 546 for purposes of initiating and receiving telephone calls to and from the public switch telephone network 124, via hunt group interface 500. As one skilled in the art will appreciate, other interfaces (not shown) beyond hunt groups 500, can alternatively be used, such as ISDN interface circuits, T-carrier and the like. The application 146 is in communication with a web server and client 464, which in turn is in communication with the Internet 468 via an Internet access interface 472. As those in the art will understand, an Internet access interface is typically provided by an Internet service provider, also there are other methods which could be used to complete the Internet connection. The rental car agency contains a workstation or personal computer 582 with an Internet access interface 472 to the Internet 468. The application 146 requests of the location engine 139 to perform a location request periodically regarding the mobile station 140, with the location response information provided the web server and client, 464. For each rental car or vehicle containing a mobile station 140, the location, as well as various information about the rental car or vehicle can be ascertained via the above described infrastructure.

911 Application with Wireless Location of the Caller Reporting an Incident

An application in the location system operates in conjunction with an application in each public safety answering point (PSAP) that together provides various call handling functions to enable the PSAP to perform its work load efficiently and effectively toward unique emergency events unique to a given location. The application pair measures the number of emergency 9-1-1 wireless calls originating from a particular geographical area or location. Upon exceeding a provisional threshold value "X", the application pair traps the next incoming call from the same location and provides a call screening function via a play announcement and collect digits activity. This activity alerts the originating caller that if their call relates to an incident at a particular location, then they are the "X+1th" caller who has already notified the PSAP, and that no further caller discussion is required. However, if the caller's intent does not relate to the incident described above, then the caller is requested to press or say "one", or some similar keypad number, which then is collected and causes the caller to be re-routed to the next available PSAP call taker. Alternatively if the originating caller does not respond within a short time period, then the call is also re-routed to the next available PSAP call taker. The voice announcement may either be synthesized by a text-to-speech card, or an PSAP operator may store a voice message which describes the incident at the above-referenced location.

What is claimed is:

1. A method for locating a wireless mobile station, comprising:

receiving first data related to wireless signals communicated between a particular mobile station and at least a first network of a plurality of commercial mobile service provider networks, wherein for each said network, there are a plurality of base stations for at least one of transmitting and receiving wireless signals with a corresponding plurality of mobile stations registered with the network, and wherein said particular mobile station is registered with said first network for subscribing to a wireless service;

first requesting a first location estimate of the particular mobile station, wherein a first location estimator provides said first location estimate of the particular mobile station when said first location estimator is supplied with first location information including data obtained using the first data, said location information capable of changing with a change in a location of the particular mobile station;

wherein when said first location estimate is one of: (a) deemed ambiguous, (b) can not be provided, (c) is not within a desired range of accuracy, and (d) has an extent greater than or equal to a predetermined size, then the steps (A1) and (A2) are performed:

(A1) instructing said particular mobile station to communicate with a second network of the plurality of networks for supplying second data, wherein said particular mobile station is not registered with said second network for subscribing to a wireless service, and wherein said second data is obtained using wireless signals communicated between the particular mobile station and the second network;

(A2) second requesting a second location estimate of said particular mobile station wherein said second location estimate is obtained using additional location information obtained at least in part from the second data;

outputting location information for the particular mobile station, wherein said location information is dependent upon at least one of the first and second estimates of the particular mobile station.

2. A method for locating a wireless mobile station, comprising:

first receiving first signal characteristic measurements of wireless signals communicated between a mobile station and a first network of communication stations, wherein said communication stations in the first network are cooperatively linked by a first wireless service provider for wirelessly communicating with the mobile station;

instructing the mobile station to search for a wireless signal from a second network of communication stations that are cooperatively linked by a second wireless service provider for providing wireless communication, wherein said mobile station is for a subscriber of said first wireless service provider, and said mobile station is not for a subscriber of said second wireless service provider;

second receiving second signal characteristic measurements of wireless signals communicated between the mobile station and said second network of communication stations;

estimating a location of the mobile station using at least one of said first and second signal characteristic measurements.

3. A method for locating a wireless mobile station as claimed in claim 2, wherein the mobile station is registered for a wireless communication service with the first wireless service provider, and the mobile station is not registered for the wireless communication service with the second wireless service provider.

4. A method for locating a wireless mobile station as claimed in claim 2, wherein said step of instructing includes transmitting a command to the mobile station for instructing the mobile station to search for a signal from a communication station of said second wireless service provider in a frequency bandwidth different from a frequency bandwidth for communicating with the communication stations of said first wireless service provider.

5. A method for locating a wireless mobile station, as claimed in claim 2, wherein said step of estimating includes a step of computing a most likely location of said mobile station using a fuzzy logic computation.

6. An apparatus for locating a first mobile station, wherein the first mobile station communicates via wireless signals with a first wireless network infrastructure having a plurality of spaced apart communication stations for wireless communication with said first mobile station, wherein at least one of said first mobile station and said first wireless network infrastructure has a capability for obtaining a plurality of multipath measurements for one of: one or more forward transmissions to said first mobile station, and one or more reverse transmissions from said first mobile station to said first wireless network infrastructure, and wherein said multipath measurements are derived from both fixed clutter and variable clutter, said apparatus comprising:

an interface for receiving values indicative of said multipath measurements for at least one of said forward transmissions and said reverse transmissions;

a mobile station location determining system for locating said first mobile station, wherein said location determining system uses the values, and generates additional values that have an enhanced dependence on multipath measurements derived from fixed clutter as compared to multipath measurements derived from variable clutter;

wherein said mobile station location determining system includes at least one wireless location determining model for estimating a location of said first mobile station, said at least one model uses one or more of said additional values;

an output interface for outputting to one of: a communication network that provides telephony services, and the Internet a resulting location estimate of said first mobile station, said resulting location estimate obtained from said location determining system.

7. An apparatus for locating a mobile station, comprising:
a plurality of spaced apart communication stations, of a wireless network, for wirelessly communicating with a plurality of mobile stations, wherein said communication stations at least one of: transmit and receive wireless signals from the mobile stations, and wherein said wireless signals are transmitted by the communication stations in a forward bandwidth and said wireless signals are received at the communication stations in a different reverse bandwidth;
an interface for accepting emergency related messages which are representative of one or more of a plurality of predetermined message types;
wherein the interface accepts one or more of the emergency related messages in response to an emergency call from a particular mobile station that is not registered to a subscriber of wireless subscriber services from the network;
wherein during the emergency call, the interface accepts emergency call related information communicated between at least one of the communication stations and the particular mobile station;
wherein in response to receiving at least one of the emergency related messages, said interface provides to a mobile station location obtaining system, wireless measurements including: (i) a first measurement of said wireless signals transmitted to the particular mobile station in said forward bandwidth, and (ii) a second measurement of said wireless signals received from the particular mobile station in said reverse bandwidth;
wherein said interface outputs further information for identifying the at least one communication station for locating the particular mobile station; and
wherein said mobile station location obtaining system estimates a location of said particular mobile station using both said first measurements and said second measurements.

8. The apparatus of claim 7, wherein said interface provides said mobile station location obtaining system with data indicative of CDMA finger measurements related to said radio signals communicated between the network and the particular mobile station.

9. A method for locating a mobile station using wireless signal measurements obtained from transmissions between the mobile station and at least one of a plurality of communication stations, wherein each of said communications stations includes one or more of a transmitter and a receiver for wirelessly communicating with the mobile station, comprising:
transmitting to the mobile station, a control message from one of the communication stations, wherein said message is received by a receiving antenna of said mobile station;
wherein the control message requests activation of at least one of a control processor and a searcher receiver in the mobile station, for determining a plurality of multipath finger sets for a wireless communication between said mobile station and at least a first of the communication stations, wherein at least some of said multipath finger sets are different;
receiving information related to said finger sets in response to transmissions from the mobile station; and
supplying said information for at least one of said finger sets to a mobile station location estimator for estimating a location of said mobile station.

10. A method for locating a wireless mobile station, comprising:
receiving data indicative of wireless signal measurements obtained via wireless signals communicated between a particular mobile station and a plurality of communication stations of a wireless infrastructure operated by a commercial radio service provider, wherein said particular mobile station is not registered to a subscriber of said commercial radio service provider for subscriber services;
wherein each of said communications stations includes one or more of a transmitter and a receiver for wirelessly communicating with said particular mobile station;
wherein said data includes information that is dependent upon a location of each of at least a first and a second of said plurality of communication stations;
determining, using at least said information, an estimate of a location, L, of said particular mobile station;
wherein said step of determining includes performing a substep of obtaining at least (a) and (b) following: (a) first location data indicative of a first range of locations for L relative to said first communication station, and (b) second location data indicative of a second range of locations for L relative to said second communication station.

11. The method of claim 1, further including a step of determining said location information by performing a step of adjusting a confidence value for at least one of the first and second location estimates, wherein values for at least some of the following factors are used in adjusting the confidence value: (a) how closely the location estimate matches a predetermined route, (b) how likely an estimated velocity of the particular mobile station is for a geographical area having the location estimate; (c) how closely the location estimate corresponds to a different estimate for locating the particular mobile station; and (d) how closely the location estimate corresponds to an extrapolated location estimate of the particular mobile station.

12. A method for utilizing mobile station location information, comprising:
receiving, at a predetermined destination and as a consequence of a transmission from a location providing system location information for a mobile station ($M_1$);
wherein the location providing system performs a first geolocation computation which yields a geolocation result for determining at least one geographical extent or position ($G_1$) for the mobile station $M_1$, and wherein the geographical extent or position $G_1$ is used to obtain the location information;
wherein the first geolocation computation is performed using a first input obtained as a result of (A) and (B) following:
(A) a communication of $M_1$ geolocation indicative data from the mobile station $M_1$ to a network ($NTWK_1$), the $M_1$ geolocation indicative data obtained from a corresponding wireless communication between: (1) the mobile station $M_1$, and (2) at least one of: a receiver at a known location, and a transmitter at a known location; and
(B) a transmission, via the network $NTWK_1$, of $M_1$ geolocation information for providing at least a portion ($P_1$) of the first input to the first geolocation computation, wherein the $M_1$ geolocation information is obtained, at least in part, from the $M_1$ geolocation indicative data;

wherein the location providing system performs a second geolocation computation which yields a geolocation result for determining at least one geographical extent or position ($G_2$) for a mobile station ($M_2$);

wherein the second geolocation computation is performed using a second input obtained via (C) and (D) following:

(C) a wireless communication of $M_2$ geolocation indicative data from the mobile station $M_2$ to a network ($NTWK_2$), the $M_2$ geolocation indicative data obtained from a corresponding wireless communication between: (3) the mobile station $M_2$, and (4) at least one of: a receiver at a known location, and a transmitter at a known location; and (D) a transmission, via the network $NTWK_2$, of $M_2$ geolocation information for providing at least a portion ($P_2$) of the second input to the second geolocation computation, wherein the $M_2$ geolocation information is obtained, at least in part, from the $M_2$ geolocation indicative data;

wherein the network $NTWK_1$ is operated by a first service provider and the network $NTWK_2$ is operated by a second service provider different from the first service provider;

wherein at least one of the following (a) and (b) is satisfied:

(a) the portion $P_1$ is obtained using a signal time delay, and the geographical extent or position $G_1$ is obtained using $P_1$, and the portion $P_2$ is obtained using a signal time delay, and the geographical extent or position $G_2$ is obtained using $P_2$; and (b) for a geolocation computation (CG) that is the same as the second geolocation computation, or yields effectively a same geolocation result as the second geolocation computation when each is supplied with a geolocation content obtained from the second input, the location providing system does not perform CG for locating $M_1$; and using said location information for one of: locating, monitoring and accessing said mobile station $M_1$.

13. A method for locating one or more mobile stations, comprising:

first receiving, by a location providing system a request for locating a mobile station ($M_1$);

first performing a first geolocation computation which yields a geolocation result for determining at least one geographical extent or position ($G_1$) for the mobile station $M_1$, wherein the first geolocation computation uses first input for obtaining $G_1$, and the first input is obtained using (A) and (B) following:

(A) a wireless communication of $M_1$ geolocation indicative data from the mobile station $M_1$ to a network ($NTWK_1$), the $M_1$ geolocation indicative data obtained from a corresponding communication between: (1) the mobile station $M_1$, and (2) at least one of: a receiver at a known location, and a transmitter at a known location; and (B) a transmission via the network $NTWK_1$ of $M_1$ geolocation information for providing at least a portion ($P_1$) of the first input to the first geolocation computation, wherein the $M_1$ geolocation information is obtained, at least in part, using the $M_1$ geolocation indicative data;

second receiving, by the location providing system, a request for locating a mobile station ($M_2$);

second performing a second geolocation computation which yields a geolocation result for determining at least one geographical extent or position ($G_2$) for the mobile station $M_2$, wherein the second geolocation computation uses a second input, the second input obtained using (C) and (D) following:

(C) a wireless communication of $M_2$ geolocation indicative data from the mobile station $M_2$ to a network ($NTWK_2$), the $M_2$ geolocation indicative data obtained from a corresponding communication between: (3) the mobile station $M_2$, and (4) at least one of: a receiver at a known location, and a transmitter at a known location; and (D) a transmission, via the network $NTWK_2$, of $M_2$ geolocation information for providing at least a portion ($P_2$) of the second input to the second geolocation computation, wherein the $M_2$ geolocation information is obtained, at least in part, from the second geolocation indicative data;

wherein the network $NTWK_1$ is operated by a first service provider and the network $NTWK_2$ is operated by a second service provider different from the first service provider, wherein at least one of the following (a) and (b) is satisfied:

(a) the portion $P_1$ is obtained using a signal time delay, and the geographical extent or position $G_1$ is obtained using $P_1$, and the portion $P_2$ is obtained using a signal time delay, and the geographical extent or position $G_2$ is obtained using $P_2$; and (b) for a geolocation computation (CG) that is the same as the second geolocation computation, or yields effectively a same geolocation result as the second geolocation computation when each is supplied with a geolocation content obtained from the second input, the location providing system does not perform CG for locating $M_1$; and providing, to a predetermined destination, location information obtained using one or more of said geographical extents or positions $G_1$ and $G_2$.

14. The method of claim 13, wherein $NTWK_1$ provides voice communications, and $NTWK_2$ includes at least a portion of the Internet.

15. The method of claim 12 further including receiving vehicle operation information from sensors on a vehicle having the particular mobile station.

16. The method of claim 15, wherein said vehicle operation information is used for controlling an operation a vehicle.

17. A method for accessing a location providing system, comprising:

first obtaining, by a network ($NTWK_1$) operated by a first service provider, first geolocation related information for locating a mobile station ($M_{1,1}$);

first communicating with a location providing system for providing thereto the first geolocation related information, wherein there is two-way communication between the network $NTWK_1$, and the location providing system, and wherein the location providing system uses the first geolocation related information for performing a first geolocation computation which yields a geolocation result for determining at least one geographical extent or position ($G_{1,1}$) for the mobile station $M_{1,1}$;

wherein the first geolocation computation is performed using a first input obtained as a result of (A) and (B) following:

(A) a wireless communication of $M_{1,1}$ geolocation indicative data from the mobile station $M_{1,1}$ to the network $NTWK_1$, the $M_{1,1}$ geolocation indicative data obtained from a corresponding wireless communication between: (1) the mobile station $M_{1,1}$, and (2) at least one of: a receiver at a known location, and a transmitter at a known location; and (B) a transmission, from the network $NTWK_1$, of $M_{1,1}$ geolocation information for providing at least a portion ($P_{1,1}$) of the first input to the first geolocation computation, wherein the $M_{1,1}$ geolocation information is obtained, at least in part, from the $M_{1,1}$ geolocation indicative data;

second obtaining, by the network $NTWK_1$, second geolocation related information for locating a mobile station ($M_{1,2}$);

second communicating with the location providing system for providing thereto the second geolocation related information, wherein there is two-way communication between the network $NTWK_1$, and the location providing system uses the second geolocation related information for performing a second geolocation computation which yields a geolocation result for determining at least one geographical extent or position ($G_{1,2}$) for the mobile station $M_{1,2}$;

wherein the second geolocation computation is performed using a second input obtained via (C) and (D) following:

(C) a communication of $M_{1,2}$ geolocation indicative data for the mobile station $M_{1,2}$ to the network $NTWK_1$, the $M_{1,2}$ geolocation indicative data obtained from a corresponding communication between: (3) the mobile station $M_{1,2}$, and (4) at least one of: a receiver at a known location, and a transmitter at a known location; and (D) a transmission from the network $NTWK_1$ of $M_{1,2}$ geolocation information for providing at least a portion ($P_{1,2}$) of the second input to the second geolocation computation, wherein the $M_{1,2}$ geolocation information is obtained, at least in part, from the $M_{1,2}$ geolocation indicative data;

wherein there is two way communication between the location providing system and another network ($NTWK_2$) that is operated by a second service provider in competition with the first service provider, wherein the communication with the network $NTWK_2$ provides third geolocation related information for locating a mobile station ($M_2$), wherein the location providing system uses the third geolocation related information for performing a third geolocation computation which yields a geolocation result for determining at least one geographical extent or position ($G_2$) for the mobile station $M_2$;

wherein the third geolocation computation is performed using a third input obtained via (E) and (F) following:

(E) a wireless communication of $M_2$ geolocation indicative data from the mobile station $M_2$ to the network $NTWK_2$, the $M_2$ geolocation indicative data obtained from a corresponding wireless communication between: (5) the mobile station $M_2$, and (6) at least one of: a receiver at a known location, and a transmitter at a known location; and (F) a transmission from the network $NTWK_2$ of $M_2$ geolocation information for providing at least a portion ($P_2$) of the third input to the third geolocation computation, wherein the $M_2$ geolocation information is obtained, at least in part, from the $M_2$ geolocation indicative data;

wherein at least one of the following (a) through (c) are satisfied:

(a) the portion $P_{1,1}$ is obtained using a signal time delay, and the geographical extent or position $G_{1,1}$ is obtained using $P_{1,1}$, and the portion $P_2$ is obtained using a signal time delay, and the geographical extent or position $G_2$ is obtained using $P_2$;

(b) for a geolocation computation ($CG_2$) that is the same as the third geolocation computation, or yields effectively a same geolocation result as the third geolocation computation when each is supplied with a geolocation content obtained from the third input, the location providing system does not perform $CG_2$ for locating $M_{1,1}$; and (c) for a geolocation computation ($CG_{1,2}$) that is the same as the second geolocation computation, or yields effectively a same geolocation result as the second geolocation computation when each is supplied with a geolocation content obtained from the second input, the location providing system does not perform $CG_{1,2}$ for locating $M_{1,1}$.

18. The method of claim 12, wherein the location providing system performs at least one task (T) of the following tasks:

(T1) determining a priority for performing geolocation related processing for locating one of the mobile stations $M_1$ and $M_2$;

(T2) selecting one or more of a plurality of geolocation generating sources, wherein the selection is dependent upon an availability of corresponding geolocation data for inputting to the geolocation generating sources, said corresponding geolocation data including a corresponding one of the first and second inputs for a corresponding one of the first and second geolocation computations;

(T3) resolving ambiguities between multiple location estimates for one of the mobile stations $M_1$ and $M_2$ being located;

(T4) generating an audit trail of a subscriber profile for a subscriber of a corresponding one of the mobile stations $M_1$ and $M_2$;

(T5) routing one of the first and second inputs to one or more geolocation generating sources according to an identification of the one of the first and second inputs;

(T6) associating different instances of geolocation data for obtaining a data ensemble for locating one of the mobile stations $M_1$ and $M_2$, wherein the instances are received from different sources or received at different times;

(T7) determining a signal processing or transmission capability of one of the mobile stations $M_1$ and $M_2$ being located;

(T8) determining a location of a base station;

(T9) determining if additional geolocation related information is needed to effectively locate one of the mobile stations $M_1$ and $M_2$ being located;

(T10) transmitting messages to one of the networks $NTWK_1$ and $NTWK_2$ for obtaining, when needed, additional geolocation related information; and (T11) activating a signal processing component for adjusting a wireless signal path loss measurement.

19. The method of claim 18, wherein at least a plurality of the tasks (T1) through (T11) are performed.

20. The method of claim 18, wherein a majority of the tasks (T1) through (T11) are performed.

21. The method of claim 18, wherein at least some of the tasks (T1) through (T5) are performed.

22. The method of claim 21, wherein at least task (T5) is performed and at least some of the geolocation generating sources are distributed on a network.

23. The method of claim 21, wherein for locating each of the mobile stations $M_1$ and $M_2$, at least most of the tasks (T1) through (T11) are performed.

24. The method of claim 12 further including a step of transmitting a request for locating the mobile station $M_1$.

25. The method of claim 12, wherein (a) is satisfied.

26. The method of claim 12, wherein (a) is satisfied.

27. The method of claim 26, wherein for a geolocation computation ($CG_1$) that is the same as the first geolocation computation, or yields effectively a same geolocation result as the first geolocation computation when each is supplied with a geolocation content obtained from the first input, the location providing system does not perform $CG_1$ for locating $M_2$.

28. The method of claim 12, wherein each of the mobile stations $M_1$ and $M_2$ is capable of performing a base station handoff.

29. The method of claim 12, wherein the network $NTWK_1$ communicates with the mobile station $M_1$ via one or more of the wireless protocols: CDMA, W-CDMA, TDMA, GSM, AMPS, and NAMPS.

30. The method of claim 12, wherein for the mobile station $M_1$, the $M_1$ geolocation indicative data includes measurements of wireless signals indicative of a geolocation of the mobile station $M_1$.

31. The method of claim 12, wherein there is a common set of geolocation related messages used for communications between the location providing system, and each of the networks $NTWK_1$ and $NTWK_2$.

32. The method of claim 12, wherein for determining a location of the mobile station $M_1$, the first geolocation computation is performed after an additional geolocation related computation which uses home location register obtained information, that is indicative of a coarse coverage area having the mobile station $M_1$ therein, to obtain the $M_1$ geolocation information.

33. The method of claim 32, further including a step of requesting the location information, wherein said additional geolocation related computation follows, and wherein the information indicative of the coarse coverage area provides information for communicating with at least one $NTWK_1$ provisioned equipment for the coarse coverage area.

34. The method of claim 32, wherein location related messages are transmitted to a portion of the network $NTWK_1$ currently in communication with the mobile station $M_1$.

35. The method of claim 12, wherein the location providing system receives from the network $NTWK_1$ at least one communication ($C_1$) via a message type ($MSG_1$) of a predetermined location related programming interface, wherein the communication $C_1$ includes one or more of: (a1) a request for determining a location of $M_1$, and (a2) a notification related to a change in location of $M_1$; and wherein the location providing system transmits to the network $NTWK_1$ at least an instance of a message type ($MSG_2$) of the predetermined location related programming interface, wherein the instance of $MSG_2$ includes one of: (b1) a request for the $M_1$ geolocation information, and (b2) a request for notification related to a change in location of $M_1$.

36. The method of claim 35, wherein instances of the message types $MSG_1$ and $MSG_2$ are generated in a two way communication between the location providing system and the network $NTWK_2$ for determining a location of $M_2$.

37. The method of claim 12, wherein the first input includes geolocation information of a communication device for communicating with the mobile station $M_1$ and the network $NTWK_1$, wherein when the communication device detects the mobile station $M_1$ the communication device provides the mobile station $M_1$ with voice communication service via a different wireless interface from the wireless interface for communicating with the $NTWK_1$ when the mobile station $M_1$ not detected by the communication device.

38. The method of claim 37, wherein a geolocation of the communication device is identified with a location of a premises for a subscriber that subscribes to the network $NTWK_1$ using the mobile station $M_1$.

39. The method of claim 37, wherein the communication device includes a base station.

40. The method of claim 12, wherein the geographical extent or position $G_1$ is obtained using corresponding signal time delay measurements of the portion $P_1$, and the geographical extent or position $G_2$ is obtained using a corresponding signal time delay measurements of the portion $P_2$, and wherein: (A) said first geolocation computation performs one of a triangulation, a trilateration, a multilateration, and a pattern recognition, and (B) said second geolocation computation performs one of a triangulation, a trilateration, a multilateration and a pattern recognition.

41. The method of claim 12, wherein the geographical extent or position $G_1$ is obtained using a geographical extent or position ($G_{1,1}$) determined at the mobile station $M_1$, wherein $G_{1,1}$ is determined using signal time delay measurements of a wireless communication between: (1) the mobile station $M_1$, and (2) at least one of: a receiver at a known location, and a transmitter at a known location.

42. The method of claim 12, wherein the geographical extent or position $G_1$ is obtained using a signal time delay measurement from both a forward and reverse signal direction of a wireless communication between: (1) the mobile station $M_1$, and (2) at least one of: a receiver at a known location, and a transmitter at a known location.

43. The method of claim 12, wherein at least said first geolocation computation uses a signal time difference of arrival for determining the geographical extent or position $G_1$.

44. The method of claim 12, wherein (b) holds, and for determining the geographical extent or position $G_1$, the first input includes one of: (A) geolocation data from a distributed antenna system, and (B) geolocation data from a communication of a plurality of daisy chained base stations.

45. The method of claim 12, further including a step of obtaining information indicative of one of: an acceleration, and a speed of the mobile station $M_1$.

46. The method of claim 12, wherein (a) is satisfied.

47. The method of claim 12, wherein (b) is satisfied.

48. The method of claim 12, wherein the mobile station $M_1$ is independently moveable from the location providing system.

49. The method of claim 48, wherein the mobile station $M_2$ is independently moveable from the location providing system, and $M_2$ is independently moveable from $M_1$.

50. The method of claim 48, wherein the mobile station $M_1$ is not physically connected to the location providing system.

51. The method of claim 12, wherein there is a first two way communication between the network $NTWK_1$ and the location providing system using a predetermined location related programming interface for the first two way communication;

wherein there is a second two way communication between the network NTWK$_2$ and the location providing system using the predetermined location related programming interface for the second two way communication;

wherein said location related programming interface includes at least two of (1-A) through (1-C) following:

(1-A) a message type for messages to the location providing system indicating that wireless location is requested for a response to an emergency;

(1-B) at least one message type for messages to the networks NTWK$_1$ and NTWK$_2$ for requesting mobile station geolocation indicative data; and (1-C) at least one message type for messages to the networks NTWK$_1$ and NTWK$_2$ for requesting notification of a mobile station state change, the notification provided via an access to a home location register for the mobile station having the state change;

wherein for at least one of the message types (1-A) through (1-C), there is an instance of the at least one message type communicated in each of the first and second two way communications.

52. The method of claim 51, wherein said location related programming interface includes each of (1-A) through (1-C).

53. The method of claim 12, wherein there is a first two way communication between the network NTWK$_1$ and the location providing system using a predetermined location related programming interface for the first two way communication;

wherein there is a second two way communication between the network NTWK$_2$ and the location providing system using the predetermined location related programming interface for the second two way communication;

wherein for each mobile station (M) of a plurality of mobile stations, including the mobile station M$_1$ and the mobile station M$_2$, the predetermined location related programming interface includes a common set of message types for communicating with a plurality networks, including NTWK$_1$ and NTWK$_2$, wherein said common set of message types provides for communications using at least the following messages:

(i) an alert message from a home location register of the mobile station M, the alert message includes information indicative of a change in an operational characteristic of the mobile station M, or a change in a geographical location of the mobile station M; and (ii) text transmission message for sending a short text message to the mobile station M, wherein the text transmission message includes location related information for M.

54. The method of claim 12, wherein for at least one of the first and second geolocation computations, there is one portion of the at least one geolocation computation that is performed remotely from another portion thereof, wherein communication for using results from the one and the another portions occurs via a telecommunication network.

55. The method of claim 54, wherein the telecommunication network includes the Internet.

56. The method of claim 12, wherein the first and second service providers do not have a common owner that controls wireless subscriber services of both the networks NTWK$_1$ and NTWK$_2$.

57. The method of claim 12, wherein each of the first and second service providers have a different collection of subscribers for which wireless service is provided without contacting the other service provider.

58. The method of claim 12, wherein the first service provider operates a first mobile switching center for providing at least voice communication with mobile stations; and wherein the second service provider operates a different second mobile switching center for providing at least voice communication with mobile stations, wherein the first and second mobile switching centers are not operably controlled by a common entity for providing substantially all voice communication on both of the networks NTWK$_1$ and NTWK$_2$.

59. The method of claim 12, wherein the first service provider stores first subscriber information for a first collection of subscribers that subscribe to a first wireless service of the first service provider; and wherein the second service provider stores a second subscriber information for a second collection of subscribers that subscribe to a second wireless service of the second service provider;

wherein the first and second collections identify substantially different subscribers, and wherein a subscriber of the first service provider gains access to the second wireless service by the first service provider receiving information from the second subscriber information.

60. The method of claim 12, wherein the first and second service providers are competitors for wireless subscribers.

61. The method of claim 12, wherein: the mobile station M$_1$ and the mobile station M$_2$ are identical.

62. The method of claim 61, wherein when a first instance of the geographical extent or position G$_1$ is determined to be one of:

(a) ambiguous, (b) not provided, (c) not within a desired range of accuracy, and (d) a geographical extent greater than or equal to a predetermined size, then said mobile station M$_1$ communicates with the network NTWK$_2$ for obtaining geolocation indicative data from a corresponding communication between: (i) the mobile station M$_1$, and (ii) at least one of: a receiver at a known location, and a transmitter at a known location.

63. The method of claim 61 wherein the M$_1$ geolocation indicative data and the M$_2$ geolocation indicative data are for substantially a same location.

64. The method of claim 12, wherein: (a) said predetermined destination is for a vehicle rental agency, (b) the mobile station M$_1$ resides in a rental vehicle of the rental agency, (c) said rental vehicle has been dropped off at a location that is remote from a premise operated by the vehicle rental agency, and (d) said location information corresponds to the location of the vehicle.

65. The method of claim 12, wherein said mobile station M$_1$ is included in a vehicle for wirelessly controlling one or more of the following vehicle operations: (a) locking or unlocking vehicle doors, (b) sensing a door position, (c) sensing a keypad depression, (d) sensing a condition of an engine, (e) sensing a condition of a vehicle brake, and (f) sensing a deployment of an air bag.

66. The method of claim 65, wherein said mobile station M$_1$ is in communication with a local area network of the vehicle for performing one or more of the vehicle operations.

67. The method of claim 12, further including a step of transmitting a request for locating the mobile station M$_1$ to the location providing system, wherein said request is encrypted.

68. The method of claim 12, further including a step of receiving data indicative of an event or a condition that occurs substantially at the mobile station $M_1$.

69. The method of claim 68, wherein the data is obtained via a local area network provided within a vehicle having the mobile station $M_1$.

70. The method of claim 68, wherein the data includes information indicative of a sudden change in an acceleration or deceleration force, or deployment of an air bag.

71. The method of claim 68, wherein the data includes information indicative of an emergency assistance call.

72. The method of claim 71, wherein the mobile station $M_1$ and the mobile station $M_2$ are identical.

73. The method of claim 68, wherein the data includes information indicative of the mobile station $M_1$ traveling into or out of a designated area.

74. The method of claim 12, wherein said using step includes communicating control data to the mobile station $M_1$ for controlling one or more devices co-located with the mobile station $M_1$.

75. The method of claim 12, wherein said receiving step includes one or more of the steps (i) and (ii) following:
(i) receiving the location information via: (1) a digital air interface voice channel or a wireline channel, and (2) an automatic call distributor; and
(ii) receiving the location information via: (3) a digital air interface voice channel or a wireline channel, and (4) a hunt group associated with a central office or a PBS group.

76. The method of claim 12, wherein said receiving step includes receiving said location information via at least one of: (a) a transmission through a network that includes a plurality of independently operated networks, and (b) the Internet.

77. The method of claim 76, further including receiving one or more updates to said location information without an individual request being transmitted for each of the updates.

78. The method of claim 12, further including receiving one or more updates to said location information without an individual request being transmitted for each of the updates.

79. The method of claim 78, wherein said updates are for one or more of: providing emergency assistance, and locating one or more vehicles.

80. The method of claim 12, further including transmitting, to the mobile station $M_1$, information for navigating a user of the mobile station $M_1$ to a desired geographical destination.

81. The method of claim 80, wherein said transmitting step includes transmitting a short message via a short messaging service.

82. The method of claim 80, wherein said information for navigating includes one or more of: a street address, and a building identification.

83. The method of claim 12, wherein said predetermined destination is an emergency assistance center.

84. The method of claim 12, wherein said location providing system uses said first input to perform one of: a triangulation, trilateration, and a multilateration for determining the geographical extent or position $G_1$ for the mobile station $M_1$.

85. The method of claim 84, wherein said location providing system uses said second input to perform one of: a triangulation, trilateration, and a multilateration for determining the geographical extent or position $G_2$ for the mobile station $M_2$, and the mobile station $M_1$ is different from the mobile station $M_2$.

86. The method of claim 12, wherein:
(a) the network $NTWK_1$ controls a plurality of base stations for providing two-way communication with the plurality of mobile stations; and
(b) the mobile station $M_1$ is recognized by the network $NTWK_1$ for receiving wireless service via the plurality of base stations.

87. The method of claim 12, wherein the first geolocation computation does not perform a geolocation computation that both: (i) uses a same geolocation content as the second input, and (ii) yields effectively a same geolocation result as the second geolocation computation.

88. The method of claim 12, wherein one of: the $M_1$ geolocation information, and the $M_2$ geolocation information includes a purposefully provided time delay.

89. The method of claim 13, wherein the location providing system performs at least one task of the following tasks:
(T1) determining a priority for performing geolocation related processing for locating one of the mobile stations $M_1$ and $M_2$;
(T2) selecting one or more of a plurality of geolocation generating sources, wherein the selection is dependent upon an availability of corresponding geolocation data for inputting to the geolocation generating sources, said corresponding geolocation data including a corresponding one of the first and second inputs for a corresponding one of the first and second geolocation computations;
(T3) resolving ambiguities between multiple location estimates for one of the mobile stations $M_1$ and $M_2$ being located;
(T4) generating an audit trail of a subscriber profile for a subscriber of a corresponding one of the mobile stations $M_1$ and $M_2$;
(T5) routing one of the first and second inputs to one or more geolocation generating sources according to an identification of the one of the first and second inputs;
(T6) associating different instances of geolocation data for obtaining a data ensemble for locating one of the mobile stations $M_1$ and $M_2$, wherein the instances are received from different sources or received at different times;
(T7) determining a signal processing or transmission capability of one of the mobile stations $M_1$ and $M_2$ being located;
(T8) determining a location of a base station;
(T9) determining if additional geolocation related information is needed to effectively locate one of the mobile stations $M_1$ and $M_2$ being located;
(T10) transmitting messages to one of the networks $NTWK_1$ and $NTWK_2$ for obtaining, when needed, additional geolocation related information; and
(T11) activating a signal processing component for adjusting a wireless signal path loss measurement.

90. The method of claim 89, wherein at least a plurality of the tasks (T1) through (T11) are performed.

91. The method of claim 89, wherein a majority of the tasks (T1) through (T11) are performed.

92. The method of claim 89, wherein at least some of the tasks (T1) through (T5) are performed.

93. The method of claim 89, wherein at least task (T5) is performed and at least some of the geolocation generating sources are distributed on a network.

94. The method of claim 89, wherein for locating each of the mobile stations $M_1$ and $M_2$, at least most of the tasks (T1) through (T11) are performed.

95. The method of claim 13 further including a step of transmitting a request for locating the mobile station $M_1$.

96. The method of claim 13, wherein (a) is satisfied.

97. The method of claim 13, wherein (b) is satisfied.

98. The method of claim 97, wherein for a geolocation computation ($CG_1$) that is the same as the first geolocation computation, or yields effectively a same geolocation result as the first geolocation computation when each is supplied with a geolocation content obtained from the first input, the location providing system does not perform $CG_1$ for locating $M_2$.

99. The method of claim 13, wherein at least one of the mobile stations $M_1$ and $M_2$ is capable of performing a base station handoff.

100. The method of claim 13, wherein the network $NTWK_1$ communicates with the mobile station $M_1$ via one or more of the wireless protocols: CDMA, W-CDMA, TDMA, GSM, AMPS, and NAMPS.

101. The method of claim 13, wherein for the mobile station $M_1$, the $M_1$ geolocation indicative data includes measurements of wireless signals indicative of a geolocation of the mobile station $M_1$.

102. The method of claim 13, wherein there is a common set of geolocation related messages used for communications between the location providing system, and each of the networks $NTWK_1$ and $NTWK_2$.

103. The method of claim 13, wherein for determining a location of the mobile station $M_1$, the first geolocation computation is performed after an additional geolocation related computation which includes using home location register obtained information, that is indicative of a coarse coverage area having the mobile station $M_1$ therein, to obtain the $M_1$ geolocation information.

104. The method of claim 103, wherein said home location register obtained information provides information for communicating with at least one $NTWK_1$ provisioned equipment for the coarse coverage area.

105. The method of claim 103, further including transmitting location related messages to a portion of the network $NTWK_1$ currently in communication the mobile station $M_1$.

106. The method of claim 13, further including the steps of:
receiving, from the network $NTWK_1$, at least one communication ($C_1$) via a message type ($MSG_1$) of a predetermined location related programming interface, wherein the communication $C_1$ includes one or more of: (a1) a request for determining a location of $M_1$, and (a2) a notification related to a change in location of $M_1$; and
transmitting, to the network $NTWK_1$, at least an instance of a message type ($MSG_2$) of the predetermined location related programming interface, wherein the instance of $MSG_2$ includes one of: (b1) a request for the $M_1$ geolocation information, and (b2) a request for notification related to a change in location of $M_1$.

107. The method of claim 106, wherein instances of the message types $MSG_1$ and $MSG_2$ are generated in a two way communication between the location providing system and the network $NTWK_2$ for determining a location of $M_2$.

108. The method of claim 13, wherein the first input includes geolocation information of a communication device for communicating with the mobile station $M_1$ and the network $NTWK_1$, wherein when the communication device detects the mobile station $M_1$, the communication device provides the mobile station $M_1$ with voice communication service via a different wireless interface from the wireless interface for communicating with the $NTWK_1$ when the mobile station $M_1$ not detected by the communication device.

109. The method of claim 108, wherein a geolocation of the communication device is identified with a location of a premises for a subscriber that subscribes to the network $NTWK_1$ using the mobile station $M_1$.

110. The method of claim 108, wherein the communication device includes a base station.

111. The method of claim 13, wherein the geographical extent or position $G_1$ is obtained using corresponding signal time delay measurements of the portion $P_1$, and the geographical extent or position $G_2$ is obtained using corresponding signal time delay measurements of the portion $P_2$, and wherein: (A) said first geolocation computation performs one of a triangulation, a trilateration, a multilateration, and a pattern recognition, and (B) said second geolocation computation performs one of a triangulation, a trilateration, a multilateration, and a pattern recognition.

112. The method of claim 13, wherein the geographical extent or position $G_1$ is obtained using a geographical extent or position ($G_{1,1}$) determined at the mobile station $M_1$, wherein $G_{1,1}$ is determined using signal time delay measurements of a wireless communication between: (1) the mobile station $M_1$, and (2) at least one of: a receiver at a known location, and a transmitter at a known location.

113. The method of claim 13, wherein the geographical extent or position $G_1$ is obtained using a signal time delay measurement from both a forward and reverse signal direction of a wireless communication between: (1) the mobile station $M_1$, and (2) at least one of: a receiver at a known location, and a transmitter at a known location.

114. The method of claim 13, wherein at least said first geolocation computation uses a signal time difference of arrival for determining the geographical extent or position $G_1$.

115. The method of claim 13, wherein (b) holds, and for determining the geographical extent or position $G_1$, the portion $P_1$ includes one of: (A) geolocation data from a distributed antenna system, and (B) geolocation data from a communication of a plurality of daisy chained base stations.

116. The method of claim 13, further including a step of providing information indicative of one of: an acceleration, and a velocity of the mobile station $M_1$.

117. The method of claim 13, wherein (a) is satisfied.

118. The method of claim 13, wherein (b) is satisfied.

119. The method of claim 13, wherein the mobile station $M_1$ is independently moveable from the location providing system.

120. The method of claim 119, wherein the mobile station $M_2$ is independently moveable from the location providing system, and $M_2$ is independently moveable from $M_1$.

121. The method of claim 119, wherein the mobile station $M_1$ is not physically connected to the location providing system.

122. The method of claim 13, wherein said step of first receiving is performed in a first two way communication between the network $NTWK_1$ and the location providing system using a predetermined location related programming interface for the first two way communication;
wherein said step of second receiving is performed in a second two way communication between the network $NTWK_2$ and the location providing system using the predetermined location related programming interface for the second two way communication;
wherein said location related programming interface includes at least two of (1-A) through (1-C) following:
(1-A) a message type for messages to the location providing system indicating that wireless location is requested for a response to an emergency;

(1-B) at least one message type for messages to the networks $NTWK_1$ and $NTWK_2$ for requesting, respectively, mobile station geolocation indicative data; and (1-C) at least one message type for messages to the networks $NTWK_1$ and $NTWK_2$ for requesting notification of a mobile station state change, the notification provided via an access to a home location register for the mobile station having the state change;

wherein for at least one of the message types (1-A) through (1-C), there is an instance of the at least one message type communicated in each of the first and second two way communications.

123. The method of claim 122, wherein said location related programming interface includes each of (1-A) through (1-C).

124. The method of claim 13, wherein said step of first receiving is performed in a first two way communication between the network $NTWK_1$ and the location providing system using a predetermined location related programming interface for the first two way communication;

wherein said step of second receiving is performed in a second two way communication between the network $NTWK_2$ and the location providing system using the predetermined location related programming interface for the second two way communication;

wherein for each mobile station (M) of a plurality of mobile stations, including the mobile station $M_1$ and the mobile station $M_2$, the predetermined location related programming interface includes a common set of message types for communicating with a plurality networks, including $NTWK_1$ and $NTWK_2$, wherein said common set of message types provides for communications using at least the following messages:

(i) an alert message from a home location register of the mobile station M, wherein the alert message includes information indicative of a change in an operational characteristic of the mobile station M, or a change in a geographical location of the mobile station M; and (ii) text transmission message for sending a short text message to the mobile station M, wherein the text transmission message includes location related information for M.

125. The method of claim 13, wherein for at least of the first and second geolocation computations, there is one portion of the at least one geolocation computation that is performed remotely from another portion thereof, wherein communication for using results from the one and the another portions occurs via a telecommunication network.

126. The method of claim 125, wherein the telecommunication network includes the Internet.

127. The method of claim 13, wherein the first and second service providers do not have a common owner that controls wireless subscriber services of both the networks $NTWK_1$ and $NTWK_2$.

128. The method of claim 13, wherein each of the first and second service providers have a different collection of subscribers for which wireless service is provided without contacting the other service provider.

129. The method of claim 13, wherein the first service provider operates a first mobile switching center for providing at least voice communication with mobile stations; and wherein the second service provider operates a different second mobile switching center for providing at least voice communication with mobile stations, wherein the first and second mobile switching centers are not operably controlled by a common entity for providing substantially all voice communication on both of the networks $NTWK_1$ and $NTWK_2$.

130. The method of claim 13, wherein the first service provider stores first subscriber information for a first collection of subscribers that subscribe to a first wireless service of the first service provider; and wherein the second service provider stores second subscriber information for a second collection of subscribers that subscribe to a second wireless service of the second service provider, wherein the first and second collections identify substantially different subscribers, and wherein a subscriber of the first service provider gains access to the second service by the first service provider receiving information from the second subscriber information.

131. The method of claim 13, wherein the first and second service providers are competitors for wireless subscribers.

132. The method of claim 13, wherein: the mobile station $M_1$ and the mobile station $M_2$ are identical.

133. The method of claim 132, wherein when a first instance of one of: the geographical extent or position $G_1$, and the location information is for the mobile station $M_1$; and wherein the first instance is one of (a) through (d) following:

(a) deemed ambiguous, (b) can not be provided, (c) is not within a desired range of accuracy, and (d) has a geographical extent greater than or equal to a predetermined size, then a step of instructing said mobile station $M_1$ to communicate with the network $NTWK_2$ is performed for obtaining geolocation indicative data from a corresponding communication between: (i) the mobile station $M_1$, and (ii) at least one of: a receiver at a known location, and a transmitter at a known location.

134. The method of claim 132 wherein the $M_1$ geolocation indicative data and the $M_2$ geolocation indicative data are for substantially a same location.

135. The method of claim 13, wherein: (a) said predetermined destination is related to a vehicle rental agency, (b) the mobile station $M_1$-resides in a rental vehicle of the rental agency, (c) said rental vehicle has been dropped off at a location that is remote from a premise operated by the vehicle rental agency, and (d) said location information corresponds to the location of the vehicle.

136. The method of claim 13, wherein said mobile station $M_1$ is included in a vehicle for wirelessly controlling one or more of the following vehicle operations: (a) locking or unlocking vehicle doors, (b) sensing a door position, (c) sensing a keypad depression, (d) sensing a condition of an engine, (e) sensing a condition of a vehicle brake, and (f) sensing a deployment of an air bag.

137. The method of claim 136, wherein said mobile station $M_1$ is in communication with a local area network of the vehicle for performing one or more of the vehicle operations.

138. The method of claim 13, wherein said request, for locating the mobile station $M_1$ is encrypted.

139. The method of claim 13, wherein said step of providing includes providing, to the predetermined destination, data indicative of an event or a condition that occurs substantially at the mobile station $M_1$.

140. The method of claim 139, wherein the data is obtained via a local area network provided within a vehicle having the mobile station $M_1$.

141. The method of claim 139, wherein the data includes information indicative of a sudden change in an acceleration or deceleration force, or deployment of an air bag.

142. The method of claim 139, wherein the data includes information indicative of an emergency assistance call.

143. The method of claim 142, wherein the mobile station $M_1$ and the mobile station $M_2$ are identical.

144. The method of claim 139, wherein the data includes information indicative of the mobile station $M_1$ traveling into or out of a designated area.

145. The method of claim 13, wherein said predetermined destination transmits control data to the mobile station $M_1$ for controlling one or more devices co-located with the mobile station $M_1$.

146. The method of claim 13, wherein said providing step includes one or more of (i) and (ii) following:
  (i) providing the location information via: (1) a digital air interface voice channel or a wireline channel, and (2) an automatic call distributor; and
  (ii) providing the location information via: (3) a digital air interface voice channel or a wireline channel, and (4) a hunt group associated with a central office or a PBS group.

147. The method of claim 13, wherein said providing step includes providing said location information via at least one of: (a) a transmission through a network that includes a plurality of independently operated networks, and (b) the Internet.

148. The method of claim 147, further including providing one or more updates of said location information, to the predetermined destination, without an individual request being transmitted for each of the updates.

149. The method of claim 13, further including providing one or more updates of said location information, to the predetermined destination, without an individual request being transmitted for each of the updates.

150. The method of claim 149, wherein said updates are for one or more of: providing emergency assistance, and locating one or more vehicles.

151. The method of claim 13, further including transmitting, to the mobile station $M_1$, information for navigating a user of the mobile station $M_1$ to a desired geographical destination.

152. The method of claim 151, wherein said transmitting step includes transmitting a short message via a short messaging service.

153. The method of claim 151, wherein said information for navigating includes one or more of: a street address, and a building identification.

154. The method of claim 13, wherein said predetermined destination is an emergency assistance center.

155. The method of claim 13, wherein said first geolocation computation performs one of: triangulation, trilateration, and multilateration for determining the geographical extent or position $G_1$ for the mobile station $M_1$.

156. The method of claim 155, wherein said second geolocation computation performs one of: a triangulation, trilateration, and a multilateration for determining the geographical extent or position $G_2$ for the mobile station $M_2$, and the mobile station $M_1$ is different from the mobile station $M_2$.

157. The method of claim 13, wherein:
  (a) the network $NTWK_1$ controls a plurality of base stations for providing two-way communication with a plurality of mobile stations; and
  (b) the mobile station $M_1$ is recognized by the network $NTWK_1$ for receiving wireless service via the plurality of base stations.

158. The method of claim 13, wherein the first geolocation computation does not perform a geolocation computation that both: (i) uses a same geolocation content as the second input, and (ii) yields effectively a same geolocation result as the second geolocation computation.

159. The method of claim 13, further including receiving a purposefully provided time delay as part of one of: the $M_1$ geolocation information, and the $M_2$ geolocation information.

160. The method of claim 17, wherein the location providing system performs at least one of one or more of the following tasks:
  (T1) determining a priority for performing geolocation related processing for locating one of the mobile stations $M_{1,1}$, $M_{1,2}$ and $M_2$;
  (T2) selecting one or more of a plurality of geolocation generating sources wherein the selection is dependent upon an availability of corresponding geolocation data for inputting to the geolocation generating sources, said corresponding geolocation data including a corresponding one of the first, second and third inputs for a corresponding one of the first, second and third geolocation computations;
  (T3) resolving ambiguities between multiple location estimates for one of the mobile stations $M_{1,1}$, $M_{1,2}$ and $M_2$ being located;
  (T4) generating an audit trail of a subscriber profile for a subscriber of a corresponding one of the mobile stations $M_{1,1}$, $M_{1,2}$ and $M_2$;
  (T5) routing one of the first, second and third inputs to one or more geolocation generating sources according to an identification of the one of the first and second inputs;
  (T6) associating different instances of geolocation data for obtaining a data ensemble for locating one of the mobile stations $M_{1,1}$, $M_{1,2}$ and $M_2$, wherein the instances are received from different sources or received at different times;
  (T7) determining a signal processing or transmission capability of one of the mobile stations $M_{1,1}$, $M_{1,2}$ and $M_2$ being located;
  (T8) determining a location of a base station;
  (T9) determining if additional geolocation related information is needed to effectively locate one of the mobile stations $M_{1,1}$, $M_{1,2}$ and $M_2$ being located;
  (T10) transmitting messages to one of the networks $NTWK_1$ and $NTWK_2$ for obtaining, when needed, additional geolocation related information; and
  (T11) activating a signal processing component for adjusting a wireless signal path loss measurement.

161. The method of claim 160, wherein at least a plurality of the tasks (T1) through (T11) are performed.

162. The method of claim 160, wherein a majority of the tasks (T1) through (T11) are performed.

163. The method of claim 160, wherein at least some of the tasks (T1) through (T5) are performed.

164. The method of claim 160, wherein at least task (5) is performed and at least some of the geolocation generating sources are distributed on a network.

165. The method of claim 160, wherein for locating each of the mobile stations $M_{1,1}$, $M_{1,2}$ and $M_2$, at least most of the tasks (T1) through (T11) are performed.

166. The method of claim 17 further including a step of receiving a request for locating the mobile station $M_{1,1}$.

167. The method of claim 17, wherein (a) is satisfied.

168. The method of claim 17, wherein (b) is satisfied.

169. The method of claim 168, wherein for a geolocation computation ($CG_1$) that is the same as the first geolocation computation, or yields effectively a same geolocation result as the first geolocation computation when each is supplied with a geolocation content obtained from the first input, the location providing system does not perform $CG_1$ for locating at least one of $M_{1,2}$ and $M_2$.

170. The method of claim 17, wherein (c) is satisfied.

171. The method of claim 17, wherein at least one of the mobile stations $M_{1,2}$, $M_{1,2}$ and $M_2$ is capable of performing a base station handoff.

172. The method of claim 17, wherein the network $NTWK_1$ communicates with each of the mobile stations $M_{1,1}$, and $M_{1,2}$ via one or more of the wireless protocols: CDMA, W-CDMA, TDMA, GSM, AMPS, and NAMPS.

173. The method of claim 17, wherein for at least one of the mobile stations $M_{1,1}$ and $M_{1,2}$, the corresponding one of: the $M_{1,1}$ geolocation indicative data and the $M_{1,2}$ geolocation indicative data includes measurements of wireless signals, wherein the measurements are indicative of a geolocation of the at least one mobile station.

174. The method of claim 17, wherein there is a common set of geolocation related messages used for communications between the location providing system, and each of the networks $NTWK_1$ and $NTWK_2$.

175. The method of claim 17, wherein for determining a location of at least one of the mobile stations $M_{1,1}$, and $M_{1,2}$, a corresponding geolocation computation of one of the first, and second geolocation computations is performed by the location providing system after an additional geolocation related computation which includes accessing from a home location register for the at least one mobile station, information indicative of a coarse coverage area for the at least one mobile station, said information indicative of the coarse coverage area used to obtain the corresponding one of the $M_{1,1}$ geolocation information and the $M_{1,2}$ geolocation information.

176. The method of claim 175, wherein said wherein the information indicative of the coarse coverage area provides information for communicating with at least one $NTWK_1$ provisioned equipment for the coarse coverage area.

177. The method of claim 175, further including receiving location related messages for a portion of the network $NTWK_1$ currently in communication the mobile station $M_1$.

178. The method of claim 17, further including the steps of:
transmitting, to the location providing system, at least one communication ($C_1$) via a message type ($MSG_1$) of a predetermined location related programming interface, wherein the communication $C_1$ includes one or more of: (a1) a request for determining a location of $M_{1,1}$, and (a2) a notification related to a change in location of $M_{1,1}$; and
receiving at least an instance of a message type ($MSG_2$) of the predetermined location related programming interface from the location providing system, wherein the instance of $MSG_2$ includes one of: (b1) a request for the $M_{1,1}$ geolocation information, and (b2) a request for notification related to a change in location of $M_{1,1}$.

179. The method of claim 178, wherein instances of the message types $MSG_1$ and $MSG_2$ are generated in a two way communication with the network $NTWK_2$ for determining a location of $M_2$.

180. The method of claim 17, wherein the second geolocation related information includes geolocation information of a communication device for communicating with the mobile station $M_{1,2}$ and the network $NTWK_1$, wherein when the communication device detects the mobile station $M_1$, the communication device provides the mobile station $M_{1,2}$ with voice communication service via a different wireless interface from the wireless interface for communicating with the $NTWK_1$ when the mobile station $M_1$ not detected by the communication device.

181. The method of claim 180, wherein a geolocation of the communication device is identified with a location of a premises for a subscriber that subscribes to the network $NTWK_1$ using the mobile station $M_{1,2}$.

182. The method of claim 180, wherein the communication device includes a base station.

183. The method of claim 17, wherein the geographical extent or position $G_{1,1}$ is obtained using corresponding signal time delay measurements of the portion $P_{1,1}$, and the geographical extent or position $G_2$ is obtained using a corresponding signal time delay measurements of the portion $P_2$, and wherein: (A) said first geolocation computation performs one of a triangulation, a trilateration, a multilateration, and a pattern recognition, and (B) said second geolocation computation performs one of a triangulation, a trilateration, a multilateration and a pattern recognition.

184. The method of claim 17, wherein the geographical extent or position $G_{1,1}$ is obtained using a geographical extent or position ($G_{1,3}$) determined at the mobile station $M_{1,1}$, wherein $G_{1,3}$ is determined using signal time delay measurements of a wireless communication between: (1) the mobile station $M_{1,1}$, and (2) at least one of: a receiver at a known location, and a transmitter at a known location.

185. The method of claim 17, wherein the geographical extent or position $G_{1,1}$ is obtained using a signal time delay measurement from both a forward and reverse signal direction of a wireless communication between: (1) the mobile station $M_{1,1}$, and (2) at least one of: a receiver at a known location, and a transmitter at a known location.

186. The method of claim 17, wherein at least said first geolocation computation uses a signal time difference of arrival for determining the geographical extent or position $G_{1,1}$.

187. The method of claim 17, wherein (b) holds, and for determining the geographical extent or position $G_{1,1}$, the first input includes one of: (A) geolocation data from a distributed antenna system, and (B) geolocation data from a communication of a plurality of daisy chained base stations.

188. The method of claim 17, further including a step of obtaining information indicative of one of: an acceleration, and a speed of the mobile station $M_{1,1}$.

189. The method of claim 17, wherein (a) is satisfied.

190. The method of claim 17, wherein (b) is satisfied.

191. The method of claim 17, wherein the mobile station $M_{1,1}$ is independently moveable from the location providing system.

192. The method of claim 191, wherein the mobile station $M_2$ is independently moveable from the location providing system, and $M_2$ is independently moveable from $M_1$.

193. The method of claim 191, wherein the mobile station $M_{1,1}$ is not physically connected to the location providing system.

194. The method of claim 17, wherein there is a first two way communication between the network $NTWK_1$ and the location providing system using a predetermined location related programming interface for the first two way communication;
wherein there is a second two way communication between the network $NTWK_2$ and the location providing system using the predetermined location related programming interface for the second two way communication;

wherein said location related programming interface includes at least two of (1-A) through (1-C) following: (1-A) a message type for messages to the location providing system indicating that a location is requested for a response to an emergency; (1-B) at least one message type for messages to the networks $NTWK_1$ and $NTWK_2$ for requesting, respectively, said first and second geolocation related information; and (1-C) at least one message type for messages to the networks $NTWK_1$ and $NTWK_2$ for requesting notification of a mobile station state change, the notification provided via an access to a home location register for the mobile station having the state change;

wherein for at least one of the message types (1-A) through (1-C), there is an instance of the at least one message type communicated in each of the first and second two way communications.

195. The method of claim 194, wherein said location related programming interface includes each of (1-A) through (1-C).

196. The method of claim 17, wherein there is a first two way communication between the network $NTWK_1$ and the location providing system using a predetermined location related programming interface for the first two way communication;

wherein there is a second two way communication between the network $NTWK_2$ and the location providing system using the predetermined location related programming interface for the second two way communication;

wherein for each mobile station (M) of a plurality of mobile stations, including the mobile station $M_{1,1}$ and the mobile station $M_2$, the predetermined location related programming interface includes a common set of message types for communicating with a plurality networks, including $NTWK_1$ and $NTWK_2$, wherein said common set of message types provides for communications using at least the following messages:

(i) an alert message from a home location register of the mobile station M, wherein the alert message includes information indicative of a change in an operational characteristic of the mobile station M, or a change in a geographical location of the mobile station M; and (ii) text transmission message for sending a short text message to the mobile station M, wherein the text transmission message includes location related information for M.

197. The method of claim 17, wherein for at least one of the first and second geolocation computations, there is one portion of the at least one geolocation computation that is performed remotely from another portion thereof, wherein communication for using results from the one and the another portions occurs via a telecommunication network.

198. The method of claim 197, wherein the telecommunication network includes the Internet.

199. The method of claim 17, wherein the first and second service providers do not have a common owner that controls wireless subscriber services of both the networks $NTWK_1$ and $NTWK_2$.

200. The method of claim 17, wherein each of the first and second service providers have a different collection of subscribers for which wireless service is provided without contacting the other service provider.

201. The method of claim 17 further including a step of operating a first mobile switching center for providing at least voice communication with mobile stations; and wherein the second service provider operates a different second mobile switching center for providing at least voice communication with mobile stations, wherein the first and second mobile switching centers are not operably controlled by a common entity for providing substantially all voice communication on both of the networks $NTWK_1$ and $NTWK_2$.

202. The method of claim 17, further includes a step of storing first subscriber information for a first collection of subscribers that subscribe to a first wireless service provided by the first service provider; and wherein the second service provider stores a second subscriber information for a second collection of subscribers that subscribe to a second wireless service provided by the second service provider, wherein the first and second collections identify substantially different subscribers, and wherein a subscriber of the first service provider gains access to the second wireless service by the first service provider receiving information from the second subscriber information.

203. The method of claim 17, wherein the first and second service providers are competitors for wireless subscribers.

204. The method of claim 17, wherein: the mobile station $M_{1,1}$ and the mobile station $M_2$ are identical.

205. The method of claim 204, wherein when a first instance of the geographical extent or position $G_{1,1}$ is determined to be one of:

(a) ambiguous, (b) not provided, (c) not within a desired range of accuracy, and (d) a geographical extent greater than or equal to a predetermined size, then said mobile station $M_{1,1}$ communicates with the network $NTWK_2$ for obtaining geolocation indicative data from a corresponding communication between: (i) the mobile station $M_{1,1}$, and (ii) at least one of: a receiver at a known location, and a transmitter at a known location.

206. The method of claim 204 wherein the first geolocation related information and the second geolocation related information are for substantially a same location.

207. The method of claim 17, wherein: (a) location information for $M_{1,1}$ is provided by the location providing system to a predetermined destination for a vehicle rental agency, (b) the mobile station-$M_{1,1}$ resides in a rental vehicle of the rental agency, (c) said rental vehicle has been dropped off at a location that is remote from a premise operated by the vehicle rental agency, and (d) said location information corresponds to the location of the vehicle.

208. The method of claim 17, wherein said mobile station $M_{1,1}$ is included in a vehicle for wirelessly controlling one or more of the following vehicle operations: (a) locking or unlocking vehicle doors, (b) sensing a door position, (c) sensing a keypad depression, (d) sensing a condition of an engine, (e) sensing a condition of a vehicle brake, and (f) sensing a deployment of an air bag.

209. The method of claim 208, wherein said mobile station $M_{1,1}$ is in communication with a local area network of the vehicle for performing one or more of the vehicle operations.

210. The method of claim 17, further including a step of transmitting a request for locating the mobile station $M_{1,1}$ to the location providing system, wherein said request is encrypted.

211. The method of claim 17, further including a step of receiving data indicative of an event or a condition that occurs substantially at the mobile station $M_{1,1}$.

212. The method of claim 211, wherein the data is obtained via a local area network provided within a vehicle having the mobile station $M_{1,1}$.

213. The method of claim 211, wherein the data includes information indicative of a sudden change in an acceleration or deceleration force, or deployment of an air bag.

214. The method of claim 211, wherein the data includes information indicative of an emergency assistance call.

215. The method of claim 214, wherein the mobile station $M_{1,1}$ and the mobile station $M_2$ are identical.

216. The method of claim 211, wherein the data includes information indicative of the mobile station $M_{1,1}$ traveling into or out of a designated area.

217. The method of claim 17, further including receiving a communication of control data for controlling one or more devices co-located with the mobile station $M_{1,1}$.

218. The method of claim 17 further including one or more of steps (i) and (ii) following:
  (i) receiving the location information via: (1) a digital air interface voice channel or a wireline channel, and (2) an automatic call distributor; and
  (ii) receiving the location information via: (3) a digital air interface voice channel or a wireline channel, and (4) a hunt group associated with a central office or a PBS group.

219. The method of claim 17, wherein said location providing system provides, to a predetermined destination, location information dependent upon or identical to $G_{1,1}$ via at least one of: (a) a transmission through a network that includes a plurality of independently operated networks, and (b) the Internet.

220. The method of claim 219, further including providing one or more updates of said first geolocation related information to the location providing system without an individual request being transmitted for each of the updates.

221. The method of claim 17, further including providing one or more updates of said $M_{1,1}$ geolocation information without an individual request being transmitted for each of the updates.

222. The method of claim 221, wherein said updates are for one or more of: providing emergency assistance, and locating one or more vehicles.

223. The method of claim 17, further including transmitting, to the mobile station $M_{1,1}$, information for navigating a user of the mobile station $M_{1,1}$ to a desired geographical destination.

224. The method of claim 223, wherein said transmitting step includes transmitting a short message via a short messaging service.

225. The method of claim 223, wherein said information for navigating includes one or more of: a street address, and a building identification.

226. The method of claim 17, wherein said first geolocation related information is for an emergency assistance call.

227. The method of claim 17, wherein the transmission of said $M_{1,1}$ geolocation information includes data so that the first geolocation computation performs one of: a triangulation, trilateration, and a multilateration for determining the geographical extent or position $G_{1,1}$ for the mobile station $M_{1,1}$.

228. The method of claim 227, wherein the transmission of said $M_2$ geolocation information includes data so that the second geolocation computation performs one of: a triangulation, trilateration, and a multilateration for determining the geographical extent or position $G_2$ for the mobile station $M_2$, and the mobile station $M_{1,1}$ is different from the mobile station $M_2$.

229. The method of claim 17, wherein:
  (a) the network $NTWK_1$ controls a plurality of base stations for providing two-way communication with a plurality of mobile stations; and
  (b) the mobile station $M_{1,1}$ is recognized by the network $NTWK_1$ for receiving wireless service via the plurality of base stations.

230. The method of claim 17, wherein the first geolocation computation does not perform a geolocation computation that both: (i) uses a same geolocation content as the second input and, (ii) yields effectively a same geolocation result as the second geolocation computation.

231. The method of claim 17, further including transmitting a purposefully provided time delay as part of one of: the $M_{1,1}$ geolocation information, and the $M_2$ geolocation information.

232. The method of claim 17, wherein (c) is satisfied.

* * * * *